(12) United States Patent
Yoshimatsu et al.

(10) Patent No.: US 9,307,260 B2
(45) Date of Patent: Apr. 5, 2016

(54) IMAGE DECODING APPARATUS, IMAGE DECODING METHOD, IMAGE CODING APPARATUS, AND IMAGE CODING METHOD

(75) Inventors: Naoki Yoshimatsu, Aichi (JP); Takeshi Tanaka, Osaka (JP); Keiichi Kurokawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1014 days.

(21) Appl. No.: 13/498,685

(22) PCT Filed: Jul. 27, 2011

(86) PCT No.: PCT/JP2011/004259
§ 371 (c)(1),
(2), (4) Date: Mar. 28, 2012

(87) PCT Pub. No.: WO2012/014471
PCT Pub. Date: Feb. 2, 2012

(65) Prior Publication Data
US 2012/0183079 A1    Jul. 19, 2012

(30) Foreign Application Priority Data

Jul. 30, 2010  (JP) ................................ 2010-173069

(51) Int. Cl.
*H04N 7/26*   (2006.01)
*H04N 19/436*  (2014.01)
(Continued)

(52) U.S. Cl.
CPC ........... *H04N 19/436* (2014.11); *H04N 19/129* (2014.11); *H04N 19/156* (2014.11);
(Continued)

(58) Field of Classification Search
CPC ... H04N 19/436; H04N 19/44; H04N 19/129; H04N 19/156; H04N 19/167; H04N 19/174; H04N 19/61; H04N 19/70; H04N 19/85

USPC .......................... 375/240.25, 240.01, E7.026
See application file for complete search history.

(56) References Cited

U.S. PATENT DOCUMENTS

| 7,881,541 B2 | 2/2011 | Kashima et al. |
| 2005/0053158 A1* | 3/2005 | Regunathan ......... H04N 19/105 375/240.25 |

(Continued)

FOREIGN PATENT DOCUMENTS

| JP | 2000-295616 | 10/2000 |
| JP | 2003-32679 | 1/2003 |

(Continued)

OTHER PUBLICATIONS

Rong Luo, Bin Chen, "A Hierarchical Scheme of Flexible Macroblock Ordering for ROI based H.264/AV Video Coding" in Advanced Communication Technology, 2008, ICACT 2008. 10th International Conference on, vol. 3, No., pp. 1579-1582, Feb. 17-20, 2008.*

(Continued)

*Primary Examiner* — William C Vaughn, Jr.
*Assistant Examiner* — Naod Belai
(74) *Attorney, Agent, or Firm* — Wenderoth, Lind & Ponack, L.L.P.

(57) ABSTRACT

An image decoding apparatus (100) capable of appropriately executing parallel decoding processing by a simple structure includes: a stream segmentation control unit (140) that designates a processing target area, and selects a portion of a segment stream based on a position of the processing target area; M stream segmentation units (130) that generate M×N segment streams by executing stream segmentation processing on designated M processing target areas in parallel; and N decoding engines (120) that decode respective portions of the N segment streams including the selected portion in parallel. In the case where a slice included in the processing target area is segmented into a plurality of slice portions and assigned to a plurality of segment streams, each stream segmentation unit (130) reconstructs, for each segment stream, a slice portion group made up of one or more slice portions assigned to the segment stream, as a new slice.

16 Claims, 59 Drawing Sheets

(51) Int. Cl.
*H04N 19/44* (2014.01)
*H04N 19/70* (2014.01)
*H04N 19/129* (2014.01)
*H04N 19/61* (2014.01)
*H04N 19/156* (2014.01)
*H04N 19/174* (2014.01)
*H04N 19/167* (2014.01)
*H04N 19/85* (2014.01)

(52) U.S. Cl.
CPC ........... *H04N19/167* (2014.11); *H04N 19/174* (2014.11); *H04N 19/44* (2014.11); *H04N 19/61* (2014.11); *H04N 19/70* (2014.11); *H04N 19/85* (2014.11)

(56) References Cited

U.S. PATENT DOCUMENTS

| | | | |
|---|---|---|---|
| 2006/0093042 A1 | 5/2006 | Kashima et al. | |
| 2008/0031329 A1* | 2/2008 | Iwata | H04N 19/176 375/240.12 |
| 2008/0063082 A1* | 3/2008 | Watanabe et al. | 375/240.23 |
| 2008/0069244 A1 | 3/2008 | Yano | |
| 2008/0151997 A1* | 6/2008 | Oguz | 375/240.02 |
| 2010/0080303 A1 | 4/2010 | Suzuki | |
| 2010/0080304 A1* | 4/2010 | Reddy et al. | 375/240.26 |
| 2010/0128801 A1 | 5/2010 | Hashimoto | |
| 2010/0215263 A1 | 8/2010 | Imanaka | |
| 2010/0254620 A1 | 10/2010 | Iwahashi et al. | |
| 2010/0266049 A1 | 10/2010 | Hashimoto et al. | |
| 2010/0322317 A1 | 12/2010 | Yoshimatsu et al. | |

FOREIGN PATENT DOCUMENTS

| | | |
|---|---|---|
| JP | 2006-129284 | 5/2006 |
| JP | 2008-67026 | 3/2008 |
| JP | 2008-72647 | 3/2008 |
| JP | 2008-306450 | 12/2008 |
| JP | 2009-246539 | 10/2009 |
| JP | 2010-41352 | 2/2010 |
| JP | 2010-109572 | 5/2010 |
| WO | 2007/136093 | 11/2007 |
| WO | 2008/139708 | 11/2008 |
| WO | 2009/119888 | 10/2009 |
| WO | 2009/150801 | 12/2009 |
| WO | 2010/041472 | 4/2010 |
| WO | 2010/067505 | 6/2010 |

OTHER PUBLICATIONS

International Search Report issued Nov. 1, 2011 in corresponding International Application No. PCT/JP2011/004259.

Jie Zhao et al., "New Results using Entropy Slices for Parallel Decoding", ITU-Telecommunications Standardization Sector Study Group 16 Question 6 Video Coding Experts Group (VCEG) 35$^{th}$ Meeting: Berlin, Germany, Document VCEG-AI32, ITU-T, Jul. 2008, pp. 1-9.

Bongsoo Jung et al., "Adaptive slice-level parallelism for H.264/AVC encoding using pre macroblock mode selection", Journal of Visual Communication and Image Representation, Oct. 2008, vol. 19, No. 8, pp. 558-572.

Michael Roitzsch, "Slice-Balancing H.264 Video Encoding for Improved Scalability of Multicore Decoding", EMSOFT '07 Proceedings of the 7$^{th}$ ACM & IEEE International Conference on Embedded Software, Sep. 30, 2007, pp. 269-278.

Extended European Search Report issued May 6, 2015 in corresponding European Application No. 11812073.2.

Eiji Iwata et al., "Exploiting Coarse-Grain Parallelism in the MPEG-2 Algorithm," Internet Citation, Sep. 1998, XP002300648, URL: *Stanford University, Computer Systems Lab*, retrieved on Oct. 13, 2004, pp. 1-13.

\* cited by examiner

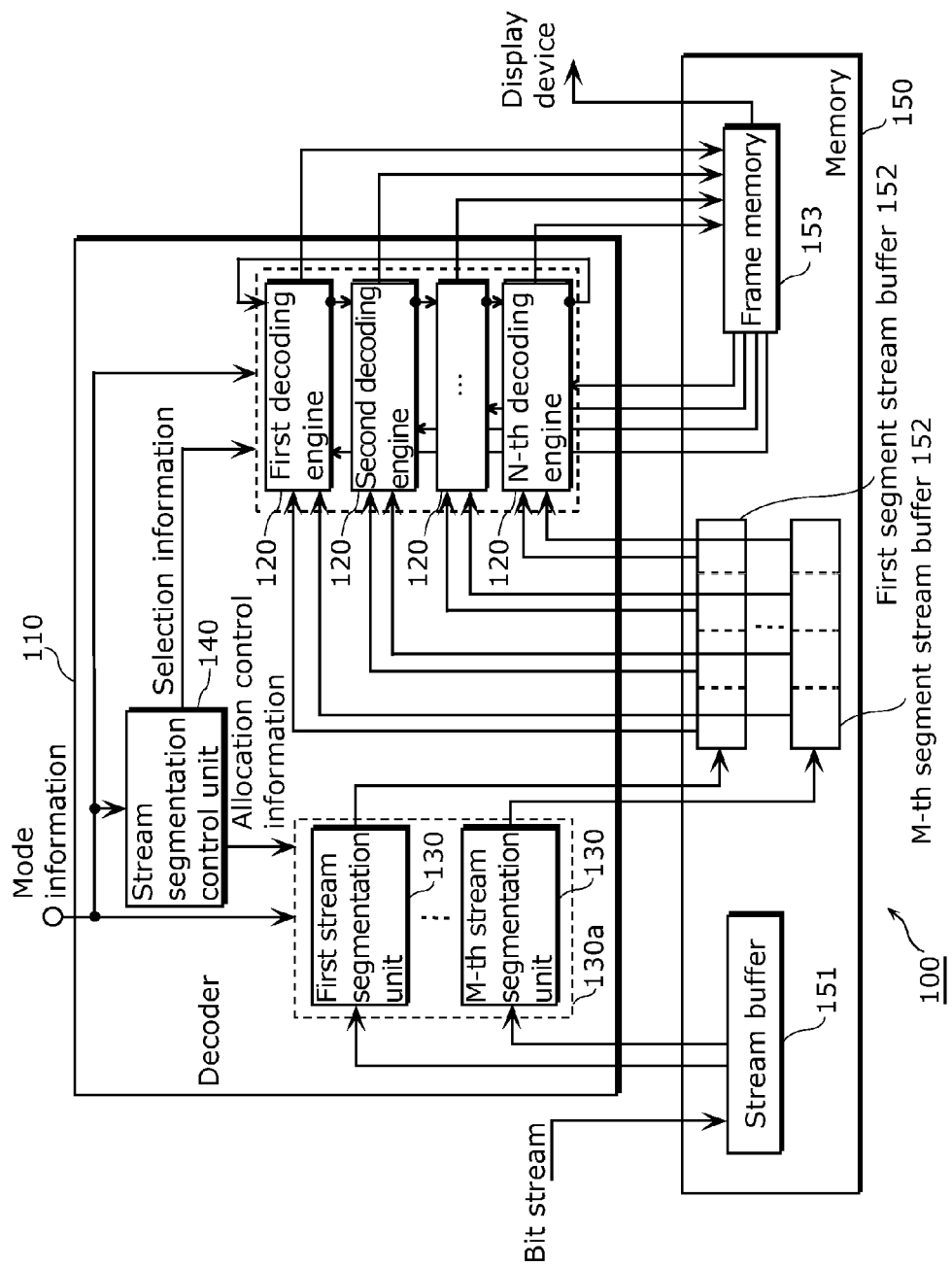

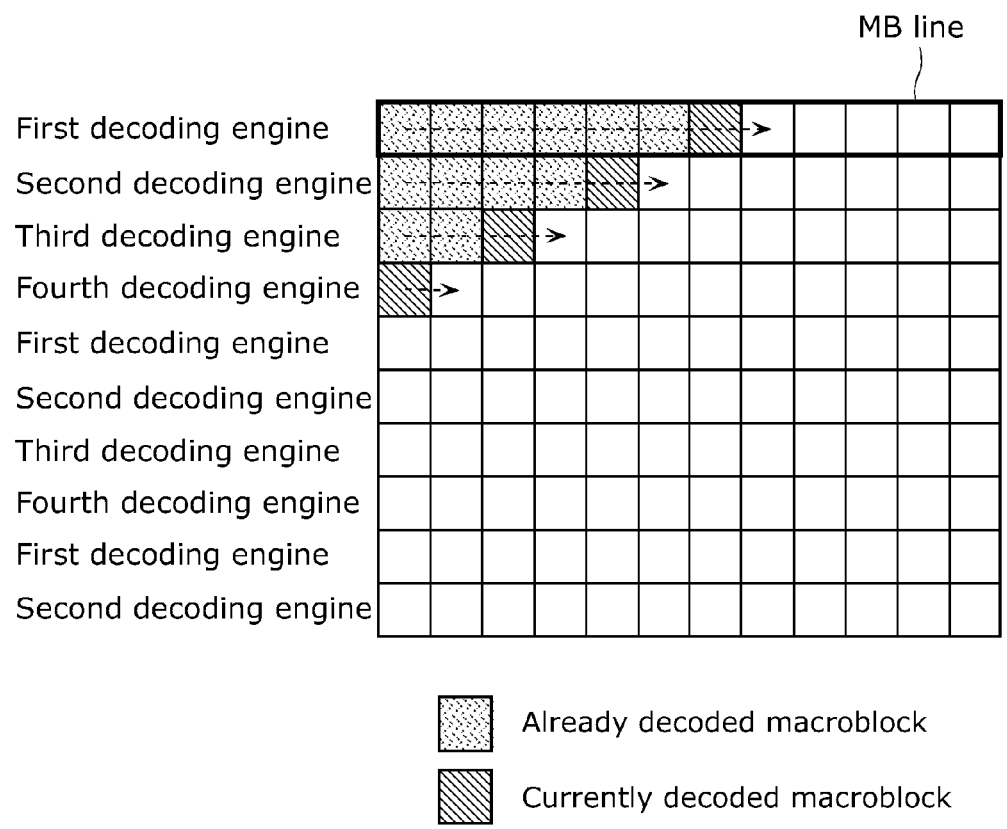

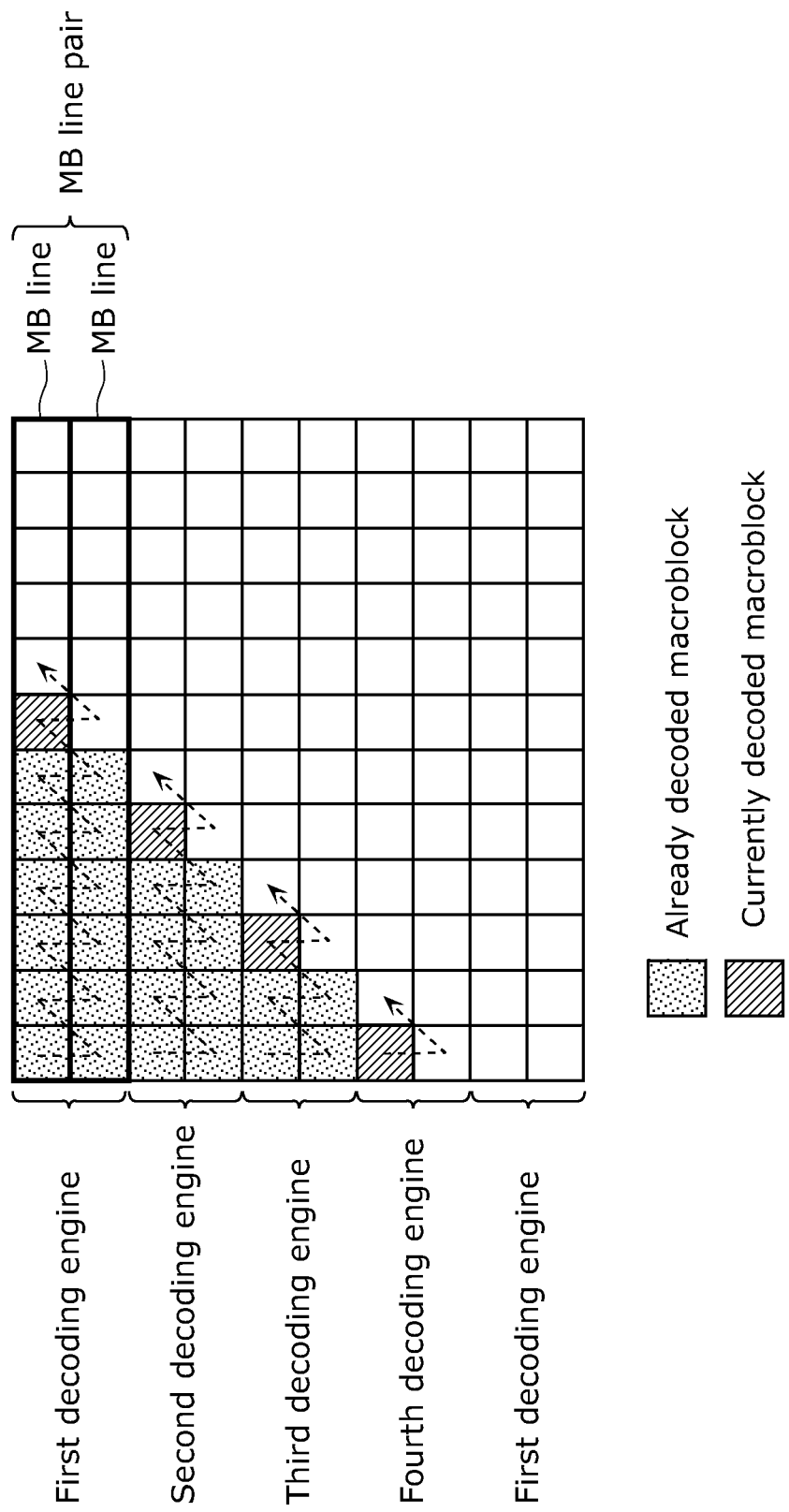

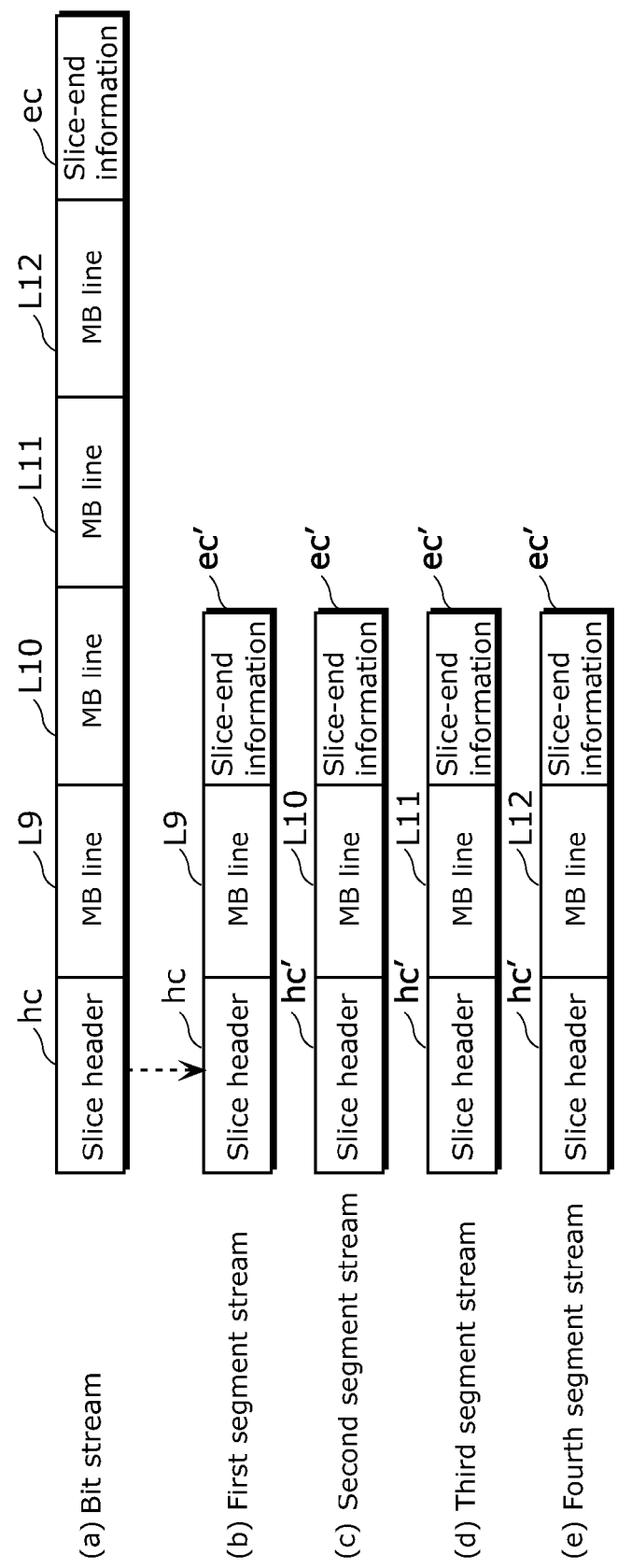

FIG. 8

| | | |
|---|---|---|
| Slice 0 selection information | Segment stream buffer information: 1 | NAL unit number information : 3 |
| Slice 1 selection information | Segment stream buffer information: 2 | NAL unit number information : 2 |
| Slice 2 selection information | Segment stream buffer information: 2 | NAL unit number information : 1 |
| Slice 3 selection information | Segment stream buffer information: 1 | NAL unit number information : 2 |
| Slice 4 selection information | Segment stream buffer information: 2 | NAL unit number information : 1 |
| .. | .. | .. |

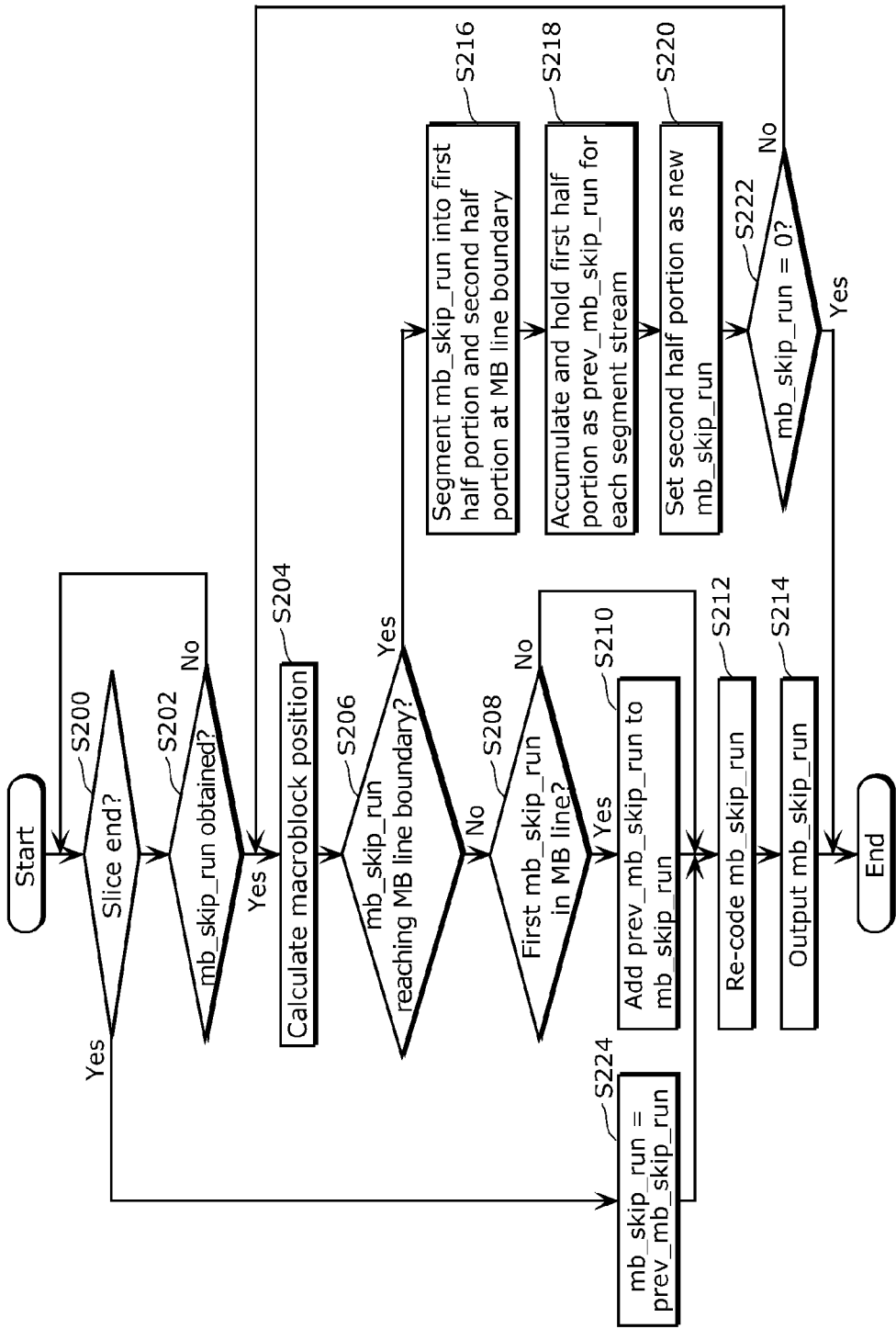

FIG. 34

| | Partial stream buffer information: 1 | NAL unit number information : 3 |
|---|---|---|
| Slice 0 selection information | Partial stream buffer information: 2 | NAL unit number information : 2 |
| Slice 1 selection information | Partial stream buffer information: 2 | NAL unit number information : 1 |
| Slice 2 selection information | Partial stream buffer information: 1 | NAL unit number information : 2 |
| Slice 3 selection information | Partial stream buffer information: 2 | NAL unit number information : 1 |
| Slice 4 selection information | .. | .. |
| .. | | |

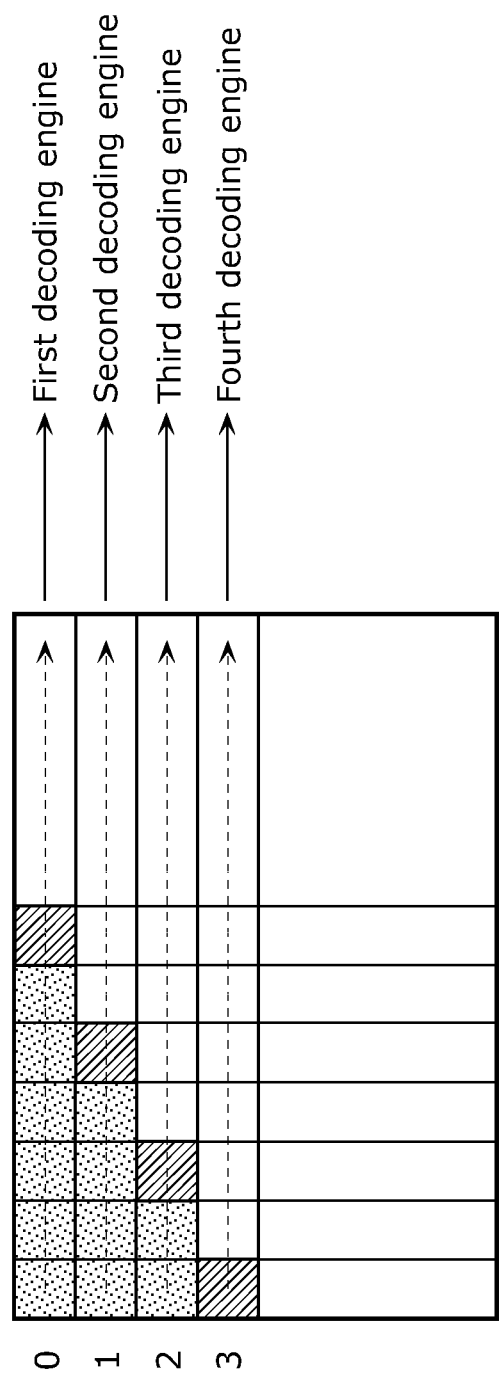

IMAGE DECODING APPARATUS, IMAGE DECODING METHOD, IMAGE CODING APPARATUS, AND IMAGE CODING METHOD

TECHNICAL FIELD

The present invention relates to an image decoding apparatus and an image decoding method for decoding a bit stream generated by coding image data, and an image coding apparatus and an image coding method for generating a bit stream by coding image data. The present invention particularly relates to an image decoding apparatus and an image decoding method for executing decoding in parallel, and an image coding apparatus and an image coding method for executing coding in parallel.

BACKGROUND ART

An image coding apparatus for coding a moving picture segments each picture constituting the moving picture into macroblocks, and codes the moving picture on a macroblock basis. The image coding apparatus thus generates a bit stream representing the coded moving picture.

FIG. 44 is a diagram showing a structure of a picture to be coded.

The picture is segmented into macroblocks composed of 16×16 pixels, and coded. Here, a plurality of macroblocks included in the picture constitute a slice, and a plurality of slices constitute the picture. A structural unit of one row of macroblocks horizontally arranged from a left end to a right end of the picture is referred to as a macroblock line (MB line).

FIG. 45 is a diagram showing a structure of a bit stream.

The bit stream is hierarchical and, as shown in FIG. 45(*a*), includes a header and a plurality of pictures arranged in coding order. The header includes, for example, a sequence parameter set (SPS) referenced to for decoding a sequence composed of the plurality of pictures. As shown in FIG. 45(*b*), each of the coded pictures includes a header and a plurality of slices. Likewise, as shown in FIG. 45(*c*), each of the slices includes a header and a plurality of macroblocks (MBs). The header at the beginning of the picture in FIG. 45(*b*) includes, for example, a picture parameter set (PPS) referenced to for decoding the picture.

FIG. 46 is a diagram showing a structure of a conventional image decoding apparatus.

An image decoding apparatus 1300 includes a memory 1310 and a decoding engine 1320. The memory 1310 includes a stream buffer 1311 having an area for storing a bit stream, and a frame memory 1312 having an area for storing decoded image data outputted by the decoding engine 1320. The image decoding apparatus 1300 obtains coded image data such as macroblocks and pictures included in the bit stream sequentially from the beginning side, and stores the coded image data into the stream buffer 1311.

The decoding engine 1320 sequentially reads the coded image data from the stream buffer 1311 in decoding order, decodes the coded image data, and stores the decoded image data generated by the decoding into the frame memory 1312. The decoding engine 1320 decodes the coded image data with reference to the decoded image data already stored in the frame memory 1312.

The decoded image data stored in the frame memory 1312 is outputted to a display device in display order, and displayed.

FIG. 47 is a diagram showing a structure of the decoding engine 1320.

The decoding engine 1320 includes an entropy decoding unit 1321, an inverse transform unit 1322, an adder 1323, a deblocking filter 1324, a motion compensation unit 1325, a weighted prediction unit 1326, an intra-picture prediction unit 1327, and a switch 1328.

The entropy decoding unit 1321 performs entropy decoding on coded image data to generate quantized data indicating quantized values, and outputs the quantized data to the inverse transform unit 1322.

The inverse transform unit 1322 performs inverse quantization, inverse orthogonal transform, and the like on the quantized data to transform the quantized data into difference image data.

The adder 1323 generates decoded image data by adding the difference image data outputted from the inverse transform unit 1322 and predicted image data outputted from either the weighted prediction unit 1326 or the intra-picture prediction unit 1327 via the switch 1328.

The deblocking filter 1324 removes coding distortion included in the decoded image data generated by the adder 1323, and stores the decoded image data without the coding distortion into the frame memory 1312.

The motion compensation unit 1325 reads the decoded image data stored in the frame memory 1312 and performs motion compensation thereon to generate predicted image data, and outputs the predicted image data to the weighted prediction unit 1326.

The weighted prediction unit 1326 adds a weight to the predicted image data outputted from the motion compensation unit 1325, and outputs the predicted image data to the switch 1328.

The intra-picture prediction unit 1327 performs intra-picture prediction. In other words, the intra-picture prediction unit 1327 performs intra-picture prediction using the decoded image data generated by the adder 1323 to generate predicted image data, and outputs the predicted image data to the switch 1328.

In the case where the difference image data outputted from the inverse transform unit 1322 is generated by intra-picture prediction, the switch 1328 outputs the predicted image data that is outputted from the intra-picture prediction unit 1327, to the adder 1323. In the other case where the difference image data outputted from the inverse transform unit 1322 is generated by inter-picture prediction, the switch 1328 outputs the predicted image data that is outputted from the weighted prediction unit 1326, to the adder 1323.

Recent years have seen increases in resolution and frame rate of images. HD (High Definition) image coding and decoding are currently implemented, but image coding and decoding using higher resolutions and higher frame rates are also expected. More specifically, moving pictures having a so-called 4k2k resolution are under consideration for practical use.

FIG. 48 is an illustration of HD and 4k2k.

HD bit streams are distributed via terrestrial digital broadcasting, BS digital broadcasting, and the like, where pictures having a resolution of "1920×1080 pixels" are decoded and displayed at a frame rate of 30 frames per second. 4k2k bit streams are scheduled to be experimentally distributed via high BS digital broadcasting from 2011, where pictures having a resolution of "3840×2160 pixels" are decoded and displayed at a frame rate of 60 frames per second.

In short, a 4k2k bit stream has vertical and horizontal resolutions two times those of an HD bit stream, and has a frame rate two times that of the HD bit stream.

Furthermore, coding and decoding of 8k4k images (7680×4320 pixels) having vertical and horizontal resolutions two times those of 4k2k images are expected to come under consideration.

Such increases in resolution and frame rate of images inevitably result in significant increases in processing load that is placed on decoding engines of image decoding apparatuses. For example, in the case of decoding a 4k2k bit stream, the decoding engine 1320 of the image decoding apparatus 1300 shown in FIG. 46 requires an operation frequency of 1 GHz or more that is practically difficult to achieve. This is why parallel decoding processing is being considered.

FIG. 49 is a block diagram showing a structure of an image decoding apparatus that executes parallel decoding processing.

An image decoding apparatus 1400 includes the memory 1310 and a decoder 1420. The decoder 1420 includes N decoding engines 1421 (for example, N=4) which function similarly to the decoding engine 1320 shown in FIGS. 46 and 47. Each of the N decoding engines 1421 (first to N-th decoding engine 1421) extracts a portion to be processed by the decoding engine 1421 itself from a bit stream stored in the stream buffer 1311, decodes the extracted portion, and outputs it to the frame memory 1312.

Each of FIGS. 50A and 50B is an illustration of an example of parallel decoding processing.

As an example, the image decoding apparatus 1400 obtains a bit stream composed of four area bit streams, and stores the obtained bit stream in the stream buffer 1311. Each of the four area bit streams is an independent stream and, as shown in FIG. 50A, represents a moving picture in one of four areas generated by dividing one picture into four equal parts. Each of the four decoding engines 1421 (for example, N=4) in the image decoding apparatus 1400 extracts the area bit stream to be processed by the decoding engine 1421 itself from the stream buffer 1311, decodes the extracted area bit stream, and causes the moving picture to be displayed in the area corresponding to the area bit stream.

As another example, the image decoding apparatus 1400 obtains a bit stream including pictures each composed of four slices, and stores the obtained bit stream in the stream buffer 1311. The four slices are generated by dividing one picture into four equal parts in the vertical direction, as shown in FIG. 50B. Each of the four decoding engines 1421 (for example, N=4) in the image decoding apparatus 1400 extracts the slice to be processed by the decoding engine 1421 itself from the stream buffer 1311, decodes the extracted slice, and causes the moving picture to be displayed in the area corresponding to the slice.

However, generating one bit stream as four area bit streams and decoding the four area bit streams as shown in FIG. 50A requires restrictions on moving picture coding methods. That is, the whole system needs to be changed, which incurs a heavy load.

Likewise, dividing one picture into four equal parts and coding and decoding the four parts as slices as shown in FIG. 50B also requires restrictions on moving picture coding methods.

In detail, in MPEG-2 (Moving Picture Experts Group phase 2) which is a moving picture coding and decoding standard, slices are always separated at boundaries of MB lines. In H.264/AVC, the sizes and positions of slices set in pictures are arbitrary, with there being a possibility that only one slice is set in one picture. Accordingly, uniformly setting the positions and sizes of slices as shown in FIG. 50B necessitates changes in the whole system including an operational standard for digital broadcasting systems, which incurs a heavy load.

This leads to study on an image decoding apparatus that performs parallel decoding on a bit stream representing a moving picture coded according to the operational standard, with no need to restrict or change the operational standard. For example, this image decoding apparatus segments each picture in a bit stream generated according to MPEG-2 into slices, and performs parallel decoding processing on the slices.

Such an image decoding apparatus, however, cannot appropriately execute parallel decoding processing. That is, since the image decoding apparatus segments each picture into slices and decodes these slices in parallel, the image decoding apparatus cannot appropriately execute parallel decoding processing on a bit stream, such as an H.264/AVC bit stream, where the sizes and positions of slices are arbitrarily set. In other words, unequal loads are placed on a plurality of decoding engines included in the image decoding apparatus, making it impossible to achieve decoding that effectively utilizes parallel processing. For example, in the case where one picture is composed of one slice, the picture cannot be segmented, and one decoding engine is required to decode the whole picture.

In view of this, there is proposed an image decoding apparatus that performs variable length decoding on a bit stream generated according to H.264/AVC, segments each picture obtained by the variable length decoding into MB lines, and decodes the MB lines in parallel (for example, see Patent Literature (PTL) 1).

FIG. 51 is an illustration of decoding processing performed by the image decoding apparatus in Patent Literature 1.

In this image decoding apparatus, a first decoding engine decodes the 0th MB line in a picture, a second decoding engine decodes the first MB line in the picture, and a third decoding engine decodes the second MB line in the picture.

Each decoding engine sequentially decodes macroblocks from a left end to a right end of the corresponding MB line. In macroblock decoding, there is a dependency between a decoding target macroblock and macroblocks located at left, left above, above, and right above positions of the decoding target macroblock. That is, when decoding the macroblock, each decoding engine needs information obtained by decoding the left, left above, above, and right above macroblocks of the decoding target macroblock. Hence, each decoding engine starts decoding the decoding target macroblock, after the decoding of these macroblocks is completed. In the case where any of the left, left above, above, and right above macroblocks is not present, each decoding engine starts decoding the decoding target macroblock after the decoding of the other macroblocks is completed. Thus, the image decoding apparatus executes parallel decoding on macroblocks that are located two macroblocks apart horizontally and one macroblock apart vertically from each other.

However, there is an instance where the image decoding apparatus in Patent Literature 1 segments a slice included in an H.264/AVC picture. In such a case, each decoding engine needs to have a function of appropriately recognizing a segment of the slice, as the slice. This complicates the structure of the image decoding apparatus.

In view of this, there is proposed an image decoding apparatus that appropriately executes parallel decoding processing by a simple structure (for example, see Patent Literature 2).

FIG. 52 is a block diagram showing a structure of the image decoding apparatus in Patent Literature 2.

An image decoding apparatus 1100 in Patent Literature 2 includes a memory 1150 including a stream buffer 1151, a segment stream buffer 1152, and a frame memory 1153, and a decoder 1110 including a stream segmentation unit 1130 and N decoding engines 1120. The stream segmentation unit 1130 segments, for each coded picture included in a bit stream stored in the stream buffer 1151, the coded picture into a plurality of macroblock lines, and assigns each of the plurality of macroblock lines to a portion of a corresponding one of N segment streams to be generated (N is an integer equal to or greater than 2), thereby generating the N segment streams. The N decoding engines 1120 obtain the N segment streams from the stream segmentation unit 1130 via the segment stream buffer 1152, and decode the N segment streams in parallel. Moreover, in the case where, when generating the N segment streams, a slice included in the coded picture is segmented into a plurality of slice portions and assigned to a plurality of segment streams, the stream segmentation unit 1130 reconstructs, for each segment stream, a slice portion group made up of one or more slice portions assigned to the segment stream, as a new slice.

Thus, a coded picture is segmented into a plurality of macroblock lines, and each of the plurality of macroblock lines is assigned to and decoded by a corresponding one of the N decoding engines 1120 as a portion of a segment stream. This enables the N decoding engines 1120 to equally share the load of decoding processing, with it being possible to appropriately execute parallel decoding processing. For example, even in the case where an H.264/AVC coded picture is composed of one slice, the coded picture is segmented into a plurality of macroblock lines, so that the load of decoding the slice is not placed on one decoding engine 1120 but equally shared by the N decoding engines 1120.

When a coded picture is segmented into a plurality of macroblock lines, there is a possibility that a slice extending over a plurality of macroblock lines is segmented into a plurality of slice portions and these slice portions are assigned to different segment streams. In this case, the whole slice in the coded picture is not included in one segment stream. Instead, a slice portion group made up of one or more slice portions which are segments of the slice is included in each segment stream. There is also a possibility that such a slice portion group does not have a header indicating the beginning of the slice portion group and end information indicating the end of the slice portion group.

Accordingly, the image decoding apparatus 1100 in Patent Literature 2 reconstructs the slice portion group as a new slice. As a result, the decoding engine 1120 that decodes the segment stream including the slice portion group can easily recognize the slice portion group as a new slice and appropriately decode the slice portion group, without requiring special processing for recognizing the slice portion group and appropriately decoding the slice portion group. That is, in the image decoding apparatus 1100 in Patent Literature 2, there is no need to provide each of the N decoding engines 1120 with a function or a structure for such special processing. Since conventional decoding circuits can be used as the decoding engines 1120 for decoding the segment streams, the whole structure of the image decoding apparatus can be simplified.

The image decoding apparatus in Patent Literature 1 also has a problem that its performance improvement is limited, because the image decoding apparatus is capable of parallel decoding processing of macroblocks but incapable of parallel decoding processing of variable length codes.

In view of this, there is also proposed an image decoding apparatus that performs parallel decoding processing of variable length codes (for example, see Patent Literature 3).

The image decoding apparatus in Patent Literature 3 performs variable length decoding processing on a plurality of pictures or slices included in a bit stream, and stores intermediate data obtained by the variable length decoding processing in an intermediate data buffer. The image decoding apparatus extracts each picture from the intermediate data stored in the intermediate data buffer, and performs parallel decoding processing on the picture on an MB line basis using a plurality of image decoding processing units.

CITATION LIST

Patent Literature

[PTL 1]
Japanese Unexamined Patent Application Publication No. 2006-129284
[PTL 2]
International Patent Application Publication No. 2010/041472
[PTL 3]
Japanese Unexamined Patent Application Publication No. 2008-67026

SUMMARY OF INVENTION

Technical Problem

However, the image decoding apparatus 1100 in Patent Literature 2 has a problem that a sufficiently high decoding processing speed cannot be attained. In detail, in the case where the bit stream has a large amount of data, the number of decoding engines 1120 can be increased to increase the number of operations performed in parallel, thereby increasing the processing speed. Regarding the stream segmentation unit 1130, however, the number of stream segmentation units cannot be increased, and so the processing speed cannot be increased.

To overcome this, the image decoding apparatus 1100 in Patent Literature 2 may perform the generation of N segment streams on a plurality of pictures or slices included in the bit stream in parallel, as in the image decoding apparatus in Patent Literature 3.

In the case of performing the generation of N segment streams in parallel, however, the stream segmentation unit 1130 needs to have processing and a structure for enabling the N decoding engines 1120 to recognize the segment streams to be decoded in parallel. Besides, the N decoding engines 1120 need to have processing and a structure for recognizing the segment streams to be decoded in parallel. Thus, processing and structural changes are required of each component in the image decoding apparatus 1100 in Patent Literature 2. This complicates the whole structure of the image decoding apparatus.

The present invention is developed in view of the problems described above, and has an object of providing an image decoding apparatus and an image decoding method for appropriately executing parallel decoding processing by a simple structure. The present invention also has an object of providing an image coding apparatus and an image coding method corresponding to the image decoding apparatus and the image decoding method.

Solution to Problem

To achieve the stated object, an image decoding apparatus according to one aspect of the present invention is an image decoding apparatus that decodes a bit stream generated by coding image data, the image decoding apparatus including: a first segmentation control unit that designates a processing target area included in the bit stream; M stream segmentation units that generate M×N segment streams by executing stream segmentation processing in parallel on M processing target areas designated by the first segmentation control unit, each of the M stream segmentation units executing the stream segmentation processing on a processing target area each time the processing target area is designated to the stream segmentation unit by the first segmentation control unit, the stream segmentation processing being a process of generating at least a portion of N segment streams from the processing target area, M being an integer equal to or greater than 2, and N being an integer equal to or greater than 2; a second segmentation control unit that, for each processing target area designated by the first segmentation control unit, selects a portion of each of at least one segment stream from the M×N segment streams generated by the M stream segmentation units, based on a position of the processing target area in the bit stream; and N decoding units that, each time the portion of each of the at least one segment stream is selected by the second segmentation control unit, decode respective portions of the N segment streams in parallel, the portions of the N segment streams including the portion of each of the at least one segment stream, wherein each of the M stream segmentation units: executes the stream segmentation processing, by segmenting the processing target area into a plurality of structural units and assigning each of the plurality of structural units to a portion of a corresponding one of the N segment streams to be generated; and in the case where a slice included in the processing target area is segmented into a plurality of slice portions and the plurality of slice portions are assigned to a plurality of segment streams as a result of segmenting the processing target area into the plurality of structural units, reconstructs, for each of the plurality of segment streams, a slice portion group made up of one or more slice portions assigned to the segment stream, as a new slice.

According to this structure, the stream segmentation processing is executed on the M processing target areas (for example, slices, pictures, or the like) in parallel. Therefore, in the case where the bit stream has a large amount of data, the number of decoding units can be increased to increase the number of operations performed in parallel, thereby increasing the processing speed. In addition, the number of stream segmentation units can be increased, too, thereby increasing the processing speed.

In the image decoding apparatus according to one aspect of the present invention, the M processing target areas are designated to the M stream segmentation units. That is, the stream segmentation processing of segmenting a processing target area into a plurality of structural units (for example, macroblock lines) is allocated to each of the M stream segmentation units. This leads to a situation where the order of a plurality of processing target areas included in the bit stream cannot be maintained in the M×N segment streams generated by the M stream segmentation units, making it impossible to simply decode the M×N segment streams. In view of this, in the image decoding apparatus according to one aspect of the present invention, for each designated processing target area, a portion of each of at least one segment stream is selected from the M×N segment streams generated by the M stream segmentation units, based on the position of the processing target area, i.e. the position in decoding order of the processing target area in the bit stream. For example, when a portion of each of the N segment streams corresponding to the processing target area is stored in the same buffer (segment stream buffer), this buffer is selected. The selected respective portions of the N segment streams are then decoded in parallel. As a result, the M×N segment streams can be decoded in the correct order. Furthermore, in the image decoding apparatus according to one aspect of the present invention, the designation of the processing target areas and the selection of the portions of the segment streams are performed in a centralized manner by a component other than the M stream segmentation units and the N decoding units. No special processing or structure is required of each component such as the M stream segmentation units and the N decoding units, in order to decode the M×N segment streams in the correct order as mentioned above. Hence, parallel decoding processing can be appropriately executed by a simple structure.

Moreover, each of the M stream segmentation units analyzes each piece of first header information included in the bit stream and generates the N segment streams based on a result of the analysis, irrespective of the designated processing target area.

According to this structure, each stream segmentation unit analyzes each piece of first header information such as an SPS, a PPS, and a slice header included in the bit stream, and so is capable of appropriately generating the N segment streams based on a reference relationship of the processing target area and the first header information in the bit stream.

Moreover, one stream segmentation unit of the M stream segmentation units generates N segment streams that include second header information included in the bit stream, and all other stream segmentation units of the M stream segmentation units each generate N segment streams that do not include the second header information.

According to this structure, the second header information such as an SPS and a PPS is included only in one segment stream, and is not included in the other (N−1) segment streams. As a result, the N decoding units can be kept from processing a plurality of pieces of second header information overlapping each other, with it being possible to prevent a decrease in processing performance of the decoding units caused by redundant decoding of the second header information.

Moreover, the second segmentation control unit further generates selection information indicating the selected portion of the segment stream, and outputs the generated selection information to each of the N decoding units, and the N decoding units decode the portions of the N segment streams indicated by the selection information outputted from the second segmentation control unit, in parallel.

According to this structure, the N decoding units can decode the respective portions of the N segment streams in parallel in the correct order using the selection information.

Moreover, the second segmentation control unit outputs the selection information including a data size of the selected portion of the segment stream, to each of the N decoding units, and the N decoding units specify the portions of the N segment streams based on the data size included in the selection information outputted from the second segmentation control unit, and decode the specified portions in parallel. For example, the second segmentation control unit outputs the selection information including, as the data size, the number of bits or the number of data structural units constituting each of the N segment streams.

According to this structure, the N decoding units can appropriately recognize the portions to be decoded in parallel respectively from the N segment streams, and decode the recognized portions. Besides, in the case where the selection information indicates the number of data structural units (for example, NAL units in H.264/AVC), the selection information can be simplified.

Moreover, the first segmentation control unit further: judges, for each of the M stream segmentation units, whether or not the stream segmentation processing executed by the stream segmentation unit on the designated processing target area is completed; and in the case of judging that the stream segmentation processing is completed, designates a new processing target area preferentially to the stream segmentation unit completing the stream segmentation processing.

According to this structure, when one stream segmentation unit completes the stream segmentation processing of one processing target area, the stream segmentation processing of a new processing target area is assigned to the stream segmentation unit. This enables the M stream segmentation units to be equal in processing amount.

Moreover, the N decoding units include a first decoding unit and a second decoding unit, and in the case where the first decoding unit decodes a first slice portion included in a segment stream assigned to the first decoding unit from among the N segment streams and the second decoding unit decodes a second slice portion included in a segment stream assigned to the second decoding unit from among the N segment streams, the first slice portion and the second slice portion being spatially adjacent to each other: the first decoding unit starts decoding the first slice portion before the second decoding unit starts decoding the second slice portion; and the second decoding unit obtains, from the first decoding unit, adjacency information generated as a result of the decoding of the first slice portion by the first decoding unit, and decodes the second slice portion using the adjacency information or decodes the second slice portion without using the adjacency information.

According to this structure, even in the case where the first slice portion included in one segment stream and the second slice portion included in another segment stream are separately decoded by the first decoding unit and the second decoding unit despite the first slice portion and the second slice portion being adjacent to each other, the adjacency information is provided from the first decoding unit to the second decoding unit, so that the second decoding unit can appropriately decode the second slice portion included in the other segment stream using the adjacency information as necessary.

Moreover, the first segmentation control unit designates, as the processing target area, a slice, a picture, or a picture group made up of a plurality of pictures in the bit stream.

According to this structure, in the case where a slice is designated as the processing target area, the processing target area, i.e. the stream segmentation processing, is allocated to each of the M stream segmentation units with minimum granularity. This eases the equalization in processing amount of the M stream segmentation units. In the case where a picture or a picture group is designated as the processing target area, the processing target area, i.e. the stream segmentation processing, is allocated to each of the M stream segmentation units with relatively large granularity. This alleviates the load of the designation of the processing target areas and the selection of the N segment streams respectively on the first and second segmentation control units.

Moreover, it is preferable that the n-th (n is an integer from 1 to N) decoding unit out of the N decoding units decodes the n-th segment stream out of the N segment streams generated by the stream segmentation unit. In other words, it is preferable that the decoding unit decodes a portion of each of segment streams sequentially selected from predetermined M segment streams out of the M×N segment streams. As a result, each of the N decoding units decodes M segment streams out of the M×N segment streams, by decoding a portion of each of segment streams sequentially selected by the second segmentation control unit. This enables each of the N decoding units to decode only the segment streams assigned to the decoding unit.

Moreover, the stream segmentation unit may perform the stream segmentation processing only on the designated processing target area, by skipping each processing target area not designated by the first segmentation control unit. This enables the stream segmentation unit to process only the designated processing target area without performing complex processing.

Moreover, the header information may be header information in a layer equal to or higher than a picture layer. According to this structure, even in the case where the processing target area is smaller than a picture, that is, even in the case where the stream segmentation processing is allocated in units smaller than a picture, the header information in the layer equal to or higher than the picture layer is analyzed in all stream segmentation units, so that each of the stream segmentation units can appropriately generate the segment streams.

Moreover, an image coding apparatus according to one aspect of the present invention is an image coding apparatus that generates a bit stream by coding image data, the image coding apparatus including: N coding units that generate N segment streams by coding, for each picture included in the image data, a plurality of structural units included in the picture in parallel, N being an integer equal to or greater than 2; a first combination control unit that designates a processing target area included in the bit stream; M stream combination units that execute combination processing in parallel on M processing target areas designated by the first combination control unit, the combination processing being a process of combining partial areas that are respectively included in the N segment streams and correspond to a processing target area designated by the first combination control unit to generate a combined coding area which is the processing target area, M being an integer equal to or greater than 2; a second combination control unit that sequentially selects, from M combined coding areas generated by the M stream combination units, combined coding areas to be multiplexed, based on positions of the M processing target areas in the bit stream, the M processing target areas being designated by the first combination control unit; and a multiplexing unit that generates the bit stream by multiplexing the M combined coding areas in order in which the combined coding areas are selected by the second combination control unit, wherein each of the M stream combination units: in the case where the partial areas are composed of a plurality of coded structural units when executing the combination processing, generates the combined coding area by segmenting the partial areas into the plurality of coded structural units and recombining the plurality of coded structural units; and in the case where a slice included in the image data is segmented into a plurality of slice portions and coded and the plurality of coded slice portions are assigned to the N segment streams when performing the recombination, reconstructs a slice portion group made up of the plurality of coded slice portions as a new slice in the combined coding area.

According to this structure, the picture is segmented into a plurality of structural units such as macroblock lines, and each of the plurality of macroblock lines is assigned to and coded by a corresponding one of the N coding units. This enables the N coding units to equally share the load of coding processing, with it being possible to appropriately execute parallel coding processing. For example, even in the case where an H.264/AVC coded picture is composed of one slice, the picture is segmented into a plurality of macroblock lines, so that the load of coding the slice is not placed on one coding unit but equally shared by the N coding units.

Besides, the combination processing (stream combination processing) is allocated to the M stream combination units on a processing target area basis according to the processing target area designation by the first combination control unit. Hence, the combination processing can be performed by the M stream combination units in parallel.

When a picture is segmented into a plurality of macroblock lines and coded, there is a possibility that a slice extending over a plurality of macroblock lines is segmented into a plurality of slice portions and these slice portions are sequentially assigned to segment streams. That is, slice portions which are segments of the slice are distributed in each segment stream. Such distributed slice portions are not in the same order as in the image data. This being so, in the case where there is a dependency between the plurality of consecutive macroblock lines based on a predetermined code word, the distributed slice portions cannot maintain the dependency. In such a state, it is impossible to generate the bit stream conforming to the corresponding coding scheme. Accordingly, in the image coding apparatus according to one aspect of the present invention, the slice portion group, i.e. the group of the distributed slice portions, is reconstructed as a new slice in the combination processing. In so doing, the combined coding area (for example, a slice, a picture, or the like) including the slice portion group can be generated in conformance with the coding scheme.

Further, when the combination processing is allocated to the M stream combination units on a processing target area basis and performed by the M stream combination units in parallel, the order of a plurality of processing target areas included in the image data cannot be maintained in the M combined coding areas (partial streams) generated by the parallel combination processing. As a result, the M combined coding areas cannot be multiplexed in the correct order.

In view of this, in the image coding apparatus according to one aspect of the present invention, for each designated processing target area, combined coding areas to be multiplexed are sequentially selected from the M combined coding areas generated by the M stream combination units, based on the position of the processing target area, i.e. the position in coding order of the processing target area in the bit stream. The M combined coding areas are multiplexed in the order in which the combined coding areas are selected. As a result, the M combined coding areas can be multiplexed in the correct order. Furthermore, in the image coding apparatus according to one aspect of the present invention, the designation of the processing target areas and the selection of the combined coding areas to be multiplexed are performed in a centralized manner by a component other than the M stream combination units and the N coding units. No special processing or structure is required of each component such as the M stream combination units and the N coding units, in order to multiplex the M combined coding areas in the correct order as mentioned above. Hence, parallel coding processing can be appropriately executed by a simple structure.

Moreover, the second combination control unit, each time a combined coding area to be multiplexed is selected, further generates selection information indicating the selected combined coding area, and outputs the generated selection information to the multiplexing unit, and the multiplexing unit, each time the selection information is obtained from the second combination control unit, multiplexes the combined coding area indicated by the selection information into the bit stream.

According to this structure, the multiplexing unit can multiplex the M combined coding areas in the correct order using the selection information.

Moreover, the second combination control unit outputs the selection information including a data size of the selected combined coding area, to the multiplexing unit, and the multiplexing unit multiplexes the combined coding area of the data size included in the selection information, into the bit stream.

According to this structure, in the case where the combined coding areas are sequentially generated from the stream combination unit by repeated processing target area designation by the first combination control unit, the multiplexing unit can appropriately recognize, from the generated combined coding areas, the combined coding area to be multiplexed, and multiplex the combined coding area.

For example, the second combination control unit outputs the selection information including, as the data size, the number of bits or the number of data structural units constituting the combined coding area. In the case where the selection information indicates the number of data structural units (for example, NAL units in H.264/AVC), the selection information can be simplified.

Moreover, the first combination control unit further: judges, for each of the M stream combination units, whether or not the combination processing executed by the stream combination unit is completed; and in the case of judging that the combination processing is completed, designates a new processing target area preferentially to the stream combination unit completing the combination processing.

According to this structure, new combination processing is assigned to a stream combination unit that is not engaged in combination processing. This enables the M stream combination units to be equal in processing amount.

Moreover, the N coding units include a first coding unit and a second coding unit, and in the case where the first coding unit codes a first structural unit assigned to the first coding unit from among N structural units and the second coding unit codes a second structural unit assigned to the second coding unit from among the N structural units, the first structural unit and the second structural unit being adjacent to each other in the picture: the first coding unit starts coding the first structural unit before the second coding unit starts coding the second structural unit; and the second coding unit obtains, from the first coding unit, adjacency information generated by the coding of the first structural unit by the first coding unit, and codes the second structural unit using the adjacency information or codes the second structural unit without using the adjacency information.

According to this structure, even in the case where the processing target area is segmented into a plurality of structural units such as macroblock lines and the first and second structural units are coded respectively by the first coding unit and the second coding unit in parallel, the adjacency information is provided from the first coding unit to the second coding unit, so that the second coding unit can appropriately code the second structural unit using the adjacency information as necessary.

Moreover, the stream combination unit may perform the combination processing only on a partial area corresponding to the designated processing target area by skipping a partial area included in each of the N segment streams and corresponding to each processing target area not designated by the first combination control unit. This enables the stream combination unit to process only the partial area corresponding to the designated processing target area without performing complex processing.

Moreover, the processing target area may be a slice. According to this structure, the processing target area, i.e. the combination processing, is allocated to each of the M stream combination units with minimum granularity. This eases the equalization in processing amount of the M stream combination units.

Moreover, the processing target area may be a picture or a picture group made up of a plurality of pictures. According to this structure, the processing target area, i.e. the combination processing, is allocated to each of the M stream combination units with relatively large granularity. This alleviates the load of the designation of the processing target areas and the selection of the combined coding areas respectively on the first and second combination control units.

Note that the present invention can be realized not only as the image decoding apparatus and the image coding apparatus, but also as methods or programs for the image decoding apparatus and the image coding apparatus, recording media on which the programs are stored, and integrated circuits.

Advantageous Effects of Invention

The image decoding apparatus and the image coding apparatus according to the present invention respectively produce advantageous effects of appropriately executing parallel decoding processing and parallel coding processing by simple structures.

BRIEF DESCRIPTION OF DRAWINGS

FIG. 1 is a block diagram showing a structure of an image decoding apparatus according to Embodiment 1 of the present invention.

FIG. 2A is a diagram showing decoding order of a picture that is not coded in MBAFF according to Embodiment 1 of the present invention.

FIG. 2B is a diagram showing decoding order of a picture that is coded in MBAFF according to Embodiment 1 of the present invention.

FIG. 5 is an illustration of slice-end processing according to Embodiment 1 of the present invention.

FIG. 8 is a diagram showing an example of a format of selection information in the case of performing slice allocation by the stream segmentation control unit and stream segmentation processing according to Embodiment 1 of the present invention.

FIG. 18 is a flowchart showing how the skip run modification unit performs a modification operation on MB skip run information according to Embodiment 1 of the present invention.

FIG. 34 is a diagram showing an example of a format of selection information in the case of performing slice allocation by the stream combination control unit and stream combination processing according to Embodiment 3 of the present invention.

FIG. 51 is an illustration of decoding processing performed by a conventional image decoding apparatus.

DESCRIPTION OF EMBODIMENTS

Figure 3:
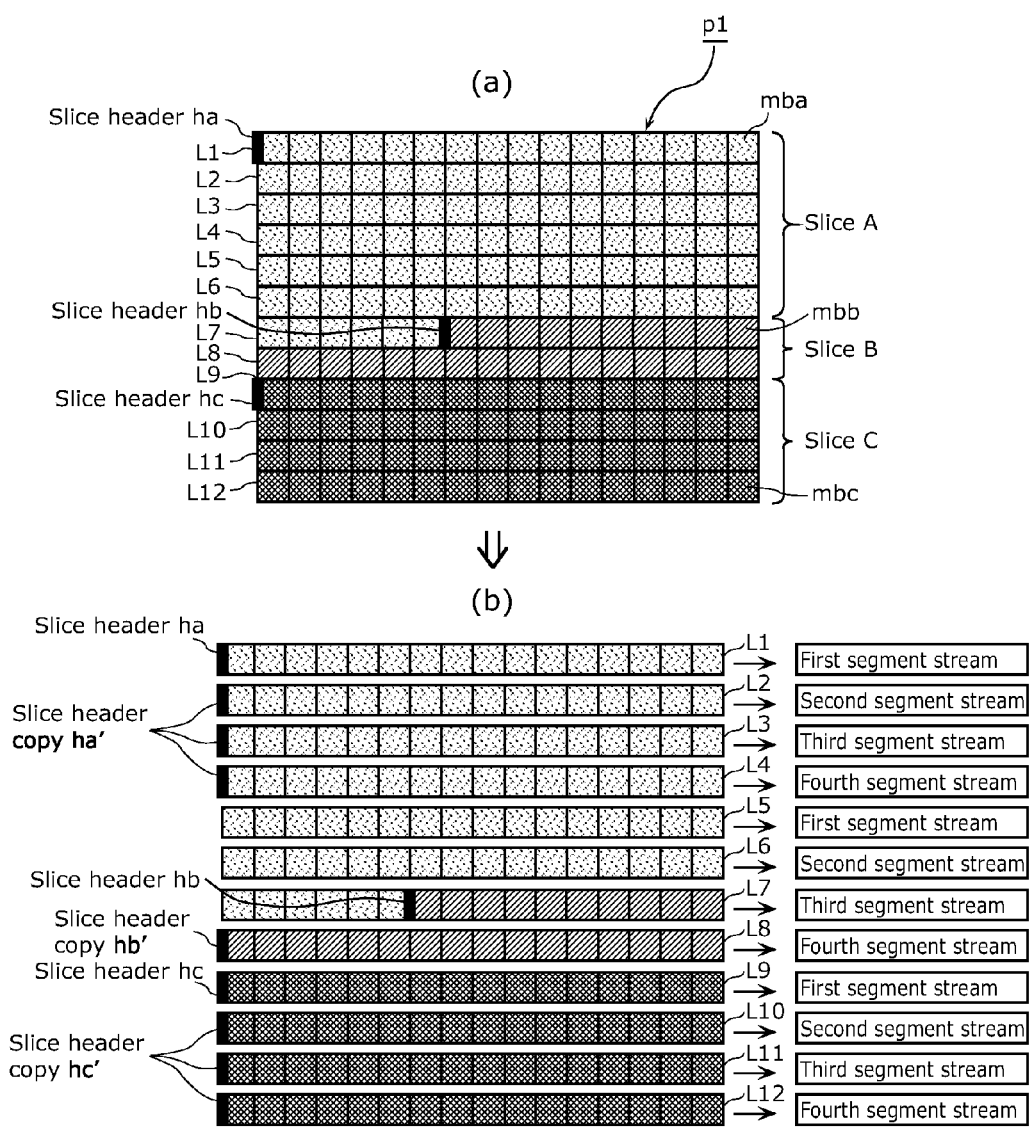
FIG. 3 is an illustration of slice header insertion processing according to Embodiment 1 of the present invention.

An image decoding apparatus and an image coding apparatus according to embodiments of the present invention are described below, with reference to drawings.

Embodiment 1

FIG. 1 is a block diagram showing a structure of an image decoding apparatus according to Embodiment 1 of the present invention.

An image decoding apparatus 100 according to this embodiment is capable of appropriately executing parallel decoding processing by a simple structure, and includes a decoder 110 and a memory 150.

The memory 150 has areas for storing data inputted to the decoder 110, intermediate data generated by the decoder 110, and data eventually generated and outputted by the decoder 110.

In detail, the memory 150 includes a stream buffer 151, M segment stream buffers (first to M-th segment stream buffers) 152, and a frame memory 153.

The stream buffer 151 stores a bit stream generated and transmitted by an image coding apparatus. The M segment stream buffers 152 store M×N segment streams generated by the decoder 110 as the above-mentioned intermediate data. Each segment stream buffer 152 has areas that are each assigned to a different one of N decoding engines 120. The frame memory 153 stores N segments of decoded image data generated by the N decoding engines (decoding units) 120, as the above-mentioned data eventually generated and outputted. The decoded image data stored in the frame memory 153 is read and displayed as a moving picture by a display device.

The decoder 110 reads the bit stream stored in the stream buffer 151 in the memory 150 and decodes the bit stream, to generate decoded image data. The decoder 110 stores the decoded image data in the frame memory 153 in the memory 150. The decoder 110 includes M stream segmentation units (first to M-th stream segmentation units) 130, a stream segmentation control unit 140, and the N decoding engines (first to N-th decoding engines) 120.

Each decoding engine 120 in this embodiment has a processing capability of decoding HD images (1920×1088 pixels, 60i) corresponding to two channels.

The stream segmentation control unit 140 obtains mode information described later. According to the obtained mode information, the stream segmentation control unit 140 notifies each stream segmentation unit 130 of allocation control information for allocating stream segmentation processing on a predetermined unit basis, in order to make the M stream segmentation units 130 to be equal in stream segmentation processing amount. Stream segmentation processing will be described later. In this embodiment, it is assumed that the stream segmentation control unit 140 allocates stream segmentation processing to the M stream segmentation units 130 on a slice basis. That is, for each processing target area (slice) included in the bit stream, the stream segmentation control unit 140 causes one of the M stream segmentation units 130 to execute stream segmentation processing for the processing target area, by notifying the allocation control information. For example, the allocation control information indicates a slice number for identifying the slice that is subject to stream segmentation processing. In other words, the stream segmentation control unit 140 sends the allocation control information to one of the M stream segmentation units 130, to designate the processing target area subject to stream segmentation processing to the stream segmentation unit 130. Moreover, based on the result of allocating stream segmentation processing to the M stream segmentation units 130 on a slice basis, the stream segmentation control unit 140 notifies the N decoding engines 120 of selection information indicating from which of the M segment stream buffers 152 the N decoding engines 120 are each to obtain a segment stream.

Each of the M stream segmentation units 130 obtains the mode information and the allocation control information. According to the obtained mode information and allocation control information, each of the M stream segmentation units 130 extracts a slice (processing target area) to be processed from the bit stream, and segments the slice into N segment streams (first to N-th segment streams), where the M stream segmentation units 130 operate in parallel. That is, the stream segmentation unit 130 in this embodiment segments each slice included in the bit stream and allocated by the stream segmentation control unit 140, into one or more MB lines. The stream segmentation unit 130 then assigns each of the MB lines to a portion of a corresponding one of N segment streams to be generated, thereby generating the N segment streams. This process of segmenting a slice (processing target area) into a plurality of MB lines and assigning each of the MB lines to a portion of a corresponding one of N segment streams is the above-mentioned stream segmentation processing. The M stream segmentation units 130 execute the stream segmentation processing in parallel, thus generating M×N segment streams.

Note that an MB line is a structural unit made up of one row of macroblocks horizontally arranged from a left end to a right end of a picture. In the case where the picture is not coded in MBAFF (Macroblock Adaptive Frame Field Coding), the stream segmentation unit 130 segments each processing target area (slice) into a plurality of MB lines. In the case where the picture is coded in MBAFF, on the other hand, the stream segmentation unit 130 treats two MB lines as one structural unit (hereinafter referred to as an MB line pair), and segments each processing target area (slice) into a plurality of MB line pairs. In other words, in the case of the picture coded in MBAFF, the stream segmentation unit 130 segments each processing target area (slice) into a plurality of MB lines, and assigns two MB lines belonging to the same MB line pair to a portion of the same segment stream. The following description of the present invention is based on a premise that each picture is not coded in MBAFF. When necessary processing differs between the picture not coded in MBAFF and the picture coded in MBAFF in the present invention, however, specific processing for MBAFF is described in each instance. If no specific processing or the like is necessary for MBAFF, by replacing the "MB line" with the "MB line pair" in the following description, the description can be interpreted as the description of the present invention in the case where each picture is coded in MBAFF.

Each of the M stream segmentation units 130 stores N segment streams generated as a result of segmentation, in one of the M segment stream buffers 152 that is associated with the stream segmentation unit 130. That is, the first stream segmentation unit 130 stores N segment streams generated as a result of segmentation in the first segment stream buffer 152, the second stream segmentation unit 130 stores N segment streams generated as a result of segmentation in the second segment stream buffer 152, and the M-th stream segmentation unit 130 stores N segment streams generated as a result of segmentation in the M-th segment stream buffer 152.

Moreover, each of the M stream segmentation units 130 treats a slice as a predetermined unit. When segmenting a slice into a plurality of MB lines, the stream segmentation unit 130 checks whether or not there is a header immediately before an MB line in the bit stream or between two macroblocks belonging to the MB line. In the case where there is the header, the stream segmentation unit 130 assigns the header to a portion of a segment stream together with the MB line.

As a result of such segmentation into MB lines by the stream segmentation unit 130, a slice included in a picture and extending over a plurality of MB lines is segmented. Furthermore, upon segmentation into N segment streams, the stream segmentation unit 130 removes any dependency between macroblocks over at least two of the N segment streams in variable length decoding.

Each of the N decoding engines 120 obtains the mode information and the selection information. According to the obtained mode information and selection information, each of the N decoding engines 120 reads a segment stream to be processed by the decoding engine 120 from one of the M segment stream buffers 152 and decodes the read segment stream, where the N decoding engines 120 operate in parallel. The N decoding engines 120 thus generate N segments of decoded image data.

As an example, in the case of being notified to obtain a segment stream from the first segment stream buffer 152 according to the selection information from the stream segmentation control unit 140, the first decoding engine 120 reads the first segment stream from the area in the first segment stream buffer 152 assigned to the first decoding engine 120. Likewise, the second decoding engine 120 reads the second segment stream from the area in the first segment stream buffer 152 assigned to the second decoding engine 120. The third decoding engine 120 reads the third segment stream from the area in the first segment stream buffer 152 assigned to the third decoding engine 120. The fourth decoding engine 120 reads the fourth segment stream from the area in the first segment stream buffer 152 assigned to the fourth decoding engine 120. The first to fourth decoding engines 120 then respectively decode the first to fourth segment streams in parallel.

As another example, in the case of being notified to obtain a segment stream from the M-th segment stream buffer 152 according to the selection information from the stream segmentation control unit 140, the first decoding engine 120 reads the first segment stream from the area in the M-th segment stream buffer 152 assigned to the first decoding engine 120. Likewise, the second decoding engine 120 reads the second segment stream from the area in the M-th segment stream buffer 152 assigned to the second decoding engine 120. The third decoding engine 120 reads the third segment stream from the area in the M-th segment stream buffer 152 assigned to the third decoding engine 120. The fourth decoding engine 120 reads the fourth segment stream from the area in the M-th segment stream buffer 152 assigned to the fourth decoding engine 120. The first to fourth decoding engines 120 then respectively decode the first to fourth segment streams in parallel.

In decoding the segment streams, each of the N decoding engines 120 decodes the segment stream by performing motion compensation as necessary with reference to decoded image data already stored in the frame memory 153.

Furthermore, in decoding a current macroblock which is in a current segment stream and has been coded by intra-picture prediction, the corresponding one of the N decoding engines 120 obtains, as adjacent MB information, information of the decoded macroblocks located at the left above, above, and right above positions with respect to the current macroblock to be decoded from the decoding engine 120 which has decoded the macroblocks. The decoding engine 120 which has obtained the adjacent MB information decodes the current macroblock to be decoded using the adjacent MB information. In the same manner, in exemplary cases of performing deblocking filtering processing and motion vector prediction processing, the decoding engine 120 obtains, as adjacent MB information, information of the decoded macroblocks located at the left above, above, and right above positions with respect to the current macroblock to be decoded from the decoding engine 120 which has decoded the macroblocks, and performs the above-mentioned processing.

For simplicity, the following descriptions in this embodiment are given assuming that N=4. In this embodiment, when decoding of the macroblocks located at the left, left above, above, and right above positions with respect to the current macroblock to be decoded is completed, each of the N (N=4) decoding engines 120 starts decoding the current macroblock to be decoded using the adjacent MB information. Thus, the first to fourth decoding engines 120 decode the macroblocks located at different horizontal positions in the respective MB lines in parallel.

FIG. 2A is a diagram showing decoding order of a picture that is not coded in MBAFF.

In the case of a picture that is not coded in MBAFF, the first decoding engine 120 decodes the 0th MB line, the second decoding engine 120 decodes the first MB line, the third decoding engine 120 decodes the second MB line, and the fourth decoding engine 120 decodes the third MB line. The k-th (k is an integer equal to or greater than 0) MB line corresponds to the k-th MB line from the top end of the picture. For example, the 0th MB line is located at the 0th position from the top end of the picture.

When the decoding of the picture starts, first the first decoding engine 120 starts decoding the 0th MB line. Next, upon completion of the decoding of two leftmost macroblocks in the 0th MB line, the second decoding engine 120 starts decoding a leftmost macroblock in the first MB line. Next, upon completion of the decoding of two leftmost macroblocks in the first MB line, the third decoding engine 120 starts decoding a leftmost macroblock in the second MB line. Next, upon completion of the decoding of two leftmost macroblocks in the second MB line, the fourth decoding engine 120 starts decoding a leftmost macroblock in the third MB line.

Accordingly, the (k+1)-th MB line is decoded from leftmost to rightmost macroblocks, with a delay of two macroblocks from the k-th MB line.

FIG. 2B is a diagram showing decoding order of a picture that is coded in MBAFF.

In the case of a picture that is coded in MBAFF, each of the MB line pairs is a structural unit corresponding to two rows (MB lines) of macroblocks horizontally arranged from a left end to a right end of the picture, as described above. Each MB line pair is adaptively coded by frame coding or field coding in units of two vertically arranged macroblocks (a macroblock pair). In each macroblock pair, the top macroblock is decoded first, and the bottom macroblock is decoded next. In this case as in the case of a picture that is not coded in MBAFF, the first decoding engine 120 decodes the 0th MB line pair, the second decoding engine 120 decodes the first MB line pair, the third decoding engine 120 decodes the second MB line pair, and the fourth decoding engine 120 decodes the third MB line pair. The k-th (k denotes an integer equal to or greater than 0) MB line pair is a structural unit corresponding to the k-th two rows (MB lines) of macroblocks from top end of the picture. For example, the 0th MB line pair are the 0th two MB lines from the top end of the picture.

When the decoding of the picture starts, first the first decoding engine 120 starts decoding the 0th MB line pair. Next, upon completion of the decoding of two leftmost macroblock pairs in the 0th MB line pair, the second decoding engine 120 starts decoding an upper leftmost macroblock in the first MB line pair. Next, upon completion of the decoding of two leftmost macroblock pairs in the first MB line pair, the third decoding engine 120 starts decoding an upper leftmost macroblock in the second MB line pair. Next, upon completion of the decoding of two leftmost macroblock pairs in the second MB line pair, the fourth decoding engine 120 starts decoding an upper leftmost macroblock in the third MB line pair.

Accordingly, the (k+1)-th MB line pair is decoded from leftmost to rightmost macroblock pairs, with a delay of two macroblock pairs from the k-th MB line pair.

In the case of a picture that is not coded in MBAFF, it is only necessary that the (k+1)-th MB line is decoded with a delay of at least two macroblocks from the k-th MB line. In the case of a picture that is coded in MBAFF, it is only necessary that the (k+1)-th MB line pair is decoded with a delay of at least two macroblock pairs from the k-th MB line pair. In short, the picture that is not coded in MBAFF and the picture that is coded in MBAFF may be decoded with delays of three or more macroblocks and three or more macroblock pairs, respectively. It is possible to minimize time for decoding each of pictures both in the case where the (k+1)-th MB line is decoded with a delay of two macroblocks from the k-th MB line and in the case where the (k+1)-th MB line pair is decoded with a delay of two macroblock pairs from the k-th MB line pair. In each of the exemplary cases where the delay corresponds to three or more macroblocks and the delay corresponds to three or more macroblock pairs, time for decoding the pictures becomes longer as the delay increases.

The image decoding apparatus 100 in this embodiment is characterized by reconstructing a slice portion group made up of one or more portions (slice portions) of a slice generated by segmentation by the stream segmentation unit 130, as a new slice. The slice reconstruction involves slice header insertion processing, slice-end processing, MB address information update processing, skip run modification processing, and QP delta setting processing. The QP delta setting processing includes QP delta modification processing and QP delta insertion processing. It is to be noted that this embodiment describes the case where the QP delta setting processing corresponds to the QP delta modification processing.

FIG. 3 is an illustration of slice header insertion processing.

For example, the M stream segmentation units 130 segment a picture p1 shown in FIG. 3(a). In the following description, the M stream segmentation units 130 are collectively referred to as a stream segmentation unit group 130a. In this embodiment, it is assumed that the processing target area which is the unit of allocation by the stream segmentation control unit 140 is a slice, as mentioned earlier. This being so, in the case where the picture p1 is composed of a plurality of slices, each stream segmentation unit 130 segments any of the plurality of slices included in the picture p1. Hence, the stream segmentation unit group 130a made up of the M stream segmentation units 130 segments the picture p1, as described below. Note that, in the case where the processing target area which is the unit of allocation by the stream segmentation control unit 140 is a picture, one stream segmentation unit 130 segments the picture p1, as described below.

The picture p1 is composed of slices A, B, and C, and also composed of MB lines L1 to L12.

The slice A covers MB lines L1 to L7, and includes a slice header ha and a plurality of macroblocks mba arranged sequentially next to the slice header ha. The slice B covers MB lines L7 and L8, and includes a slice header hb and a plurality of macroblocks mbb arranged sequentially next to the slice header hb. The slice C covers MB lines L9 to L12, and includes a slice header hc and a plurality of macroblocks mbc arranged sequentially next to the slice header hc. Each of the slice headers includes supplemental information necessary for decoding the slice having the slice header.

As shown in FIG. 3(b), the stream segmentation unit group 130a segments the picture p1 into MB lines. The stream segmentation unit group 130a then assigns, beginning from the top, each of the MB lines L1 to L12 to a portion of a corresponding one of the first to fourth segment streams. For example, the stream segmentation unit group 130a assigns the MB line L1 to a portion of the first segment stream, the MB line L2 to a portion of the second segment stream, the MB line L3 to a portion of the third segment stream, and the MB line L4 to a portion of the fourth segment stream. Having assigned the MB line to the fourth segment stream, the stream segmentation unit group 130a repeats the MB line assignment to the first segment stream. In detail, the stream segmentation unit group 130a assigns the MB line L5 to a portion of the first segment stream, the MB line L6 to a portion of the second segment stream, the MB line L7 to a portion of the third segment stream, and the MB line L8 to a portion of the fourth segment stream.

As a result, the first segment stream includes the MB lines L1, L5, and L9 in sequence, the second segment stream includes the MB lines L2, L6, and L10 in sequence, the third segment stream includes the MB lines L3, L7, and L11 in sequence, and the fourth segment stream includes the MB lines L4, L8, and L12 in sequence.

Each of the MB lines L1 to L6, a set of the top six macroblocks in the MB line L7, a set of the last 10 macroblocks in the MB line L7, and the MB lines L8 to L12 is a slice portion of one of the slices A to C. In the first segment stream, a slice portion group (the slice A in the first segment stream) is composed of the MB lines L1 and L5 that are slice portions of the slice A. In the second segment stream, a slice portion group (the slice A in the second segment stream) is composed of the MB lines L2 and L6 that are slice portions of the slice A.

Here, simply assigning MB lines to segment streams may be not sufficient to allow the decoding engines 120 to appropriately recognize slices included in the segment streams.

For example, the first segment stream includes the consecutive MB lines L1, L5, and L9 as described above. In this case, the MB lines L1 and L5 are to be recognized as the slice A, and the MB line L9 is to be recognized as the slice C. For this purpose, the slice header ha of the slice A needs to be disposed at the beginning of the MB line L1 that is to be the beginning of the slice A in the first segment stream, and the slice header hc of the slice C needs to be disposed at the beginning of the MB line L9 that is to be the beginning of the slice C in the first segment stream. In the example shown in FIG. 3, the slice headers ha and hc are disposed in advance at the beginning of the MB lines L1 and L9, respectively. Therefore, the stream segmentation unit group 130a simply needs to assign the MB lines L1, L5, and L9 to the first segment stream together with the slice headers ha and hc.

On the other hand, the second segment stream includes the consecutive MB lines L2, L6, and L10 as described above. In this case, the MB lines L2 and L6 are to be recognized as the slice A, and the MB line L10 is to be recognized as the slice C. For this purpose, the slice header ha of the slice A needs to be disposed at the beginning of the MB line L2 that is to be the beginning of the slice A in the second segment stream, and the slice header hc of the slice C needs to be disposed at the beginning of the MB line L10 that is to be the beginning of the slice C in the second segment stream.

Hence, when assigning MB lines to portions of the segment streams, the stream segmentation unit group 130a in this embodiment generates slice header copies ha', hb', and hc' by copying the slice headers ha, hb, and hc and inserts these slice header copies into the segment streams as necessary.

For example, the stream segmentation unit group 130a generates three slice header copies ha' by copying the slice header ha, and inserts the slice header copies ha' immediately before the MB lines L2, L3, and L4. Moreover, the stream segmentation unit group 130a generates one slice header copy hb' by copying the slice header hb, and inserts the slice header copy hb' immediately before the MB line L8. Furthermore, the stream segmentation unit group 130a generates three slice header copies hc' by copying the slice header hc, and inserts the slice header copies hc' immediately before the MB lines L10, L11, and L12.

As a result, in the second segment stream, the slice header copy ha' that is a copy of the slice header ha of the slice A is disposed immediately before the MB line L2 that is the beginning of the slice A, and the slice header copy hc' that is a copy of the slice header hc of the slice C is disposed immediately before the MB line L10 that is the beginning of the slice C. In this way, the second decoding engine 120 can obtain parameters required to decode the slices A and C of the second segment stream, respectively based on the slice header copies ha' and hc'.

Next, a description is given of MB address information update processing.

The stream segmentation unit group 130a updates MB address information included in the slice header copies depending on the insertion positions when inserting the slice header copies into the segment streams as described above.

More specifically, each of the slice headers of the slices that constitute a picture in a bit stream includes MB address information "first_mb_in_slice" for identifying the address of the starting macroblock of the slice in the picture. Thus, each of the slice header copies generated by copying such slice header originally includes the same MB address information as the MB address information of the copy-source slice header. As a result, each of the slice header copies specifies an erroneous address identified based on the MB address information of the slice header copy when inserted at a position different from the position of the copy-source slice header in the picture. In other words, the address identified based on the MB address information of the slice header copy specifies the address of the starting macroblock in the slice having the copy-source slice header in the picture, instead of specifying the address of the starting macroblock in the slice having the slice header copy in the segment stream in the picture.

For example, the slice header ha of the slice A in the picture p1 includes MB address information identifying the address of the starting macroblock (the starting macroblock in the MB line L1) in the slice A in the picture p1. Thus, the slice header copy ha' generated by copying the slice header ha originally includes MB address information for identifying the address of the starting macroblock in the MB line L1 in the picture p1. When the slice header copy ha' is inserted immediately before the MB line L2, the address identified based on the MB address information of the slice header copy ha' specifies the address of the starting macroblock in the MB line L1 in the picture p1, instead of specifying the address of the starting macroblock (the starting macroblock in the MB line L2) in the slice A having the slice header copy ha' in the second segment stream in the picture p1.

For this reason, the stream segmentation unit group 130a in this embodiment updates the MB address information included in the slice header copies as described above.

Figure 4:
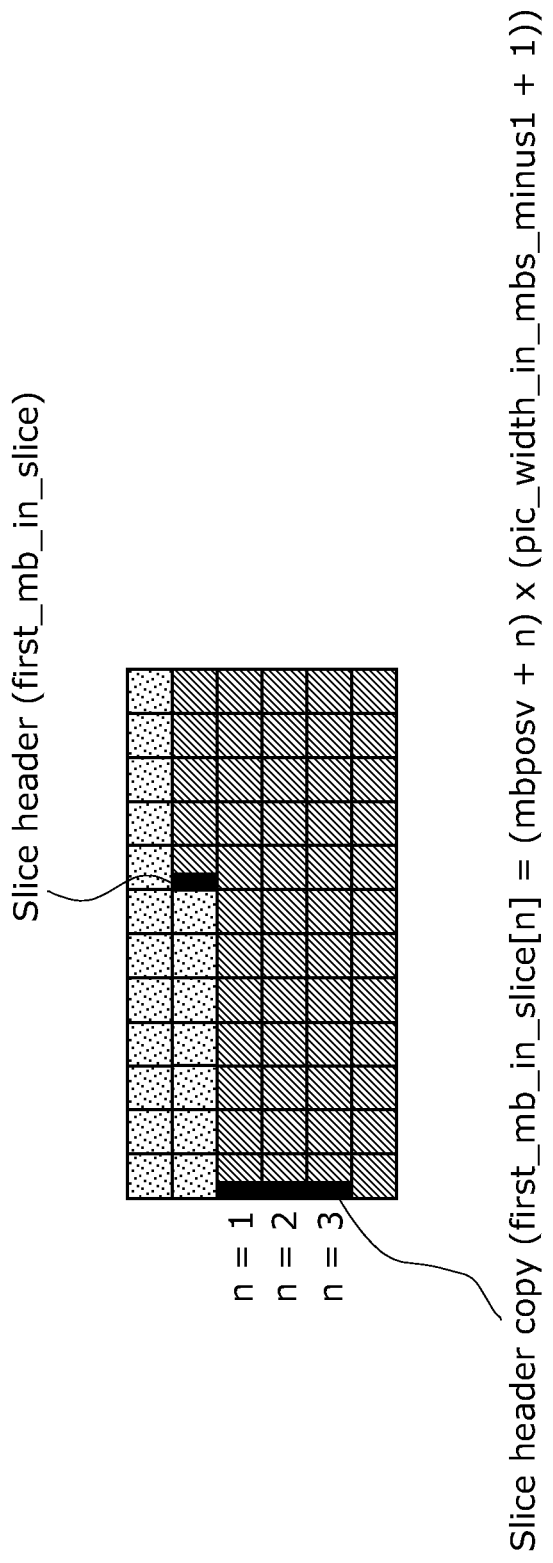
FIG. 4 is an illustration of MB address information update processing according to Embodiment 1 of the present invention.

FIG. 4 is an illustration of MB address information update processing.

First, the stream segmentation unit 130 obtains "pic_width_in_mbs_minus1" that is information related to the number of macroblocks in the horizontal direction of the picture, from an SPS (Sequence Parameter Set) included in the bit stream.

Furthermore, the stream segmentation unit 130 determines the address of the starting macroblock in the slice having the copy-source slice header using the MB address information "first_mb_in_slice" included in the copy-source slice header.

Next, the stream segmentation unit 130 calculates "mbposv" that is a value indicating which MB line the starting macroblock belongs to in the picture, based on the determined address of the starting macroblock. Here, the value "mbposv" is an integer equal to or greater than 0.

Subsequently, in the case where the MB line located immediately after the position at which the slice header copy is inserted is apart by n lines when seen from the MB line in which the copy-source slice header is disposed, the stream segmentation unit 130 determines the MB address information of the slice header copy, based on "first_mb_in_slice[n]"=("mbposv"+n)×("pic_width_in_mbs_minus1"+1).

In the case where the picture is coded in MBAFF (Macroblock Adaptive Frame Field Coding), the stream segmentation unit 130 determines the MB address information of the slice header copy, based on "first_mb_in_slice[n]"=("mbposv"/2+n)×("pic_width_in_mbs_minus1"+1).

The stream segmentation unit 130 updates the MB address information originally included in the slice header copy to the MB address information determined as described above. In this way, the address identified based on the MB address information of the slice header copy specifies the correct address of the starting macroblock in the slice having the slice header copy in the segment stream in the picture.

Next, a description is given of slice-end processing.

Slice-end information indicating the end of a slice is set at the end of each of slices that constitute the picture in the bit stream. Thus, as shown in FIG. 3, simply segmenting the picture into a plurality of MB lines and assigning each of these MB lines to a portion of any of the first to fourth segment streams may not be sufficient to allow the decoding engines 120 to appropriately recognize the ends of the slices included in the segment streams.

For this, the stream segmentation unit 130 in this embodiment also executes slice-end processing as well as the slice header insertion processing.

FIG. 5 is an illustration of the slice-end processing.

For example, as shown in FIG. 5(a), the slice C of the picture p1 in the bit stream includes the slice header hc, the MB lines L9 to L12, and slice-end information ec.

The stream segmentation unit group 130a segments the picture p1 into MB lines. As a result, as shown in FIGS. 5(b) to 5(e), one stream segmentation unit 130 assigns the MB line L9 to the first segment stream together with the slice header hc, the MB line L10 to the second segment stream, the MB line L11 to the third segment stream, and the MB line L12 to the fourth segment stream.

Furthermore, in the aforementioned slice header insertion processing, the stream segmentation unit 130 generates three slice header copies hc' by copying the slice header hc, and inserts the respective three slice header copies hc' immediately before the MB lines L10, L11, and L12 of the second to fourth segment streams. In addition, in the aforementioned MB address information update processing, the stream segmentation unit 130 updates the MB address information included in the slice header copies hc' depending on the positions of the slice header copies hc' inserted.

Here, in the slice-end processing, the stream segmentation unit 130 generates slice-end information ec' indicating the end of the slice C (MB line L9) in the first segment stream, the end of the slice C (MB line L10) in the second segment stream, the end of the slice C (MB line L11) in the third segment stream, and the end of the slice C (MB line L12) in the fourth segment stream. Subsequently, the stream segmentation unit 130 sets the generated slice-end information ec' at the positions immediately after the MB lines L9, L10, L11, and L12 of the first to fourth segment streams. The stream segmentation unit 130 discards the slice-end information ec originally included in the bit stream when segmenting the bit stream into MB lines. In addition, since the slice-end information ec is identical to the slice-end information ec', the MB line L12 is finally assigned to the fourth segment stream together with the slice-end information ec' (ec).

In this way, each of the decoding engines 120 can appropriately recognize the ends of the slices in the assigned segment stream.

The following describes processing of allocating slices included in the bit stream by the stream segmentation control unit 140.

As mentioned above, the image decoding apparatus 100 in this embodiment includes the M stream segmentation units 130 and the N decoding engines 120, and performs parallel decoding processing on the bit stream. By enabling parallel processing in the whole system in this way, it is possible to achieve an improvement in performance of the whole decoding processing.

Each of the M stream segmentation units 130 segments, as a predetermined unit (processing target area), each slice in a coded picture included in the bit stream into one or more MB lines. Here, since the size of each slice is not uniform, the processing amount varies between the M stream segmentation units 130 depending on the slice.

Even in a system where all slices are uniform in size, the target of processing is a bit stream, and so the processing amount depends on the amount of code of each slice. In a typical moving picture coding scheme, a bit stream is variable length coded, where the amount of code varies according to data. Besides, slices in H.264/AVC have types such as I slice, P slice, and B slice. There is a tendency that the I slice on which intra-picture coding is performed has a large amount of code whereas the P slice and the B slice on which not only intra-picture coding but also inter-picture coding is performed have a small amount of code. Thus, the amount of code of each coded slice included in a bit stream is not uniform but can vary widely. Accordingly, if inputted coded slices are simply allocated sequentially to the M stream segmentation units 130, the processing amount of each stream segmentation unit 130 is not equal, making it impossible to sufficiently achieve the advantageous effect of improving processing performance by parallelization.

In view of this, the stream segmentation control unit 140 allocates slices to the stream segmentation units 130 so that the processing amount of each stream segmentation unit 130 is equal.

Figure 6A:
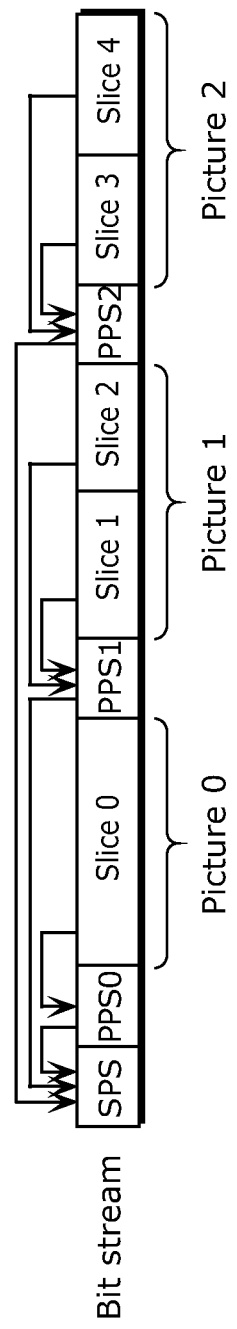
FIG. 6A is a diagram showing a bit stream according to Embodiment 1 of the present invention.
Figure 6B:
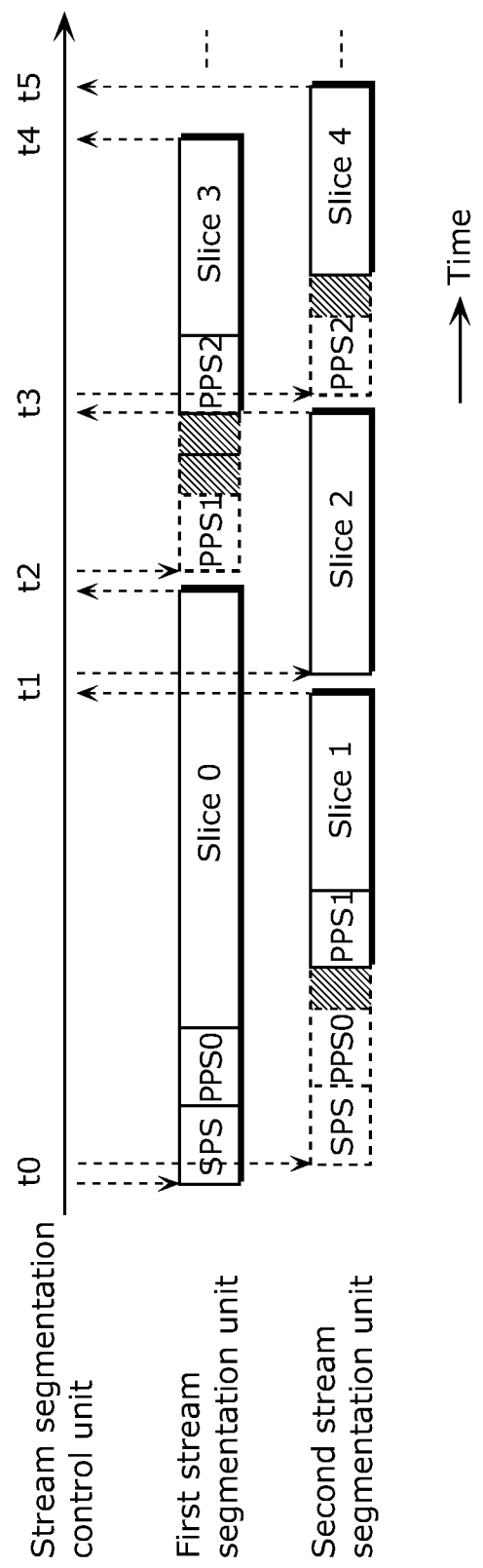
FIG. 6B is an illustration of a specific example of slice allocation processing by a stream segmentation control unit according to Embodiment 1 of the present invention.

Each of FIGS. 6A and 6B is an illustration of a specific example of slice allocation processing by the stream segmentation control unit 140. It is assumed in this embodiment that M=2, for simplicity's sake.

FIG. 6A is a diagram showing an example of a bit stream in H.264/AVC. The bit stream in this example includes an SPS (Sequence Parameter Set), PPSs (Picture Parameter Sets), and slice data (slice) constituting each picture. A picture 0 is composed of only a slice 0. A picture 1 is composed of slices 1 and 2. A picture 2 is composed of slices 3 and 4.

The arrows in FIG. 6A indicate reference relationships between the slice data and the PPSs and reference relationships between the PPSs and the SPS. For example, the slice 0 is decoded using header information included in a PPS 0, and the slices 1 and 2 are decoded using header information included in a PPS 1. Meanwhile, the SPS that includes sequence information of the stream is referenced to by the PPSs 0 to 2. That is, the SPS shown in FIG. 6A is used for decoding all of the slices 0 to 4.

Thus, in H.264/AVC, there is an instance where a plurality of slices reference to the same header information (SPS, PPS). Therefore, in the case of allocating stream segmentation processing to each of the M stream segmentation units 130, all stream segmentation units 130 are required to equally decode and analyze the header information such as the SPS and the PPS.

FIG. 6B is a diagram showing processing of allocating the series of slices by the stream segmentation control unit 140. Upon processing start, each stream segmentation unit 130 holds a slice number of a slice to be processed. As an example, the first stream segmentation unit 130 holds SN1=0 as an initial value of a slice number of a slice to be processed, while the second stream segmentation unit 130 holds SN2=0 as an initial value of a slice number of a slice to be processed.

At time t0, the first stream segmentation unit 130 and the second stream segmentation unit 130 are both not engaged in stream segmentation processing, and accordingly the stream segmentation control unit 140 sends allocation control information to notify the first stream segmentation unit 130 to decode the slice 0 and the second stream segmentation unit 130 to decode the slice 1.

Upon being notified to decode the slice 0 from the stream segmentation control unit 140, the first stream segmentation unit 130 compares the slice number of the slice notified to be decoded, with the value of SN1 held as the slice number of the slice to be processed. At this time, both slice numbers are 0, i.e. the two slice numbers match each other, so that the first stream segmentation unit 130 performs stream segmentation processing on a slice inputted first.

In detail, the first stream segmentation unit 130 first decodes and analyzes the SPS, and extracts each parameter necessary for stream segmentation processing. Since the slice number of the slice notified by the allocation control information matches the value of SN1, the first stream segmentation unit 130 outputs the inputted SPS directly to the first segment stream buffer 152. Next, the first stream segmentation unit 130 decodes and analyzes the PPS 0, and extracts each parameter necessary for stream segmentation processing. The first stream segmentation unit 130 equally outputs the inputted PPS 0 directly to the first segment stream buffer 152. The first stream segmentation unit 130 then performs stream segmentation processing on the slice 0, and outputs N segment streams generated as a result to the first segment stream buffer 152.

On the other hand, upon being notified to decode the slice 1 from the stream segmentation control unit 140 by the allocation control information, the second stream segmentation unit 130 compares the slice number of the slice notified to be decoded, with the value of SN2 held as the slice number of the slice to be processed. At this time, the slice number of the slice notified to be decoded is 1 whereas the value of SN2 is 0, with there being a difference of 1. Accordingly, the second stream segmentation unit 130 skips processing for one inputted slice, and performs stream segmentation processing on a slice inputted second. That is, the second stream segmentation unit 130 skips stream segmentation processing for the number of slices corresponding to the difference.

In detail, the second stream segmentation unit 130 first decodes and analyzes the SPS, and extracts each parameter necessary for stream segmentation processing. Since the slice number of the slice notified to be decoded does not match the value of SN2, however, the second stream segmentation unit 130 does not output the SPS to the second segment stream buffer 152. Next, the second stream segmentation unit 130 decodes and analyzes the PPS 0 and extracts each parameter necessary for stream segmentation processing, but equally does not output the inputted PPS 0 to the second segment stream buffer 152. The second stream segmentation unit 130 then skips stream segmentation processing on the inputted slice 0. Hence, the second stream segmentation unit 130 does not output a result of stream segmentation processing of the slice 0 to the second segment stream buffer 152. Note that the stream segmentation processing skip is carried out by searching for start code that accompanies coded data. Having skipped the processing of the slice 0, the second stream segmentation unit 130 increments SN2 to SN2=1.

Here, the second stream segmentation unit 130 does not output the SPS and the PPS 0 to the second segment stream buffer 152, in order to prevent the N decoding engines 120 from redundantly receiving the same header information. Since the first stream segmentation unit 130 outputs the SPS and the PPS 0 to the first segment stream buffer 152, the second stream segmentation unit 130 refrains from outputting the SPS and the PPS 0.

Following this, the second stream segmentation unit 130 decodes and analyzes the PPS 1, and extracts each parameter necessary for stream segmentation processing. Since the slice number of the slice notified to be decoded matches the value of SN2, the second stream segmentation unit 130 outputs the inputted PPS 1 directly to the second segment stream buffer 152. The second stream segmentation unit 130 then performs stream segmentation processing on the slice 1, and outputs N segment streams generated as a result to the second segment stream buffer 152.

At time n, the stream segmentation processing of the slice 1 by the second stream segmentation unit 130 ends, and accordingly the second stream segmentation unit 130 notifies the stream segmentation control unit 140 of the processing completion and also information of the segment streams outputted to the second segment stream buffer 152. In detail, the second stream segmentation unit 130 notifies the number of NAL units for the PPS 1 and the slice 1 actually outputted to the second segment stream buffer 152. A NAL unit is a structural unit of a stream in H.264/AVC. An SPS, a PPS, a slice, and the like are each contained in a NAL unit.

Since each slice is variable in size, there is a possibility that the number of MB lines included in a slice is less than N which is the number of segment streams. This being so, the number of NAL units corresponding to the slice processed by the stream segmentation unit 130 varies for each of the N segment streams generated, taking the value of either 0 or 1. Hence, the stream segmentation unit 130 notifies the stream segmentation control unit 140 of the number of NAL units outputted for each of the N segment streams.

In the operation example shown in FIG. 6B, it is assumed that the number of MB lines included in each slice is not less than N and so the number of NAL units corresponding to one slice is 1 regardless of the segment stream, for simplicity's sake. The second stream segmentation unit 130 notifies the stream segmentation control unit 140 that two NAL units have been processed in total for the PPS 1 and the slice 1. At the same time, having completed the stream segmentation processing of the slice 1, the second stream segmentation unit 130 increments SN2 to SN2=2. Upon being notified of the processing completion from the second stream segmentation unit 130, the stream segmentation control unit 140 notifies the second stream segmentation unit 130 to decode the slice 2.

Upon being notified to decode the slice 2 from the stream segmentation control unit 140, the second stream segmentation unit 130 compares the slice number of the slice notified to be decoded, with the value of SN2 held as the slice number of the slice to be processed. At this time, both slice numbers are 2, i.e. the two slice numbers match each other, so that the second stream segmentation unit 130 performs stream segmentation processing on a slice inputted first.

In detail, the second stream segmentation unit 130 performs stream segmentation processing on the slice 2. Since the slice number of the slice notified to be decoded matches the value of SN2, the second stream segmentation unit 130 outputs N segment streams generated as a result to the second segment stream buffer 152.

At time t2, the stream segmentation processing of the slice 0 by the first stream segmentation unit 130 ends, and accordingly the first stream segmentation unit 130 notifies the stream segmentation control unit 140 of the processing completion and also information of the segment streams outputted to the first segment stream buffer 152, namely, "3" as the number of NAL units for the SPS, the PPS 0, and the slice 0. At the same time, having completed the stream segmentation processing of the slice 0, the first stream segmentation unit 130 increments SN1 to SN1=1. Upon being notified of the processing completion from the first stream segmentation unit 130, the stream segmentation control unit 140 notifies the first stream segmentation unit 130 to decode the slice 3 by the allocation control information.

Upon being notified to decode the slice 3 from the stream segmentation control unit 140, the first stream segmentation unit 130 compares the slice number of the slice notified to be decoded, with the value of SN1 held as the slice number of the slice to be processed. At this time, the slice number of the slice notified to be decoded is 3 whereas the value of SN1 is 1, with there being a difference of 2. Accordingly, the first stream segmentation unit 130 skips processing for two inputted slices, and performs stream segmentation processing on a slice inputted third.

In detail, the first stream segmentation unit 130 first decodes and analyzes the PPS 1, and extracts each parameter necessary for stream segmentation processing. Since the slice number of the slice notified to be decoded does not match the value of SN1, however, the first stream segmentation unit 130 does not output the PPS 1 to the first segment stream buffer 152. The first stream segmentation unit 130 then skips stream segmentation processing on the inputted slice 1. Hence, the first stream segmentation unit 130 does not output a result of stream segmentation processing of the slice 1 to the first segment stream buffer 152. Having skipped the processing of the slice 1, the first stream segmentation unit 130 increments SN1 to SN1=2. Next, the slice 2 is inputted to the first stream segmentation unit 130. Since the slice number of the slice notified to be decoded still does not match the value of SN1, however, the first stream segmentation unit 130 skips stream segmentation processing on the inputted slice 2, too. Hence, the first stream segmentation unit 130 does not output a result of stream segmentation processing of the slice 2 to the first segment stream buffer 152. Having skipped the processing of the slice 2, the first stream segmentation unit 130 increments SN1 to SN1=3.

Following this, the first stream segmentation unit 130 decodes and analyzes the PPS 2, and extracts each parameter necessary for stream segmentation processing. Since the slice number of the slice notified to be decoded matches the value of SN1, the first stream segmentation unit 130 outputs the inputted PPS 2 directly to the first segment stream buffer 152. The first stream segmentation unit 130 then performs stream segmentation processing on the slice 3, and outputs N segment streams generated as a result to the first segment stream buffer 152.

At time t3, the stream segmentation processing of the slice 2 by the second stream segmentation unit 130 ends, and accordingly the second stream segmentation unit 130 notifies the stream segmentation control unit 140 of the processing completion and also information of the segment streams outputted to the second segment stream buffer 152, namely, "1" as the number of NAL units for the slice 2. At the same time, having completed the stream segmentation processing of the slice 2, the second stream segmentation unit 130 increments SN2 to SN2=3. Upon being notified of the processing completion from the second stream segmentation unit 130, the stream segmentation control unit 140 notifies the second stream segmentation unit 130 to decode the slice 4 by the allocation control information.

Upon being notified to decode the slice 4 from the stream segmentation control unit 140, the second stream segmentation unit 130 compares the slice number of the slice notified to be decoded, with the value of SN2 held as the slice number of the slice to be processed. At this time, the slice number of the slice notified to be decoded is 4 whereas the value of SN2 is 3, with there being a difference of 1. Accordingly, the second stream segmentation unit 130 skips processing for one inputted slice, and performs stream segmentation processing on a slice inputted second.

In detail, the second stream segmentation unit 130 first decodes and analyzes the PPS 2, and extracts each parameter necessary for stream segmentation processing. Since the slice number of the slice notified to be decoded does not match the value of SN2, however, the second stream segmentation unit 130 does not output the PPS 2 to the second segment stream buffer 152. The second stream segmentation unit 130 then skips stream segmentation processing on the inputted slice 3.

Hence, the second stream segmentation unit 130 does not output a result of stream segmentation processing of the slice 3 to the second segment stream buffer 152. Having skipped the processing of the slice 3, the second stream segmentation unit 130 increments SN2 to SN2=4.

Next, since the slice number of the slice notified to be decoded matches the value of SN2, the second stream segmentation unit 130 performs stream segmentation processing on the slice 4, and outputs N segment streams generated as a result to the second segment stream buffer 152.

At time t4, the stream segmentation processing of the slice 3 by the first stream segmentation unit 130 ends, and accordingly the first stream segmentation unit 130 notifies the stream segmentation control unit 140 of the processing completion and also information of the segment streams outputted to the first segment stream buffer 152, namely, "2" as the number of NAL units for the PPS2 and the slice 3. At the same time, having completed the stream segmentation processing of the slice 3, the first stream segmentation unit 130 increments SN1 to SN1=4.

Likewise, at time t5, the stream segmentation processing of the slice 4 by the second stream segmentation unit 130 ends, and accordingly the second stream segmentation unit 130 notifies the stream segmentation control unit 140 of the processing completion and also information of the segment streams outputted to the second segment stream buffer 152, namely, "1" as the number of NAL units for the slice 4. At the same time, having completed the stream segmentation processing of the slice 4, the second stream segmentation unit 130 increments SN2 to SN2=5.

As described above, the stream segmentation control unit 140 sequentially allocates slice decoding processing (stream segmentation processing) to the stream segmentation units 130 that have completed processing. This enables the stream segmentation units 130 to be equal in processing amount.

Figure 7:
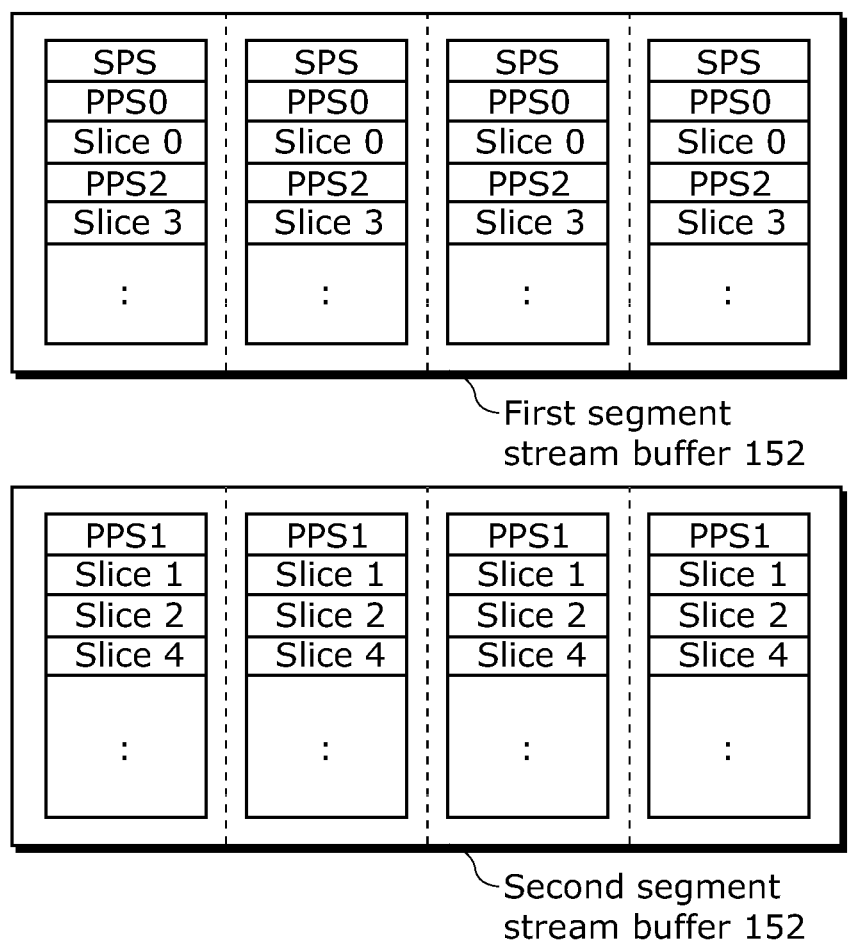
FIG. 7 is a diagram showing states of segment stream buffers in the case of performing slice allocation by the stream segmentation control unit and stream segmentation processing according to Embodiment 1 of the present invention.

FIG. 7 is a diagram showing states of the segment stream buffers 152 in the case of performing slice allocation and stream segmentation processing shown in FIG. 6B. Slices 0 to 4 shown in FIG. 7 each represent data of a portion of the slice.

N (N=4) segment streams corresponding to the slices 0 and 3 are stored in the first segment stream buffer 152. Meanwhile, N (N=4) segment streams corresponding to the slices 1, 2, and 4 are stored in the second segment stream buffer 152. Thus, the slices are stored in the two segment stream buffers 152 in a distributed manner according to the processing amount of each stream segmentation unit 130, and so the storage order of the slices is not uniform.

Accordingly, to enable the N decoding engines 120 to obtain the segment streams in the same order of slices as in the bit stream prior to segmentation, the stream segmentation control unit 140 notifies the N decoding engines 120 of selection information indicating from which of the M segment stream buffers 152 the segment streams are to be obtained.

FIG. 8 is a diagram showing an example of a format of selection information in the case of performing slice allocation and stream segmentation processing shown in FIG. 6B.

As shown in FIG. 8, the selection information includes segment stream buffer information and NAL unit number information for each slice, and is generated each time the stream segmentation control unit 140 performs slice allocation processing. The segment stream buffer information indicates whether the stream segmentation control unit 140 allocates the slice to the first stream segmentation unit 130 or the second stream segmentation unit 130. That is, the segment stream buffer information indicates the segment stream buffer in which the segment streams outputted from the stream segmentation unit 130 as a result of performing stream segmentation processing on the slice are stored. The NAL unit number information indicates the number of NAL units outputted when the stream segmentation unit 130 processes the slice, and is notified from the stream segmentation unit 130 to the stream segmentation control unit 140 upon completion of the processing by the stream segmentation unit 130.

As mentioned earlier, there is a possibility that the NAL unit number information varies for each of the N segment streams. Accordingly, each of the N decoding engines 120 is notified of separate selection information depending on the corresponding one of the N segment streams. In detail, the first decoding engine 120 is notified of selection information corresponding to the first segment stream, the second decoding engine 120 is notified of selection information corresponding to the second segment stream, the third decoding engine 120 is notified of selection information corresponding to the third segment stream, and the fourth decoding engine 120 is notified of selection information corresponding to the fourth segment stream. Based on the above-mentioned assumption that the number of MB lines included in each slice is not less than N and so the number of NAL units corresponding to one slice is 1 regardless of the segment stream, it is assumed here that the N decoding engines 120 are notified of the same selection information.

The selection information generated by the stream segmentation control unit 140 is notified to the N decoding engines 120 and stored in, for example, a FIFO (first-in first-out) memory in each of the N decoding engines 120. The selection information stored in the FIFO memory is read by the decoding engine 120 in notification order, and used for stream obtainment from the segment stream buffer 152.

In detail, the decoding engine 120 first reads the segment stream buffer information=1 and the NAL unit number information=3, as the selection information of the slice 0. According to the selection information of the slice 0, the decoding engine 120 obtains three NAL units (the SPS, the PPS 0, and the slice 0) from the first segment stream buffer 152. The decoding engine 120 then reads the segment stream buffer information=2 and the NAL unit number information=2, as the selection information of the slice 1. According to the selection information of the slice 1, the decoding engine 120 obtains two NAL units (the PPS 1 and the slice 1) from the second segment stream buffer 152. The decoding engine 120 then reads the segment stream buffer information=2 and the NAL unit number information=1, as the selection information of the slice 2. According to the selection information of the slice 2, the decoding engine 120 obtains one NAL unit (the slice 2) from the second segment stream buffer 152. The decoding engine 120 then reads the segment stream buffer information=1 and the NAL unit number information=2, as the selection information of the slice 3. According to the selection information of the slice 3, the decoding engine 120 obtains two NAL units (the PPS 2 and the slice 3) from the first segment stream buffer 152. The decoding engine 120 then reads the segment stream buffer information=2 and the NAL unit number information=1, as the selection information of the slice 4. According to the selection information of the slice 4, the decoding engine 120 obtains one NAL unit (the slice 4) from the second segment stream buffer 152.

Thus, through the use of the selection information notified from the stream segmentation control unit 140, the decoding engine 120 can obtain the segment streams (the slices of the segment streams) from the M segment stream buffers 152 in the same order of slices as in the bit stream inputted to the decoder 110.

Note that the slice allocation processing described with reference to FIGS. 6A to 8 is merely one processing operation example of the image decoding apparatus 100 according to the present invention, and the present invention is not limited to the processing operation described here.

For example, though the stream segmentation control unit 140 designates the slice number when notifying the stream segmentation unit 130 to decode the slice in FIG. 6B, the stream segmentation control unit 140 may designate the number of slices to be skipped, instead of the slice number. In this case, the stream segmentation control unit 140 keeps a record of the number of slices allocated to each of the M stream segmentation units 130 and, based on this information, calculates the number of slices to be skipped. Moreover, though the stream segmentation unit 130 notifies the stream segmentation control unit 140 of the processing completion and the number of NAL units outputted to the segment stream buffer 152 at the end of the stream segmentation processing of the slice by the stream segmentation unit 130 in FIG. 6B, the stream segmentation unit 130 may notify the number of bits of the segment stream outputted to the segment stream buffer 152, instead of the number of NAL units outputted to the segment stream buffer 152. That is, the stream segmentation unit 130 may notify any information that enables the decoding engine 120 to determine the size of the segment stream to be obtained from the segment stream buffer 152.

Moreover, though the segment stream buffer information directly designates the buffer number of the segment stream buffer 152 in FIG. 8, information other than the buffer number may instead be used. For example, in the case where M=2, the segment stream buffer information may be information indicating whether or not the segment stream buffer 152 storing the segment stream corresponding to the slice as the processing target is the same as the segment stream buffer 152 storing the segment stream corresponding to the immediately preceding slice. That is, the segment stream buffer information may be any information that enables the decoding engine 120 to appropriately obtain the segment streams from the plurality of segment stream buffers 152. Moreover, though the selection information includes the NAL unit number information in FIG. 8 as an example, the selection information may include information indicating the number of bits of the segment stream instead of the NAL unit number information, as mentioned above.

Figure 9:
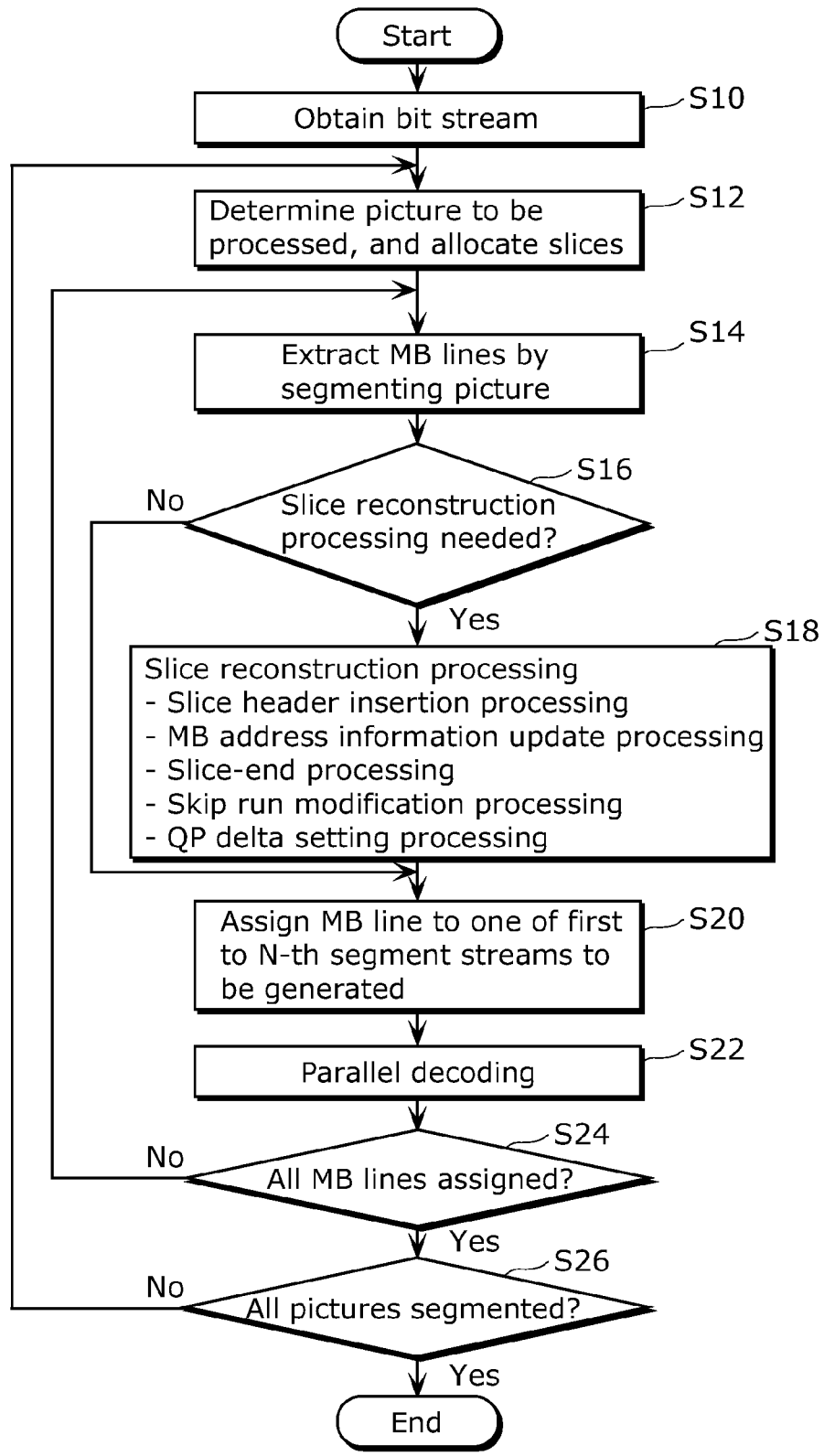
FIG. 9 is a flowchart showing overall operations performed by the image decoding apparatus according to Embodiment 1 of the present invention.

FIG. 9 is a flowchart showing overall operations performed by the image decoding apparatus 100 in this embodiment.

First, the image decoding apparatus 100 obtains a bit stream (Step S10). The image decoding apparatus 100 determines the current coded picture to be processed in the bit stream, and also allocates slices to make the processing amount equal, in order to perform stream segmentation in parallel (Step S12). Furthermore, the image decoding apparatus 100 extracts an MB line by segmenting the picture to be processed (Step S14). In the case where a slice header exists immediately before an MB line or between two macroblocks belonging to the MB line, the MB line is extracted together with the slice header.

Next, prior to assigning the current MB line extracted by the segmentation in Step S14 to one of the first to N-th segment streams to be generated, the image decoding apparatus 100 determines whether or not slice reconstruction processing is required (more specifically, whether or not a slice header needs to be inserted immediately before the MB line, whether or not slice-end information needs to be set immediately after the MB line already assigned, whether or not MB skip run information needs to be modified, and whether or not QP variations need to be set) (Step S16).

The image decoding apparatus 100 executes slice reconstruction processing (Step S18) in the case where it determines in Step S16 that the slice reconstruction processing needs to be performed (Yes in Step S16). In short, the image decoding apparatus 100 executes at least one of the aforementioned slice header insertion processing, slice-end processing, skip run modification processing, and QP delta setting processing. In addition, the image decoding apparatus 100 also executes MB address information update processing when executing the slice header insertion processing. Note that the stream segmentation processing from Steps S14 to S20 is performed in parallel on a slice basis.

Subsequently, the image decoding apparatus 100 assigns the MB line to one of the first to N-th segment streams to be generated (Step S20). Step S20 is repeatedly performed to sequentially assign MB lines to the first to N-th segment streams, thereby generating the first to N-th segment streams.

The image decoding apparatus 100 decodes, in parallel, the MB lines assigned to the first to N-th segment streams (Step S22). In the case where no MB line is assigned to one of the first to N-th segment streams, the image decoding apparatus 100 decodes the remaining segment streams other than the segment stream not assigned with any MB line.

Next, the image decoding apparatus 100 determines whether or not all the MB lines in the picture have already been assigned (Step S24), and when it is determined that all the MB lines have not yet been assigned (No in Step S24), repeats the execution of the processing starting with Step S14. In contrast, when it is determined that all the MB lines have already been assigned (Yes in Step S24), the image decoding apparatus 100 further determines whether or not all the pictures in the bit stream have already been segmented (Step S26). Here, when it is determined that all the pictures have not yet been segmented (No in Step S26), the image decoding apparatus 100 repeats the execution of the processing starting with Step S12. In contrast, when it is determined that all the pictures have already been segmented (Yes in Step S26), the image decoding apparatus 100 completes the decoding processing.

The processing operations indicated by the flowchart in FIG. 9 are examples of processing operations performed by the image decoding apparatus 100 according to the present invention. The present invention is not limited to the processing operations shown in this flowchart.

For example, in the flowchart in FIG. 9, the stream segmentation unit 130 of the image decoding apparatus 100 performs slice header insertion processing in the slice reconstruction process of Step S18. However, the stream segmentation unit 130 may directly provide the slice header copies to the decoding engines 120 that require the respective slice headers without performing such slice header insertion processing. In addition, in the flowchart in FIG. 9, the stream segmentation unit 130 performs MB address information update processing in the slice reconstruction process of Step S18. However, the stream segmentation unit 130 may skip such update processing. In this case, for example, the decoding engines 120 update the MB address information of the slice header copies in the segment streams. In addition, in the flowchart in FIG. 9, the stream segmentation unit 130 performs slice-end processing in the slice reconstruction process of Step S18. However, the stream segmentation unit 130 may skip such slice reconstruction processing. In this case, for example, such slice-end processing may be performed on the already-assigned MB lines, after each of the MB lines is assigned to a corresponding one of the first to N-th segment streams in Step S20 and immediately before a next new MB line is assigned to one of the segment streams by the stream segmentation unit 130.

Here, a detailed description is given of a structure and operations of the stream segmentation unit 130.

Figure 10:
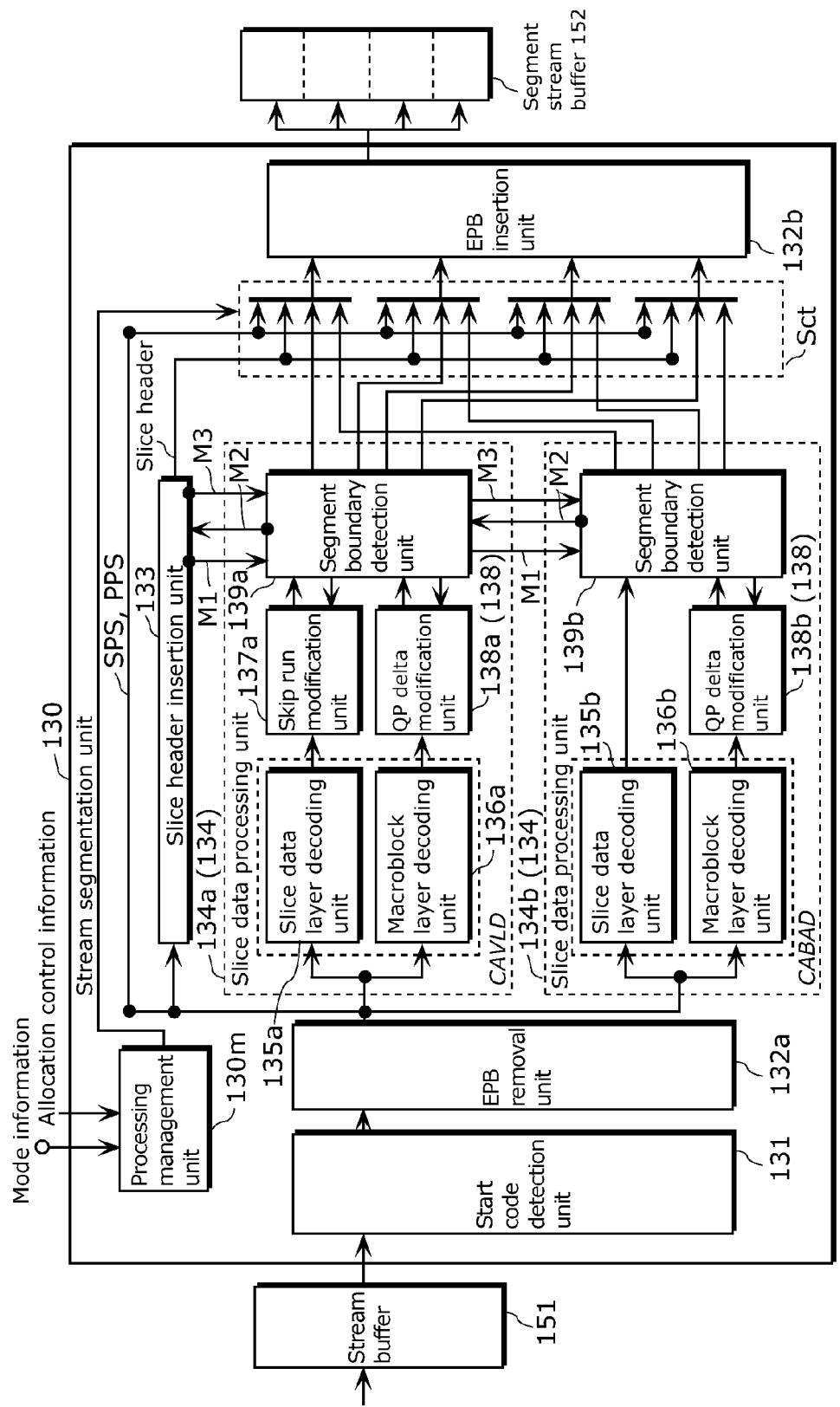
FIG. 10 is a block diagram showing a structure of a stream segmentation unit according to Embodiment 1 of the present invention.

FIG. 10 is a block diagram showing the structure of the stream segmentation unit 130.

The stream segmentation unit 130 includes a processing management unit 130m, a selector Sct, a start code detection unit 131, an EPB removal unit 132a, an EPB insertion unit 132b, a slice header insertion unit 133, and slice data processing units 134a and 134b.

The processing management unit 130m obtains mode information and allocation control information and, according to the obtained information, controls the other components included in the stream segmentation unit 130. For example, the processing management unit 130m holds the slice number (such as SN1, SN2, or the like) of the slice to be processed and controls the selector Sct based on the slice number so that the stream segmentation processing as shown in FIGS. 6A to 8 is carried out. Thus, the processing management unit 130m causes the segment stream generated from the SPS, the PPS, or the processing target slice to be outputted or not to be outputted.

The start code detection unit 131 reads a bit stream from the stream buffer 151, and detects the start code of each of NAL units.

The EPB removal unit 132a removes the EPBs (emulation prevention bytes) from the bit stream, and outputs the bit stream without the EPBs to the slice data processing units 134a and 134b. Furthermore, the EPB removal unit 132a obtains information such as SPSs (Sequence Parameter Sets) and PPSs (Picture Parameter Sets) that are included in layers higher than the layer of slices in the bit stream, and outputs the information items to the EPB insertion unit 132b so as to enable the EPB insertion unit 132b to insert the information items to the four segment streams.

The EPB insertion unit 132b inserts the EPBs removed by the EPB removal unit 132a into the segment streams that are generated by segmenting the bit stream.

The slice header insertion unit 133 executes the aforementioned slice header insertion processing and MB address information update processing. The slice header insertion unit 133 sends, to the slice data processing units 134a and 134b at a predetermined timing, a slice header processing detail notification M1 indicating whether or not slice header insertion processing is to be performed, and upon receiving a slice-end processing completion notification M2 from the slice data processing units 134a and 134b, executes the slice header insertion processing. In the subsequent slice header insertion processing, the slice header insertion unit 133 outputs, to the EPB insertion unit 132b, the slice header immediately before a current MB line and the slice header copy with updated MB address information.

The slice data processing units 134a and 134b generate four segment streams by segmenting the bit stream without the EPBs, and output the four segment streams. The segment streams outputted from the slice data processing units 134a and 134b do not include slice headers and slice header copies in the MB lines or at the positions immediately before the MB lines. Here, the slice data processing unit 134a executes processing in accordance with CAVLD (Context-Adaptive Variable Length Decoding), and segments the bit stream generated by CAVLC (Context-Adaptive Variable Length Coding) into four segment streams. Furthermore, the slice data processing unit 134b executes processing in accordance with CABAD (Context-Adaptive Binary Arithmetic Decoding), and segments the bit stream generated by CABAC (Context-Adaptive Binary Arithmetic Coding) into four segment streams.

The slice data processing unit 134a includes a slice data layer decoding unit 135a, a macroblock layer decoding unit 136a, a skip run modification unit 137a, a QP delta modification unit 138a, and a segment boundary detection unit 139a.

The slice data layer decoding unit 135a performs variable length decoding on coded data in the slice data layer in the bit stream. The macroblock layer decoding unit 136a performs variable length decoding on coded data in the macroblock layer in the bit stream. Dependencies between adjacent macroblocks are dissolved by such variable length decoding performed by the slice data layer decoding unit 135a and the macroblock layer decoding unit 136a. The slice data layer decoding unit 135a and the macroblock layer decoding unit 136a may decode only information (specifically, nCs (non-zero coefficients) in CAVLC) which is dependent on macroblocks adjacent to a current macroblock to be processed.

The skip run modification unit 137a modifies the MB skip run information "mb_skip_run" decoded by the slice data layer decoding unit 135a, re-codes the modified MB skip run information, and outputs the re-coded MB skip run information. More specifically, in the case where the MB skip run information indicates the number of consecutive blocks which cross the boundary between at least two consecutive slice portions in the bit stream, the skip run modification unit 137a segments the number of consecutive blocks, and sets MB skip run information modified to indicate the number of blocks for each slice portion, for each of the segment streams to be assigned with at least two consecutive slice portions. Furthermore, in the case where a plurality of blocks corresponding to the plurality of pieces of MB skip run information to be set are consecutive in at least one of the segment streams, the skip run modification unit 137a converts the plurality of pieces of MB skip run information to a single piece of MB skip run information indicating the total number of the blocks indicated by the plurality of pieces of MB skip run information.

Here, the MB skip run information is an example of a first code word indicating the number of the consecutive blocks in the case where blocks of a particular kind are consecutive in a slice of a coded picture. More specifically, the MB skip run information indicates the number of macroblocks to be consecutively skipped.

For example, in the case where a set of macroblocks to be skipped in sequence cross the boundary between a plurality of MB lines in a slice of the bit stream, the MB skip run information decoded by the slice data layer decoding unit 135a indicates the number of macroblocks to be skipped in sequence in the set. In such a case, segmenting a picture into MB lines and assigning the MB lines to separate segment streams changes the number of macroblocks to be skipped in sequence in each segment stream. In short, the dependency between the MB lines based on the MB skip run information is broken.

For this, the skip run modification unit 137a determines, for each of MB lines including a portion of such set, the number of macroblocks which constitute the portion included in the MB line and are to be skipped in sequence. Subsequently, the skip run modification unit 137a modifies the MB skip run information such that the number of macroblocks indicated by the MB skip run information is the number specified for the MB line.

The QP delta modification unit 138a modifies the QP variation "mb_qp_delta" of each macroblock decoded by the macroblock layer decoding unit 136a, re-codes the modified QP variation, and outputs the re-coded QP variation. Stated differently, in the case where the QP variation indicates a variation between blocks which cross the boundary between two MB lines, the QP delta modification unit 138*a* calculates a variation in coding coefficient based on a new context of the blocks in each segment stream. Subsequently, the QP delta modification unit 138*a* updates the QP variation into the calculated variation.

Here, the QP variation is an example of a second code word indicating a variation in coding coefficient between consecutive blocks in a slice of a coded picture. More specifically, the QP variation is included in a macroblock (current macroblock), and indicates a difference value between the QP value of the current macroblock and the QP value of the macroblock located immediately before the current macroblock.

In other words, the picture is segmented into MB lines, and when each of the MB lines is assigned to a corresponding one of the plurality of segment streams, the consecutive macroblocks having a boundary corresponding to the boundary of the MB lines are assigned to separate segment streams. As a result, the decoding engine 120 which decodes the segment stream including one of the consecutive macroblocks (current macroblock) cannot derive the QP value of the current macroblock based on the QP variation of the current macroblock. In short, the dependency between the MB lines based on the QP variation is broken.

To prevent this, the QP delta modification unit 138*a* re-calculates QP variation of each macroblock (current macroblock), based on the new context of macroblocks in the segment stream.

The segment boundary detection unit 139*a* segments the bit stream into four segment streams. More specifically, the segment boundary detection unit 139*a* segments each picture or slice into a plurality of MB lines, and assigns each of the MB lines to a corresponding one of the four segment streams. In the case where a slice header is placed immediately before a current MB line or between two macroblocks belonging to the current MB line, the segment boundary detection unit 139*a* assigns only the MB line to a corresponding one of the segment streams without assigning the slice header. Furthermore, the segment boundary detection unit 139*a* provides each of the segment streams with MB skip run information obtained from the skip run modification unit 137*a* and the QP variation obtained from the QP delta modification unit 138*a*.

Furthermore, when the segment boundary detection unit 139*a* detects the end of a current slice in the segment stream and receives the slice header processing detail notification M1 from the slice header insertion unit 133, it executes the aforementioned slice-end processing according to the details indicated by the slice header processing detail notification M1. In addition, upon completion of the slice-end processing, the segment boundary detection unit 139*a* sends the slice-end processing completion notification M2 to the slice header insertion unit 133.

The slice data processing unit 134*b* includes a slice data layer decoding unit 135*b*, a macroblock layer decoding unit 136*b*, a QP delta modification unit 138*b*, and a segment boundary detection unit 139*b*.

The slice data layer decoding unit 135*b* performs variable length decoding (arithmetic decoding) on coded data in the slice data layer in the bit stream. The macroblock layer decoding unit 136*b* performs variable length decoding (arithmetic decoding) on coded data in the macroblock layer in the bit stream. Dependencies between adjacent macroblocks are dissolved by such variable length decoding performed by the slice data layer decoding unit 135*a* and the macroblock layer decoding unit 136*b*.

As with the aforementioned QP delta modification unit 138*a*, the QP delta modification unit 138*b* modifies the QP variation "mb_qp_delta" of each macroblock decoded by the macroblock layer decoding unit 136*b*, re-codes the modified QP variation, and outputs the re-coded QP variation.

As with the segment boundary detection unit 139*a*, the segment boundary detection unit 139*b* segments the bit stream into four segment streams. At this time, the segment boundary detection unit 139*b* provides each of the segment streams with the QP variation obtained from the QP delta modification unit 138*b*. Furthermore, when the segment boundary detection unit 139*b* detects the end of the current slice in the segment stream and receives the slice header processing detail notification M1 from the slice header insertion unit 133, it executes the aforementioned slice-end processing according to the details indicated by the slice header processing detail notification M1. In addition, upon completion of the slice-end processing, the segment boundary detection unit 139*b* sends the end processing completion notification M2 to the slice header insertion unit 133.

Here, detailed descriptions are given of the slice header insertion unit 133 and the slice data processing units 134*a* and 134*b*. It is to be noted that, in the descriptions given of the functions and processing operations that are performed by both the slice data processing units 134*a* and 134*b*, the slice data processing units 134*a* and 134*b* are not differentiated from each other and referred to as slice data processing units 134.

First, descriptions are given of timings at which the slice header insertion unit 133 inserts slice headers, and timings at which the slice data processing unit 134 inserts slice-end information.

Figure 11:
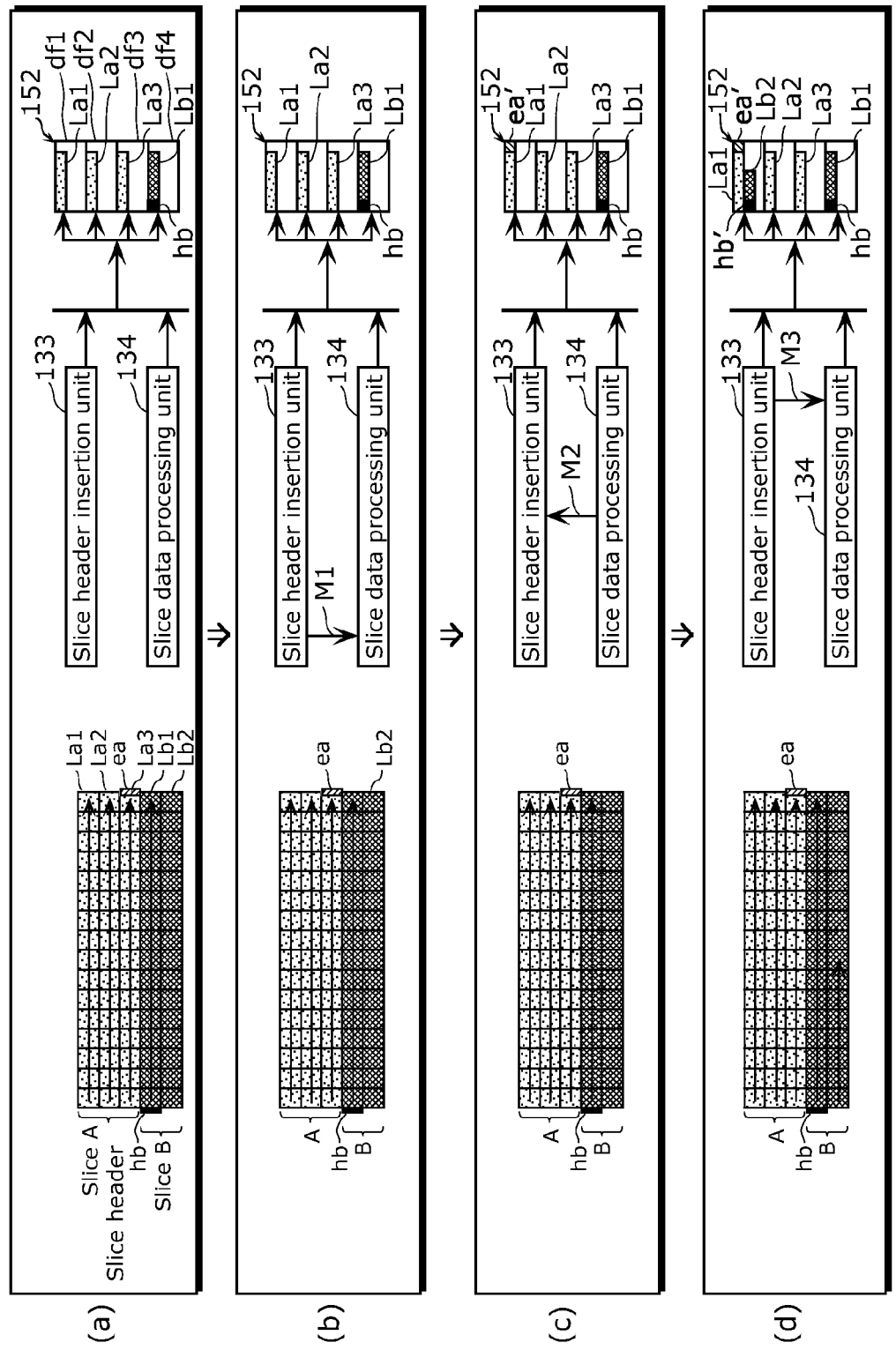
FIG. 11 is an illustration of operations performed by a slice header insertion unit and a slice data processing unit according to Embodiment 1 of the present invention.

FIG. 11 is an illustration of operations performed by the slice header insertion unit 133 and the slice data processing unit 134. Here, slices A and B included in a picture are allocated to the stream segmentation unit 130 as slices that are subject to stream segmentation processing.

The slice data processing unit 134 segments the picture including the slices A and B into MB lines, and sequentially stores, via the EPB insertion unit 132*b*, the MB lines from the beginning side into the four areas (the first area df1 to the fourth area df4) included in the segment stream buffer 152. At this time, the slice data processing unit 134 changes the storage destinations of MB lines on a per MB line basis to the first area df1, the second area df2, the third area df3, or the fourth area df4 in this listed order, and repeats this change.

For example, as shown in FIG. 11(*a*), the slice data processing unit 134 stores an MB line La1 of the slice A to the first area df1 of the segment stream buffer 152, stores a next MB line La1 of the slice A to the second area df2 of the segment stream buffer 152, and stores a next MB line La3 of the slice A to the third area df3 of the segment stream buffer 152. Furthermore, the slice data processing unit 134 stores an MB line Lb1 of the slice B following the slice A into the fourth area df4 of the segment stream buffer 152.

As a result, an MB line is stored into each of the first area df1 to the fourth area df4 that are the four areas of the segment stream buffer 152. Thus, the segment stream buffer 152 is in a state in which the first area df1 is just ready for storage of a next MB line of the slice B.

In the case where slice-end information ea is placed immediately after the MB line La3 in the bit stream when the slice data processing unit 134 tries to store the MB line La3 into the third area df3, the slice data processing unit 134 stores only the MB line La3 into the third area df3 without storing the slice-end information ea. Subsequently, the slice data processing unit 134 stores slice-end information ea' corresponding to the slice-end information ea into the third area df3 when storing an MB line belonging to a new slice into the third area df3. Here, a slice header hb of the slice B is stored in advance in the fourth area df4 by the slice header insertion unit 133 by the time when the slice data processing unit 134 tries to store the MB line Lb1 into the fourth area df4. In addition, in the picture, another MB line of the slice A exists before the MB line La1 of the slice A. Accordingly, no slice header copy of the slice A is inserted immediately before the MB lines La1, La2, and La3 of the first area df1, the second area df2, and the third area df3.

Furthermore, each time a macroblock is outputted, the segment boundary detection units 139a and 139b of the slice data processing unit 134 determines whether or not all the macroblocks in a current MB line have been outputted. As a result, when each of the segment boundary detection units 139a and 139b detects that all the macroblocks have been outputted, it detects a boundary between MB lines (the end of the MB line). Each of the segment boundary detection units 139a and 139b stops the macroblock output processing each time of detecting an MB line boundary, and notifies the slice header insertion unit 133 of the detection of the MB line boundary.

Accordingly, when the last macroblock of the MB line is stored into the segment stream buffer 152 and the segment stream buffer 152 is in the aforementioned state shown in FIG. 11(a), the slice header insertion unit 133 receives a notification of the detection of the MB line boundary from the segment boundary detection units 139a and 139b of the slice data processing unit 134.

As shown in FIG. 11(b), the slice header insertion unit 133 that received the notification of the detection of the MB line boundary sends the slice header processing detail notification M1 to the slice data processing unit 134. The slice header processing detail notification M1 shows "Output" or "No output" as information for notifying the slice data processing unit 134 of whether or not a slice header is to be outputted to and stored in the segment stream buffer 152 immediately before a next MB line from the slice data processing unit 134 is stored in the segment stream buffer 152. In short, a slice header processing detail notification M1 showing "Output" is a notification urging the slice data processing unit 134 to perform slice-end processing.

For example, the slice header insertion unit 133 determines that a slice header copy hb' is outputted to and stored in the segment stream buffer 152 immediately before a next MB line Lb2 from the slice data processing unit 134 is stored into the segment stream buffer 152. At this time, the slice header insertion unit 133 outputs the slice header processing detail notification M1 showing "Output" to the slice data processing unit 134.

In the case where the slice data processing unit 134 receives a slice header processing detail notification M1 showing "Output", the slice data processing unit 134 generates slice-end information and stores the slice-end information into the segment stream buffer 152, and outputs a slice-end processing completion notification M2 to the slice header insertion unit 133. In the other case where the slice data processing unit 134 receives a slice header processing detail notification M1 showing "No output", the slice data processing unit 134 outputs a slice-end processing completion notification M2 to the slice header insertion unit 133 without storing slice-end information into the segment stream buffer 152.

For example, as shown in FIG. 11(c), in the case where the slice data processing unit 134 receives the slice header processing detail notification M1 showing "Output", the slice data processing unit 134 generates slice-end information ea', and stores the slice-end information ea' into the first area df1 of the segment stream buffer 152. Upon completion of the storage, the slice data processing unit 134 outputs the slice-end processing completion notification M2 to the slice header insertion unit 133.

In the case where the slice header insertion unit 133 receives the slice-end processing completion notification M2 from the slice data processing unit 134 and the slice header processing detail notification M1 outputted immediately before shows "Output", the slice header insertion unit 133 outputs the slice header to store it into the segment stream buffer 152 via the EPB insertion unit 132b, and subsequently outputs a slice header processing completion notification M3 to the slice data processing unit 134. In the case where the slice header processing detail notification M1 outputted immediately before shows "No output", the slice header insertion unit 133 outputs the slice header processing completion notification M3 to the slice data processing unit 134 without storing the slice header into the segment stream buffer 152.

For example, in the case where the slice header insertion unit 133 receives the slice-end processing completion notification M2 from the slice data processing unit 134 when the immediately-outputted slice header processing detail notification M1 shows "Output", the slice header insertion unit 133 generates a slice header copy hb' and stores it into the first area df1 of the segment stream buffer 152 as shown in FIG. 11(d). Subsequently, the slice header insertion unit 133 outputs the slice header processing completion notification M3 to the slice data processing unit 134.

When each of the segment boundary detection units 139a and 139b of the slice data processing unit 134 receives the slice header processing completion notification M3 from the slice header insertion unit 133, it re-starts macroblock output processing that has been stopped to output a next MB line and store the MB line into the segment stream buffer 152.

For example, as shown in FIG. 11(d), the slice data processing unit 134 outputs the next MB line Lb2 and stores it into the first area df1 of the segment stream buffer 152.

These processes performed by the slice header insertion unit 133 and the slice data processing unit 134 make it possible to write the data that is the slice-end information, a slice header, and a next MB line at the correct MB line boundary in this listed order, in each of the areas of the segment stream buffer 152.

Figure 12:
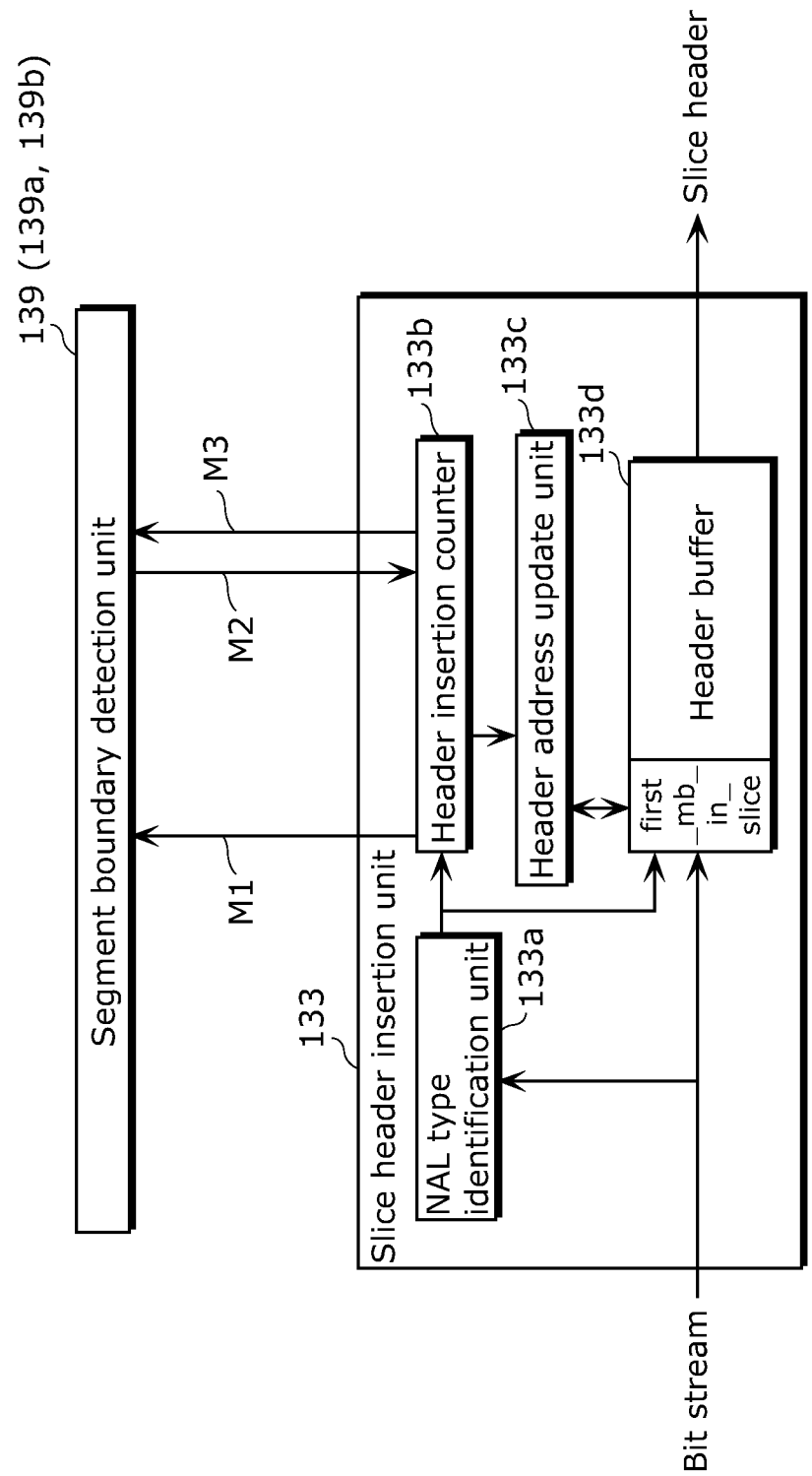
FIG. 12 is a block diagram showing a structure of the slice header insertion unit according to Embodiment 1 of the present invention.

FIG. 12 is a block diagram showing a structure of the slice header insertion unit 133.

It is to be noted that, when the functions and processing operations that are performed by both the segment boundary detection units 139a and 139b are described with reference to FIG. 12, the segment boundary detection units 139a and 139b are not differentiated from each other and referred to as segment boundary detection units 139.

The slice header insertion unit 133 includes a NAL type identification unit 133a, a header insertion counter 133b, a header address update unit 133c, and a header buffer 133d.

The NAL type identification unit 133a obtains NAL units of the bit stream, and determines, for each obtained NAL unit, whether or not the NAL unit type shows a slice. Subsequently, in the case where the NAL type identification unit 133a determines that the NAL type shows a slice, it notifies the header buffer 133d and the header insertion counter 133b of the determination.

On receiving the notification from the NAL type identification unit 133a, the header buffer 133d checks whether or not the NAL unit indicated by the notification includes a slice header, and when the NAL unit includes a slice header, extracts the slice header from the NAL unit and stores it. In the case where a next NAL unit includes a new slice header, the header buffer 133d replaces the already-stored slice header with the new slice header. In short, the header buffer 133d always stores the latest slice header.

The header insertion counter 133b counts how many times the segment boundary detection unit 139 detects an MB line boundary (end) in the bit stream in order to determine timings for generating and inserting slice header copies. More specifically, the header insertion counter 133b counts values from 0 to 4 (the number of the decoding engines 120). On receiving the notification from the NAL type identification unit 133a, the header insertion counter 133b checks whether or not the NAL unit indicated by the notification includes a slice header, and when the NAL unit includes a slice header, resets the count value to 0. When an MB line boundary (the end of the MB line) is detected, the header insertion counter 133b increments the count vale by 1. When the count value reaches 4 and another MB line boundary is detected, the header insertion counter 133b maintains the count value at 4 without increment.

In this way, the header insertion counter 133b updates or maintains the count value and resets the count value to 0 when the MB line boundary is detected and the NAL unit includes the slice header.

When an MB line boundary is detected, the header insertion counter 133b outputs a slice header processing detail notification M1 showing either "Output" or "No output" to the segment boundary detection unit 139 according to the count value (including the count value 0 that is reset by the slice header immediately after the MB line boundary) updated by the detection. More specifically, when the count value immediately after the detection of the MB line boundary is within 0 to 3, the header insertion counter 133b outputs a slice header processing detail notification M1 showing "Output", and when the count value is 4, outputs a slice header processing detail notification M1 showing "No output". Furthermore, the header insertion counter 133b outputs a slice header processing detail notification M1 showing "Output" not only when an MB line boundary is detected but also when the count value is reset to 0.

Furthermore, when the header insertion counter 133b outputs the slice header processing detail notification M1 to the segment boundary detection unit 139 and receives the slice-end processing completion notification M2 from the segment boundary detection unit 139, and in the case where the outputted slice header processing detail notification M1 shows "Output", the header insertion counter 133b causes the header buffer 133d to output the slice header stored in the header buffer 133d. Subsequently, the header insertion counter 133b outputs the slice header processing completion notification M3 to the segment boundary detection unit 139. When the slice header is outputted from the header buffer 133d, the slice header insertion unit 133 selects an area as a storage destination in the segment stream buffer 152 according to the value indicated by the MB address information included in the slice header. Subsequently, the slice header insertion unit 133 stores the slice header in the area as the selected storage destination. In contrast, when the outputted slice header processing detail notification M1 shows "No output", the header insertion counter 133b maintains the slice header in a storage status without causing the header buffer 133d to output the slice header stored in the header buffer 133d. Subsequently, as described earlier, the header insertion counter 133b outputs the slice header processing completion notification M3 to the segment boundary detection unit 139.

The header address update unit 133c updates MB address information "first_mb_in_slice" of the slice header stored in the header buffer 133d according to the count value (including the count value 0 that is reset by the slice header located immediately after the MB line boundary) immediately after the detection of the MB line boundary.

For example, the header address update unit 133c does not update MB address information when the count value n is 0, and updates MB address information to ("mbposv"+n)×("pic_width_in_mbs_minus1"+1) when the count value n is not 0. In the case where a current picture is coded in MBAFF, the header address update unit 133c updates the MB address information according to ("mbposv"/2+n)×("pic_width_in_mbs_minus1"+1).

Figure 13:
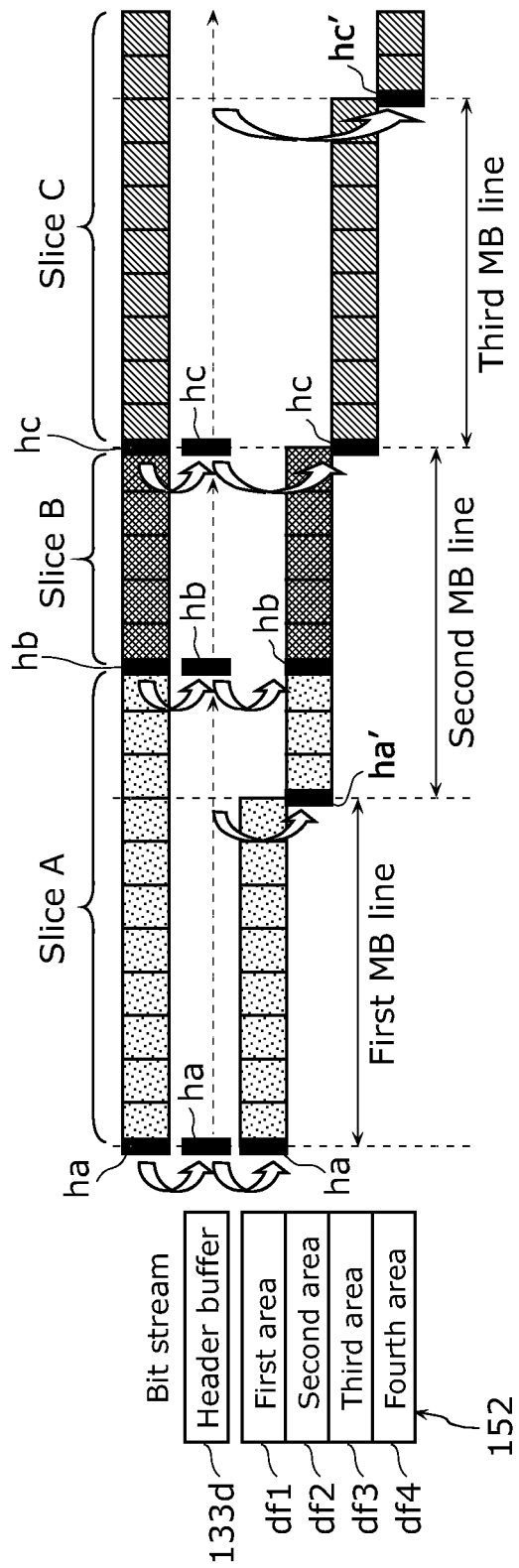
FIG. 13 is a diagram showing MB lines and slice headers assigned to first to fourth areas in a segment stream buffer according to Embodiment 1 of the present invention.

FIG. 13 is a diagram showing MB lines and slice headers assigned to the first area df1 to the fourth area df4 in the segment stream buffer 152.

For example, the stream segmentation unit 130 reads the slices A, B, and C of the bit stream stored in the stream buffer 151 in this listed order.

In this case, first, the header buffer 133d of the slice header insertion unit 133 extracts the slice header ha from the beginning of the slice A, and stores the slice header ha. At this time, the header insertion counter 133b resets the count value to 0. Since the count value is 0, the header buffer 133d outputs the stored slice header ha to store the slice header ha into the first area df1 of the segment stream buffer 152.

When the slice header ha is outputted from the header buffer 133d, the slice data processing unit 134 outputs the first MB line next to the slice header ha of the slice A in the bit stream, and stores the first MB line in the first area df1 of the segment stream buffer 152. As a result, data that are the slice header ha and the first MB line belonging to the slice A are stored in the first area df1 in this listed order.

When the first MB line is outputted from the slice data processing unit 134, the aforementioned header insertion counter 133b increments the count value to 1. Since the count value at the end of the first MB line is 1, the header buffer 133d outputs the stored slice header ha as a slice header copy ha', and stores the slice header copy ha' to the second area df2 of the segment stream buffer 152. The MB address information of the slice header copy ha' is updated by the header address update unit 133c.

When the slice header copy ha' is outputted from the header buffer 133d, the slice data processing unit 134 outputs the second MB line next to the first MB line in the bit stream, and stores the second MB line into the second area df2 of the segment stream buffer 152.

Here, the second MB line includes a plurality of macroblocks belonging to the slice A, the slice header hb of the slice B, and a plurality of macroblocks belonging to the slice B. First, the segment boundary detection unit 139 of the slice data processing unit 134 stores all the macroblocks belonging to the slice A included in the second MB line into the second area df2. Upon completion of the storage, the segment boundary detection unit 139 temporally stops the macroblock output processing, and waits for reception of the slice header processing detail notification M1 from the slice header insertion unit 133. At this time, the slice header insertion unit 133 resets the count value to 0 to detect the slice header hb of the slice B, and sends the slice header processing detail notification unit M1 showing "Output" to the segment boundary detection unit 139. On receiving this slice header processing detail notification M1, the segment boundary detection unit 139 performs slice-end processing on the end of the slice A in the second area df2, and sends the slice-end processing completion notification M2 to the slice header insertion unit 133. On receiving this slice-end processing completion notification M2, the slice header insertion unit 133 stores the slice header hb of the slice B into the second area df2, and sends the slice header processing completion notification M3 to the segment boundary detection unit 139. On receiving this slice header processing completion notification M3, the segment boundary detection unit 139 re-starts the output processing that has been stopped, and stores the plurality of macroblocks belonging to the next slice B included in the second MB line into the second area df2.

As a result, in the second area df2, data that are the macroblocks each corresponding to a portion of the second MB line belonging to the slice A, the slice header hb, and the macroblocks each corresponding to a portion of the second MB line belonging to the slice B are stored next to the slice header copy ha' in this listed sequence.

When the second MB line is outputted from the slice data processing unit 134, the header buffer 133d of the slice header insertion unit 133 extracts the slice header hc from the beginning of the slice C next to the second MB line in the bit stream, and stores the slice header hc. At this time, the header insertion counter 133b resets the count value to 0. Since the count value at the end of the second MB line is 0, the header buffer 133d outputs the stored slice header hc, and stores the slice header hc into the third area df3 of the segment stream buffer 152.

When the slice header hc is outputted from the header buffer 133d, the slice data processing unit 134 outputs the third MB line next to the slice header hc of the slice C in the bit stream, and stores the third MB line in the third area df3 of the segment stream buffer 152. As a result, the slice header hc and the third MB line belonging to the slice C are stored in the third area df3 in this listed order.

When the third MB line is outputted from the slice data processing unit 134, the aforementioned header insertion counter 133b increments the count value to 1. Since the count value at the end of the third MB line is 1, the header buffer 133d outputs the stored slice header hc as a slice header copy hc', and stores the slice header copy hc' to the fourth area df4 of the segment stream buffer 152. The MB address information of the slice header copy hc' is updated by the header address update unit 133c.

This processing is repeated to sequentially store data into the first area df1 to the fourth area df4 in the segment stream buffer 152. As a result, each of the first segment stream to the fourth segment stream is stored in a corresponding one of the first area df1 to the fourth area df4.

Figure 14A:
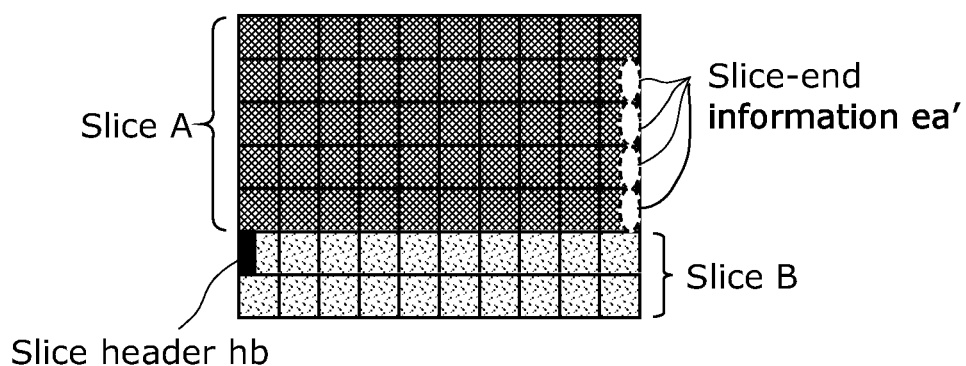
FIG. 14A is a diagram showing positions at which slice-end information is provided according to Embodiment 1 of the present invention.
Figure 14B:
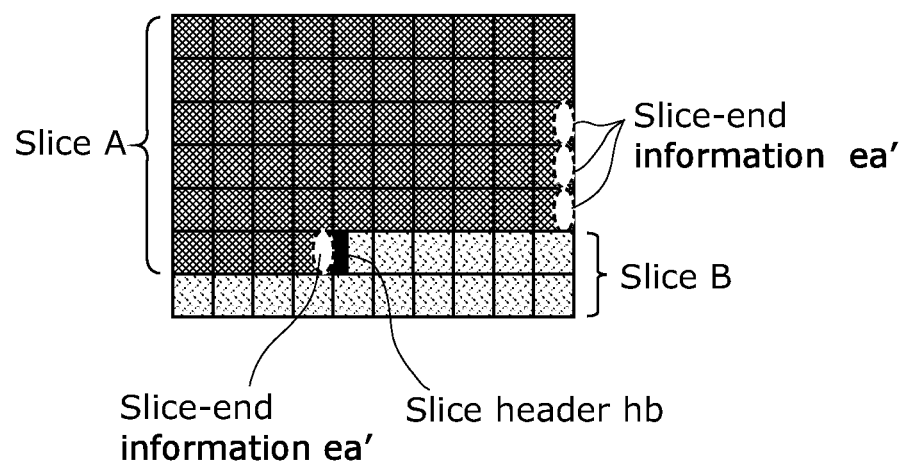
FIG. 14B is a diagram showing positions at which slice-end information is provided according to Embodiment 1 of the present invention.

Each of FIG. 14A and FIG. 14B is a diagram showing positions at which the slice-end information is provided.

For example, as shown in FIG. 14A, the picture includes a slice A and a slice B, and the starting macroblock in the slice B next to the slice A is at the left end of an MB line. In this case, the segment boundary detection unit 139 of the slice data processing unit 134 provides slice-end information ea' of the slice A at the end of the MB line that is in the slice A and located four MB lines before the starting MB line in the slice B, immediately before the slice header hb of the slice B is outputted from the slice header insertion unit 133. Furthermore, the segment boundary detection unit 139 of the slice data processing unit 134 provides slice-end information ea' of the slice A at the end of the MB line that is in the slice A and located three MB lines before the starting MB line in the slice B, immediately before the slice header copy hb' of the slice B is outputted from the slice header insertion unit 133.

In this way, in the case where the starting macroblock in the slice is located at the left end of an MB line, the slice-end information ea' is provided at the end of each of the four MB lines located immediately before the MB line.

For example, as shown in FIG. 14B, the picture includes a slice A and a slice B, and the starting macroblock in the slice B next to the slice A is located at a position other than the left end of an MB line. In this case, the segment boundary detection unit 139 of the slice data processing unit 134 provides slice-end information ea' of the slice A at the end of the MB line that is in the slice A and located three MB lines before the MB line including the slice header hb in the slice B, immediately before the slice header copy hb' of the slice B is outputted from the slice header insertion unit 133.

In this way, when the starting macroblock in a slice is located at a position other than the left end of an MB line, slice-end information ea' is provided at the boundary between the slices in the MB line and the end of each of the three MB lines located immediately before the MB line.

Here, a detailed description is given of operations performed by the segment boundary detection unit 139.

Figure 15:
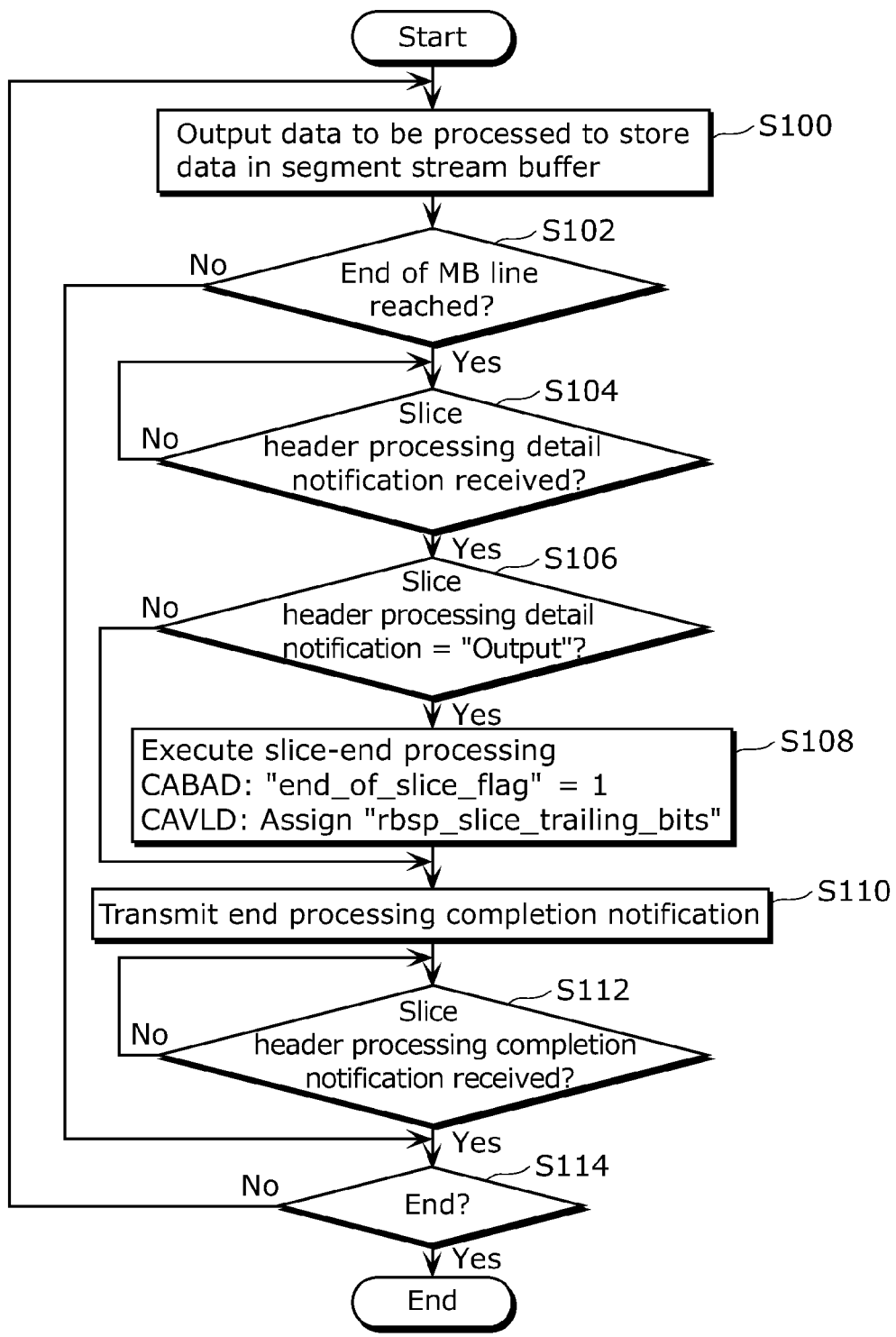
FIG. 15 is a flowchart showing operations performed by a segment boundary detection unit according to Embodiment 1 of the present invention.

FIG. 15 is a flowchart showing operations performed by the segment boundary detection unit 139.

First, the segment boundary detection unit 139 determines data (such as macroblocks) to be processed from the beginning side of the bit stream, and outputs the data to store it into the segment stream buffer 152 (Step S100).

Here, the segment boundary detection unit 139 manages the addresses of macroblocks (MB address values) to be outputted. More specifically, when a current macroblock to be outputted is the starting macroblock in a slice in the bit stream, the segment boundary detection unit 139 updates the MB address value of the macroblock to be outputted to a value indicated by the MB address information included in the slice header of the slice. Subsequently, the segment boundary detection unit 139 increments the MB address value each time a macroblock succeeding the starting macroblock is outputted. Here, MB address values are integers equal to or greater than 0.

Subsequently, when outputting the macroblock in Step S100, the segment boundary detection unit 139 selects a storage-destination area in the segment stream buffer 152 according to the MB address value of the macroblock, and stores the macroblock into the storage-destination area. More specifically, in the case where the numbers 1 to 4 are assigned to the respective four areas included in the segment stream buffer 152, the segment boundary detection unit 139 selects m-th (=(MB address value/W) % N+1) area, and stores the macroblock into the m-th area.

Here, W is shown by, for example, W="pic_width_in_mbs_minus1"+1, and denotes the number of macroblocks in the horizontal direction of the picture. N denotes the total number (N=4) of the decoding engines 120, and % denotes a remainder when (MB address value/W) is divided by N.

Next, the segment boundary detection unit 139 determines whether or not the macroblock outputted in Step S100 is located at the end (boundary) of the MB line, that is, whether or not the last macroblock in the MB line has already been subjected to the macroblock output processing (Step S102). More specifically, the segment boundary detection unit 139 determines whether or not the MB address value of the macroblock outputted in Step S100 is a value obtained by ("a multiple of W"−1). When the MB address value is a value obtained by ("a multiple of W"−1), the last macroblock in the MB line has already been subjected to the macroblock output processing, and when the MB address value is not a value obtained by ("a multiple of W"−1), the last macroblock in the MB line has not yet been subjected to the macroblock output processing.

When the segment boundary detection unit 139 determines that the last macroblock in the MB line has not yet been subjected to the macroblock output processing (No in Step S102), the segment boundary detection unit 139 determines whether or not data to be processed next remains in the bit stream, that is, whether or not to finish the output processing (Step S114). In contrast, when the segment boundary detection unit 139 determines that the last macroblock in the MB line has already been subjected to the macroblock output processing (Yes in Step S102), the segment boundary detection unit 139 notifies the slice header insertion unit 133 of the detection of the MB line boundary and stops the output processing, and then determines whether or not a slice header processing detail notification M1 is received from the slice header insertion unit 133 (Step S104).

When the segment boundary detection unit 139 determines that no slice header processing detail notification M1 has been received (No in Step S104), the segment boundary detection unit 139 waits until a slice header processing detail notification M1 is received. In contrast, when the segment boundary detection unit 139 determines that a slice header processing detail notification M1 has been received (Yes in Step S104), the segment boundary detection unit 139 determines whether or not the slice header processing detail notification M1 shows "Output" (Step S106).

Here, when the segment boundary detection unit 139 determines that the slice header processing detail notification M1 shows "Output" (Yes in Step S106), the segment boundary detection unit 139 executes the slice-end processing (Step S108). In other words, when the bit stream is decoded by CABAD, the segment boundary detection unit 139 sets "1" to "end_of_slice_flag" as the slice-end information. In contrast, when the bit stream is decoded by CAVLD, the segment boundary detection unit 139 assigns "rbsp_slice_trailing_bits" as the slice-end information.

After the segment boundary detection unit 139 determines that the slice header processing detail notification M1 does not show "Output" (No in Step S106) or after the slice-end processing is executed in Step S108, the segment boundary detection unit 139 sends the end processing completion notification M2 to the slice header insertion unit 133 (Step S110). Subsequently, the segment boundary detection unit 139 determines whether or not a slice header processing completion notification M3 has been received from the slice header insertion unit 133 (Step S112). Here, when the segment boundary detection unit 139 determines that no slice header processing completion notification M3 has been received (No in Step S112), the segment boundary detection unit 139 waits until a slice header processing completion notification M3 is received. In contrast, when the segment boundary detection unit 139 determines that a slice header processing completion notification M3 has been received (Yes in Step S112), the segment boundary detection unit 139 determines whether or not data to be processed next remains in the bit stream, that is, whether or not to finish the output processing (Step S114).

Here, the segment boundary detection unit 139 finishes the output processing when it determines to do so (Yes in Step S114). When the segment boundary detection unit 139 determines that the output processing should not be finished (No in Step S114), the segment boundary detection unit 139 outputs data to be processed next to store the data into the segment stream buffer 152 (Step S100).

Next, a description is given of operations performed by the skip run modification unit 137a.

As described earlier, the skip run modification unit 137a modifies "mb_skip_run" that is MB skip run information. Such MB skip run information is a code word included in a bit stream coded according to CAVLC, and indicates the number of consecutive skipped macroblocks (this number is also referred to as "length"). In addition, in the following descriptions, the length of MB skip run information means the number of consecutive skipped macroblocks indicated by the MB skip run information.

Figure 16A:
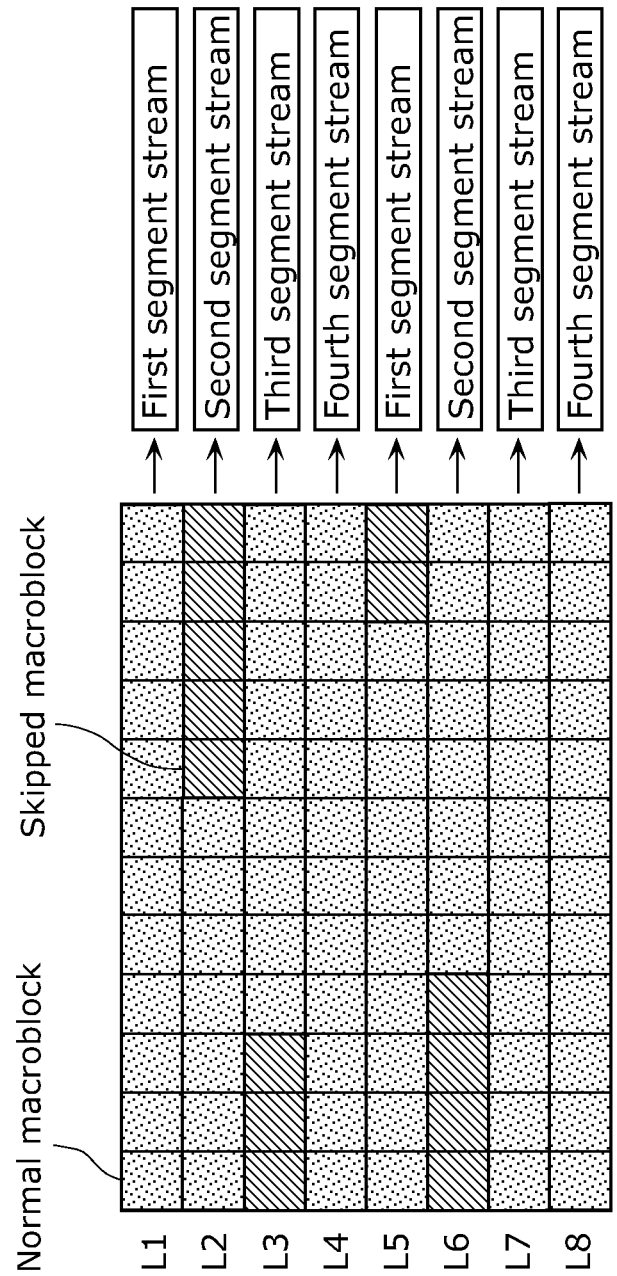
FIG. 16A is an illustration of MB skip run information modification processing according to Embodiment 1 of the present invention.
Figure 16B:
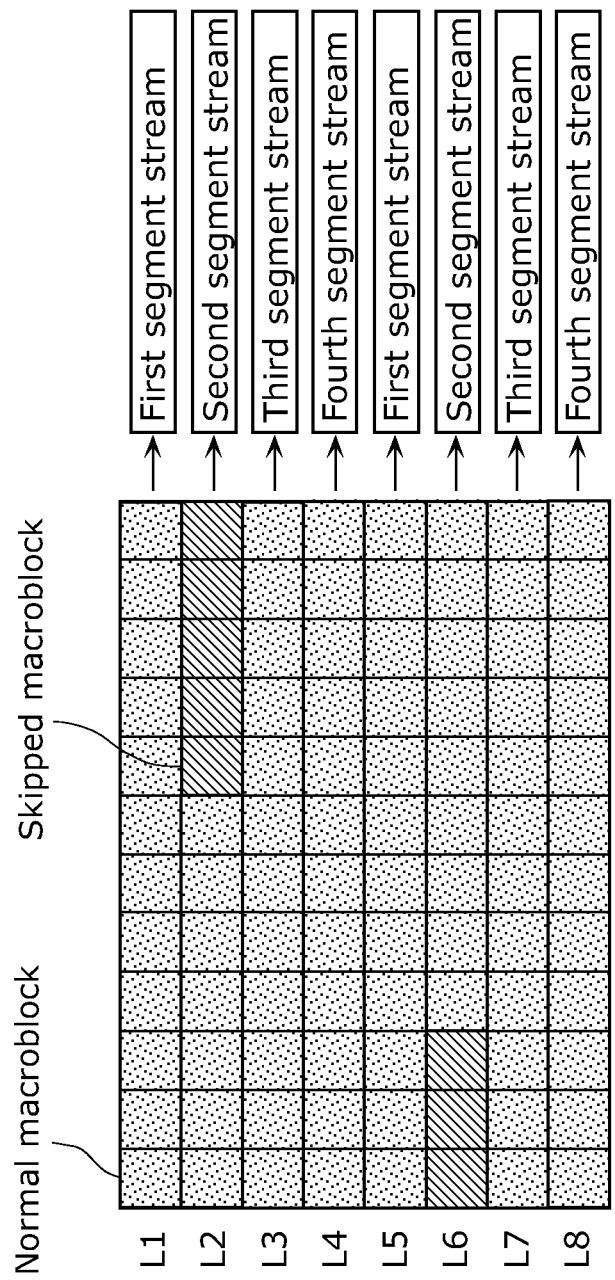
FIG. 16B is an illustration of MB skip run information modification processing according to Embodiment 1 of the present invention.

Each of FIGS. 16A and 16B is an illustration of MB skip run information modification processing.

The picture shown in FIG. 16A includes five consecutive skipped macroblocks at the end of the MB line L2, three consecutive skipped macroblocks at the beginning of the MB line L3, two consecutive skipped macroblocks at the end of the MB line L5, and four consecutive skipped macroblocks at the beginning of the MB line L6. Accordingly, the bit stream including such picture includes coded MB skip run information having a length of 8 (obtained by adding 5 and 3) indicating the number of consecutive skipped macroblocks which cross the boundary between the MB lines L2 and L3, and includes coded MB skip run information having a length of 6 (obtained by adding 2 and 4) indicating the number of consecutive skipped macroblocks which cross the boundary between the MB lines L5 and L6.

In such case, segmenting a picture into MB lines and assigning the MB lines to separate segment streams changes the number of macroblocks to be skipped in sequence in each segment stream. In short, the dependency between the plurality of MB lines based on the MB skip run information indicating the number of consecutive skipped macroblocks which cross the boundary between the plurality of MB lines is broken.

The MB lines included in the first segment stream are L1 and L5, and two consecutive skipped macroblocks are at the end of the MB line L5. The MB lines included in the second segment stream are L2 and L6, and nine consecutive skipped macroblocks cross the boundary between L2 to L6. The MB lines included in the third segment stream are L3 and L7, and three consecutive skipped macroblocks are at the beginning of the MB line L3. The MB lines included in the fourth segment stream are L4 and L8, and no skipped macroblocks exist.

As described above, although the two pieces of MB skip run information originally included in the bit stream have lengths of 8 and 6, respectively, there is a need to output MB skip run information having a length of 2 for the first segment stream, MB skip run information having a length of 9 for the second segment stream, and MB skip run information having a length of 3 for the third segment stream. Stated differently, in the case where a plurality of MB lines have dependencies mutually, there is a need to modify the MB skip run information such that MB skip run information indicating the number of consecutive skipped macroblocks which cross the boundary between new plural MB lines create a new dependency according to the context of the MB lines in each segment stream.

For this, in the case where a set of skipped macroblocks corresponding to the MB skip run information decoded by the slice data layer decoding unit 135a crosses the boundary between the plurality of MB lines, the skip run modification unit 137a first segments the MB skip run information at the boundary of the MB lines. Here, segmenting the MB skip run information at the boundary of the MB lines means segmenting the number of the plurality of consecutive skipped macroblocks which cross the boundary between the plurality of MB lines, and generating a plurality of pieces of MB skip run information indicating the numbers of skipped macroblocks for the respective MB lines.

In the case of the picture shown in FIG. 16A, the skip run modification unit 137a segments the MB skip run information corresponding to a set of eight skipped macroblocks which cross the boundary between the MB lines L2 and L3 into MB skip run information corresponding to a set of five skipped macroblocks in the MB line L2 and MB skip run information corresponding to a set of three skipped macroblocks in the MB line L3. Likewise, the skip run modification unit 137a segments the MB skip run information corresponding to a set of six skipped macroblocks which cross the boundary between the MB lines L5 and L6 into MB skip run information corresponding to a set of two skipped macroblocks in the MB line L5 and MB skip run information corresponding to a set of four skipped macroblocks in the MB line L6.

Next, the skip run modification unit 137a re-combines the plurality of pieces of MB skip run information corresponding to the sets of consecutive skipped macroblocks in the respective segment streams among the MB skip run information segments. Here, re-combining the plurality of pieces of MB skip run information means converting the plurality of pieces of MB skip run information into a single piece of MB skip run information indicating the total sum of the numbers indicated by the plurality of pieces of MB skip run information.

In the case of the picture shown in FIG. 16A, from among the sets of skipped macroblocks corresponding to the segments of MB skip run information, the set of skipped macroblocks having a length of 5 and in the MB line L2 and the set of skipped macroblocks having a length of 4 and in the MB line L6 are consecutive in the second segment stream. For this, the skip run modification unit 137a combines the two pieces of MB skip run information corresponding to the two respective sets of skipped macroblocks, and converts the combined one into MB skip run information having a length of 9.

Lastly, the skip run modification unit 137a re-codes the thus obtained MB skip run information, and outputs the re-coded MB skip run information.

As described above, the skip run modification unit 137a can output the MB skip run information having an appropriate length for each segment stream by segmenting input MB skip run information at an MB line boundary, and re-combining it as necessary.

Here, the skip run modification unit 137a re-combines the consecutive pieces of MB skip run information in each segment stream as necessary without leaving them as segments. This is because the H.264/AVC standard does not allow presence of consecutive pieces of MB skip run information. Stated differently, the H.264/AVC standard does not allow representing the number of consecutive skipped macroblocks using a plurality of pieces of MB skip run information, and thus the skip run modification information 137a combines the plurality of pieces of MB skip run information. In this way, MB skip run information is modified by the skip run modification unit 137a in conformance with the H.264/AVC standard so that each segment stream is generated in conformance with the H.264/AVC standard. As a result, the decoding engine 120 at a later-stage can decode the segment stream without performing any special processing.

In addition, the picture shown in FIG. 16B includes five consecutive skipped macroblocks at the end of the MB line L2, and three consecutive skipped macroblocks at the beginning of the MB line L6. Accordingly, the bit stream including such picture includes MB skip run information having a length of 5 coded for the MB line L2, and includes MB skip run information having a length of 3 coded for the MB line L6.

This picture does not include any MB skip run information indicating the number of consecutive skipped macroblocks which cross the boundary between a plurality of MB lines. Therefore, the skip run modification unit 137a does not need to segment the MB skip run information at an MB line boundary. However, in the case where this picture is segmented into MB lines and the respective MB lines are assigned to separate segment streams, the MB skip run information having a length of 5 and the MB skip run information having a length of 3 are consecutively generated in the second segment stream.

Accordingly, as in this example, even when there is no MB skip run information indicating the number of consecutive skipped macroblocks which cross the boundary between a plurality of MB lines, the skip run modification unit 137a re-combines a plurality of pieces of MB skip run information indicating the number of consecutive skipped macroblocks of one set in each segment stream. Stated differently, the skip run modification unit 137a combines the MB skip run information having a length of 5 and the MB skip run information having a length of 3 in the second segment stream to convert them into a single piece of MB skip run information having a length of 8.

The skip run modification unit 137a re-codes the thus obtained MB skip run information, and outputs the re-coded MB skip run information.

Figure 17:
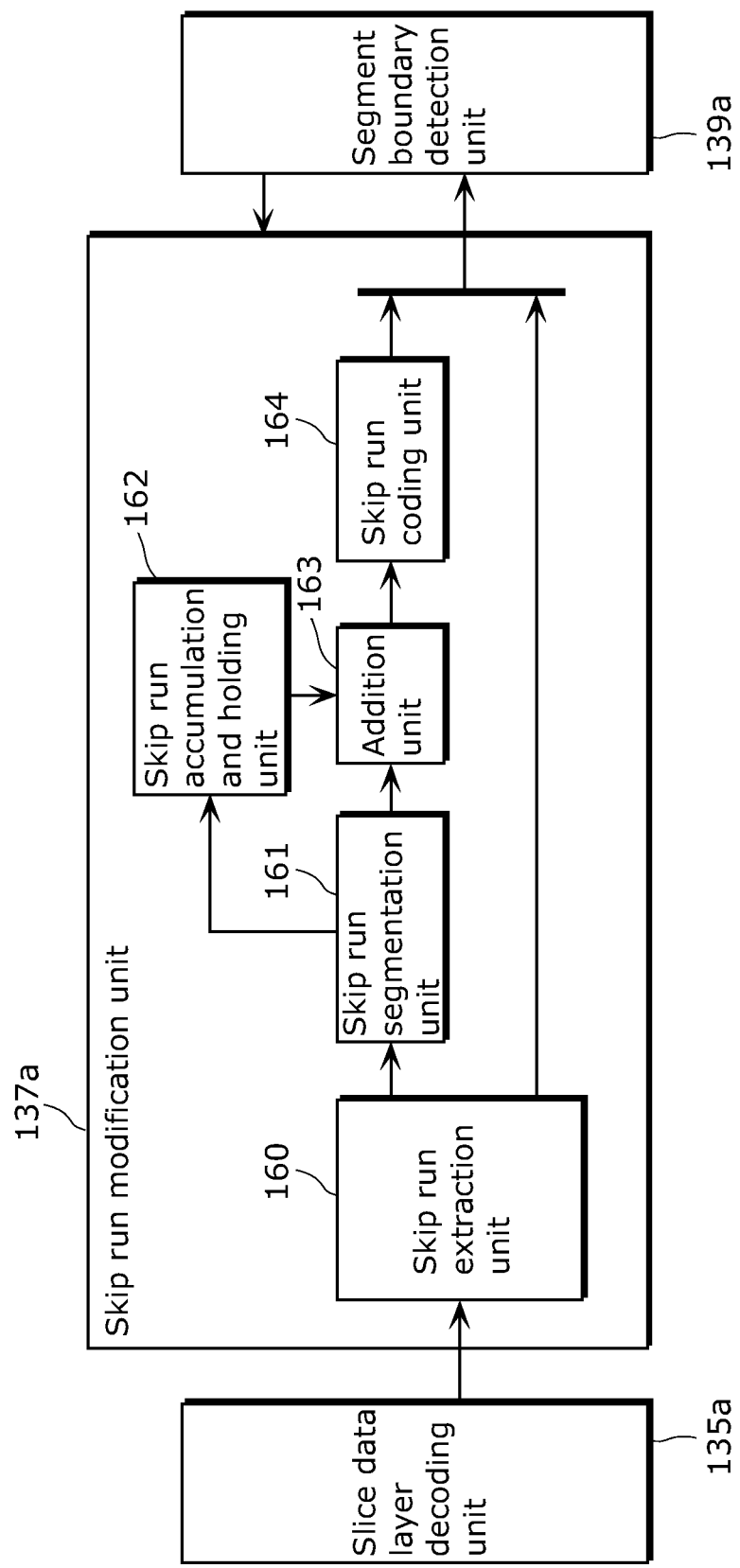
FIG. 17 is a block diagram showing a structure of a skip run modification unit according to Embodiment 1 of the present invention.

FIG. 17 is a block diagram showing a structure of the skip run modification unit 137a.

The skip run modification unit 137a includes a skip run extraction unit 160, a skip run segmentation unit 161, a skip run accumulation and holing unit 162, an addition unit 163, and a skip run coding unit 164.

The skip run extraction unit 160 detects and extracts MB skip run information from a stream to be outputted by the slice data layer decoding unit. The extracted MB skip run information is outputted to the skip run segmentation unit 161, and the other information is outputted directly to the segment boundary detection unit 139a.

The skip run segmentation unit 161 determines whether or not the input MB skip run information indicates the number of consecutive skipped macroblocks which cross the boundary between a plurality of MB lines, based on the length of the MB skip run information and position information of macroblocks having the MB skip run information. Here, in the case where the input MB skip run information indicates the number of consecutive skipped macroblocks which cross the boundary between a plurality of MB lines, the skip run segmentation unit 161 segments the MB skip run information at the boundary of the MB lines regarding it as a segment boundary. Among the MB skip run information segments, the MB skip run information indicating the number of skipped macroblocks that exceed an MB line boundary is outputted to the addition unit 163, and the MB skip run information indicating the number of skipped macroblocks that do not exceed an MB line boundary is outputted to the skip run accumulation and holding unit 162.

It is to be noted that, MB skip run information may indicate the number of consecutive skipped macroblocks which cross the boundary between three or more MB lines. In this case, two or more MB line boundaries are present in the consecutive skipped macroblocks. Thus, the skip run segmentation unit 161 repeatedly performs such segmentation regarding the MB line boundaries as segment boundaries. At this time, among the MB skip run information segments, the MB skip run information indicating the number of skipped macroblocks that exceed the last MB line boundary is outputted to the addition unit 163, and the other MB skip run information is outputted to the skip run accumulation and holding unit 162.

The skip run accumulation and holding unit 162 receives the MB skip run information segment outputted by the skip run segmentation unit 161, and holds the value for each segment stream as preceding MB skip run information. In other words, in the case where the skip run accumulation and holding unit 162 receives the MB skip run information in the first segment stream, it holds the MB skip run information as the preceding MB skip run information of the first segment stream. In the case where the skip run accumulation and holding unit 162 receives the MB skip run information in the second segment stream, it holds the MB skip run information as the preceding MB skip run information of the second segment stream. In the case where the skip run accumulation and holding unit 162 receives the MB skip run information in the third segment stream, it holds the MB skip run information as the preceding MB skip run information of the third segment stream. In the case where the skip run accumulation and holding unit 162 receives the MB skip run information in the fourth segment stream, it holds the MB skip run information as the preceding MB skip run information of the fourth segment stream.

At this time, in the case where the skip run accumulation and holding unit 162 already holds the preceding MB skip run information, the skip run accumulation and holding unit 162 receives the MB skip run information from the skip run segmentation unit 161, accumulates the received MB skip run information, and holds, as per segment stream, the value of the accumulated MB skip run information as new MB skip run information. Stated differently, the skip run accumulation and holding unit 162 adds, to the held preceding MB skip run information, the MB skip run information received from the skip run segmentation unit 161 for each segment stream.

The addition unit 163 receives MB skip run information from the skip run segmentation unit 161, and reads the preceding MB skip run information that corresponds to the segment stream including the MB skip run information and that is held in the skip run accumulation and holding unit 162. Next, the addition unit 163 adds the value of the MB skip run information received from the skip run segmentation unit 161 and the value of the preceding MB skip run information read from the skip run accumulation and holding unit 162. The addition unit 163 then outputs the result as the modified MB skip run information to the skip run coding unit 164. This processing re-combines the pieces of MB skip run information.

The skip run coding unit 164 re-codes the modified MB skip run information that is outputted by the addition unit 163 and outputs the re-coded MB skip run information to the segment boundary detection unit 139*a* to re-embed the modified MB skip run information into the stream.

FIG. 18 is a flowchart showing how the skip run modification unit 137*a* performs a modification operation on the MB skip run information.

First, the skip run modification unit 137*a* determines whether or not a current stream reaches the end of a slice (Step S200). MB skip run information does not indicate the number of consecutive skipped macroblocks which cross the boundary between slices. Thus, when the stream reaches the end of the slice, there is a need to output all the preceding pieces of MB skip run information held in the skip run modification unit 137*a*. When it is determined that the stream reaches the end of the slice (Yes in Step S200), a transition to Step S224 is made. This processing will be described in detail later.

On the other hand, when it is determined that the stream does not reach the end of the slice (No in Step S200), the skip run modification unit 137*a* checks whether or not MB skip run information "mb_skip_run" has been obtained (Step S202). Here, in the case where MB skip run information "mb_skip_run" has not yet been obtained (No in Step S202), the skip run modification unit 137*a* returns to the beginning of this processing and reads the stream again.

On the other hand, in the case where MB skip run information "mb_skip_run" has already been obtained (Yes in Step S202), the skip run modification unit 137*a* calculates the position of the macroblock including the MB skip run information in the picture, based on the address information of the macroblock (Step S204). Here, the skip run modification unit 137*a* identifies the position of the starting skipped macroblock from among the consecutive skipped macroblocks indicated by the obtained MB skip run information.

After the calculation of the position of the macroblock in Step S204, the skip run modification unit 137*a* checks whether or not the consecutive skipped macroblocks reach an MB line boundary, based on the position information of the macroblock and the length of the MB skip run information, and determines whether or not there is a need to segment the obtained MB skip run information (Step S206).

More specifically, in the case where "mb_skip_run≥"PicWidthInMbs−mbposh" is satisfied when the horizontal position and vertical position of the starting skipped macroblock are represented as "mbposh" and mbposv", respectively and the total number of macroblocks in the horizontal direction of the picture is represented as "PicWidthInMbs", the skip run modification unit 137*a* determines that the consecutive skipped macroblocks reach an MB line boundary.

Here is given a description of the configuration according to which a stream is segmented in units of an MB line. Even in the case of segmenting a stream in units of another segment, the skip run modification unit 137*a* may determine whether or not the consecutive skipped macroblocks reach a segment boundary, based on the position information of the macroblock and the length of the MB skip run information.

When it is determined that the consecutive skipped macroblocks reach an MB line boundary (Yes in Step S206), the skip run modification unit 137*a* advances to Step S216 for segmenting the MB skip run information. This processing will be described in detail later.

When it is determined that the consecutive skipped macroblocks do not reach an MB line boundary (No in Step S206), the skip run modification unit 137*a* determines whether or not the MB skip run information is positioned at the beginning of the MB line (Step S208). Stated differently, the skip run modification unit 137*a* determines whether or not there is a need to combine the MB skip run information with the preceding MB skip run information.

When it is determined that the MB skip run information is positioned at the beginning of the MB line (Yes in Step S208), the skip run modification unit 137*a* adds the MB skip run information "mb_skip_run" and the preceding MB skip run information "prev_mb_skip_run" to re-combine these pieces of MB skip run information (Step S210). It is to be noted that this re-combination of pieces of MB skip run information must be performed independently on a per-segment stream basis. More specifically, the preceding MB skip run information is held, for each segment stream, in the skip run modification unit 137*a*, and the preceding MB skip run information added here corresponds to the MB line including the MB skip run information.

Either when it is determined in Step S208 that MB skip run information is not located at the beginning of the MB line (No in Step S208) or after pieces of MB skip run information are re-combined in Step S210, the skip run modification unit 137a re-codes the MB skip run information (Step S212). This is performed to convert the segment streams into segment streams having a format conforming to the H.264/AVC standard.

Next, the skip run modification unit 137a outputs the re-coded MB skip run information to the segment boundary detection unit 139a to complete this processing (Step S214).

In addition, when it is determined that consecutive skipped macroblocks reach the MB line boundary (Yes in Step S206), the skip run modification unit 137a segments the MB skip run information into a first half portion and a second half portion at the MB line boundary as a segment boundary (Step S216). It is to be noted that a second half portion may be 0 when consecutive skipped macroblocks reach the MB line boundary without exceeding the MB line boundary.

Furthermore, the skip run modification unit 137a internally holds the first half portion as preceding MB skip run information "prev_mb_skip_run", from among the MB skip run information segments. At this time, when there is preceding MB skip run information held by the skip run modification unit 137a, the skip run modification unit 137a adds the length of the held preceding MB skip run information and the length of the first half portion of the newly generated MB skip run information, and holds the addition result (Step S218). As described earlier, the preceding MB skip run information is held independently for each segment stream, as preceding MB skip run information of the segment stream corresponding to the MB line including the preceding MB skip run information.

After the skip run modification unit 137a sets the second half portion as new MB skip run information from among the MB skip run information segments (Step S220), the skip run modification unit 137a determines whether or not the length is 0 (Step S222).

When it is determined that the length of the new MB skip run information is 0 (Yes in Step S222), the skip run modification unit 137a completes the processing determining that there remains no MB skip run information to be processed.

When it is determined that the length of the new MB skip run information is not 0 (No in Step S222), the skip run modification unit 137a returns to Step S204 determining that there remains MB skip run information to be processed, and repeats segmentation and re-combination processing and output processing on MB skip run information. In the case of MB skip run information of MBs which cross the boundaries of three or more MB lines, the skip run modification unit 137a repeats segmentation and re-combination processing on the MB skip run information so as to accurately perform the segmentation and re-combination processing.

On the other hand, when it is determined that a slice end is reached (Yes in Step S200), the preceding MB skip run information "prev_mb_skip_run" is replaced by MB skip run information "mb_skip_run" (Step S224) so as to output the preceding MB skip run information held by the skip run modification unit 137a. Next, a transition to Step S212 is made. The skip run modification unit 137a re-codes the replacement MB skip run information, and outputs the re-coded MB skip run information to the segment boundary detection unit 139a to complete the processing (Steps S212 to S214). It is to be noted that such output of preceding MB skip run information is performed for all segment streams.

The skip run modification unit 137a repeats this processing described above until a stream end is reached. In this way, the skip run modification unit 137a appropriately performs segmentation and re-combination of MB skip run information.

Next, a detailed description is given of operations performed by the QP delta modification units 138a and 138b. It is to be noted that, in the descriptions given of the functions and processing operations that are performed by both the QP delta modification units 138a and 138b, the QP delta modification units 138a and 138b are not differentiated from each other and referred to as QP delta modification units 138.

The QP delta modification unit 138 modifies QP variation "mb_qp_delta" that is present basically on a per-macroblock basis. QP variation is a code word included in a bit stream in order to decode the QP values that are quantization parameters for macroblocks, and indicates the difference in the QP values of a current macroblock and the macroblock immediately before the current macroblock.

The QP values are decoded according to the following Expression (1).

$$QP_Y = ((QP_{Y,PREV} + mb\_qp\_delta + 52 + 2*QpBdOffset_Y) \% (52 + QpBdOffset_Y)) - QpBdOffset_Y \quad (1)$$

Here, $QP_Y$ denotes a QP value of luminance of a current macroblock, and $QP_{Y,PREV}$ denotes a QP value of luminance of a macroblock immediately before the current macroblock. $QpBdOffset_Y$ denotes a value determined depending on a bit depth of a pixel that constitutes a picture. In the case of a pixel having an 8-bit depth that is used generally, $QpBdOffset_Y = 0$ is satisfied. In this case, the above Expression (1) is rewritten into the following Expression (2).

$$QP_Y = ((QP_{Y,PREV} + mb\_qp\_delta + 52) \% 52 \quad (2)$$

As shown from the Expression (2), in the case of a pixel having an 8-bit depth, the QP value is decoded using the QP variation "mb_qp_delta" such that the QP value falls within the range of 0 to 51. Here, "mb_qp_delta" is a value within a range from −26 to +25.

The QP values that are quantization parameters have a dependency between macroblocks consecutive in processing order. However, when there is a slice boundary in the middle of the consecutive macroblocks, the dependency is broken when the QP values are decoded. Stated differently, the QP values that are quantization parameters are initialized by the QP values of slices at the beginning of the slices. The starting macroblock in a slice includes, as a QP variation, a coded difference value between a QP value of the macroblock and the QP value of the slice.

Figure 19A:
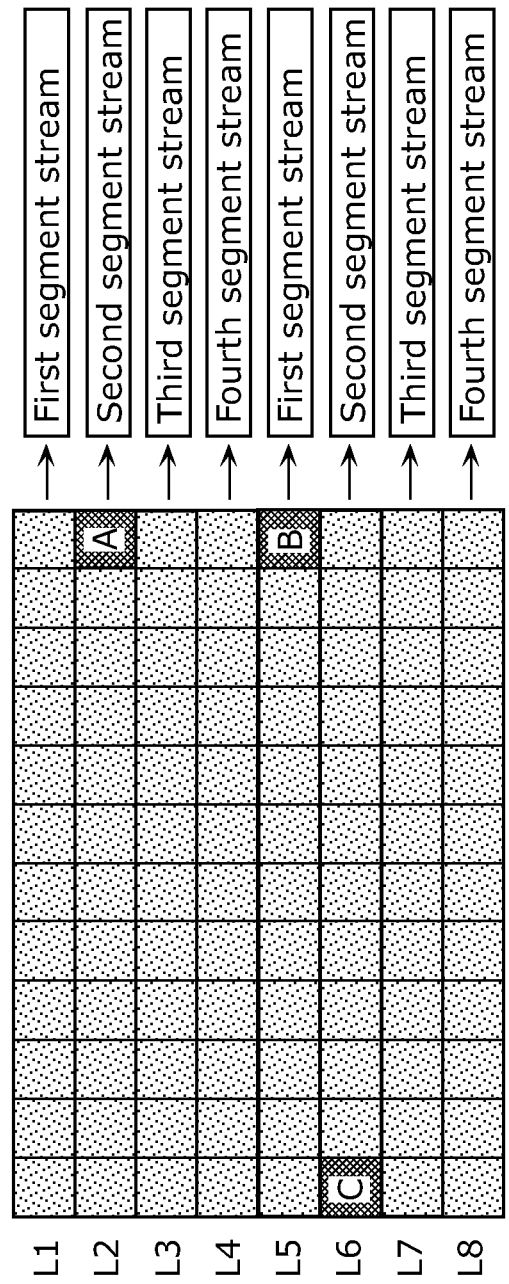
FIG. 19A is an illustration of QP variation modification processing according to Embodiment 1 of the present invention.
Figure 19B:
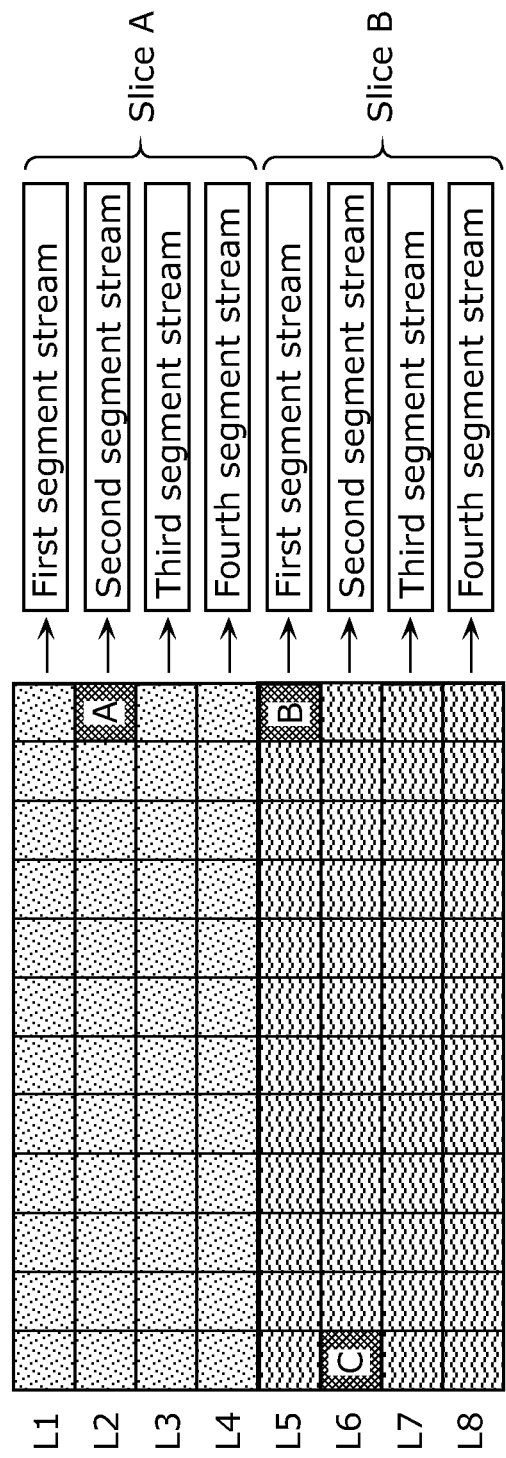
FIG. 19B is an illustration of QP variation modification processing according to Embodiment 1 of the present invention.

Each of FIGS. 19A and 19B is an illustration of QP variation modification processing.

Focusing on a macroblock C in the picture shown in FIG. 19A, a macroblock B is the macroblock that is naturally processed immediately before the macroblock C. Accordingly, the macroblock C includes, as a QP variation, a difference value between the QP value of the macroblock B and the QP value of the macroblock C.

However, segmenting such picture into MB lines and assigning the respective MB lines to separate segment streams changes the contexts of the macroblocks at the MB line boundaries in each segment stream.

In this case, after the stream segmentation, the macroblock located immediately before the macroblock C in the second segment stream is changed to a macroblock A. Accordingly, in the case where the decoding engine 120 decodes the second segment stream without modification, it is impossible to accurately decode the QP value of the macroblock C. This is because the QP value of the macroblock C is decoded as the value that is obtained by reflecting the QP variation that is the difference value between the QP value of the macroblock B and the QP value of the macroblock C on the QP value of the macroblock A. In short, the dependency between the two MB lines based on the QP variation indicating the variation between macroblocks which cross the boundary between the two MB lines is broken.

For this, the QP delta modification unit 138 modifies the QP variation by correcting the change in the contexts of the macroblocks made in the stream segmentation. More specifically, in the case where the QP variation that is the variation between macroblocks which cross the boundary between two MB lines indicates that the two MB lines have dependencies mutually, the QP delta modification unit 138 modifies the QP variation such that the dependencies are changed to new dependencies according to the new contexts of MB lines in each segment stream.

A conceivable method of modifying a QP variation includes a method of decoding (reconstructing) QP values of all macroblocks first, and then re-calculating the QP variations, based on the new contexts of the macroblocks after the stream segmentation. However, this method requires two processes of QP value decoding and QP variation calculation, increasing the amount of processing by the QP delta modification unit 138.

For this, in this embodiment, the QP delta modification unit 138 accumulates, for each of segment streams, the QP variations of macroblocks that are not assigned to a current one of the segment streams, thereby directly deriving the modified QP variation without decoding the QP variation.

Here, how to derive the modified QP variation by QP variation accumulation is described with reference to a diagram.

Figure 20:
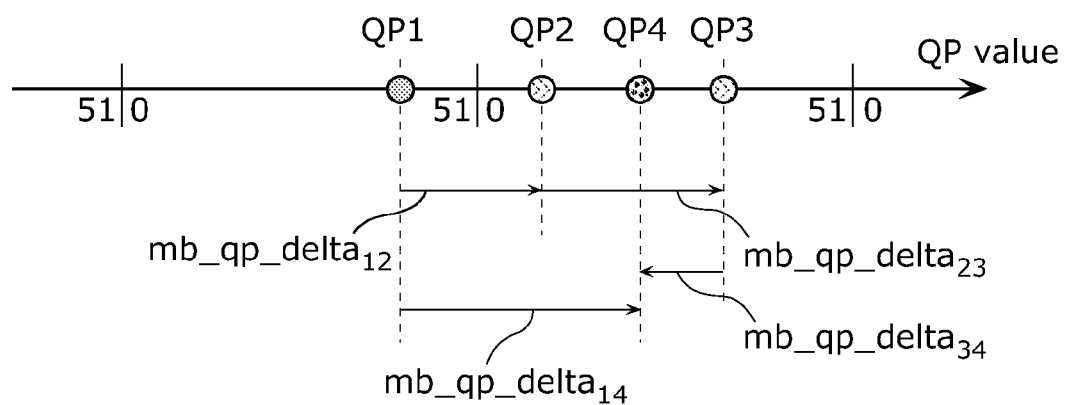
FIG. 20 is an illustration of accumulation of QP variations according to Embodiment 1 of the present invention.

FIG. 20 is an illustration of accumulation of QP variations.

In the diagram, the horizontal axis represents QP values, and QP1 to QP4 indicate the QP values of consecutive macroblocks. The diagram also shows "mb_qp_delta" indicating the difference value of each QP value. The most significant digit in two-digit numerals that are subscripts added to the "mb_qp_delta" represents the QP value number corresponding to a preceding macroblock, and the least significant digit in the two-digit numerals represents the QP value corresponding to the subsequent macroblock. For example, "mb_qp_delta$_{12}$" represents the difference value of QP1 and QP2. As shown in the diagram, "mb_qp_delta" represents the difference value in QP values on an axis on which the minimum QP value 0 and the maximum QP value 51 are connected in sequence.

In the normal QP value decoding processing, QP2 is calculated based on QP1 and "mb_qp_delta$_{12}$" according to Expression (2). Likewise, QP3 is calculated based on QP2 and "mb_qp_delta$_{23}$". Likewise, QP4 is calculated based on QP3 and "mb_qp_delta$_{34}$".

Here, as shown in the diagram, the total QP variation indicated by the "mb_qp_delta$_{12}$", "mb_qp_delta$_{23}$", and "mb_qp_delta$_{34}$" is equal to the "mb_qp_delta$_{14}$" indicating the difference value between QP1 and QP4. As clear from this, accumulating all QP variations "mb_qp_delta" between the macroblocks makes it possible to calculate the QP variation between non-adjacent macroblocks.

The accumulation is performed according to the following Expression (3).

$$\text{acc\_mb\_qp\_delta} = (\text{acc\_mb\_qp\_delta} + \text{mb\_qp\_delta} + 52)\%52 \quad (3)$$

Here, "acc_mb_qp_delta" indicates accumulated "mb_qp_delta". In this way, accumulating "mb_qp_delta" in a format according to Expression (2) makes it possible to calculate the total of QP variations in the axis on which the minimum QP value 0 and the maximum QP value 51 are connected in sequence as shown in FIG. 20.

As a specific example, a description is given of modification processing of QP variations of macroblocks in a picture shown in FIG. 19A. As described earlier, in the second segment stream after the stream segmentation, the macroblock A is the macroblock located immediately before the macroblock C. Thus, the macroblock C must include, as the QP variation, the difference value between the QP value of the macroblock A and the QP value of the macroblock C.

For this, the QP delta modification unit 138 accumulates the QP variations of all the macroblocks in the MB lines L3 to L5 and the QP variation of the macroblock C. Accumulating the QP variation of all the macroblocks from the macroblock A to macroblock C in this way makes it possible to calculate the modified QP variation that is the difference value between the QP value of the macroblock A and the QP value of the macroblock C.

The QP variation calculated here is derived according to Expression (3), and thus is a value indicating a range from 0 to 51 inclusive. The original QP variation "mb_qp_delta" is a value ranging from −26 to +25 inclusive. Thus, the QP delta modification unit 138 modifies the QP variation "mb_qp_delta" according to the following Expression (4) such that the range covers −26 to +25.

When acc_mb_qp_delta>25:
  mb_qp_delta=acc_mb_$qp$_delta−52

When acc_mb_qp_delta≤25:
  mb_qp_delta=acc_mb_qp_delta  (4)

As indicated above, the processing shown in Expression (4) may be performed only once after the accumulation of the QP variations "mb_qp_delta" of all the target macroblocks. Otherwise, the processing may be performed one by one on all the target macroblocks.

The description here is given focusing on the macroblock C. The same processing is performed on all the starting macroblocks in MB lines. For example, as for a macroblock downwardly adjacent to the macroblock C, a modified QP variation is derived by accumulating the QP variations of all the macroblocks in MB lines L4 to L6, and reflecting the accumulation result on the QP variation of the downwardly adjacent macroblock. This processing is performed independently of the processing of other segment streams.

Lastly, the QP delta modification unit 138 re-codes the modified QP variation obtained in this way, and outputs the re-coded modified QP variation to the segment boundary detection unit 139. It is to be noted that the QP delta modification unit 138a performs coding according to CAVLC method, and the QP delta modification unit 138b performs coding according to CABAC method.

As described above, the QP delta modification unit 138 is capable of setting an appropriate QP variation for each segment stream by modifying an input QP variation to match the context of macroblocks in the segment stream. As a result, the decoding engine 120 at a later-stage can decode the segment stream without performing any special processing.

FIG. 19B shows an exemplary case where a slice is segmented at the boundary between an MB line L4 and an MB line L5. In this case, MB lines L1 to L4 are included in the slice A, and MB lines L5 to L8 are included in the slice B.

At this time, in the second segment stream, the macroblock A and the macroblock C are consecutive as in FIG. 19A. However, these macroblocks are included in different slices, and thus there is no dependency between the macroblock A and macroblock C. In the second segment stream, the macroblock C is the starting macroblock of the slice B. Thus, the QP variation of the macroblock C must indicate the difference value between the QP value of the macroblock C and the slice QP value of the slice B.

More specifically, the QP delta modification unit 138 is capable of calculating the difference value based on the slice QP value of the slice B by accumulating the QP variations of the macroblocks included in the slice B from among the macroblocks between the macroblock A and the macroblock C. However, it is impossible to determine whether or not a slice is actually segmented until the beginning of the slice B is reached.

For this, the QP delta modification unit 138 accumulates the QP variations of all the macroblocks between the macroblock A and the macroblock C, and resets the accumulated QP variation "acc_mb_qp_delta" to 0 at the time of starting processing of the starting macroblock of the slice B. In this way, the QP delta modification unit 138 can accumulate the QP variations of only the macroblocks in the slice B, and accurately calculate the modified QP variation of the macroblock C.

Lastly, the QP delta modification unit 138 re-codes the modified QP variation obtained in this way, and outputs the re-coded modified QP variation to the segment boundary detection unit 139.

Figure 21:
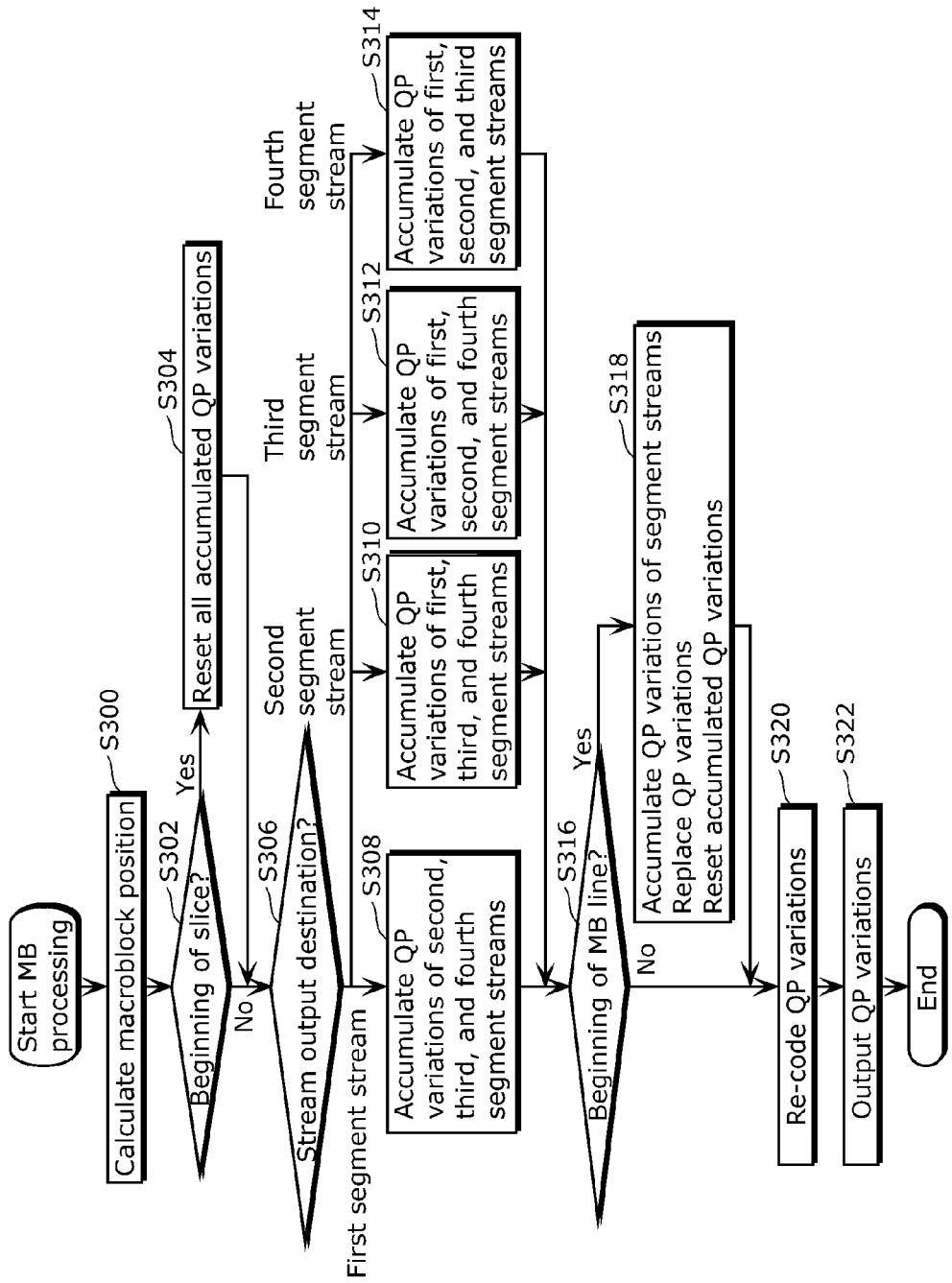
FIG. 21 is a flowchart showing how a QP delta modification unit performs QP variation modification processing according to Embodiment 1 of the present invention.

FIG. 21 is a flowchart showing QP variation modification processing by the QP delta modification unit 138.

When macroblock processing is started, the QP delta modification unit 138 firstly calculates the position of a current macroblock in the picture, based on the address information of the current macroblock (Step S300).

Next, the QP delta modification unit 138 determines whether or not the current macroblock is the starting macroblock of a slice (Step S302).

When it is determined that the current macroblock is the starting macroblock of the slice (Yes in Step S302), the QP delta modification unit 138 resets, to 0, the accumulated QP variation "acc_mb_qp_delta" corresponding to all the segment streams (Step S304). In the case where a slice is segmented in the middle, this processing makes it possible to accurately derive the QP variation, based on the slice QP value. Here, whether to reset an accumulated QP variation is determined depending on whether a current macroblock is the starting macroblock of a slice. However, it is only necessary to reset an accumulated QP variation at the beginning of a slice, and thus it is also possible to reset an accumulated QP variation when a slice header appears.

When it is determined that a current macroblock is not the starting macroblock of a slice in Step S302 (No in Step S302) or after reset of an accumulated QP variation in Step S304, the QP delta modification unit 138 determines a segment stream output destination of the current macroblock, based on the position information of the current macroblock calculated in Step S300 (Step S306).

When it is determined that the output destination of the current macroblock is the first segment stream in Step S306, the QP delta modification unit 138 accumulates the QP variation of the current macroblock on the accumulated QP variations of the second, third, and fourth segment streams, according to Expression (3) (Step S308).

When it is determined that the output destination of the current macroblock is the second segment stream in Step S306, the QP delta modification unit 138 accumulates the QP variation of the current macroblock on the accumulated QP variations of the first, third, and fourth segment streams, according to Expression (3) (Step S310).

When it is determined that the output destination of the current macroblock is the third segment stream in Step S306, the QP delta modification unit 138 accumulates the QP variation of the current macroblock on the accumulated QP variations of the first, second, and fourth segment streams, according to Expression (3) (Step S312).

When it is determined that the output destination of the current macroblock is the fourth segment stream in Step S306, the QP delta modification unit 138 accumulates the QP variation of the current macroblock on the accumulated QP variations of the first, second, and third segment streams, according to Expression (3) (Step S314).

In this way, the QP variations of the segment streams other than the segment stream that is the output destination of the current macroblock are accumulated in Steps S308 to S314. This means that the QP variations of the macroblocks included in the three MB lines that are not assigned to the current segment stream are accumulated. With this processing, the QP delta modification unit 138 can accurately correct the difference value between the QP values of the macroblocks located before and after the three MB lines that are not assigned to the current segment stream.

After the QP variation accumulation in Steps S308, S310, S312, and S314, the QP delta modification unit 138 determines whether or not a current macroblock is positioned at the beginning of an MB line, based on the position information of the macroblock calculated in Step S300 (Step S316). Here, a stream is segmented in units of an MB line. Likewise, even in the case of segmenting a stream in units of another segment, the QP delta modification unit 138 may determine whether or not a current macroblock is the starting macroblock in the segmentation unit, based on the position information of the macroblock.

When it is determined that a current macroblock is positioned at the beginning of an MB line (Yes in Step S316), the QP delta modification unit 138 accumulates the QP variation of the current macroblock on the accumulated QP variations corresponding to the segment stream including the current macroblock, according to Expression (3). Next, the QP delta modification unit 138 modifies the obtained accumulated QP variation into a range between −26 and +25 inclusive according to Expression (4), and replaces the obtained accumulated QP variation as the modified accumulated QP variation of the current macroblock. Furthermore, the QP delta modification unit 138 resets, to 0, the accumulated QP variation in relation to the segment stream including the current macroblock (Step S318). In this way, in Step S318, the QP variation is modified by reflecting the accumulated QP variation on the QP variation of the starting macroblock in the MB line.

When it is determined that a current macroblock is not positioned at the beginning of an MB line (No in Step S316) or after modification of the QP variation of the current macroblock in Step S318, the QP delta modification unit 138 re-codes the QP variation of the current macroblock (Step S320). This is performed to convert the segment streams into segment streams having a format conforming to the H.264/AVC standard.

Next, the QP delta modification unit 138 outputs the re-coded QP variation to the segment boundary detection unit 139 to complete the processing (Step S322).

As described above, the QP delta modification unit 138 re-codes and outputs QP variations of macroblocks other than the starting macroblock in each MB line without modifying the QP variations, and re-codes and outputs a QP variation of the starting macroblock in each MB line after modifying the QP variation of the starting macroblock.

In this way, in the image decoding apparatus 100 in this embodiment, each of the coded pictures is segmented into a plurality of MB lines (structural units), and each of the plurality of MB lines is assigned as a portion of a segment stream to a corresponding one of the N decoding engines 120 and decoded. This enables the N decoding engines 120 to equally share the load of decoding processing, with it being possible to appropriately execute parallel decoding processing. For example, even in the case where an H.264/AVC coded picture is composed of one slice, the coded picture is segmented into a plurality of MB lines, so that the load of decoding the slice is not placed on one decoding engine 120 but equally shared by the N decoding engines 120.

Here, when a coded picture is segmented into a plurality of MB lines, a slice which crosses the boundary between a plurality of MB lines may be segmented into a plurality of slice portions (for example, each of the MB lines L1 to L6 or a set of top six macroblocks in the MB line L7 shown in FIG. 3), and the respective slice portions may be assigned to mutually different segment streams. In other words, the segment stream includes slice portion groups each of which is composed of at least one slice portion that is a segment of a slice (examples of the groups includes MB lines L2 and L6 included in the second segment stream shown in FIG. 3), instead of including the whole slice in the coded picture. In addition, the slice portion group (such as MB lines L2 and L6) may not include a slice header indicating the beginning of the slice and slice-end information indicating the end.

Furthermore, a plurality of MB lines may have a dependency indicated by a predetermined code word included in the bit stream. For example, in H.264/AVC, a plurality of MB lines may have a dependency indicated by MB skip run information "mb_skip_run" and QP variation "mb_qp_delta". In the case where such bit stream is segmented into a plurality of MB lines and the segments are assigned to mutually different segment streams, the dependency between the MB lines cannot be maintained accurately.

For this, in this embodiment, the stream segmentation unit 130 reconstructs the slice portion group as a new slice. As a result, the decoding engine 120 that decodes the segment stream including the slice portion group can easily recognize the slice portion group as a new slice and decode it appropriately without performing any special processing for appropriately recognizing and decoding the slice portion group. In short, this embodiment eliminates the need to provide each of the N decoding engines 120 with a function or a structure for such special processing, thereby simplifying the structure of the whole image decoding apparatus 100.

Figure 49:
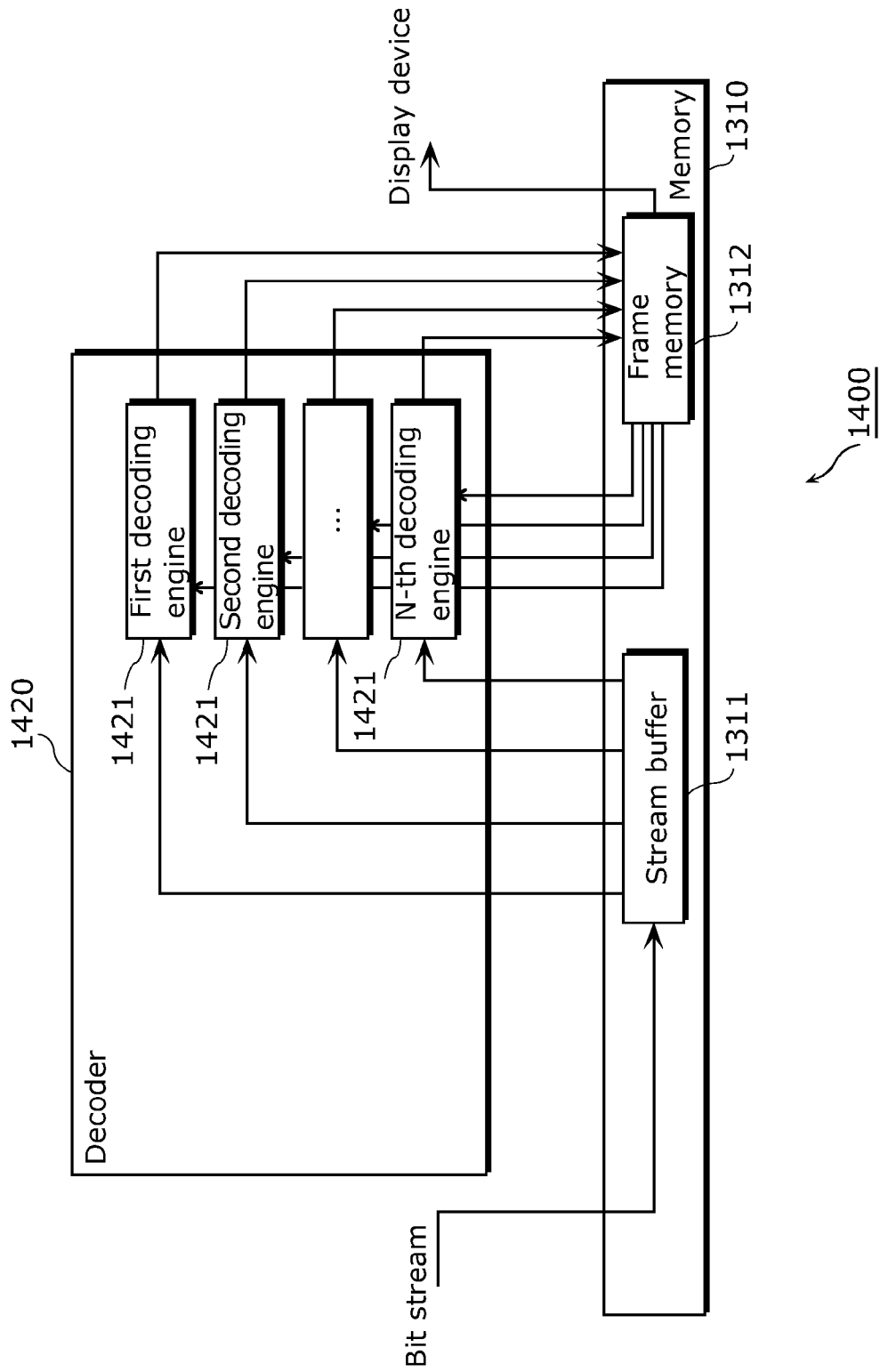
FIG. 49 is a block diagram showing a structure of an image decoding apparatus that executes conventional parallel decoding processing.
Figure 50A:
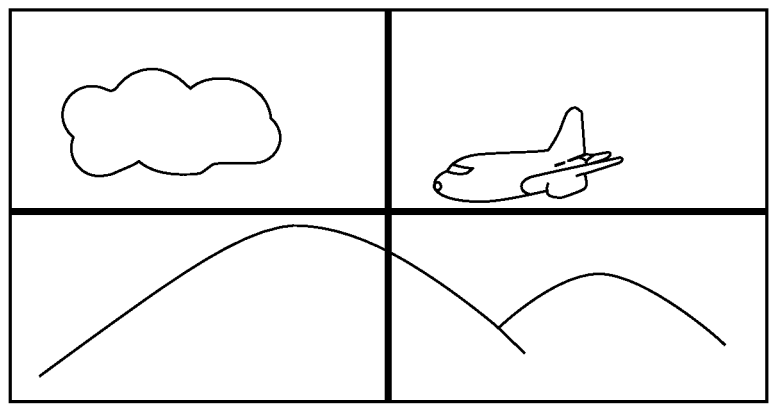
FIG. 50A is an illustration of exemplary conventional parallel decoding processing.
Figure 50B:
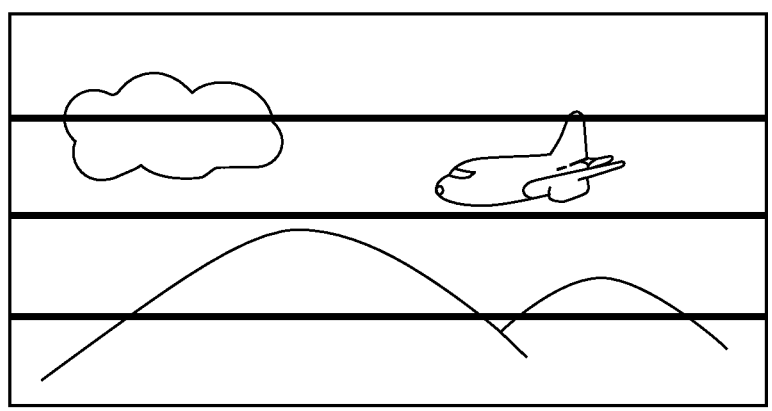
FIG. 50B is an illustration of exemplary conventional parallel decoding processing.
Figure 52:
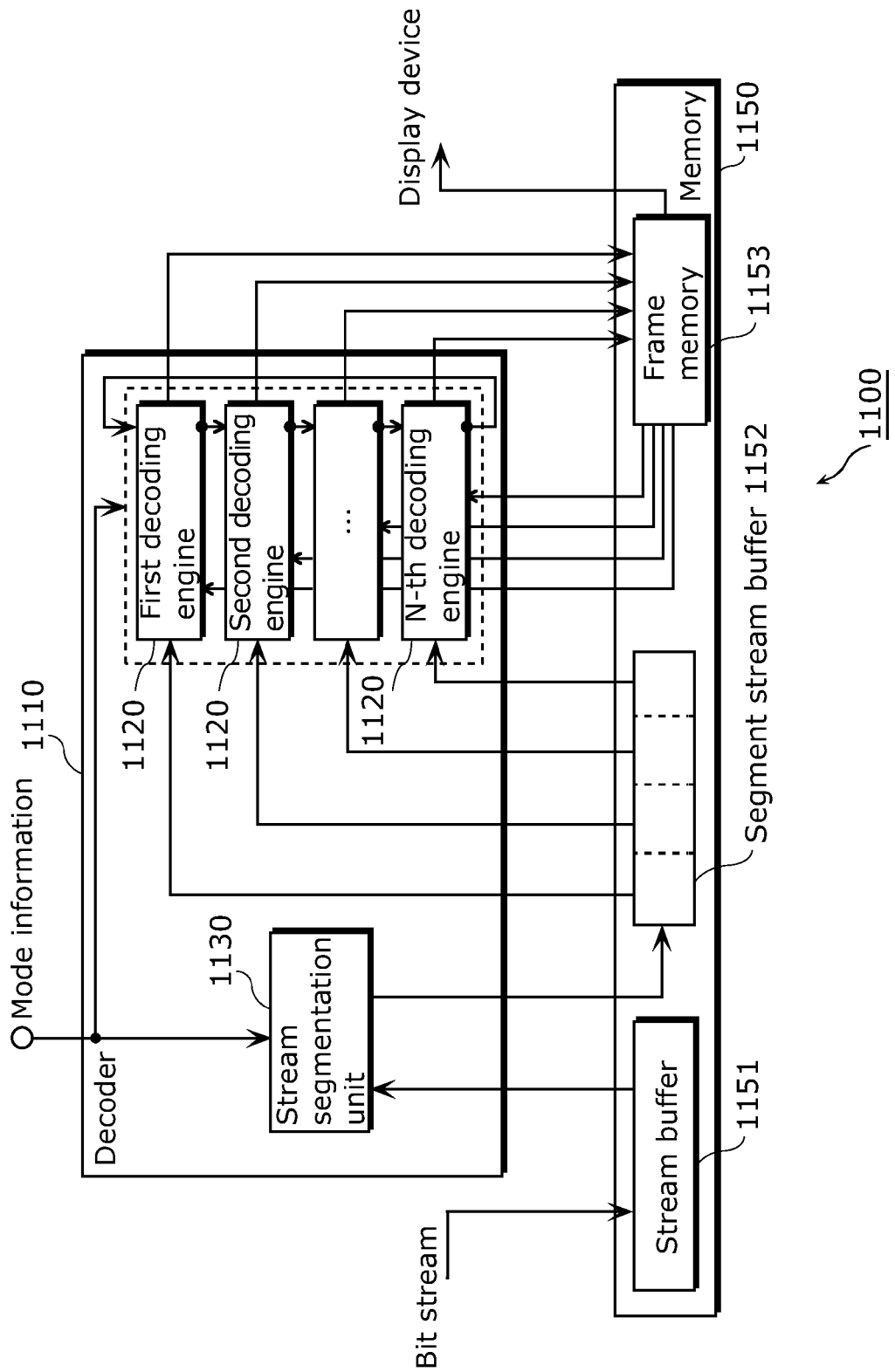
FIG. 52 is a block diagram showing a structure of an image decoding apparatus including a conventional stream segmentation unit.

Furthermore, the image decoding apparatus 100 in this embodiment is capable of accelerating decoding processing compared to the image decoding apparatus in Patent Literature 1. More specifically, the image decoding apparatus in Patent Literature 1 does not perform, in parallel, variable length decoding and deblocking filtering on a bit stream. In other words, the image decoding apparatus in Patent Literature 1 does not appropriately segment the bit stream. In contrast, the image decoding apparatus 100 in this embodiment appropriately segments a bit stream into a plurality of segment streams, thereby allowing the respective decoding engines 120 to execute, in parallel, variable length decoding and deblocking filtering in the same manner as the decoding engine 1421 shown in FIG. 49. As a result, the image decoding apparatus in this embodiment can accelerate decoding processing.

Moreover, the image decoding apparatus in this embodiment can reduce the capacity necessary for the intermediate data buffer, as compared with the image decoding apparatus in Patent Literature 3. In detail, in the image decoding apparatus in Patent Literature 3, variable length code included in a bit stream is decoded in parallel on a picture basis using the plurality of variable length decoding processing units and the decoded data is stored in the intermediate data buffer, and the image decoding processing units at the subsequent stage perform parallel decoding processing on the decoded data on an MB line basis. That is, the image decoding apparatus in Patent Literature 3 stores the variable length code in the intermediate data buffer in a decoded state, and so requires a larger capacity for the intermediate data buffer. In particular, in order to enable the plurality of variable length decoding processing units to efficiently operate in parallel on a picture basis, the intermediate data buffer needs to have a capacity for storing a plurality of pictures. Such an intermediate data buffer is enormous in size. In the image decoding apparatus 100 in this embodiment, on the other hand, the segment streams are generated in a state where variable length code is not decoded, with it being possible to save the capacity of the segment stream buffer 152.

Furthermore, the image decoding apparatus 100 in this embodiment executes one of high-resolution decoding, high-speed decoding, and mufti-channel decoding, according to the aforementioned mode information to be inputted to the M stream segmentation units 130.

Figure 22A:
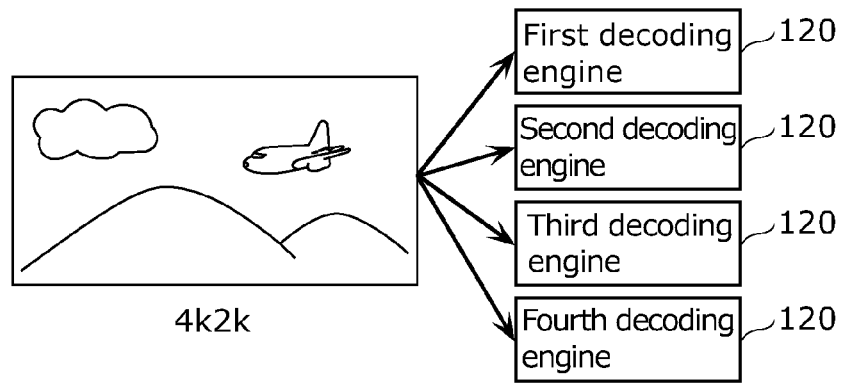
FIG. 22A is an illustration of high-resolution decoding according to Embodiment 1 of the present invention.
Figure 22B:
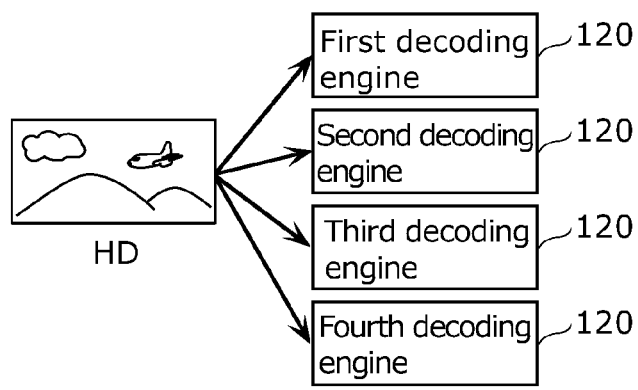
FIG. 22B is an illustration of high-speed decoding according to Embodiment 1 of the present invention.
Figure 22C:
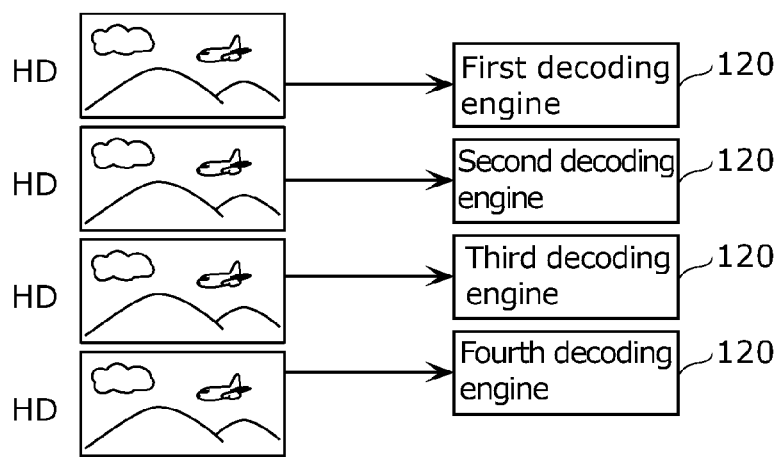
FIG. 22C is an illustration of mufti-channel decoding according to Embodiment 1 of the present invention.

FIG. 22A is an illustration of high-resolution decoding. FIG. 22B is an illustration of high-speed decoding. FIG. 22C is an illustration of mufti-channel decoding.

As shown in FIG. 22A, upon obtaining the mode information instructing to execute high-resolution decoding, the M stream segmentation units 130 and the stream segmentation control unit 140 in the image decoding apparatus 100 segment a 4k2k bit stream into four segment streams as described above, and cause the decoding engines 120 to decode the four segment streams.

For example, each of the four decoding engines 120 has processing performance sufficient to decode two channels of HD images (1920×1088 pixels, 60i), and thus the image decoding apparatus 100 can process the 4k2k image (3840× 2160 pixels, 60p) in real time.

As shown in FIG. 22B, upon obtaining the mode information instructing to execute high-speed decoding, the M stream segmentation units 130 and the stream segmentation control unit 140 in the image decoding apparatus 100 segment an HD bit stream into four segment streams as described above, and cause the decoding engines 120 to decode the four segment streams.

For example, each of the four decoding engines 120 has processing performance sufficient to decode two channels of HD images (1920×1088 pixels, 60i), and thus the image decoding apparatus 100 can process the HD image at a speed 8 (4×2) times faster.

As shown in FIG. 22C, upon obtaining the mode information instructing to execute mufti-channel decoding, the M stream segmentation units 130 and the stream segmentation control unit 140 in the image decoding apparatus 100 cause the decoding engines 120 to decode a plurality of HD bit streams, without segmenting each of the plurality of HD bit streams. In the case of mufti-channel decoding, each of the M stream segmentation units 130 does not perform copying and insertion of various NAL units such as an SPS, a PPS, and a slice, and only allocates the bit streams (channels) to corresponding areas in the segment stream buffer 152.

For example, each of the four decoding engines 120 has processing performance sufficient to decode two channels of HD images (1920×1088 pixels, 60i), and thus the image decoding apparatus 100 can simultaneously decode eight channels at maximum, that is, eight HD bit streams. Furthermore, in the case of decoding channels (bit streams) equal to or less than the maximum number of channels, the image decoding apparatus 100 can lower the clock frequency of each decoding engine 120, thereby being able to reduce its power consumption. For example, in the case of decoding four channels, the image decoding apparatus 100 causes each of the first and second decoding engines 120 to decode two channels, while stopping the remaining third and fourth decoding engines 120. Otherwise, the image decoding apparatus 100 causes the first decoding engine 120 to the fourth decoding engine 120 to operate at a clock frequency reduced to ½.

In this way, the image decoding apparatus 100 in this embodiment switches decoding processing between high-resolution decoding, high-speed decoding, and mufti-channel decoding according to mode information, thereby being able to increase user friendliness. The high-resolution decoding and the high-speed decoding performed in the image decoding apparatus 100 are the same in terms of involving segmenting a bit stream into four segment streams and decoding them in parallel. In short, the high-resolution decoding and the high-speed decoding are different only in the resolutions and frame rates (4k2k or HD) of the bit streams to be decoded. Accordingly, the image decoding apparatus 100 switches decoding processing between (i) high-resolution decoding or high-speed decoding and (ii) mufti-channel decoding according to mode information, and further switches decoding processing between high-resolution decoding and high-speed decoding according to the resolutions and frame rates of the bit streams.

Embodiment 2

Next, Embodiment 2 according to the present invention is described in detail.

The image decoding apparatus 100 in Embodiment 1 modifies the dependencies between consecutive MB lines in a bit stream before stream segmentation by modifying MB skip run information and QP variations such that the dependencies are modified into dependencies according to the context of the MB lines in each segment stream.

Here, there is a case where a bit stream includes a macroblock whose QP variation is not included. The macroblock whose QP variation is not included corresponds to a non-quantized macroblock. More specifically, an exemplary macroblock whose QP variation is not included in the H.264/AVC standard is: (1) a skipped macroblock, (2) a non-compressed macroblock (I_PCM), or (3) a macroblock for which an intra-prediction mode other than "Intra 16×16" is selected, and whose "coded_block_pattern" is 0 (that is, no non-zero coefficient is included).

In the case where such macroblock whose QP variation is not included is present at the beginning of an MB line, the image decoding apparatus 100 in Embodiment 1 cannot modify the QP variation due to absence of the QP variation to be modified.

For this, an image decoding apparatus 200 in Embodiment 2 is characterized by inserting a QP variation into a segment stream including a current macroblock whose QP variation is not included when generating a plurality of segment streams from a bit stream including the current macroblock at the beginning of an MB line. With this, the image decoding apparatus 200 can appropriately set the QP variation based on the new context in each segment stream.

Here, when such QP variation is inserted in a segment stream, it is impossible to use one piece of MB skip run information to show the number of consecutive skipped macroblocks which cross the boundary between MB lines because the QP variation is present between the MB lines. For this, the image decoding apparatus 200 in Embodiment 2 is further characterized by not re-combining MB skip run information.

The image decoding apparatus 200 in this embodiment is described below with reference to the drawings.

Figure 23:
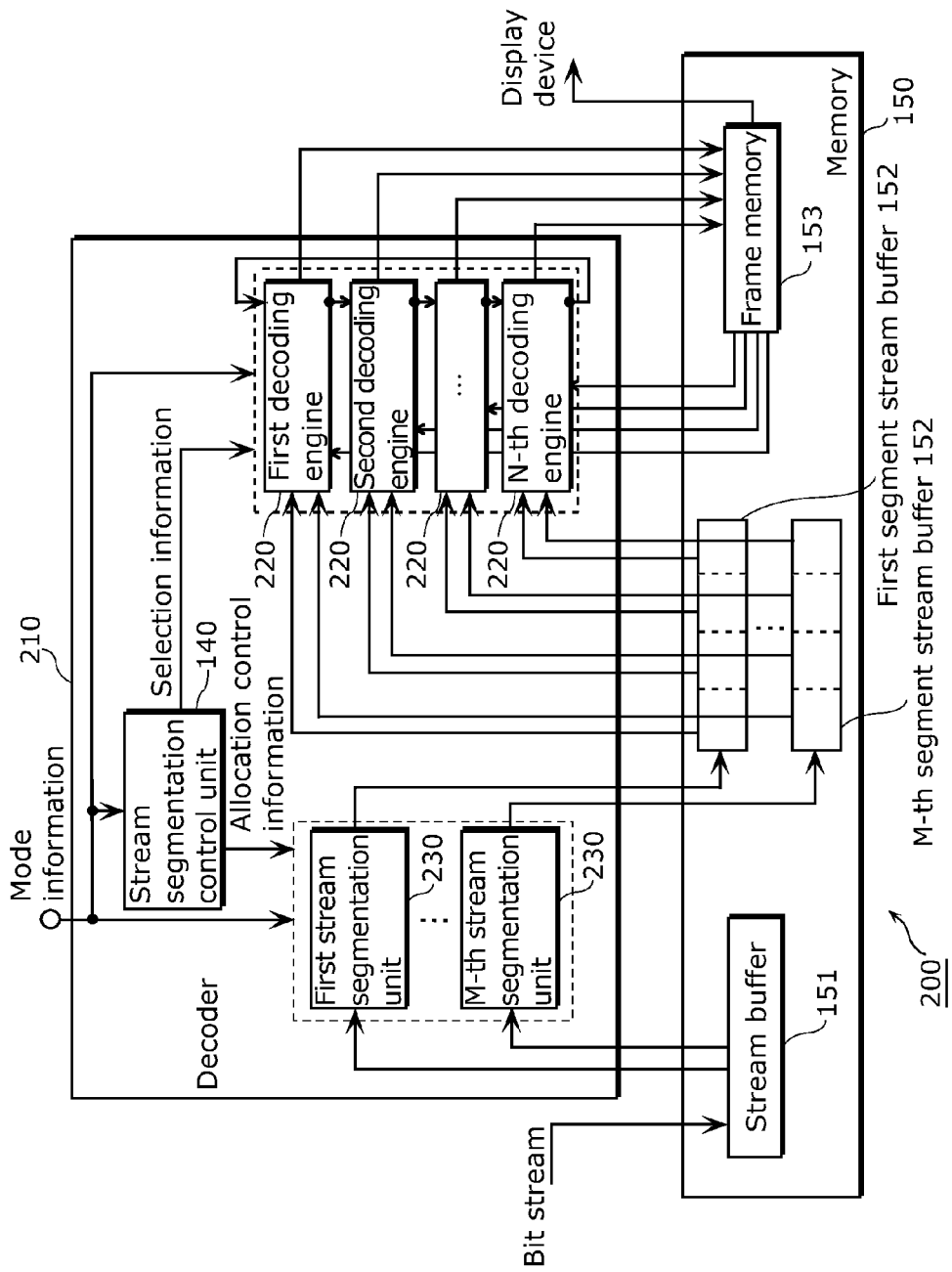
FIG. 23 is a block diagram showing a structure of an image decoding apparatus according to Embodiment 2 of the present invention.

FIG. 23 is a block diagram showing a structure of an image decoding apparatus according to Embodiment 2 of the present invention. In FIG. 23, the same structural elements as in FIG. 1 are assigned with the same reference signs, and the descriptions therefor are not repeated here.

As shown in FIG. 23, the image decoding apparatus 200 includes a decoder 210 and the memory 150.

As with the decoder 110, the decoder 210 generates decoded image data by reading the bit stream stored in the stream buffer 151 in the memory 150 and decoding the bit stream, and stores the decoded image data into the frame memory 153 in the memory 150. This decoder 210 includes the stream segmentation control unit 140, M stream segmentation units (first to M-th stream segmentation units) 230, and N decoding engines (first to N-th decoding engines) 220.

Each of the M stream segmentation units 230 executes the same processing as performed by each of the M stream segmentation units 130, except for MB skip run information modification processing and QP variation modification processing. The stream segmentation unit 230 will be described in detail later, with reference to FIG. 24.

The N decoding engines 220 correspond to N decoding units which decode respective N segment streams in parallel. Each of the N decoding engines 220 executes the same processing as performed by each of the N decoding engines 120 except for calculating a QP value using an accumulated QP variation inserted into the segment stream by the stream segmentation unit 230.

Next, a detailed description is given of a structure and operations of the stream segmentation unit 230.

Figure 24:
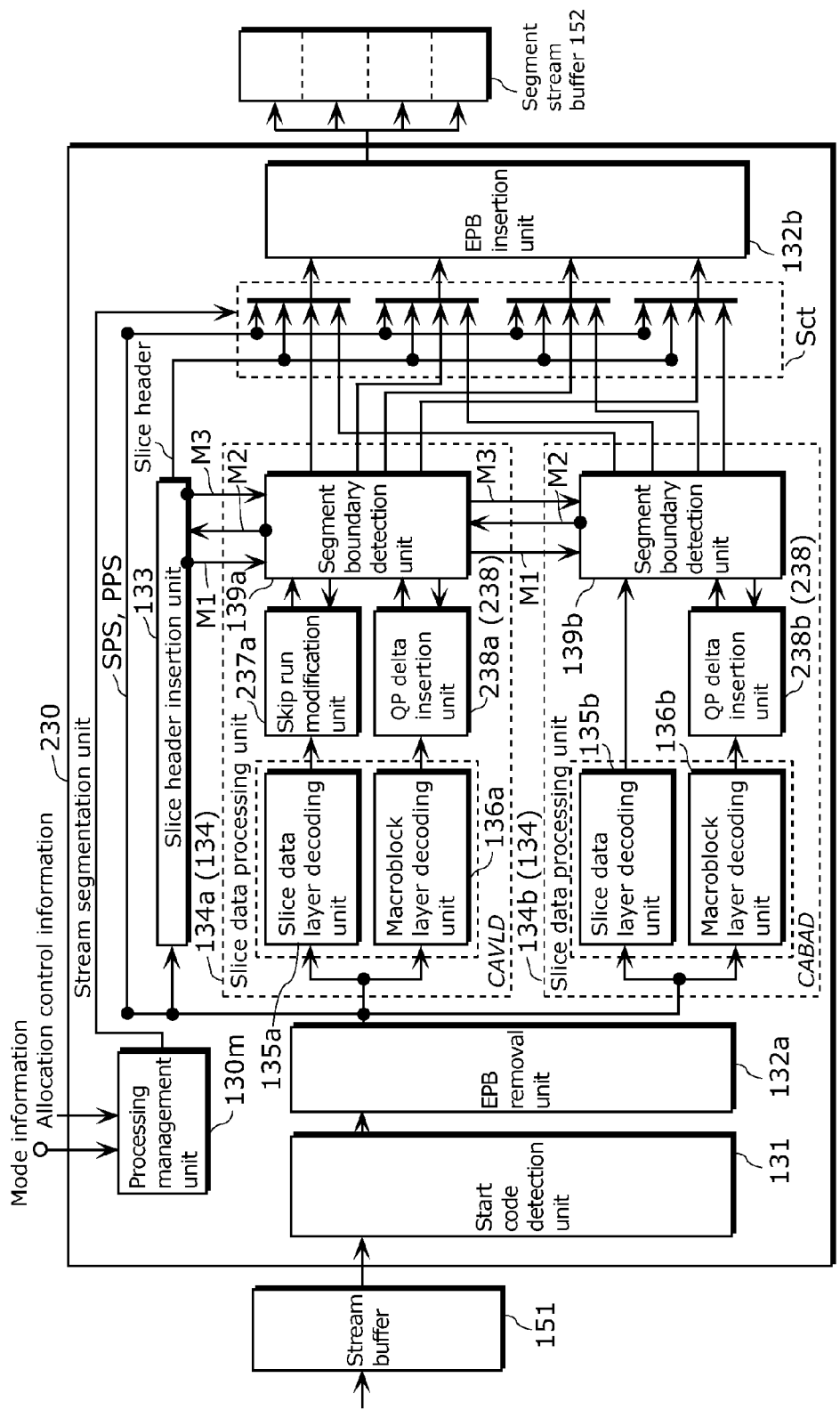
FIG. 24 is a block diagram showing a structure of a stream segmentation unit according to Embodiment 2 of the present invention.

FIG. 24 is a block diagram showing the structure of the stream segmentation unit 230.

The stream segmentation unit 230 is different from the stream segmentation unit 130 shown in FIG. 10 in that a skip run modification unit 237*a* and QP delta insertion units 238*a* and 238*b* are included instead of the skip run modification unit 137*a* and the QP delta modification units 138*a* and 138*b*.

The processing management unit 130*m* obtains mode information and allocation control information and, according to the obtained information, controls the other components included in the stream segmentation unit 230, as in Embodiment 1. For example, the processing management unit 130*m* controls the selector Sct to output the segment stream generated from the SPS, the PPS, or the processing target slice or not to output the segment stream so that the stream segmentation processing as shown in FIGS. 6A to 8 is carried out.

In the case where MB skip run information indicates the number of consecutive macroblocks which cross the boundary between at least two MB lines to be assigned to mutually different segment streams, the skip run modification unit 237*a* segments MB skip run information such that the MB skip run information indicates the numbers of blocks for each of the Mb lines, as with the skip run modification unit 137*a*.

However, unlike the skip run modification unit 137*a*, the skip run modification unit 237*a* does not combine a plurality of pieces of MB skip run information into a single piece of MB skip run information in each segment stream.

In the case where a QP variation indicates the variation between macroblocks which cross the boundary between two MB lines, the QP delta insertion units 238*a* and 238*b* calculate the QP variation based on the new context of the macroblocks in each of the segment streams, as with the QP delta modification units 138a and 138b.

Here, the QP delta insertion units 238a and 238b output the calculated QP variation as a new QP variation to the segment boundary detection unit 139. With this, new QP variation is inserted into (set in) each segment stream. Stated differently, the QP delta insertion units 238a and 238b do not modify the QP variation included in each macroblock.

Furthermore, the segment boundary detection unit 139a provides each of the segment streams with MB skip run information obtained from the skip run modification unit 237a and the accumulated QP variation obtained from the QP delta insertion unit 238a.

The segment boundary detection unit 139b provides each of the segment streams with the accumulated QP variation obtained from the QP delta insertion unit 238b.

Next, operations by the skip run modification unit 237a and the QP delta insertion units 238a and 238b are described in detail with a focus on differences from the operations by the skip run modification unit 137a and the QP delta modification units 138a and 138b.

It is to be noted that, in the descriptions given of the functions and processing operations that are performed by both the QP delta insertion units 238a and 238b, the QP delta insertion units 238a and 238b are not differentiated from each other and referred to as QP delta insertion units 238.

Figure 25:
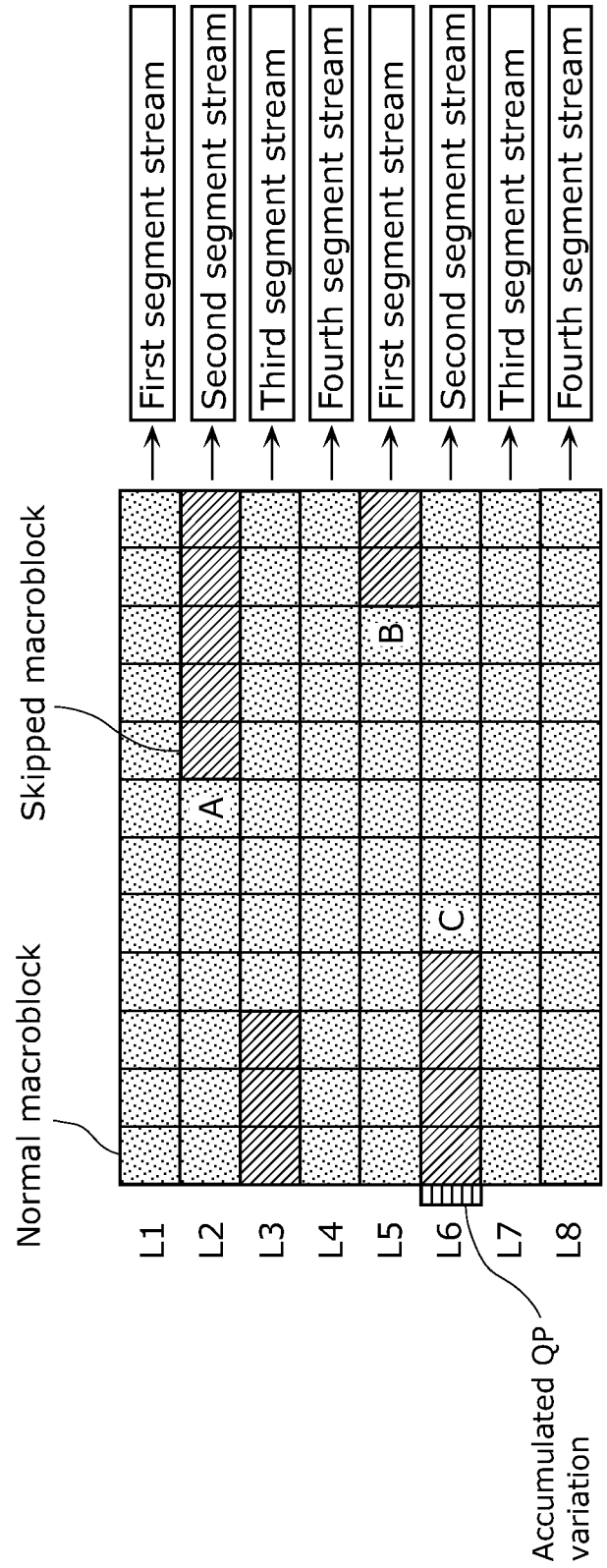
FIG. 25 is an illustration of MB skip run information modification processing and QP variation insertion processing according to Embodiment 2 of the present invention.

FIG. 25 is an illustration of MB skip run information modification processing and QP variation insertion processing.

The picture shown in FIG. 25 includes five consecutive skipped macroblocks at the end of an MB line L2, three consecutive skipped macroblocks at the beginning of an MB line L3, two consecutive skipped macroblocks at the end of an MB line L5, and four consecutive skipped macroblocks at the beginning of an MB line L6.

As described earlier, a skipped macroblock does not include any QP variation. Accordingly, the macroblock C includes, as a QP variation, a difference value between the QP value of the macroblock B and the QP value of the macroblock C.

However, segmenting such picture into MB lines and assigning the respective MB lines to separate segment streams changes the contexts of the macroblocks at the MB line boundaries in each segment stream.

In this case, after the stream segmentation, the macroblock located immediately before the macroblock C in the second segment stream is changed to a macroblock A including the QP variation. Accordingly, in the case where the decoding engine 220 decodes the second segment stream without modification, it is impossible to accurately decode the QP value of the macroblock C. This is because the QP value of the macroblock C is decoded as the value that is obtained by reflecting the QP variation that is the difference value between the QP value of the macroblock B and the QP value of the macroblock C on the QP value of the macroblock A.

In view of this, the QP delta insertion unit 238 outputs a new QP variation to be inserted into an MB line to the segment boundary detection unit 139, so as to correct a change in context of macroblocks caused by stream segmentation. That is, in the case where there is a dependency between two MB lines based on a QP variation indicating a difference in QP value between blocks which cross the boundary between the two MB lines, the QP delta insertion unit 238 outputs a new QP variation to be inserted at the beginning of the MB line to the segment boundary detection unit 139, so as to break the dependency.

In this embodiment, QP variations are inserted to the beginning of MB lines. However, such QP variations are not always inserted to the beginning of MB lines. For example, it is also possible to insert QP variations to other places such as within starting macroblocks in MB lines.

As in Embodiment 1, examples of conceivable methods of calculating QP variations to be inserted to the beginning of MB lines include: a method of calculating QP variations by reconstructing the QP values of all the macroblocks; and a method of calculating QP variations by accumulating the QP variations of the macroblocks other than a current segment stream. This embodiment describes the latter calculation method.

The QP delta insertion unit 238 calculates accumulated QP variations obtained by accumulating the QP variations of all the macroblocks including the QP variations included in the MB lines L3 to L5. Furthermore, the QP delta insertion unit 238 re-codes the calculated accumulated QP variations, and outputs the re-coded accumulated QP variations as new QP variations to the segment boundary detection unit 139. As a result, as shown in FIG. 25, the accumulated QP variation is inserted to the beginning of the MB line L6. In other words, the accumulated QP variation and the QP variation originally included in the macroblock C are set in the second segment stream. It is to be noted that the detailed calculation method of accumulated QP variations is the same as in Embodiment 1, and thus is not repeated here.

The description given here focuses on the MB line L6. The QP delta insertion unit 238 outputs, to the segment boundary detection unit 139, coded accumulated QP variations to be inserted to the beginning of the other MB lines. For example, the QP delta insertion unit 238 calculates accumulated QP variations obtained by accumulating the QP variations of all the macroblocks including the QP variations included in the MB lines L4 to L6, as an accumulated QP variation to be inserted to the beginning of the MB line L7. Next, the QP delta insertion unit 238 codes the calculated accumulated QP variation, and outputs the coded accumulated QP variation to the segment boundary detection unit 139. This processing is performed independently of the processing of other segment streams.

In this way, in this embodiment, accumulated QP variations are inserted to the beginning of MB lines, and thus there are no consecutive skipped macroblocks which cross the boundary between the MB lines. Stated differently, the skip run modification unit 237a does not combine a plurality of pieces of MB skip run information, unlike the skip run modification unit 137a in Embodiment 1.

For example, in the case of a picture shown in FIG. 25, the skip run modification unit 237a segments MB skip run information corresponding to eight skipped macroblocks which cross the boundary between the MB lines L2 and L3 into MB skip run information corresponding to five skipped macroblocks included in the MB line L2 and MB skip run information corresponding to three skipped macroblocks included in the MB line L3, as with the skip run modification unit 137a. Likewise, the skip run modification unit 237a segments MB skip run information corresponding to six skipped macroblocks which cross the boundary between the MB lines L5 and L6 into MB skip run information corresponding to two skipped macroblocks included in the MB line L5 and MB skip run information corresponding to four skipped macroblocks included in the MB line L6.

Here, as described earlier, an accumulated QP variation as a new QP variation is inserted between the five consecutive skipped macroblocks in the MB line L2 and the four consecutive skipped macroblocks in the MB line L6. For this, the skip run modification unit 237a does not re-combine the MB skip run information corresponding to the five consecutive skipped macroblocks in the MB line L2 and the MB skip run information corresponding to the four consecutive skipped macroblocks in the MB line L6.

It is to be noted that the skip run modification unit 237*a* re-codes the thus obtained MB skip run information, and outputs the re-coded MB skip run information, as with the skip run modification unit 137*a*.

Figure 26:
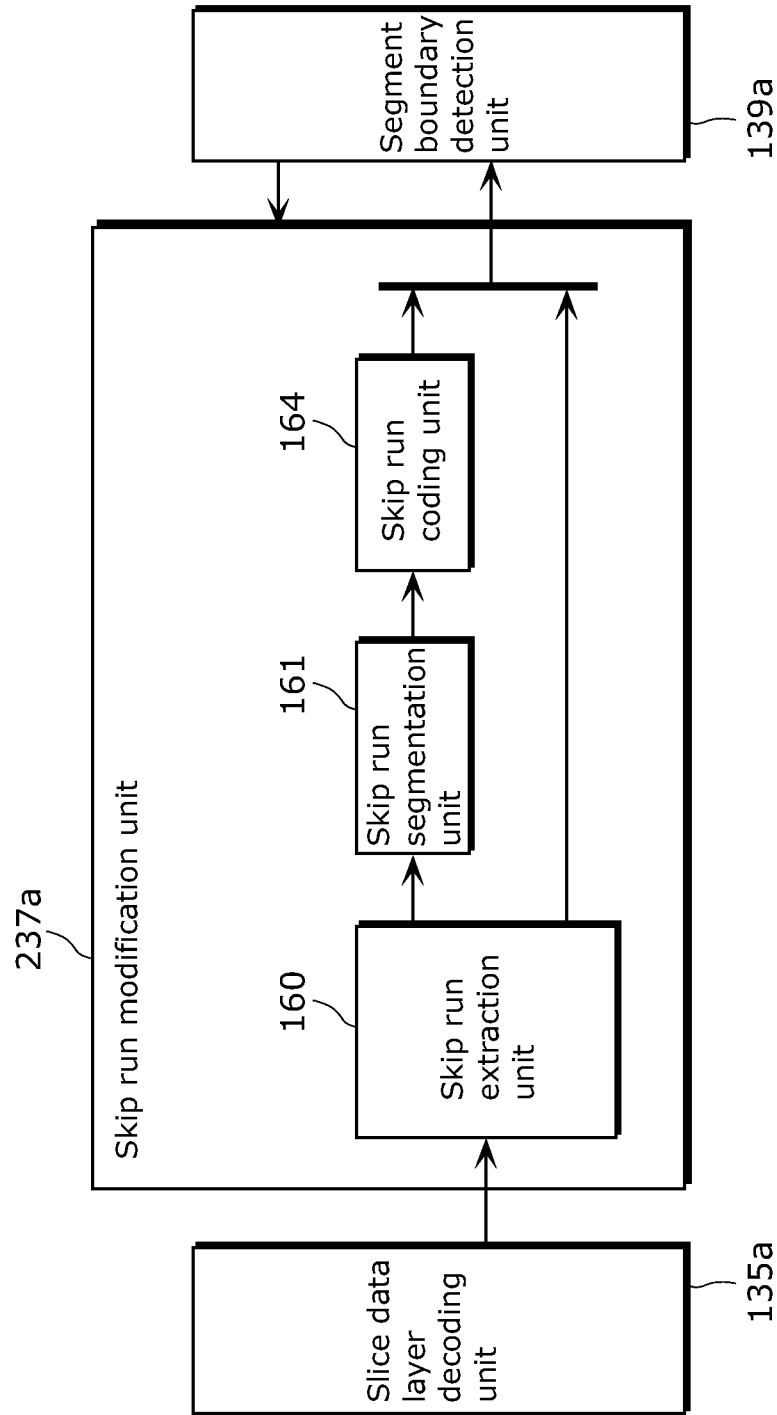
FIG. 26 is a block diagram showing a structure of a skip run modification unit according to Embodiment 2 of the present invention.

FIG. 26 is a block diagram showing a structure of the skip run modification unit 237*a*. In FIG. 26, the same structural elements as in FIG. 17 are assigned with the same reference signs, and descriptions therefor are not repeated here.

The skip run modification unit 237*a* includes the skip run extraction unit 160, the skip run segmentation unit 161, and the skip run coding unit 164. In other words, the skip run modification unit 237*a* is the same in structure as the skip run modification unit 137*a* in Embodiment 1 except for not including the skip run accumulation and holding unit 162 and the addition unit 163. The skip run segmentation unit 161 outputs the segmented MB skip run information to the skip run coding unit 164.

Figure 27:
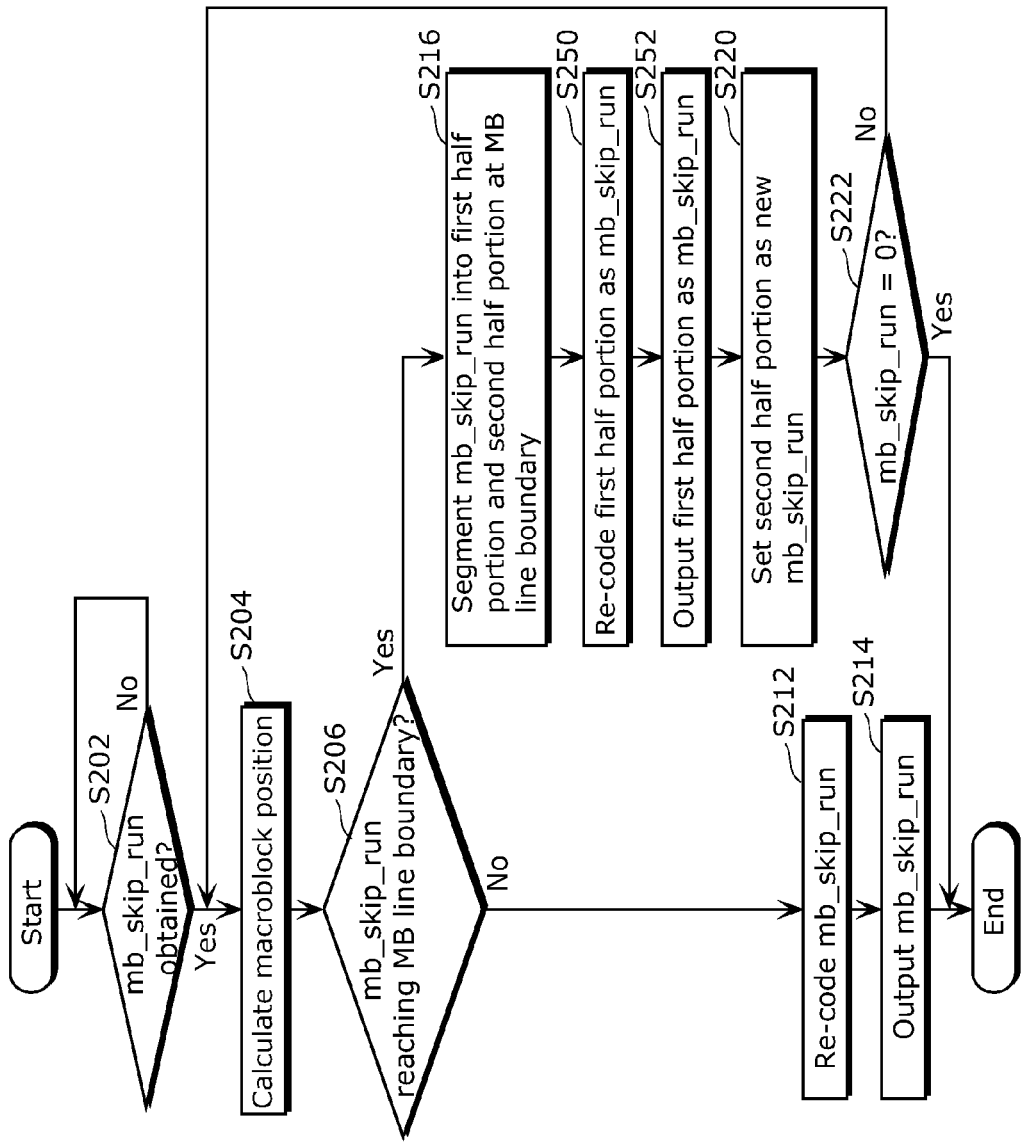
FIG. 27 is a flowchart showing how the skip run modification unit performs MB skip run information modification processing according to Embodiment 2 of the present invention.

FIG. 27 is a flowchart showing how the skip run modification unit 237*a* performs a modification operation on the MB skip run information. In FIG. 27, the same steps as in FIG. 18 are assigned with the same reference signs, and descriptions therefor are not repeated here.

First, the skip run modification unit 237*a* checks whether or not MB skip run information "mb_skip_run" has been obtained (Step S202). Stated differently, the skip run modification unit 237*a* does not determine whether or not a currently-being processed stream reaches the end of a slice. This is because the skip run modification unit 237*a* does not hold preceding MB skip run information, and does not need to output preceding MB skip run information when the currently-being processed stream reaches the end of a slice. This is described in detail later.

Here, in the case where MB skip run information "mb_skip_run" has not yet been obtained (No in Step S202), the skip run modification unit 237*a* returns to the beginning of this processing and reads the stream again.

On the other hand, in the case where MB skip run information "mb_skip_run" has already been obtained (Yes in Step S202), the skip run modification unit 237*a* calculates the position of the macroblock including the MB skip run information in the picture, based on the address information of the macroblock (Step S204).

Next, as in Embodiment 1, the skip run modification unit 237*a* determines whether or not the obtained MB skip run information must be segmented (Step S206).

When it is determined that consecutive skipped macroblocks reach an MB line boundary (Yes in Step S206), the skip run modification unit 237*a* advances to Step S216 for segmenting the MB skip run information. This processing will be described in detail later.

On the other hand, when it is determined that consecutive skipped macroblocks do not reach an MB line boundary (No in Step S206), the skip run modification unit 237*a* re-codes the MB skip run information (Step S212). Here, Steps S208 and S210 shown in FIG. 18 are not executed. This is because the skip run modification unit 237*a* in this embodiment does not re-combine MB skip run information.

Next, the skip run modification unit 237*a* outputs the re-coded MB skip run information to the segment boundary detection unit 139*a* to complete this processing (Step S214).

In addition, when it is determined that consecutive skipped macroblocks reach the MB line boundary (Yes in Step S206), the skip run modification unit 237*a* segments the MB skip run information into a first half portion and a second half portion at the MB line boundary as a segment boundary (Step S216), as in Embodiment 1.

Furthermore, the skip run modification unit 237*a* re-codes the first half portion as the MB skip run information among the MB skip run information segments (Step S250). Next, the skip run modification unit 237*a* outputs the re-coded MB skip run information to the segment boundary detection unit 139*a* (Step S252). This embodiment does not require re-combination of pieces of MB skip run information, and thus does not hold preceding MB skip run information unlike in Embodiment 1.

After the skip run modification unit 237*a* sets the second half portion as new MB skip run information from among the MB skip run information segments (Step S220), the skip run modification unit 237*a* determines whether or not the length is 0 (Step S222).

When it is determined that the length of the new MB skip run information is 0 (Yes in Step S222), the skip run modification unit 237*a* completes the processing determining that there remains no MB skip run information to be processed.

When it is determined that the length of the new MB skip run information is not 0 (No in Step S222), the skip run modification unit 237*a* returns to Step S204 determining that there remains MB skip run information to be processed, and repeats segmentation and output of MB skip run information.

The skip run modification unit 237*a* repeats this processing described above until a stream end is reached. In this way, the skip run modification unit 237*a* appropriately performs segmentation of MB skip run information.

Figure 28:
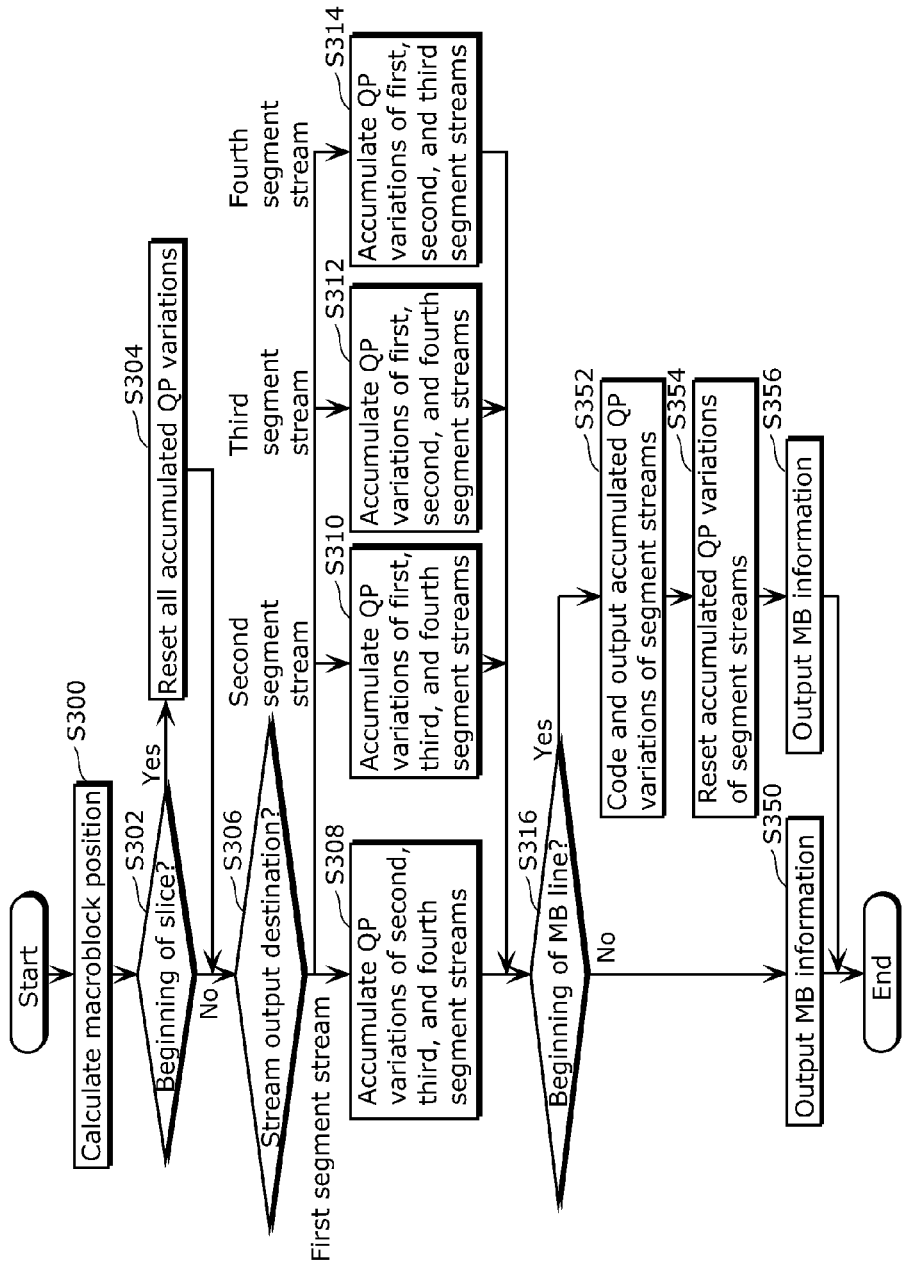
FIG. 28 is a flowchart showing how a QP delta insertion unit performs accumulated QP variation insertion processing according to Embodiment 2 of the present invention.

FIG. 28 is a flowchart showing how the QP delta insertion unit 238 performs insertion processing on the accumulated QP variations. In FIG. 28, the same steps as in FIG. 21 are assigned with the same reference signs, and descriptions therefor are not repeated here.

When macroblock processing is started, the QP delta insertion unit 238 executes the processing of Steps S300 to S316 as in Embodiment 1.

When it is determined that a current macroblock is located at the beginning of an MB line (Yes in Step S316), the QP delta insertion unit 238 codes an accumulated QP variation corresponding to the segment stream to which the current macroblock is assigned, and outputs the coded accumulated QP variation to the segment boundary detection unit 139 (Step S352). Stated differently, the QP delta insertion unit 238 outputs the accumulated QP variation before outputting the MB information.

Next, the QP delta insertion unit 238 resets, to 0, the accumulated QP variation in relation to the segment stream including the current macroblock (Step S354). Next, the QP delta insertion unit 238 outputs the MB information to the segment boundary detection unit 139 to complete the processing (Step S356). In the case where the MB information includes the QP variation, the QP delta insertion unit 238 outputs the QP variation without modification.

On the other hand, when it is determined that a current macroblock is not located at the beginning of an MB line (No in Step S316), the QP delta insertion unit 238 outputs the MB information to the segment boundary detection unit 139 to complete the processing (Step S350). In the case where the MB information includes the QP variation, the QP delta insertion unit 238 outputs the MB information without modifying the QP variation.

As described above, the QP delta insertion unit 238 outputs, to the segment boundary detection unit 139, the new QP variation (accumulated QP variation) accumulated to be inserted to the beginning of the MB line and the QP variations included in the bit stream.

In this way, the image decoding apparatus 200 in this embodiment is capable of equalizing the decoding processing loads on the N decoding engines 220 and thereby allowing the N decoding engines 220 to appropriately execute parallel decoding processing, as in the image decoding apparatus 100 in Embodiment 1.

In particular, even in the case where the macroblock located at the beginning of an MB line does not include any QP variation, the image decoding apparatus 200 in this embodiment is capable of inserting new QP variations to the MB line, and thereby obtaining accurate QP values when parallel decoding processing is performed.

The image decoding apparatus 200 in this embodiment selectively executes one of the high-resolution decoding, high-speed decoding, and mufti-channel decoding shown in FIGS. 22A to 22C, according to mode information inputted to the M stream segmentation units 230, as with the image decoding device 100 in Embodiment 1.

In this way, the image decoding apparatus 200 in this embodiment switches decoding processing between the high-resolution decoding, the high-speed decoding, and the mufti-channel decoding according to the mode information, thereby being able to increase user friendliness.

Embodiment 3

The following describes Embodiment 3 of the present invention in detail.

Figure 29:
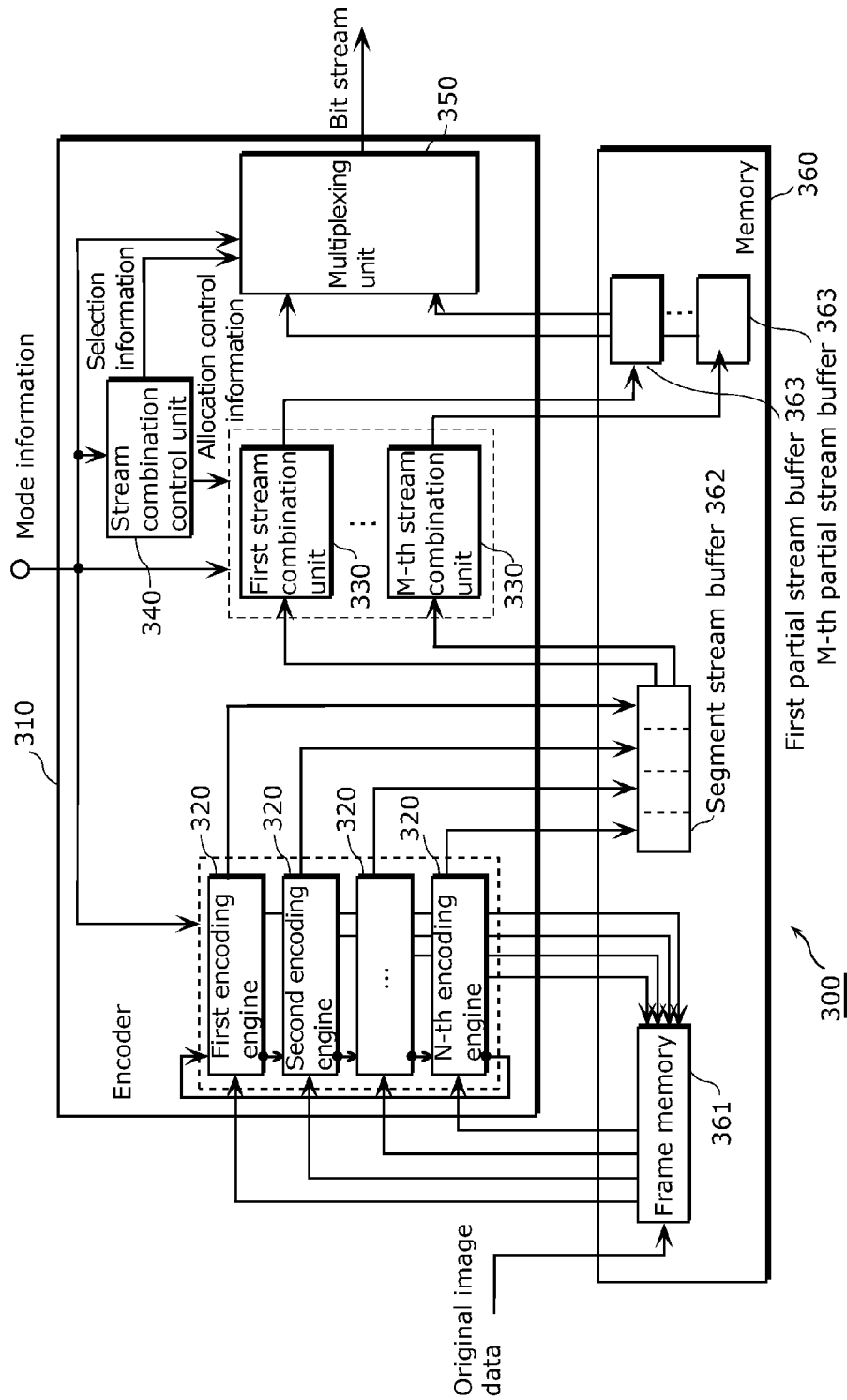
FIG. 29 is a block diagram showing a structure of an image coding apparatus according to Embodiment 3 of the present invention.

FIG. 29 is a block diagram showing a structure of an image coding apparatus in Embodiment 3 of the present invention.

An image coding apparatus 300 in this embodiment is capable of appropriately executing parallel coding processing by a simple structure, and includes an encoder 310 and a memory 360.

The memory 360 has areas for storing original image data inputted to the encoder 310 and intermediate data generated by the encoder 310.

In detail, the memory 360 includes a frame memory 361, a segment stream buffer 362, and M partial stream buffers (first to M-th partial stream buffers) 363.

The frame memory 361 is used to store original image data of a picture to be coded, and also store N locally decoded image data segments generated by N encoding engines (coding units) 320. The segment stream buffer 362 is used to store N segment streams generated by the encoder 310, as the above-mentioned intermediate data. The segment stream buffer 362 has areas that are each assigned to a different one of the N encoding engines 320. The M partial stream buffers 363 are each used to store a partial stream (combined coding area) generated by the encoder 310.

The encoder 310 reads the original image data stored in the frame memory 361 in the memory 360 and codes the original image data, to generate and output a bit stream. The encoder 310 includes the N encoding engines (first to N-th encoding engines) 320, M stream combination units (first to M-th stream combination units) 330, a stream combination control unit 340, and a multiplexing unit 350.

Each encoding engine 320 in this embodiment has a processing capability of coding HD images (1920×1088 pixels, 60i) corresponding to two channels.

The N encoding engines 320 obtain mode information and, according to the mode information, read the original image data of the picture to be coded on an MB line basis or an MB line pair basis and code the read data in parallel. That is, the image coding apparatus 300 in this embodiment segments the picture into a plurality of MB lines or a plurality of MB line pairs and assigns coding processing of the plurality of MB lines or the plurality of MB lines pairs to the N encoding engines 320 to thereby achieve parallel coding processing, as with the image decoding apparatus 100 in Embodiment 1.

Moreover, when coding a macroblock by intra-picture prediction, each of the N encoding engines 320 obtains, from an encoding engine 320 that has coded and locally decoded macroblocks located left above, above, and right above the coding target macroblock, information of these locally decoded macroblocks as adjacent MB information. Having obtained the adjacent MB information, the encoding engine 320 codes the coding target macroblock using the obtained adjacent MB information. In addition, when performing, for example, deblocking filtering processing, motion vector prediction processing, or variable length coding processing, too, the encoding engine 320 obtains information of coded and locally decoded macroblocks located left above, above, and right above the processing target macroblock as adjacent MB information and performs the processing, in the same manner as mentioned above.

It is assumed in this embodiment that N=4, for simplicity's sake. In this embodiment, when coding of macroblocks located left, left above, above, and right above the coding target macroblock ends, each of the N (N=4) encoding engines 320 starts coding the coding target macroblock using adjacent MB information of these macroblocks. Thus, the first to fourth encoding engines 320 code macroblocks located at different horizontal positions in the respective MB lines in parallel.

Figure 30A:
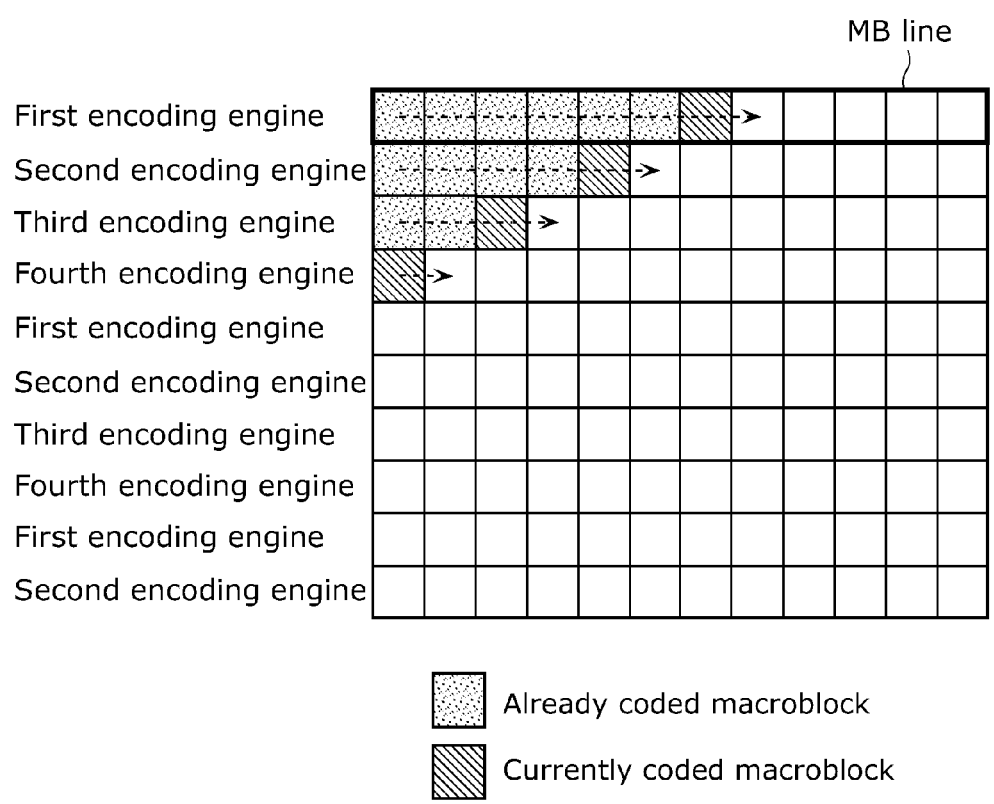
FIG. 30A is a diagram showing coding order of a picture that is not coded in MBAFF according to Embodiment 3 of the present invention.

FIG. 30A is a diagram showing coding order in the case of coding a picture without using MBAFF.

In the case of coding a picture without using MBAFF, the first encoding engine 320 codes the 0th MB line, the second encoding engine 320 codes the first MB line, the third encoding engine 320 codes the second MB line, and the fourth encoding engine 320 codes the third MB line. Note that the k-th (k is an integer equal to or greater than 0) MB line is an MB line at the k-th ordinal position from the top of the picture. For example, the 0th MB line is an MB line at the 0th ordinal position from the top of the picture.

When the coding of the picture starts, first the first encoding engine 320 starts coding the 0th MB line. Upon completion of the coding of two leftmost macroblocks in the 0th MB line, the second encoding engine 320 starts coding a leftmost macroblock in the first MB line. Upon completion of the coding of two leftmost macroblocks in the first MB line, the third encoding engine 320 starts coding a leftmost macroblock in the second MB line. Upon completion of the coding of two leftmost macroblocks in the second MB line, the fourth encoding engine 320 starts coding a leftmost macroblock in the third MB line.

Accordingly, the (k+1)-th MB line is coded from leftmost to rightmost macroblocks, with a delay of two macroblocks from the k-th MB line.

Figure 30B:
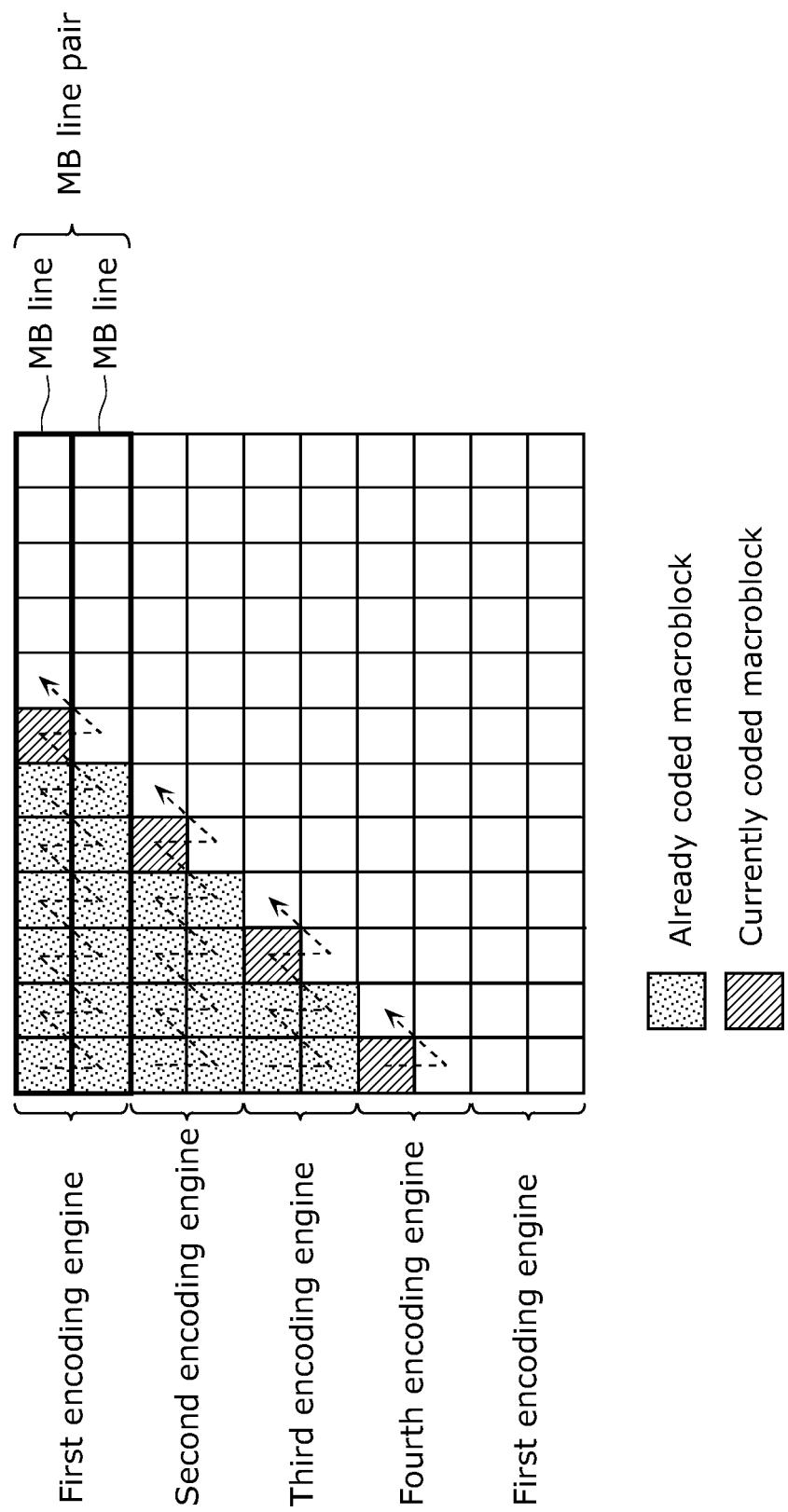
FIG. 30B is a diagram showing coding order of a picture that is coded in MBAFF according to Embodiment 3 of the present invention.

FIG. 30B is a diagram showing coding order in the case of coding a picture using MBAFF.

In the case of coding a picture using MBAFF, the first encoding engine 320 codes the 0th MB line pair, the second encoding engine 320 codes the first MB line pair, the third encoding engine 320 codes the second MB line pair, and the fourth encoding engine 320 codes the third MB line pair, as in the case of coding a picture without using MBAFF. Note that the k-th (k is an integer equal to or greater than 0) MB line pair is a structural unit composed of a pair of MB lines at the k-th ordinal position from the top of the picture. For example, the 0th MB line pair is a structural unit composed of a pair of MB lines at the 0th ordinal position from the top of the picture.

When the coding of the picture starts, first the first encoding engine 320 starts coding the 0th MB line pair. Upon completion of the coding of two leftmost macroblock pairs in the 0th MB line pair, the second encoding engine 320 starts coding an upper leftmost macroblock in the first MB line pair. Upon completion of the coding of two leftmost macroblock pairs in the first MB line pair, the third encoding engine 320 starts coding an upper leftmost macroblock in the second MB line pair. Upon completion of the coding of two leftmost macroblock pairs in the second MB line pair, the fourth encoding engine 320 starts coding an upper leftmost macroblock in the third MB line pair.

Accordingly, the (k+1)-th MB line pair is coded from leftmost to rightmost macroblock pairs, with a delay of two macroblock pairs from the k-th MB line pair.

In each of the case of coding a picture without using MBAFF and the case of coding a picture using MBAFF, the (k+1)-th MB line or the (k+1)-th MB line pair may be coded with a delay of at least two macroblocks from the k-th MB line or at least two macroblock pairs from the k-th MB line pair. That is, the (k+1)-th MB line or the (k+1)-th MB line pair may be coded with a delay of three or more macroblocks from the k-th MB line or three or more macroblock pairs from the k-th MB line pair. For example, in the case of coding the (k+1)-th MB line or the (k+1)-th MB line pair with a delay of two macroblocks from the k-th MB line or two macroblock pairs from the k-th MB line pair, the time required to code the picture can be minimized. In the case of coding the (k+1)-th MB line or the (k+1)-th MB line pair with a delay of three or more macroblocks from the k-th MB line or three or more macroblock pairs from the k-th MB line pair, on the other hand, the time required to code the picture increases with the delay.

In the case where CAVLC is used as the coding method, the N encoding engines 320 perform coding processing including variable length coding processing. In the case where CABAC is used as the coding method, the N encoding engines 320 perform only code word binarization without performing arithmetic coding in variable length coding processing. This is because, in arithmetic coding processing by CABAC, the N encoding engines 320 have dependencies over a plurality of MB lines, which makes it impossible to realize parallel processing. Arithmetic coding processing not performed by the N encoding engines 320 is performed by the M stream combination units 330 described later. Note here that, even in the case where CABAC is used as the coding method, the N encoding engines 320 add dummy start code per slice and also insert an EPB (emulation prevention byte), to enable the stream combination units 330 at the subsequent stage to correctly recognize slices.

Data coded by the N encoding engines 320 in this way is stored in the segment stream buffer 362 as N segment streams.

The stream combination control unit 340 obtains mode information. According to the obtained mode information, the stream combination control unit 340 notifies each stream combination unit 330 of allocation control information for allocating stream combination processing on a predetermined unit basis, in order to make the M stream combination units 330 to be equal in stream combination processing amount. In this embodiment, it is assumed that the stream combination control unit 340 allocates stream combination processing to the M stream combination units 330 on a slice basis. That is, for each generation target slice to be included in a bit stream, the stream combination control unit 340 causes one of the M stream combination units 330 to execute stream combination processing for the slice, by notifying the allocation control information. For example, the allocation control information indicates a slice number for identifying the slice that is subject to stream combination processing. Moreover, based on the result of allocating stream combination processing to the M stream combination units 330 on a slice basis, the stream combination control unit 340 notifies the multiplexing unit 350 of selection information indicating from which of the M partial stream buffers 363 the multiplexing unit 350 is to obtain a partial stream.

Each of the M stream combination units 330 obtains the mode information and the allocation control information. According to the obtained mode information and allocation control information, each of the M stream combination units 330 extracts N segment streams (first to N-th segment streams) included in a slice to be processed from the segment stream buffer 362, and combines the extracted N segment streams to thereby reconstruct the slice as a predetermined unit. That is, the stream combination unit 330 in this embodiment segments, for each slice allocated by the stream combination control unit 340, each of the N segment streams constituting the slice into a plurality of MB lines. The stream combination unit 330 then assigns the plurality of MB lines sequentially to the generation target slice to combine the N segment streams into one stream, thereby reconstructing the slice. The process of reconstructing one slice (combined coding area) from a slice (partial area) that is included in each of the N segment streams generated by the N encoding engines 320 and corresponds to the original slice in the original image data is the above-mentioned stream combination processing. In the stream combination processing, in the case where a slice (partial area) is composed of a plurality of coded MB lines (structural units), the slice is segmented into the plurality of coded MB lines and the plurality of coded MB lines are re-combined together, that is, the plurality of coded MB lines are sequentially assigned to the generation target slice as described earlier, thereby generating the above-mentioned one slice (combined coding area). The M stream combination units 330 execute the stream combination processing in parallel. Hence, the M stream combination units 330 each generate a reconstructed slice as a partial stream.

Note that each of the M stream combination units 330 extracts the slice notified by the allocation control information, by searching each of the N segment streams stored in the segment stream buffer 362 for start code.

In the case where CABAC is used as the coding method, each of the M stream combination units 330 reconstructs the slice while performing arithmetic coding on the N segment streams.

The M stream combination units 330 store such reconstructed slices in the respective M partial stream buffers 363, as M partial streams (first to M-th partial streams). In detail, the first stream combination unit 330 stores the first partial stream in the first partial stream buffer 363, the second stream combination unit 330 stores the second partial stream in the second partial stream buffer 363, and the M-th stream combination unit 330 stores the M-th partial stream in the M-th partial stream buffer 363.

Upon generating the partial stream with the slice being treated as the predetermined unit, each of the M stream combination units 330 outputs the slice accompanied by header information such as an SPS, a PPS, and a slice header.

The multiplexing unit 350 obtains the mode information and the selection information. According to the obtained mode information and selection information, the multiplexing unit 350 reads each partial stream to be processed from any of the M partial stream buffers 363, and sequentially outputs the read partial streams, thereby multiplexing the M partial streams. Thus, the multiplexing unit 350 generates and outputs one bit stream.

For example, in the case of being notified to obtain the partial stream from the first partial stream buffer 363 by the selection information from the stream combination control unit 340, the multiplexing unit 350 reads the first partial stream from the first partial stream buffer 363. In the case of being notified to obtain the partial stream from the M-th partial stream buffer 363 by the selection information from the stream combination control unit 340, the multiplexing unit 350 reads the M-th partial stream from the M-th partial stream buffer 363. The multiplexing unit 350 multiplexes the partial streams read from the M partial stream buffers 363 in this way, and outputs the multiplexing result as a bit stream.

A characteristic feature of the image coding apparatus 300 in this embodiment lies in that the stream combination unit 330 segments a slice included in each of the N segment streams into a plurality of MB lines and combines the plurality of MB lines to reconstruct one new slice. The slice reconstruction involves slice header insertion processing, slice-end processing, skip run modification processing, and QP delta modification processing.

Figure 31:
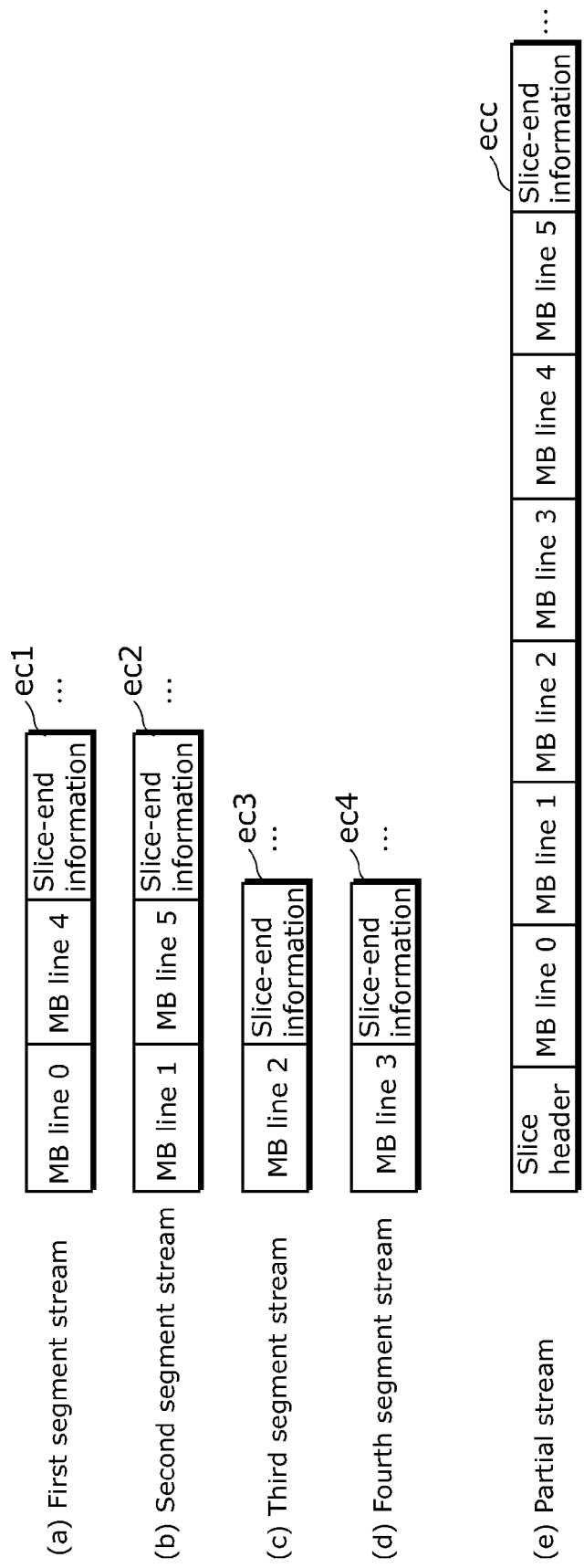
FIG. 31 is an illustration of slice header insertion processing and slice-end processing according to Embodiment 3 of the present invention.

FIG. 31 is an illustration of slice header insertion processing and slice-end processing.

An example where one slice is constructed from MB lines 0 to 5 of a picture and coded is shown in FIG. 31.

The N encoding engines 320 code different MB lines included in the slice, in parallel. Thus, the N encoding engines 320 each code data composed of one or more MB lines, as a single slice. In detail, the first encoding engine 320 codes data composed of the MB lines 0 and 4, as a single slice. The second encoding engine 320 codes data composed of the MB lines 1 and 5, as a single slice. The third encoding engine 320 codes data composed of the MB line 2, as a single slice. The fourth encoding engine 320 codes data composed of the MB line 3, as a single slice.

As shown in FIGS. 31(a) to 31(d), the slice included in the segment stream generated by each of the N encoding engines 320 as a result contains data of one or more MB lines and slice-end information. In detail, the first segment stream contains data of the MB lines 0 and 4 and slice-end information ec1. The second segment stream contains data of the MB lines 1 and 5 and slice-end information ec2. The third segment stream contains data of the MB line 2 and slice-end information ec3. The fourth segment stream contains data of the MB line 3 and slice-end information ec4.

The stream combination unit 330 combines the slices included respectively in the first to fourth segment streams to reconstruct a new slice, thus generating a partial stream (combined coding area).

In detail, the stream combination unit 330 provides an appropriate slice header for the new slice, and assigns it to the partial stream. Next, the stream combination unit 330 extracts the data of the MB line 0 from the first segment stream, and assigns the MB line 0 to the partial stream. The stream combination unit 330 also extracts the data of the MB line 1 from the second segment stream, and assigns the MB line 1 to the partial stream.

Following this, the stream combination unit 330 extracts the data of the MB line 2 from the third segment stream. Though the data of the MB line 2 is accompanied by the slice-end information ec3, the new slice to be reconstructed continues to the MB line 5, and accordingly the stream combination unit 330 removes the slice-end information ec3, and assigns the MB line 2 to the partial stream so that the slice continues after the MB line 2. Likewise, the stream combination unit 330 extracts the data of the MB line 3 and the slice-end information ec4 from the fourth segment stream, removes the slice-end information ec4, and assigns the MB line 3 to the partial stream so that the slice continues after the MB line 3. The stream combination unit 330 equally extracts the data of the MB line 4 and the slice-end information ec1 from the first segment stream, removes the slice-end information ec1, and assigns the MB line 4 to the partial stream so that the slice continues after the MB line 4.

Lastly, the stream combination unit 330 extracts the data of the MB line 5 and the slice-end information ec2 from the second segment stream. The stream combination unit 330 assigns the MB line 5 to the partial stream, removes the slice-end information ec2, generates appropriate slice-end information ecc for the reconstructed new slice, and assigns the slice-end information ecc to the partial stream.

Here, the appropriate slice-end information ecc for the reconstructed new slice is newly provided because there is a possibility that a bit position of the end of the new slice reconstructed by combining the MB lines is different from a bit position of the end of the slice in the original segment stream. The stream combination unit 330 sets the end of the slice at a byte boundary, by providing the appropriate slice-end information to the reconstructed new slice.

By performing appropriate slice header insertion and slice-end processing on the slice and combining MB line data extracted from each segment stream in this way, the stream combination unit 330 can reconstruct the slice in conformance with the format of the bit stream outputted from the image coding apparatus 300.

The following describes slice allocation processing by the stream combination control unit 340.

As mentioned above, the image coding apparatus 300 in this embodiment includes the N encoding engines 320 and the M stream combination units 330, and performs parallel coding processing on moving picture data (original image data). By enabling parallel processing in the whole system in this way, it is possible to achieve an improvement in performance of the whole coding processing.

Each of the M stream combination units 330 combines, as a predetermined unit, slices of segment streams respectively generated by the N encoding engines 320, to reconstruct a new slice. Here, since the size of each slice is not uniform, the processing amount varies between the M stream combination units 330 depending on the slice.

Even in a system where all slices are uniform in size, the target of processing is a bit stream, and so the processing amount depends on the amount of code of each slice. In a typical moving picture coding scheme, a bit stream is variable length coded, where the amount of code varies according to data. Besides, slices in H.264/AVC have types such as I slice, P slice, and B slice. There is a tendency that the I slice on which intra-picture coding is performed has a large amount of code whereas the P slice and the B slice on which not only intra-picture coding but also inter-picture coding is performed have a small amount of code. Thus, the amount of code of each coded slice included in a bit stream is not uniform but can vary widely. Accordingly, if slices of segment streams respectively generated by the N encoding engines 320 are simply allocated sequentially to the M stream combination units 330, the processing amount of each stream combination unit 330 is not equal, making it impossible to sufficiently achieve the advantageous effect of improving processing performance by parallelization.

In view of this, the stream combination control unit 340 allocates slices to the stream combination units 330 so that the processing amount of each stream combination unit 330 is equal.

Figure 32A:
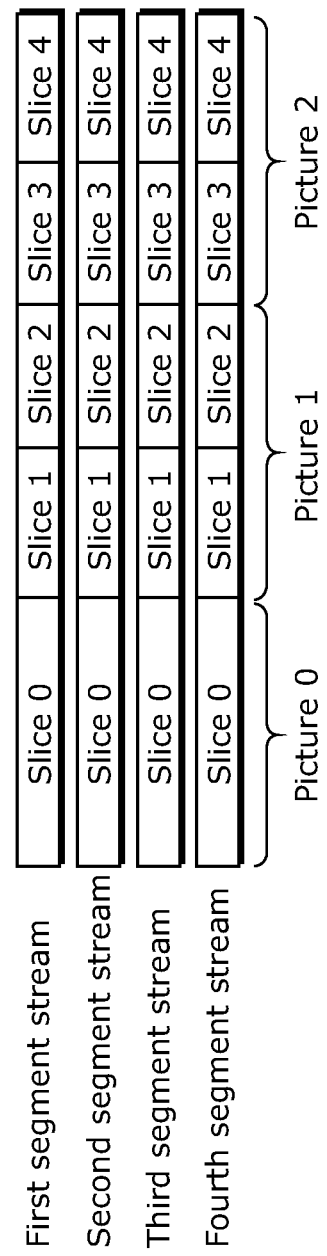
FIG. 32A is a diagram showing segment streams according to Embodiment 3 of the present invention.
Figure 32B:
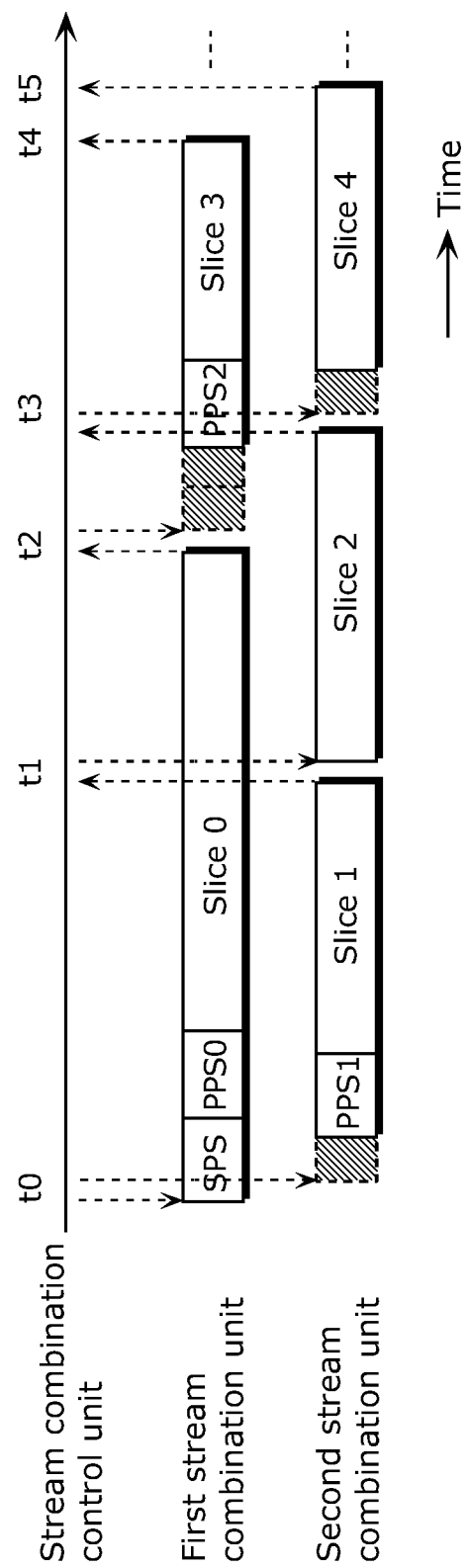
FIG. 32B is an illustration of a specific example of slice allocation processing by a stream combination control unit according to Embodiment 3 of the present invention.

Each of FIGS. 32A and 32B is an illustration of a specific example of slice allocation processing by the stream combination control unit 340. It is assumed in this embodiment that M=2, for simplicity's sake.

FIG. 32A is a diagram showing an example of N segment streams generated by the N encoding engines 320. The N segment streams (first to fourth segment streams) in this example are made up of slice data (slice) constituting each picture. A picture 0 is composed of only a slice 0. A picture 1 is composed of slices 1 and 2. A picture 2 is composed of slices 3 and 4.

FIG. 32B is a diagram showing processing of allocating the series of slices by the stream combination control unit 340. Upon processing start, each stream combination unit 330 holds a slice number of a slice to be processed. As an example, the first stream combination unit 330 holds SN1=0 as an initial value of a slice number of a slice to be processed, while the second stream combination unit 330 holds SN2=0 as an initial value of a slice number of a slice to be processed.

The stream combination control unit 340 notifies each stream combination unit 330 to reconstruct a slice by sending allocation control information, according to the processing state of the stream combination unit 330. The stream combination control unit 340 also instructs each stream combination unit 330 to add header information such as an SPS and a PPS as necessary.

Upon being notified to reconstruct a slice, the stream combination unit 330 reads a plurality of segment streams including the target slice from the segment stream buffer 362, segments each of the read plurality of segment streams into MB lines, and re-combines the MB lines while adding a slice header and the like, to reconstruct a new slice. This series of operations by the stream combination unit 330 is hereafter referred to as stream combination processing.

At time t0, the first stream combination unit 330 and the second stream combination unit 330 are both not engaged in stream combination processing, and accordingly the stream combination control unit 340 sends allocation control information to notify the first stream combination unit 330 to perform stream combination of the slice 0, instruct the first stream combination unit 330 to add an SPS that is to be present at the beginning of the stream, and also instruct the first stream combination unit 330 to add a PPS 0 that is to be present at the beginning of the picture 0. The stream combination control unit 340 also sends allocation control information to notify the second stream combination unit 330 to perform stream combination of the slice 1, and instruct the second stream combination unit 330 to add a PPS 1 that is to be present at the beginning of the picture 1. In this embodiment, the allocation control information indicates, for example, a slice number of a slice that is subject to stream combination processing and also indicates whether or not to add an SPS or a PPS.

Upon being notified to perform stream combination of the slice 0 from the stream combination control unit 340 by the allocation control information, the first stream combination unit 330 compares the slice number of the slice notified for stream combination, with the value of SN1 held as the slice number of the slice to be processed. At this time, both slice numbers are 0, i.e. the two slice numbers match each other, so that the first stream combination unit 330 performs stream combination processing on a slice inputted first.

In detail, the first stream combination unit 330 first generates and adds the SPS and the PPS 0. The first stream combination unit 330 then performs stream combination processing on the slice 0, and outputs the new slice 0 in the generated partial stream to the first partial stream buffer 363.

On the other hand, upon being notified to perform stream combination of the slice 1 from the stream combination control unit 340 by the allocation control information, the second stream combination unit 330 compares the slice number of the slice notified for stream combination, with the value of SN2 held as the slice number of the slice to be processed. At this time, the slice number of the slice notified for stream combination is 1 whereas the value of SN2 is 0, with there being a difference of 1. Accordingly, the second stream combination unit 330 skips processing for one inputted slice, and performs stream combination processing on a slice inputted second. That is, the second stream combination unit 330 skips stream combination processing for the number of slices corresponding to the difference.

In detail, the second stream combination unit 330 first skips stream combination processing on the inputted slice 0. Note that the stream combination processing skip is carried out by searching for start code that accompanies the segment stream. Having skipped the stream combination processing of the slice 0, the second stream combination unit 330 increments SN2 to SN2=1.

Following this, since the slice number of the slice notified for stream combination matches the value of SN2, the second stream combination unit 330 generates and adds the PPS 1, performs stream combination processing on the slice 1, and outputs the new slice 1 of the generated partial stream to the second partial stream buffer 363.

At time t1, the stream combination processing of the slice 1 by the second stream combination unit 330 ends, and accordingly the second stream combination unit 330 notifies the stream combination control unit 340 of the processing completion and also information of the partial stream outputted to the second partial stream buffer 363. In detail, the second stream combination unit 330 notifies the number of NAL units for the PPS 1 and the slice 1 actually outputted to the second partial stream buffer 363.

Here, the second stream combination unit 330 notifies the stream combination control unit 340 that two NAL units have been processed in total for the PPS1 and the slice 1. At the same time, having completed the stream combination processing of the slice 1, the second stream combination unit 330 increments SN2 to SN2=2. Upon being notified of the processing completion from the second stream combination unit 330, the stream combination control unit 340 notifies the second stream combination unit 330 to perform stream combination of the slice 2.

Upon being notified to perform stream combination of the slice 2 from the stream combination control unit 340, the second stream combination unit 330 compares the slice number of the slice notified for stream combination, with the value of SN2 held as the slice number of the slice to be processed. At this time, both slice numbers are 2, i.e. the two slice numbers match each other, so that the second stream combination unit 330 performs stream combination processing on a slice inputted first. In detail, the second stream combination unit 330 performs stream combination processing on the slice 2.

At time t2, the stream combination processing of the slice 0 by the first stream combination unit 330 ends, and accordingly the first stream combination unit 330 notifies the stream combination control unit 340 of the processing completion and also information of the partial stream outputted to the first partial stream buffer 363, namely, "3" as the number of NAL units for the SPS, the PPS 0, and the slice 0. At the same time, having completed the stream combination processing of the slice 0, the first stream combination unit 330 increments SN1 to SN1=1. Upon being notified of the processing completion from the first stream combination unit 330, the stream combination control unit 340 notifies the first stream combination unit 330 to perform stream combination of the slice 3, and also instructs the first stream combination unit 330 to add a PPS 2 that is to be present at the beginning of the picture 2.

Upon being notified to perform stream combination of the slice 3 from the stream combination control unit 340, the first stream combination unit 330 compares the slice number of the slice notified for stream combination, with the value of SN1 held as the slice number of the slice to be processed. At this time, the slice number of the slice notified for stream combination is 3 whereas the value of SN1 is 1, with there being a difference of 2. Accordingly, the first stream combination unit 330 skips processing for two inputted slices, and performs stream combination processing on a slice inputted third.

In detail, the first stream combination unit 330 first skips stream combination processing on the inputted slice 1. Having skipped the stream combination processing of the slice 1, the first stream combination unit 330 increments SN1 to SN1=2. Next, the slice 2 is inputted to the first stream combination unit 330. Since the slice number of the slice notified for stream combination still does not match the value of SN1, however, the first stream combination unit 330 skips processing on the inputted slice 2, too. Having skipped the processing of the slice 2, the first stream combination unit 330 increments SN1 to SN1=3.

Following this, since the slice number of the slice notified for stream combination matches the value of SN1, the first stream combination unit 330 generates and adds the PPS 2, performs stream combination processing on the slice 3, and outputs the new slice 3 of the generated partial stream to the first partial stream buffer 363.

At time t3, the stream combination processing of the slice 2 by the second stream combination unit 330 ends, and accordingly the second stream combination unit 330 notifies the stream combination control unit 340 of the processing completion and also information of the partial stream outputted to the second partial stream buffer 363, namely, "1" as the number of NAL units for the slice 2. At the same time, having completed the stream combination processing of the slice 2, the second stream combination unit 330 increments SN2 to SN2=3. Upon being notified of the processing completion from the second stream combination unit 330, the stream combination control unit 340 notifies the second stream combination unit 330 to perform stream combination of the slice 4.

Upon being notified to perform stream combination of the slice 4 from the stream combination control unit 340, the second stream combination unit 330 compares the slice number of the slice notified for stream combination, with the value of SN2 held as the slice number of the slice to be processed. At this time, the slice number of the slice notified for stream combination is 4 whereas the value of SN2 is 3, with there being a difference of 1. Accordingly, the second stream combination unit 330 skips processing for one inputted slice, and performs stream combination processing on a slice inputted second.

In detail, the second stream combination unit 330 first skips processing on the inputted slice 3. Having skipped the processing of the slice 3, the second stream combination unit 330 increments SN2 to SN2=4.

Next, since the slice number of the slice notified for stream combination matches the value of SN2, the second stream combination unit 330 performs stream combination processing on the slice 4, and outputs the new slice 4 of the generated partial stream to the second partial stream buffer 363.

At time t4, the stream combination processing of the slice 3 by the first stream combination unit 330 ends, and accordingly the first stream combination unit 330 notifies the stream combination control unit 340 of the processing completion and also information of the partial stream outputted to the first partial stream buffer 363, namely, "2" as the number of NAL units for the PPS2 and the slice 3. At the same time, having completed the stream combination processing of the slice 3, the first stream combination unit 330 increments SN1 to SN1=4.

Likewise, at time t5, the stream combination processing of the slice 4 by the second stream combination unit 330 ends, and accordingly the second stream combination unit 330 notifies the stream combination control unit 340 of the processing completion and also information of the partial stream outputted to the second partial stream buffer 363, namely, "1" as the number of NAL units for the slice 4. At the same time, having completed the stream combination processing of the slice 4, the second stream combination unit 330 increments SN2 to SN2=5.

As described above, the stream combination control unit 340 sequentially allocates stream combination processing of slices to the stream combination units 330 that have completed processing. This enables the stream combination units 330 to be equal in processing amount.

Figure 33:
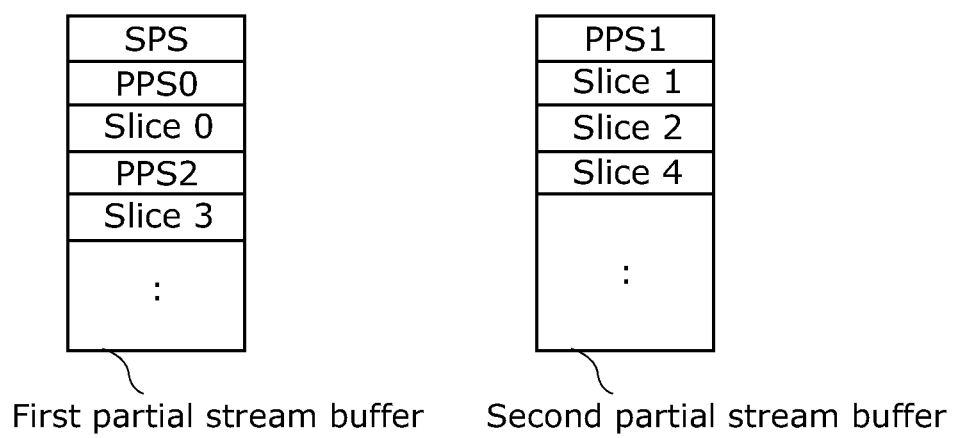
FIG. 33 is a diagram showing states of partial stream buffers in the case of performing slice allocation by the stream combination control unit and stream combination processing according to Embodiment 3 of the present invention.

FIG. 33 is a diagram showing states of the partial stream buffers 363 in the case of performing slice allocation and stream combination processing shown in FIG. 32B.

A partial stream corresponding to the slices 0 and 3 is stored in the first partial stream buffer 363. Meanwhile, a partial stream corresponding to the slices 1, 2, and 4 is stored in the second partial stream buffer 363. Thus, the slices are stored in the two partial stream buffers 363 in a distributed manner according to the processing amount of each stream combination unit 330, and so the storage order of the slices is not uniform.

Accordingly, to enable the multiplexing unit 350 to obtain the partial stream in the same order of slices as in the segment streams prior to stream combination processing, the stream combination control unit 340 notifies the multiplexing unit 350 of selection information indicating from which of the M partial stream buffers 363 the partial stream is to be obtained.

FIG. 34 is a diagram showing an example of a format of selection information in the case of performing slice allocation and stream combination processing shown in FIG. 32B.

As shown in FIG. 34, the selection information includes partial stream buffer information and NAL unit number information for each slice, and is generated each time the stream combination control unit 340 performs slice allocation processing. The partial stream buffer information indicates whether the stream combination control unit 340 allocates the slice to the first stream combination unit 330 or the second stream combination unit 330. That is, the partial stream buffer information indicates the partial stream buffer in which the new slice (the partial stream including the new slice) generated as a result of stream combination processing by the stream combination unit 330 is stored. The NAL unit number information indicates the number of NAL units outputted when the stream combination unit 330 processes the slice, and is notified from the stream combination unit 330 to the stream combination control unit 340 upon completion of the processing by the stream combination unit 330.

The selection information generated by the stream combination control unit 340 is notified to the multiplexing unit 350 and stored in, for example, a FIFO (first-in first-out) memory in the multiplexing unit 350. The selection information stored in the FIFO memory is read by the multiplexing unit 350 in notification order, and used for stream obtainment from the partial stream buffers 363.

In detail, the multiplexing unit 350 first reads the partial stream buffer information=1 and the NAL unit number information=3, as the selection information of the slice 0. According to the selection information of the slice 0, the multiplexing unit 350 obtains three NAL units (the SPS, the PPS 0, and the slice 0) from the first partial stream buffer 363. The multiplexing unit 350 then reads the partial stream buffer information=2 and the NAL unit number information=2, as the selection information of the slice 1. According to the selection information of the slice 1, the multiplexing unit 350 obtains two NAL units (the PPS 1 and the slice 1) from the second partial stream buffer 363. The multiplexing unit 350 then reads the partial stream buffer information=2 and the NAL unit number information=1, as the selection information of the slice 2. According to the selection information of the slice 2, the multiplexing unit 350 obtains one NAL unit (the slice 2) from the second partial stream buffer 363. The multiplexing unit 350 then reads the partial stream buffer information=1 and the NAL unit number information=2, as the selection information of the slice 3. According to the selection information of the slice 3, the multiplexing unit 350 obtains two NAL units (the PPS 2 and the slice 3) from the first partial stream buffer 363. The multiplexing unit 350 then reads the partial stream buffer information=2 and the NAL unit number information=1, as the selection information of the slice 4. According to the selection information of the slice 4, the multiplexing unit 350 obtains one NAL unit (the slice 4) from the second partial stream buffer 363.

Thus, through the use of the selection information notified from the stream combination control unit 340, the multiplexing unit 350 can obtain the partial streams (the slices of the partial streams) from the M partial stream buffers 363 in the same order of slices as in the segment streams generated by the N encoding engines 320.

Note that the slice allocation processing described with reference to FIGS. 32A to 34 is merely one processing operation example of the image coding apparatus 300 according to the present invention, and the present invention is not limited to the processing operation described here.

For example, though the stream combination control unit 340 designates the slice number when notifying the stream combination unit 330 to perform stream combination of the slice in FIG. 32B, the stream combination control unit 340 may designate the number of slices to be skipped, instead of the slice number. In this case, the stream combination control unit 340 keeps a record of the number of slices allocated to each of the M stream combination units 330 and, based on this information, calculates the number of slices to be skipped. Moreover, though the stream combination unit 330 notifies the stream combination control unit 340 of the processing completion and the number of NAL units outputted to the partial stream buffer 363 at the end of the stream combination processing of the slice by the stream combination unit 330 in FIG. 32B, the stream combination unit 330 may notify the number of bits of the partial stream outputted to the partial stream buffer 363, instead of the number of NAL units outputted to the partial stream buffer 363. That is, the stream combination unit 330 may notify any information that enables the multiplexing unit 350 to determine the size of the partial stream to be obtained from the partial stream buffer 363.

Moreover, though the partial stream buffer information directly designates the buffer number of the partial stream buffer 363 in FIG. 34, information other than the buffer number may instead be used. For example, in the case where M=2, the partial stream buffer information may be information indicating whether or not the partial stream buffer 363 storing the partial stream corresponding to the slice as the processing target is the same as the partial stream buffer 363 storing the partial stream corresponding to the immediately preceding slice. That is, the partial stream buffer information may be any information that enables the multiplexing unit 350 to appropriately obtain the partial streams from the plurality of partial stream buffers 363. Moreover, though the selection information includes the NAL unit number information in FIG. 34 as an example, the selection information may include information indicating the number of bits of the partial stream instead of the NAL unit number information, as mentioned above.

The following describes a structure and an operation of the stream combination unit 330 in detail.

Figure 35:
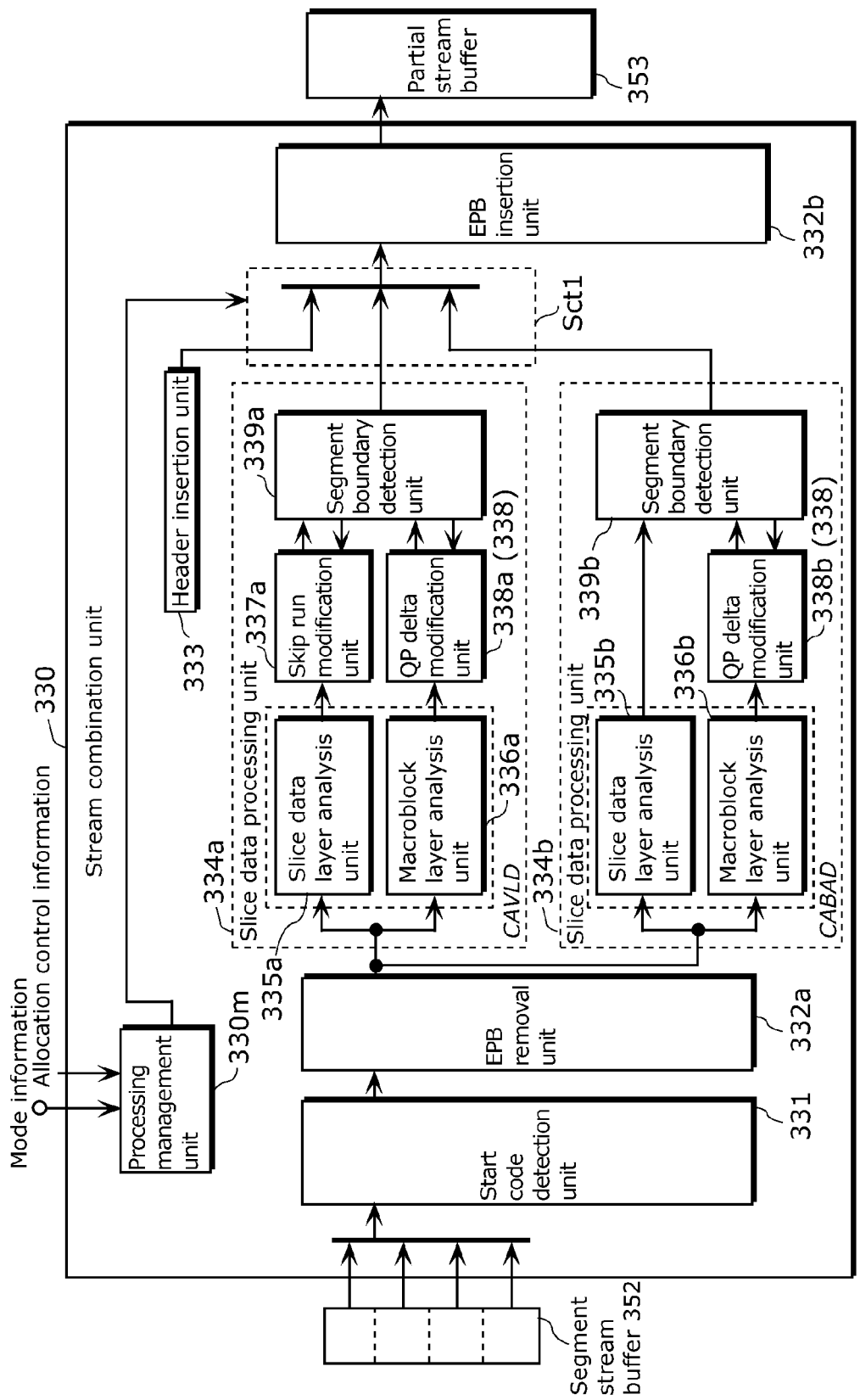
FIG. 35 is a block diagram showing a structure of a stream combination unit according to Embodiment 3 of the present invention.

FIG. 35 is a block diagram showing the structure of the stream combination unit 330.

The stream combination unit 330 includes a processing management unit 330m, a selector Sct1, a start code detection unit 331, an EPB removal unit 332a, an EPB insertion unit 332b, a header insertion unit 333, and slice data processing units 334a and 334b.

The processing management unit 330m obtains mode information and allocation control information and, according to the obtained information, controls the other components included in the stream combination unit 330. For example, the processing management unit 330m holds the slice number (such as SN1, SN2, or the like) of the slice to be processed and controls the selector Sct1 based on the slice number so that the stream combination processing as shown in FIGS. 32A to 34 is carried out. Thus, the processing management unit 330m causes the new slice (the partial stream including the new slice) reconstructed from the SPS, the PPS, or the processing target slice to be outputted or not to be outputted.

The start code detection unit 331 reads any of the N segment streams from the segment stream buffer 352, and detects start code to thereby recognize the slice.

The EPB removal unit 332a removes an EPB (emulation prevention byte) from the segment stream, and outputs the segment stream from which the EPB has been removed, to the slice data processing units 334a and 334b.

The EPB insertion unit 332b inserts the EPB removed by the EPB removal unit 332a, into the partial stream generated by combining the segment streams.

The header insertion unit 333 generates header information such as an SPS, a PPS, or a slice header, and outputs the header information to the EPB insertion unit 332b.

The slice data processing units 334a and 334b each reconstruct slice data by combining the N segment streams from which the EPB has been removed, and output the reconstructed slice data. Here, the slice data processing unit 334a executes processing in accordance with CAVLD (Context-Adaptive Variable Length Decoding), and combines the N segment streams generated by CAVLC (Context-Adaptive Variable Length Coding) to generate the partial stream. Meanwhile, the slice data processing unit 334b executes processing in accordance with CABAD (Context-Adaptive Binary Arithmetic Decoding), and combines the N segment streams generated by CABAC (Context-Adaptive Binary Arithmetic Coding) to generate the partial stream.

The slice data processing unit 334a includes a slice data layer analysis unit 335a, a macroblock layer analysis unit 336a, a skip run modification unit 337a, a QP delta modification unit 338a, and a segment boundary detection unit 339a.

The slice data layer analysis unit 335a analyzes coded data in the slice data layer included in the segment stream, and extracts information necessary for stream combination processing. The macroblock layer analysis unit 336a analyzes coded data in the macroblock layer included in the segment stream, and extracts information necessary for stream combination processing.

The skip run modification unit 337a modifies MB skip run information "mb_skip_run" extracted by the slice data layer analysis unit 335a, re-codes the modified MB skip run information, and outputs the re-coded MB skip run information. That is, in the case where the MB skip run information indicates the number of consecutive blocks which cross the boundary between at least two consecutive slice portions in the segment stream, the skip run modification unit 337a segments the number of consecutive blocks to modify the MB skip run information so as to indicate the number of blocks in each slice portion, and sets the modified MB skip run information in the segment stream to which each of the at least two consecutive slice portions is assigned. Moreover, in the case where a plurality of blocks corresponding to a plurality of pieces of MB skip run information set in the partial stream generated by combining the segment streams are consecutive in the partial stream, the skip run modification unit 337a converts the plurality of pieces of MB skip run information to one piece of MB skip run information indicating a total sum of the numbers indicated by the plurality of pieces of MB skip run information.

Here, the MB skip run information is an example of a first code word indicating the number of the consecutive blocks in the case where blocks of a particular kind are consecutive in a slice in a coded picture. In detail, the MB skip run information indicates the number of macroblocks consecutively skipped.

For example, in the case where a set of macroblocks which are consecutively skipped crosses the boundary between a plurality of MB lines in a slice in the segment stream, the MB skip run information extracted by the slice data layer analysis unit 335a indicates the number of consecutive skipped macroblocks included in the set. In such a case, when the N segment streams are segmented into MB lines and the MB lines included in the N segment streams are sequentially assigned to one partial stream, the number of consecutive skipped macroblocks changes in the partial stream. In other words, the dependency between the MB lines based on the MB skip run information is broken.

To prevent this, the skip run modification unit 337a specifies, for each MB line including a portion of the above-mentioned set, the number of consecutive skipped macroblocks that constitute the portion included in the MB line. The skip run modification unit 337a then modifies, for each MB line, the MB skip run information to indicate the number of macroblocks specified for the MB line.

The QP delta modification unit 338a modifies, for each macroblock, a QP variation "mb_qp_delta" of the macroblock extracted by the macroblock layer analysis unit 336a, re-codes the modified QP variation, and outputs the re-coded QP variation. That is, in the case where the QP variation indicates a variation between blocks which cross the boundary between two MB lines, the QP delta modification unit 338a calculates a variation in coding coefficient based on a new context of the blocks in the partial stream. The QP delta modification unit 338a then modifies the QP variation to the calculated variation.

Here, the QP variation is an example of a second code word indicating a variation in coding coefficient between consecutive blocks in a slice in a coded picture. In detail, the QP variation is included in a macroblock (target macroblock), and indicates a difference value between a QP value of the target macroblock and a QP value of a macroblock located immediately before the target macroblock.

That is, when the N segment streams are segmented into MB lines and the MB lines included in the N segment streams are sequentially assigned to one partial stream, consecutive macroblocks that cross the boundary between MB lines are assigned to separate positions in the partial stream. As a result, a decoder that decodes a bit stream including the generated partial stream cannot derive the QP value of the target macroblock from the QP variation of the target macroblock. In other words, the dependency between the MB lines based on the QP variation is broken.

To prevent this, the QP delta modification unit 338a re-calculates, for each macroblock, the QP variation of the macroblock (target macroblock) based on the new context of macroblocks in the partial stream.

The segment boundary detection unit 339a segments the segment streams into MB lines, and combines the MB lines to generate the partial stream. In detail, the segment boundary detection unit 339a detects MB line boundaries in the segment streams based on the information extracted by the slice data layer analysis unit 335a and the macroblock layer analysis unit 336a, and switches, for each MB line boundary, the segment stream read from the segment stream buffer 352 by the stream combination unit 330, to combine the N segment streams on an MB line basis. The segment boundary detection unit 339a also includes, in the partial stream, the MB skip run information obtained from the skip run modification unit 337a and the QP variation obtained from the QP delta modification unit 338a.

The segment boundary detection unit 339a further detects and removes slice-end information included in the inputted segment stream, and adds appropriate slice-end information to the slice reconstructed by combining the segment streams and assigns it to the partial stream.

The slice data processing unit 334b includes a slice data layer analysis unit 335b, a macroblock layer analysis unit 336b, a QP delta modification unit 338b, and a segment boundary detection unit 339b.

The slice data layer analysis unit 335b analyzes coded data in the slice data layer included in the segment stream, and extracts information necessary for stream combination processing. The macroblock layer analysis unit 336b analyzes coded data (binary data) in the macroblock layer included in the segment stream, and extracts information necessary for stream combination processing.

The QP delta modification unit 338b modifies, for each macroblock, a QP variation "mb_qp_delta" of the macroblock extracted by the macroblock layer analysis unit 336b, re-codes the modified QP variation, and outputs the re-coded QP variation, as with the above-mentioned QP delta modification unit 338a.

The segment boundary detection unit 339b segments the segment streams into MB lines, and combines the MB lines to generate the partial stream, as with the segment boundary detection unit 339a. Here, the segment boundary detection unit 339b includes, in each segment stream, the QP variation obtained from the QP delta modification unit 338b. The segment boundary detection unit 339b also detects and removes slice-end information included in the inputted segment stream, and adds appropriate slice-end information to the slice reconstructed by combining the segment streams and assigns it to the partial stream. The segment boundary detection unit 339b further performs arithmetic coding on the binary data included in the segment stream.

The following describes an operation of the skip run modification unit 337a in detail.

As mentioned earlier, the skip run modification unit 337a modifies "mb_skip_run" which is MB skip run information. The MB skip run information is a code word included in a bit stream in the case where the coding method is CAVLC, and indicates the number of consecutive skipped macroblocks (hereafter also referred to as "length"). In the following description, the length of the MB skip run information means the number of consecutive skipped macroblocks indicated by the MB skip run information.

Figure 36:
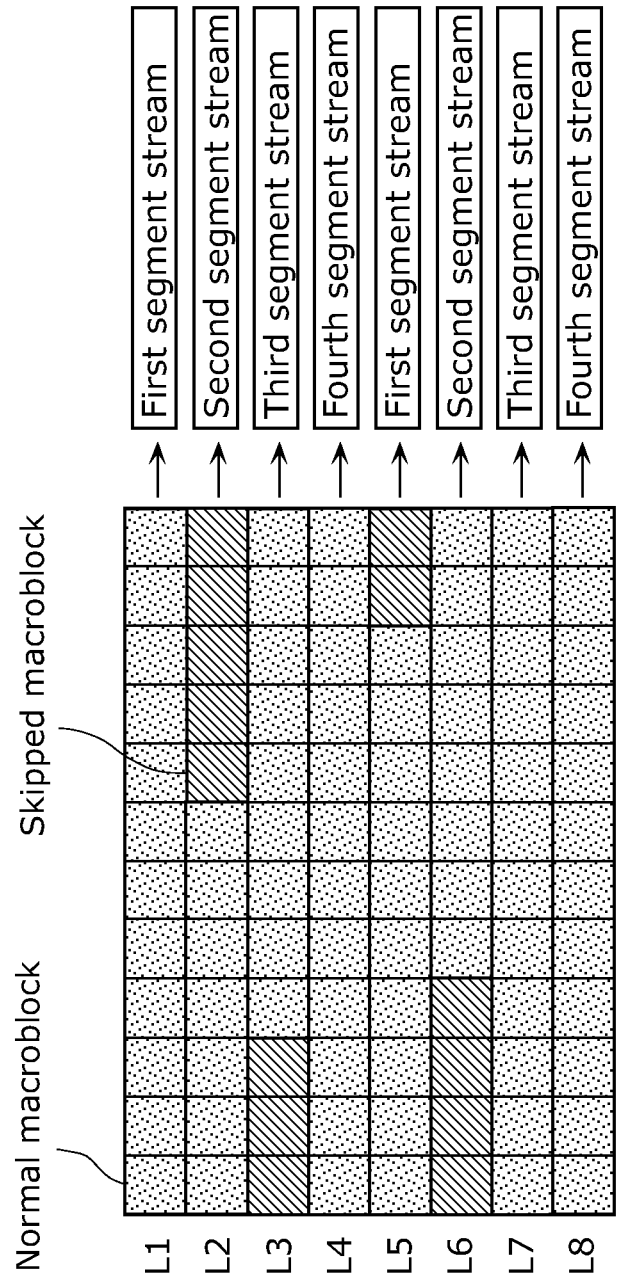
FIG. 36 is an illustration of MB skip run information modification processing according to Embodiment 3 of the present invention.

FIG. 36 is an illustration of MB skip run information modification processing.

FIG. 36 shows a picture coded by the N encoding engines 320 so that five consecutive skipped macroblocks are located at the end of the MB line L2, three consecutive skipped macroblocks are located at the beginning of the MB line L3, two consecutive skipped macroblocks are located at the end of the MB line L5, and four consecutive skipped macroblocks are located at the beginning of the MB line L6. In the segment streams including such a coded picture, MB skip run information of 2 in length indicating the number of consecutive skipped macroblocks at the end of the MB line L5 is coded in the first segment stream, MB skip run information of 9 (5+4=9) in length indicating the number of consecutive skipped macroblocks which cross the boundary between the MB lines L2 and L6 is coded in the second segment stream, and MB skip run information of 3 in length indicating the number of consecutive skipped macroblocks at the beginning of the MB line L3 is coded in the third segment stream. Meanwhile, no MB skip run information is coded in the fourth segment stream.

This being the case, when the N segment streams are segmented into MB lines and the MB lines are combined as one stream, the number of consecutive skipped macroblocks changes in the combined stream. In other words, the dependency between the plurality of MB lines based on the MB skip run information indicating the number of consecutive skipped macroblocks which cross the boundary between the plurality of MB lines is broken.

That is, in the combined stream, eight consecutive skipped macroblocks cross the boundary between the MB lines L2 and L3, and six consecutive skipped macroblocks cross the boundary between the MB lines L5 to L6, but there is no other skipped macroblock.

Thus, though the MB skip run information included in the segment streams are the MB skip run information of 2 in length in the first segment stream, the MB skip run information of 9 in length in the second segment stream, and the MB skip run information of 3 in length in the third segment stream, it is necessary to output MB skip run information of 8 in length and MB skip run information of 6 in length in the combined stream. That is, in the case where there is a dependency between a plurality of MB lines based on MB skip run information indicating the number of consecutive skipped macroblocks which cross the boundary between the plurality of MB lines in each segment stream, the MB skip run information needs to be modified so that the dependency is changed to a new dependency based on the context of MB lines in the combined stream.

Hence, in the case where a set of skipped macroblocks corresponding to the MB skip run information extracted by the slice data layer analysis unit 335a crosses the boundary between a plurality of MB lines in one segment stream, the skip run modification unit 337a segments the MB skip run information at the boundary of the MB lines. Here, segmenting the MB skip run information at the boundary of the MB lines means to segment the number of consecutive skipped macroblocks which cross the boundary between the MB lines in one segment stream, and generate a plurality of pieces of MB skip run information that each indicate the number of skipped macroblocks for a different one of the MB lines.

In the case of the picture shown in FIG. 36, the skip run modification unit 337a segments the MB skip run information corresponding to the set of nine skipped macroblocks which cross the boundary between the MB lines L2 and L6 in the second segment stream, into MB skip run information corresponding to the set of five skipped macroblocks included in the MB line L2 and MB skip run information corresponding to the set of four skipped macroblocks included in the MB line L6.

Next, the skip run modification unit 337a re-combines, among the segmented pieces of MB skip run information, a plurality of pieces of MB skip run information corresponding to a set of consecutive skipped macroblocks in the combined stream. Here, re-combining the plurality of pieces of MB skip run information means to convert the plurality of pieces of MB skip run information to one piece of MB skip run information indicating a total sum of the numbers indicated by the plurality of pieces of MB skip run information.

In the case of the picture shown in FIG. 36, among the sets of skipped macroblocks corresponding to the segmented MB skip run information, the set of skipped macroblocks of 5 in length included in the MB line L2 and the set of skipped macroblocks of 3 in length included in the MB line L3 are consecutive in the combined stream. Accordingly, the skip run modification unit 337a combines the two pieces of MB skip run information respectively corresponding to these two sets of skipped macroblocks, into MB skip run information of 8 in length. In addition, the set of skipped macroblocks of 2 in length included in the MB line L5 and the set of skipped macroblocks of 4 in length included in the MB line L6 are consecutive in the combined stream. Accordingly, the skip run modification unit 337a combines the two pieces of MB skip run information respectively corresponding to these two sets of skipped macroblocks, into MB skip run information of 6 in length.

Lastly, the skip run modification unit 337a re-codes the thus obtained MB skip run information, and outputs the re-coded MB skip run information.

As described above, the skip run modification unit 337a can output the MB skip run information of the appropriate length for the combined stream, by segmenting the inputted MB skip run information at the MB line boundary and then re-combining the MB skip run information as necessary.

Here, the skip run modification unit 337a re-combines the consecutive pieces of MB skip run information in the combined stream as necessary without leaving them in a segmented state, because H.264/AVC does not allow a plurality of pieces of MB skip run information to be present consecutively. That is, H.264/AVC does not allow the number of consecutive skipped macroblocks to be represented using a plurality of pieces of MB skip run information. The skip run modification unit 337a accordingly combines the plurality of pieces of MB skip run information. Since the skip run modification unit 337a modifies the MB skip run information in conformance with H.264/AVC in this way, the combined stream generated as a result is also in conformance with H.264/AVC.

The above describes an example where the skip run modification unit 337a performs MB skip run information segmentation and re-combination in the case where MB skip run information extends over a plurality of MB lines in each segment stream. Even in the case where MB skip run information does not extend over a plurality of MB lines in each segment stream, however, when MB skip run information extends over a plurality of MB lines in the combined stream, the skip run modification unit 337a does not perform MB skip run information segmentation but performs only MB skip run information re-combination.

The following describes operations of the QP delta modification units 338a and 338b in detail. In the following, the QP delta modification units 338a and 338b are not differentiated from each other but collectively referred to as a QP delta modification unit 338 when describing functions and processing operations common to the QP delta modification units 338a and 338b.

The QP delta modification unit 338 modifies a QP variation "mb_qp_delta" that is in principle provided for each macroblock.

Figure 37A:
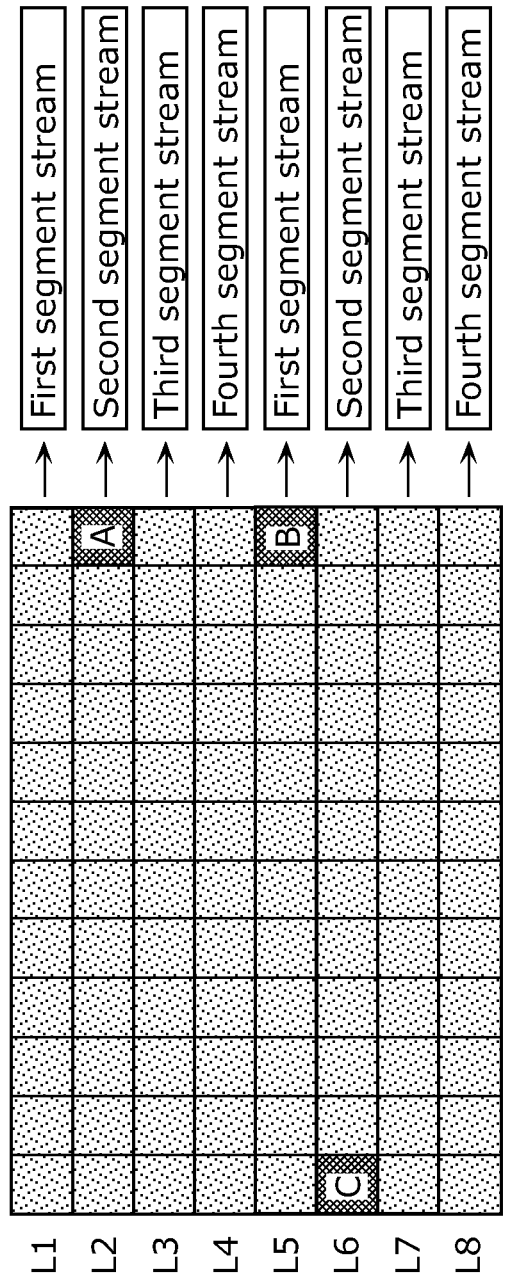
FIG. 37A is an illustration of QP variation modification processing according to Embodiment 3 of the present invention.
Figure 37B:
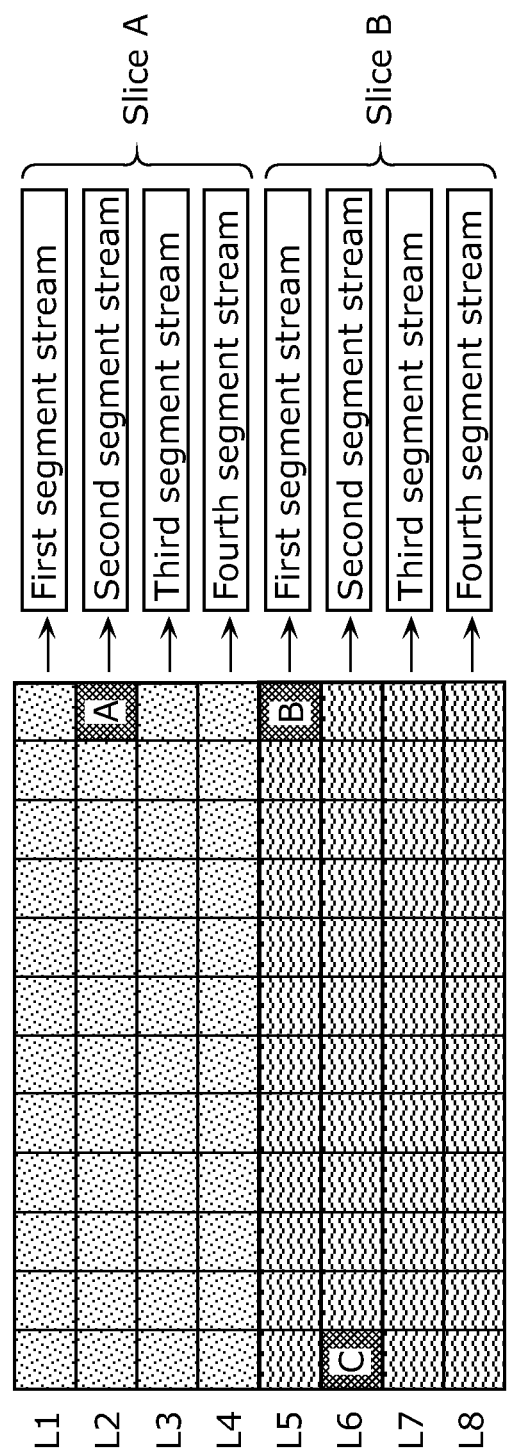
FIG. 37B is an illustration of QP variation modification processing according to Embodiment 3 of the present invention.

Each of FIGS. 37A and 37B is an illustration of QP variation modification processing.

Take, for example, a macroblock C in a picture shown in FIG. 37A. A macroblock processed immediately before the macroblock C in the second segment stream is a macroblock A. Accordingly, in the macroblock C, a difference value between a QP value of the macroblock A and a QP value of the macroblock C is coded as a QP variation.

However, when such segment streams are segmented into MB lines and the MB lines are combined together and assigned to one stream, the context of macroblocks at MB line boundaries changes in the combined stream.

That is, after the stream combination, the macroblock immediately preceding the macroblock C is a macroblock B. In the case where a decoder decodes a bit stream coded in this way, the QP value of the macroblock C cannot be correctly decoded because the QP variation which is the difference value between the QP value of the macroblock A and the QP value of the macroblock C is reflected on a QP value of the macroblock B. In other words, the dependency between two MB lines based on the QP variation indicating the variation between macroblocks which cross the boundary between the two MB lines is broken.

To prevent this, the QP delta modification unit 338 modifies the QP variation so as to correct the change in context of macroblocks caused by the stream combination. That is, in the case where there is a dependency between two MB lines based on a QP variation indicating a variation between macroblocks which cross the boundary between the two MB lines in one segment stream, the QP delta modification unit 338 modifies the QP variation so that the dependency is changed to a new dependency based on the context of MB lines in the combined stream.

As the QP variation modification method, there is a method of decoding (reconstructing) QP values of all macroblocks and then re-calculating QP variations based on the new context of macroblocks after stream combination. This method, however, requires two processes that are QP value decoding and QP variation calculation, causing an increase in processing amount of the QP delta modification unit 338.

In view of this, in this embodiment, the QP delta modification unit 338 accumulates, for each segment stream, QP variations of macroblocks that are not assigned to the target segment stream, and subtracts the accumulated QP variations, to thereby directly derive modified QP variations without decoding QP values. The QP variation accumulation is performed according to Expression (3).

As a specific example, the modification processing of the QP variation of the macroblock C in the picture shown in FIG. 37A is described below. As mentioned earlier, the macroblock immediately preceding the macroblock C in the combined stream is the macroblock B. Hence, the difference value between the QP value of the macroblock B and the QP value of the macroblock C needs to be included in the macroblock C as the QP variation.

Accordingly, the QP delta modification unit 338 accumulates QP variations of all macroblocks included in the MB lines L3 to L5. By accumulating the QP variations of all macroblocks between the macroblock A and the macroblock C in this way, it is possible to obtain a correction value for deriving the QP variation which is the difference value between the QP value of the macroblock B and the QP value of the macroblock C.

Next, the QP delta modification unit 338 subtracts the accumulated QP variation from the QP variation of the macroblock C to derive the QP variation which is the difference value between the QP value of the macroblock B and the QP value of the macroblock C, according to Expression (5) below.

$$\text{mb\_qp\_delta} = (\text{mb\_qp\_delta} - \text{acc\_mb\_qp\_delta} + 52) \% 52 \quad (5)$$

Here, "mb_qp_delta" denotes the QP variation of the macroblock C, and "acc_mb_qp_delta" denotes the accumulated QP variation of all macroblocks included in the MB lines L3 to L5.

The QP variation obtained here is a value in a range of 0 to 51 because it is derived according to Expression (5). However, the actual QP variation "mb_qp_delta" is a value ranging from −26 to +25. The QP delta modification unit 338 accordingly modifies the QP variation "mb_qp_delta" to be in a range of −26 to +25, according to Expression (6) below.

$$\text{When mb\_qp\_delta} > 25: \text{mb\_qp\_delta} = \text{mb\_qp\_delta} - 52$$

$$\text{When mb\_qp\_delta } 25: \text{mb\_qp\_delta} = \text{mb\_qp\_delta} \quad (6)$$

The QP variation of the macroblock C is modified in the above manner.

Though the macroblock C is used as an example here, the same processing is performed on starting macroblocks of all MB lines. For instance, for a lower macroblock adjacent to the macroblock C, QP variations of all macroblocks in the MB lines L4 to L6 are accumulated, and the accumulated QP variation is subtracted from the QP variation of the macroblock, to derive the modified QP variation. This processing is performed independently for each MB line.

Each of the N encoding engines 320, upon coding a starting macroblock of each MB line, codes the starting macroblock so as to include a QP variation. Note that a macroblock with no QP variation in H.264/AVC is (1) a skipped macroblock, (2) a non-compressed macroblock (I_PCM), or (3) a macroblock whose intra-prediction mode is not "Intra 16×16" and whose "coded_block_pattern" is 0 (that is, no non-zero coefficient is included). Thus, the QP variation of the starting macroblock of each MB line can be correctly modified.

In the case where no QP variation is included in any of the macroblocks in the corresponding MB line, the QP variation accumulation is continued until the macroblock that is subject to QP variation modification appears.

Lastly, the QP delta modification unit 338 re-codes the modified QP variation obtained in this way, and outputs the re-coded modified QP variation to the segment boundary detection unit 339a or 339b. Here, the QP delta modification unit 338a performs coding according to CAVLC, whereas the QP delta modification unit 338b performs coding according to CABAC.

As described above, the QP delta modification unit 338 can set the appropriate QP variation for the combined stream, by modifying the inputted QP variation based on the context of macroblocks in the combined stream.

FIG. 37B shows an example where slices are separated at the boundary of the MB lines 4 and 5. In this example, the MB lines L1 to L4 are included in a slice A, while the MB lines L5 to L8 are included in a slice B.

In such a case, the macroblock A and the macroblock C are consecutive in the second segment stream, as in FIG. 37A. However, the macroblock A and the macroblock C are included in the different slices, and thus there is no dependency between the macroblock A and macroblock C. In the second segment stream, the macroblock C is the starting macroblock of the slice B. Accordingly, the QP variation of the macroblock C indicates the difference value between the QP value of the macroblock C and the slice QP value of the slice B.

This being so, the QP delta modification unit 338 can calculate the QP difference value between the macroblock B and the macroblock C, by accumulating the QP variations of the macroblocks included in the slice B from among the macroblocks between the macroblock A and the macroblock C and subtracting the accumulated QP variation.

In detail, the QP delta modification unit 338 accumulates the QP variations of all macroblocks between the macroblock A and the macroblock C but, upon start of processing of the starting macroblock of the slice B, resets the accumulated QP variation "acc_mb_qp_delta" to 0. This enables only the QP variations of the macroblocks included in the slice B to be accumulated, with it being possible to correctly calculate the modified QP variation of the macroblock C.

The QP delta modification unit 338 re-codes the modified QP variation obtained in this way, and outputs the re-coded modified QP variation to the segment boundary detection unit 339a or 339b.

Thus, in the image coding apparatus 300 in this embodiment, a picture is segmented into a plurality of MB lines (structural units), and each of the plurality of MB lines is assigned to and coded by a corresponding one of the N encoding engines 320. This enables the N encoding engines 320 to equally share the load of coding processing, with it being possible to appropriately execute parallel coding processing. For example, even in the case where an H.264/AVC picture is composed of one slice, the picture is segmented into a plurality of MB lines, so that the load of coding the slice is not placed on one encoding engine 320 but equally shared by the N encoding engines 320.

Here, when a picture is coded independently by the N encoding engines 320, there is a possibility that a slice which originally extends over more than one MB line in one picture is segmented into a plurality of slice portions and these slice portions are assigned to different segment streams. In such a case, the whole slice in the coded picture is not included in one segment stream. Instead, a slice portion group made up of one or more slice portions which are segments of the slice is included in each segment stream.

There is also an instance where a plurality of MB lines have a dependency based on a predetermined code word included in a bit stream. For example, in H.264/AVC, there may be a dependency between a plurality of MB lines based on MB skip run information "mb_skip_run" or a QP variation "mb_qp_delta". When such a bit stream is segmented into a plurality of MB lines and the plurality of MB lines are assigned to different segment streams, the dependency between the MB lines cannot be correctly maintained.

In view of this, in this embodiment, the stream combination unit 330 combines the N segment streams to reconstruct the new slice. As a result, the image coding apparatus 300 can generate a bit stream in conformance with H.264/AVC. According to this embodiment, there is no need to provide each of the N encoding engines 320 with a function or a structure for special processing, so that the whole structure of the image coding apparatus 300 can be simplified.

Moreover, in the image coding apparatus 300 in this embodiment, while the above-mentioned stream combination processing is performed by the M stream combination units 330, the stream combination control unit 340 allocates the stream combination processing to the M stream combination units 330 on a slice basis so that the M stream combination units 330 are equal in processing amount. Such a structure enables the M stream combination units 330 to equally share the load of stream combination processing, so that parallel coding processing can be achieved in the whole system.

Though this embodiment describes the case where the encoder 310 includes the M stream combination units 330, the encoder 310 may include only one stream combination unit 330.

Figure 38A:
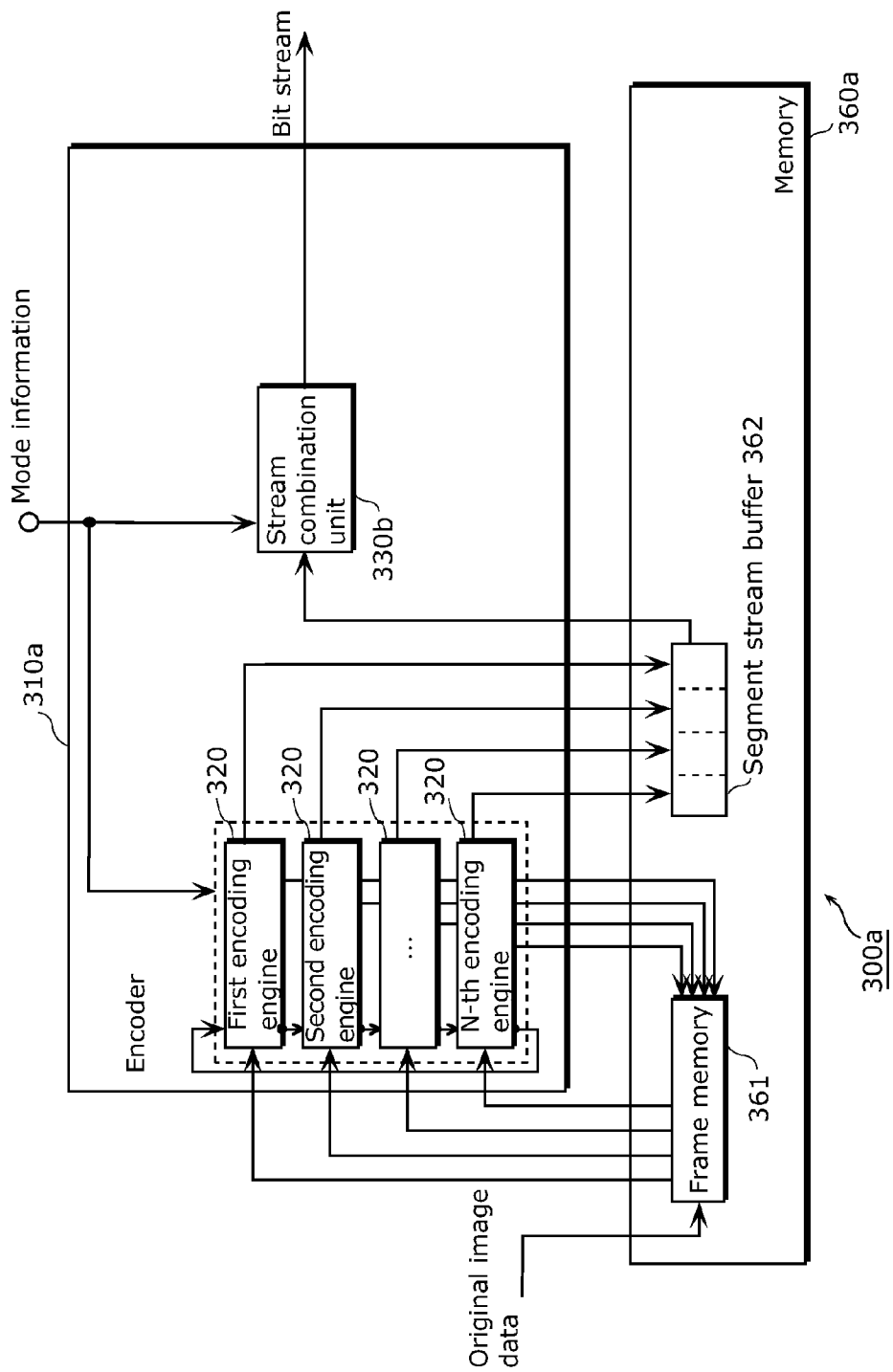
FIG. 38A is a block diagram showing a structure of an image coding apparatus that includes only one stream combination unit according to Embodiment 3 of the present invention.

FIG. 38A is a block diagram showing a structure of an image coding apparatus including only one stream combination unit.

An image coding apparatus 300a shown in FIG. 38A includes an encoder 310a and a memory 360a. The memory 360a includes the frame memory 361 and the segment stream buffer 362 as with the memory 360 described above, but does not include the partial stream buffers 363. The encoder 310a includes the N encoding engines 320 as with the encoder 310 described above, but includes one stream combination unit 330b instead of the M stream combination units 330.

The stream combination unit 330b serially performs stream combination processing which the M stream combination units 330 perform in parallel. In detail, when a plurality of slices are included in each of the N segment streams outputted from the N encoding engines 320, the stream combination unit 330b sequentially performs stream combination processing in the order of the slices. For example, when slices 0, 1, 2, . . . , n are included in each of the N segment streams, the stream combination unit 330b performs stream combination processing of combining a plurality of slices 0 included in the N segment streams, then performs stream combination processing of combining a plurality of slices 1 included in the N segment streams, and then performs stream combination processing of combining a plurality of slices 2 included in the N segment streams. The stream combination unit 330b lastly performs stream combination processing of combining a plurality of slices n included in the N segment streams. Note that the stream combination processing performed by the stream combination unit 330b is the same as the above-mentioned processing performed by the stream combination unit 330.

The stream combination unit 330b sequentially outputs new slices (reconstructed slices) generated by the stream combination processing performed in sequence in the above manner. Thus, the stream combination unit 330b outputs a bit stream.

That is, the image coding apparatus 300a is an image coding apparatus that generates a bit stream by coding image data, the image coding apparatus including: N coding units (encoding engines 320) that generate N (N is an integer equal to or greater than 2) segment streams by coding, for each picture included in the image data, a plurality of structural units included in the picture in parallel; and a stream combination unit (330b) that executes, for each processing area included in the bit stream, combination processing of combining partial areas that are respectively included in the N segment streams and correspond to the processing target area to generate a combined coding area which is the processing target area, wherein the stream combination unit: in the case where the partial areas are composed of a plurality of coded structural units when executing the combination processing, generates the combined coding area by segmenting the partial areas into the plurality of coded structural units and recombining the plurality of coded structural units; and in the case where a slice included in the image data is segmented into a plurality of slice portions and coded and the plurality of coded slice portions are assigned to the N segment streams when performing the recombination, reconstructs a slice portion group made up of the plurality of coded slice portions as a new slice in the combined coding area.

For example, the structural unit is a macroblock line or the like, the processing target area is a slice in a bit stream or the like, and the partial area is a slice in a segment stream or the like.

Figure 38B:
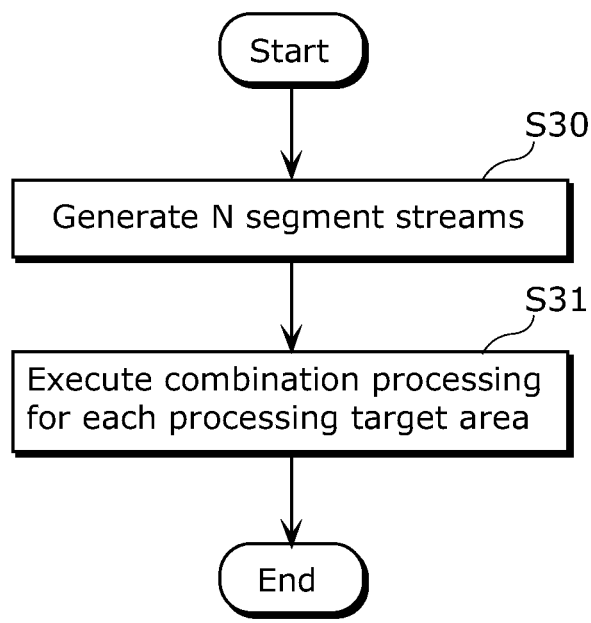
FIG. 38B is a flowchart showing an operation of the image coding apparatus that includes only one stream combination unit according to Embodiment 3 of the present invention.

FIG. 38B is a flowchart showing an operation of the image coding apparatus 300a.

First, the N encoding engines 320 in the image coding apparatus 300a generate N (N is an integer equal to or greater than 2) segment streams by coding, for each picture included in the image data, a plurality of structural units included in the picture in parallel (Step S30). Next, the stream combination unit 330b executes, for each processing area included in the bit stream, combination processing of combining partial areas that are respectively included in the N segment streams and correspond to the processing target area to generate a combined coding area which is the processing target area (Step S31). In Step S31, in the case where the partial areas are composed of a plurality of coded structural units when executing the combination processing, the stream combination unit 330b generates the combined coding area by segmenting the partial areas into the plurality of coded structural units and recombining the plurality of coded structural units. Moreover, in the case where a slice included in the image data is segmented into a plurality of slice portions and coded and the plurality of coded slice portions are assigned to the N segment streams when performing the recombination, the stream combination unit 330b reconstructs a slice portion group made up of the plurality of coded slice portions as a new slice in the combined coding area.

Thus, even in the case where there is only one stream combination unit, when the speed of stream combination processing by the stream combination unit is equal to or higher than the speed of parallel coding processing by the N encoding engines 320, sufficiently high coding processing performance by parallel coding processing can be exhibited. Hence, the image coding apparatus can be simplified in structure. Besides, the components such as the stream combination control unit 340, the multiplexing unit 350, and the M partial stream buffers 363 are unnecessary, so that the whole structure and processing of the image coding apparatus can be simplified.

The following describes an application example of the image decoding apparatus according to each of Embodiments 1 and 2.

Figure 39:
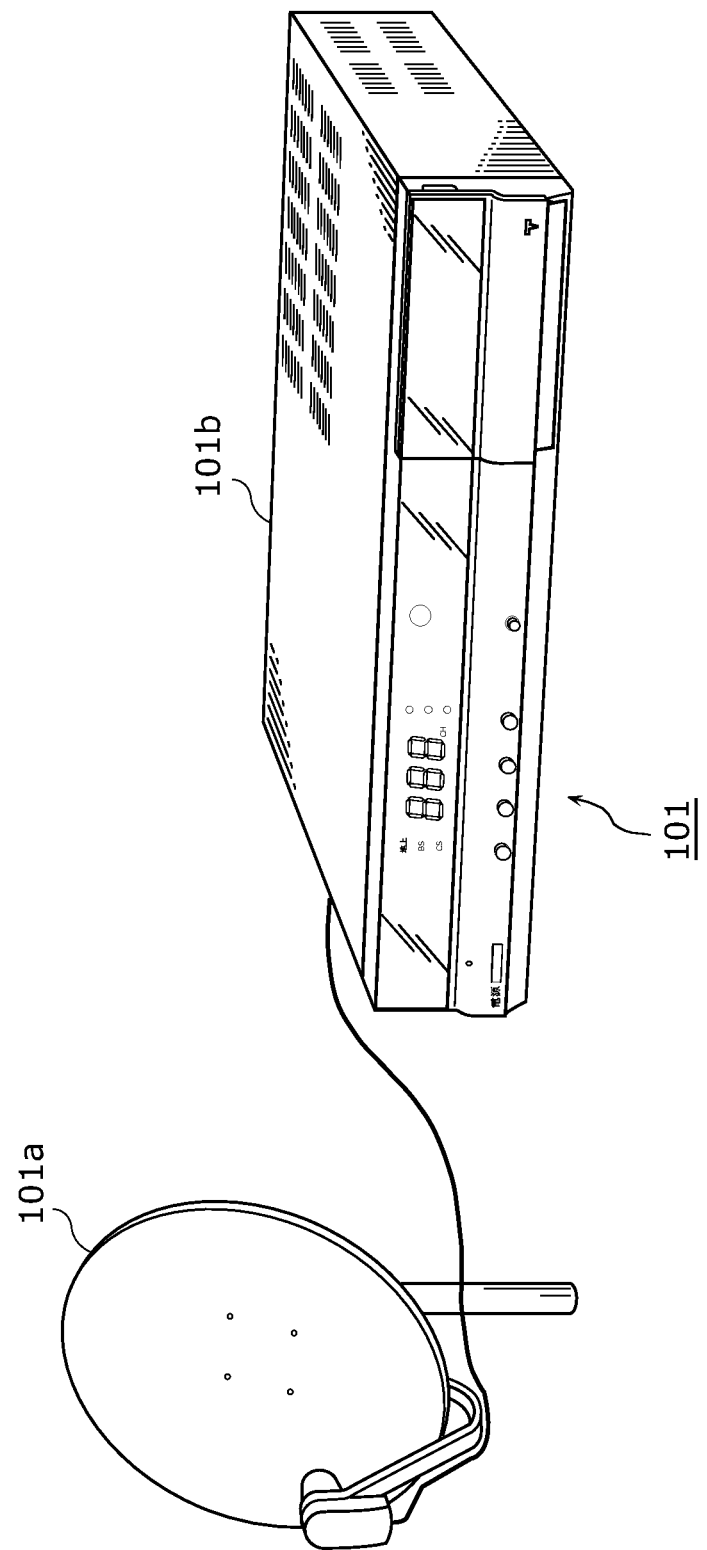
FIG. 39 is a diagram showing an application example of an image decoding apparatus and an image coding apparatus according to the present invention.

FIG. 39 is a diagram showing an application example of the image decoding apparatus according to each of Embodiments 1 and 2 and the image coding apparatus according to Embodiment 3.

For example, as shown in FIG. 39, the image decoding apparatus and the image coding apparatus are provided in a reproduction and recording apparatus 101 that receives a broadcast wave and reproduces and records a bit stream included in the broadcast wave. The reproduction and recording apparatus 101 includes an antenna 101a that receives a broadcast wave of BS digital broadcasting, and an apparatus body 101b that includes the image decoding apparatus and the image coding apparatus.

The image decoding apparatus in the apparatus body 101b extracts, for example, a 4k2k bit stream from the broadcast wave received by the antenna 101a. The image decoding apparatus segments the extracted bit stream to generate N segment streams, and decodes the N segment streams in parallel, as described above.

The image coding apparatus in the apparatus body 101b re-codes, in parallel, 4k2k pictures decoded by the image decoding apparatus, and records the re-coded pictures to a storage medium included in the apparatus body 101b.

Though the image decoding apparatus and the image decoding method according to the present invention have been described above by way of the embodiments, the present invention is not limited to such. Other embodiments realized by applying modifications conceivable by those skilled in the art to the embodiments or combining the components in the different embodiments are also included in the present invention without departing from the scope of the present invention.

For example, though the above embodiments describe the case where the image decoding apparatus 100 or 200 includes the segment stream buffers 152 and the like, the image decoding apparatus 100 or 200 may not necessarily include them.

Figure 40:
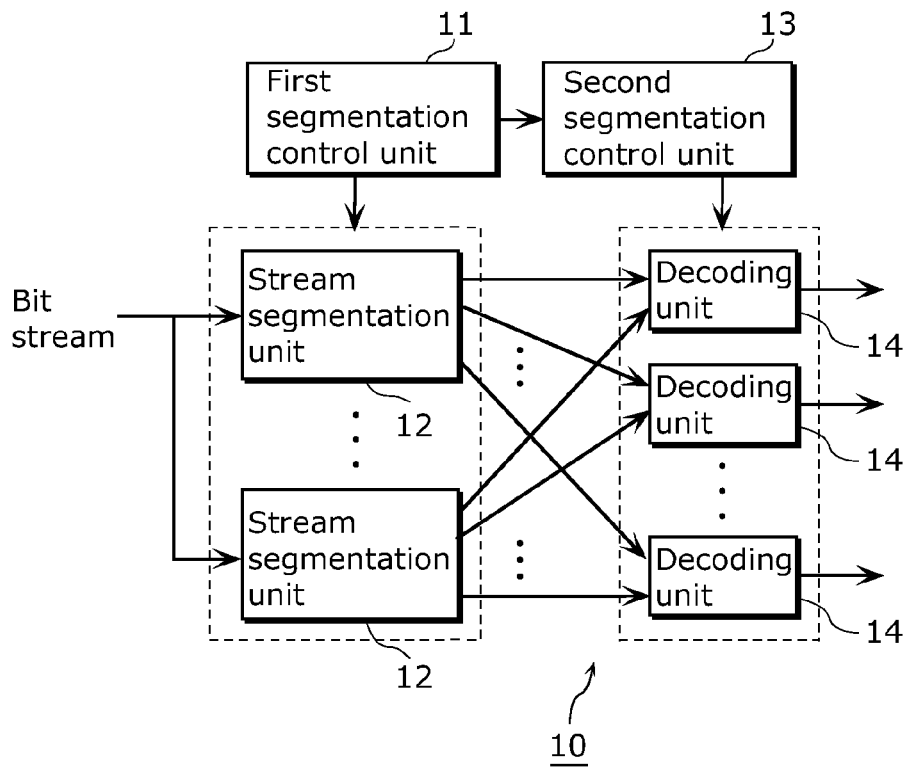
FIG. 40 is a block diagram showing a minimum structure of the image decoding apparatus according to the present invention.

FIG. 40 is a block diagram showing a minimum structure of an image decoding apparatus according to the present invention.

An image decoding apparatus 10 is an apparatus that decodes a bit stream generated by coding image data, and has a minimum structure for implementing the present invention. The image decoding apparatus 10 includes a first segmentation control unit 11, M stream segmentation units 12, a second segmentation control unit 13, and N decoding units 14. A component including the first segmentation control unit 11 and the second segmentation control unit 13 corresponds to the stream segmentation control unit 140 in Embodiment 1 or 2. The M stream segmentation units 12 correspond to the M stream segmentation units 130 in Embodiment 1 or the M stream segmentation units 230 in Embodiment 2. The N decoding units 14 correspond to the N decoding engines 120 in Embodiment 1 or the N decoding engines 220 in Embodiment 2.

The first segmentation control unit 11 designates a processing target area (for example, a slice, a picture, and the like) included in the bit stream. That is, the first segmentation control unit 11 sends allocation control information indicating the processing target area. Each of the M stream segmentation units 12 executes, each time a processing target area is designated to the stream segmentation unit 12 by the first segmentation control unit 11, stream segmentation processing of generating at least a portion of N (N is an integer equal to or greater than 2) segment streams from the processing target area. Here, the M stream segmentation units 12 generate M×N segment streams by executing the stream segmentation processing in parallel on M (M is an integer equal to or greater than 2) processing target areas designated by the first segmentation control unit 11.

The second segmentation control unit 13 selects, for each processing target area designated by the first segmentation control unit 11, a portion of each of at least one segment stream from the M×N segment streams generated by the M stream segmentation units 12, based on a position of the processing target area in the bit stream. The position mentioned here is, for example, a position in arrangement order of the processing target area in the bit stream. The selection of a portion of each of at least one segment stream from the M×N segment streams corresponds to the selection of one segment stream buffer 152 from the M segment stream buffers 152 in Embodiment 1 or 2. The N decoding units 14 decode respective portions of the N segment streams in parallel, the portions of the N segment streams including the portion of each of the at least one segment stream selected by the second segmentation control unit 13.

Here, each of the M stream segmentation units 12 executes the stream segmentation processing, by segmenting the processing target area into a plurality of structural units (for example, macroblock lines) and assigning each of the plurality of structural units to a portion of a corresponding one of the N segment streams to be generated. In the case where a slice included in the processing target area is segmented into a plurality of slice portions and the plurality of slice portions are assigned to a plurality of segment streams as a result of segmenting the processing target area into the plurality of structural units, each of the M stream segmentation units 12 reconstructs, for each of the plurality of segment streams, a slice portion group made up of one or more slice portions assigned to the segment stream, as a new slice.

Figure 41:
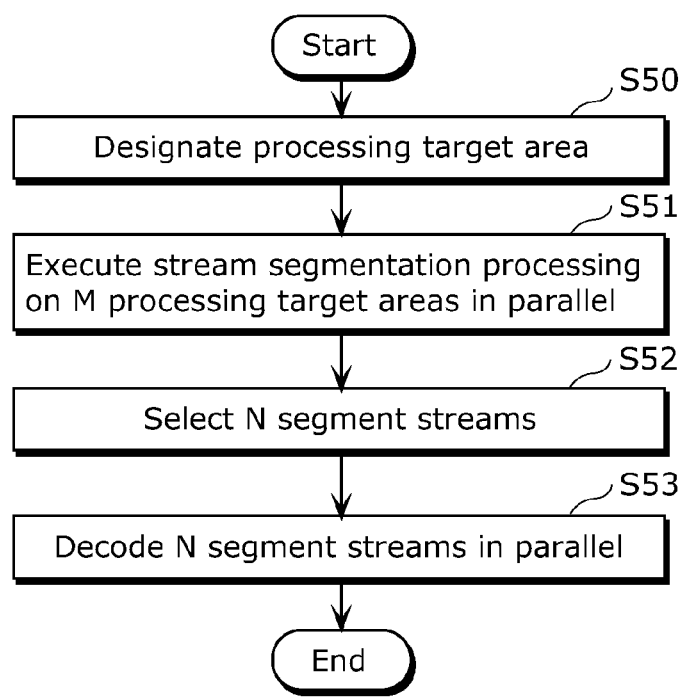
FIG. 41 is a flowchart showing an image decoding method by the image decoding apparatus according to the present invention.

FIG. 41 is a flowchart showing an image decoding method by the image decoding apparatus 10.

This image decoding method is a method whereby the image decoding apparatus 10 decodes a bit stream, and includes: a first segmentation control step S50 of designating a processing target area included in the bit stream; a stream segmentation step S51 of generating M×N segment streams by executing stream segmentation processing in parallel on M (M is an integer equal to or greater than 2) processing target areas designated in the first segmentation control step S51, the stream segmentation processing being a process of generating at least a portion of N (N is an integer equal to or greater than 2) segment streams from a processing target area each time the processing target area is designated in the first segmentation control step S50; a second segmentation control step S52 of selecting, for each processing target area designated in the first segmentation control step S50, a portion of each of at least one segment stream from the M×N segment streams generated in the stream segmentation step S51, based on a position of the processing target area in the bit stream; and a decoding step S53 of decoding, each time the portion of each of the at least one segment stream is selected in the second segmentation control step S52, respective portions of the N segment streams in parallel, the portions of the N segment streams including the portion of each of the at least one segment stream. In the stream segmentation step S51, the stream segmentation processing is executed by segmenting the processing target area into a plurality of structural units and assigning each of the plurality of structural units to a portion of a corresponding one of the N segment streams to be generated. Moreover, in the case where a slice included in the processing target area is segmented into a plurality of slice portions and the plurality of slice portions are assigned to a plurality of segment streams as a result of segmenting the processing target area into the plurality of structural units, for each of the plurality of segment streams, a slice portion group made up of one or more slice portions assigned to the segment stream is reconstructed as a new slice.

In the image decoding apparatus 10 and the image decoding method described above, a processing target area such as a coded picture or slice is segmented into a plurality of structural units such as macroblock lines, and each of the plurality of macroblock lines is assigned to and decoded by a corresponding one of the N decoding units as a portion of a segment stream. This enables the N decoding units to equally share the load of decoding processing, with it being possible to appropriately execute parallel decoding processing. For example, even in the case where an H.264/AVC coded picture is composed of one slice, the coded picture is segmented into a plurality of macroblock lines, so that the load of decoding one slice is not placed on one decoding unit but equally shared by the N decoding units.

When a coded picture is segmented into a plurality of macroblock lines, there is a possibility that a slice extending over a plurality of macroblock lines is segmented into a plurality of slice portions and these slice portions are assigned to different segment streams. In such a case, the whole slice in the coded picture is not included in one segment stream. Instead, a slice portion group made up of one or more slice portions which are segments of the slice is included in each segment stream. There is also a possibility that such a slice portion group does not have a header indicating the beginning of the slice portion group and end information indicating the end of the slice portion group. Besides, there is an instance where, among the plurality of slice portions, at least two slice portions consecutive in the bit stream have a dependency based on a predetermined code word included in the bit stream.

Accordingly, in the image decoding apparatus 10 and the image decoding method, the slice portion group is reconstructed as a new slice. Hence, each decoding unit 14 that decodes the segment stream including the slice portion group can easily recognize the slice portion group as a new slice to appropriately decode the slice portion group, without requiring special processing for recognizing the slice portion group to appropriately decode the slice portion group. That is, in the image decoding apparatus 10 and the image decoding method, there is no need to provide each of the N decoding units 14 with a function or a structure for such special processing. Since conventional decoding circuits can be used as the decoding units 14 for decoding the segment streams, the whole structure of the image decoding apparatus can be simplified.

The stream segmentation processing mentioned here is executed in parallel by the M stream segmentation units 12 on a slice basis as an example, which alleviates the load of stream segmentation processing in each stream segmentation unit 12. Moreover, the first segmentation control unit 11 controls the M stream segmentation units 12 to be equal in processing amount. This being so, even in the case where the processing amount of stream segmentation processing varies from one slice to another, the load of stream segmentation processing can be equally shared by the M stream segmentation units 12.

Besides, the stream segmentation processing is executed on the M processing target areas in parallel. Therefore, in the case where the bit stream has a large amount of data, the number of decoding units can be increased to increase the number of operations performed in parallel, thereby increasing the processing speed. In addition, the number of stream segmentation units can be increased, too, thereby increasing the processing speed.

In the image decoding apparatus 10 and the image decoding method, the M processing target areas are designated to the M stream segmentation units 12. That is, the stream segmentation processing of segmenting a processing target area into a plurality of structural units (for example, macroblock lines) is allocated to each of the M stream segmentation units 12. This leads to a situation where the order of a plurality of processing target areas included in the bit stream cannot be maintained in the M×N segment streams generated by the M stream segmentation units 12, making it impossible to simply decode the M×N segment streams. In view of this, in the image decoding apparatus 10 and the image decoding method, for each designated processing target area, a portion of each of at least one segment stream is selected from the M×N segment streams generated by the M stream segmentation units 12, based on the position of the processing target area, i.e. the position in decoding order of the processing target area in the bit stream or the like. Respective portions of N segment streams including the selected portion are decoded in parallel. As a result, the M×N segment streams can be decoded in the correct order. Furthermore, in the image decoding apparatus 10 and the image decoding method, the designation of the processing target areas and the selection of the portions of the segment streams are performed in a centralized manner by a component other than the M stream segmentation units 12 and the N decoding units 14. No special processing or structure is required of each component such as the M stream segmentation units 12 and the N decoding units 14, in order to decode the M×N segment streams in the correct order as mentioned above. Hence, parallel decoding processing can be appropriately executed by a simple structure.

Therefore, the image decoding apparatus 10 and the image decoding method can produce the above-mentioned distinct advantageous effects of the present invention and achieve the above-mentioned objects of the present invention, without a need for the segment stream buffer 152 and the like in the above embodiments.

Figure 42:
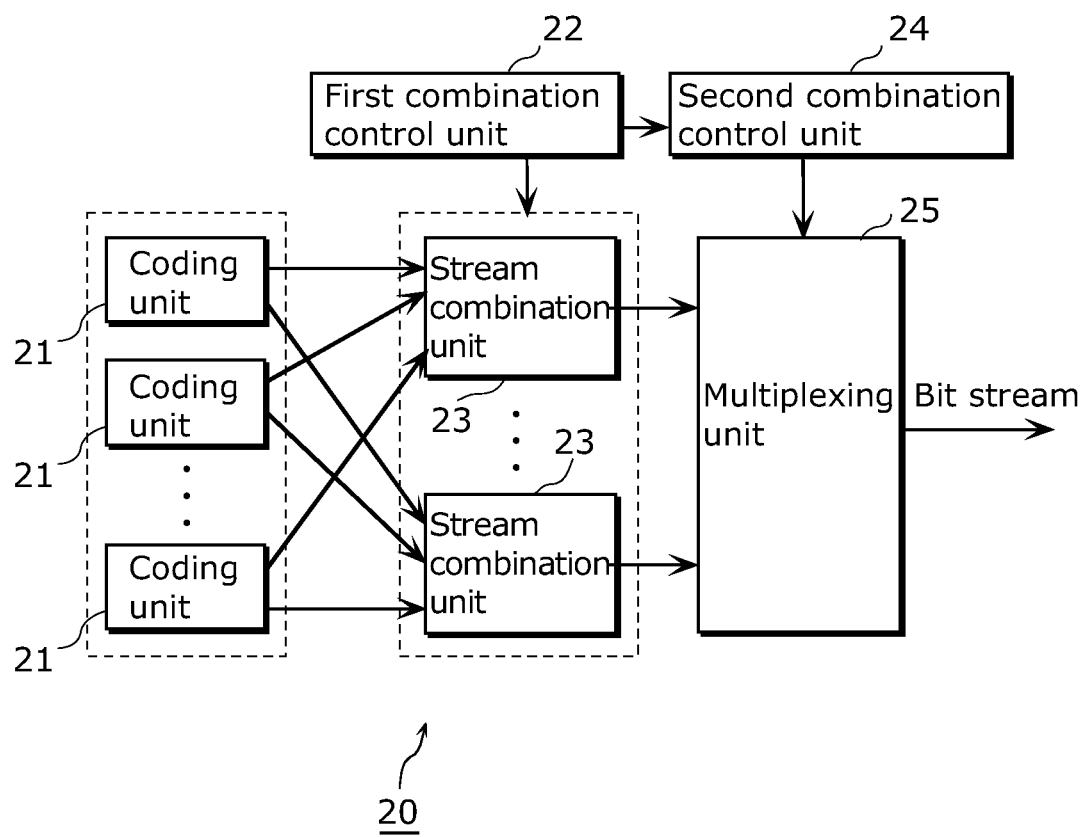
FIG. 42 is a block diagram showing a minimum structure of the image coding apparatus according to the present invention.

FIG. 42 is a block diagram showing a minimum structure of an image coding apparatus according to the present invention.

An image coding apparatus 20 is an apparatus that generates a bit stream by coding image data, and has a minimum structure for implementing the present invention. The image coding apparatus 20 includes N coding units 21, a first combination control unit 22, M stream combination units 23, a second combination control unit 24, and a multiplexing unit 25. A component including the first combination control unit 22 and the second combination control unit 24 corresponds to the stream combination control unit 340 in Embodiment 3. The N coding units 21 correspond to the N encoding engines 320 in Embodiment 3. The M stream combination units 23 correspond to the M stream combination units 330 in Embodiment 3. The multiplexing unit 25 corresponds to the multiplexing unit 350 in Embodiment 3.

The N coding units 21 generate N (N is an integer equal to or greater than 2) segment streams by coding, for each picture included in the image data, N structural units (for example, macroblock lines or the like) included in the picture in parallel.

The first combination control unit 22 designates a processing target area (for example, a slice, a picture, and the like) included in the bit stream. That is, the first combination control unit 22 sends allocation control information indicating the processing target area.

The M stream combination units 23 execute combination processing in parallel on M processing target areas designated by the first combination control unit 22, the combination processing being a process of combining partial areas that are respectively included in the N segment streams and correspond to a processing target area to generate a combined coding area which is the processing target area. That is, the M stream combination units 23 execute the combination processing (stream combination processing) in parallel. The partial areas mentioned here are areas segmented from the processing target area. The partial areas corresponding to the processing target area are included respectively in the N segment streams by the N coding units 21. The partial areas are combined into one combined coding area by the combination processing. For example, in the case where the processing target area is a slice, the slice is segmented into a plurality of slice portions by the N coding units 21, and a new slice is reconstructed as a combined coding area by the combination processing. The stream combination unit 23 sequentially generates combined coding areas (slices), thereby generating and outputting a partial stream including the combined coding areas.

The second combination control unit 24 sequentially selects, from M combined coding areas generated by the M stream combination units 23, combined coding areas to be multiplexed, based on positions, in the bit stream, of the M processing target areas designated by the first combination control unit 22. For example, the selection result is notified to the multiplexing unit 25 as selection information, as in Embodiment 3.

The multiplexing unit 25 generates the bit stream by multiplexing the M combined coding areas in order in which the combined coding areas are selected by the second combination control unit 24.

Here, in the case where the partial areas are composed of a plurality of coded structural units (for example, macroblock lines or the like) when executing the combination processing, each of the M stream combination units 23 generates the combined coding area by segmenting the partial areas into the plurality of coded structural units and recombining the plurality of coded structural units. In the case where a slice included in the image data is segmented into a plurality of slice portions and coded and the plurality of coded slice portions are assigned to the N segment streams when performing the recombination, each of the M stream combination units 23 reconstructs a slice portion group made up of the plurality of coded slice portions as a new slice in the combined coding area.

Figure 43:
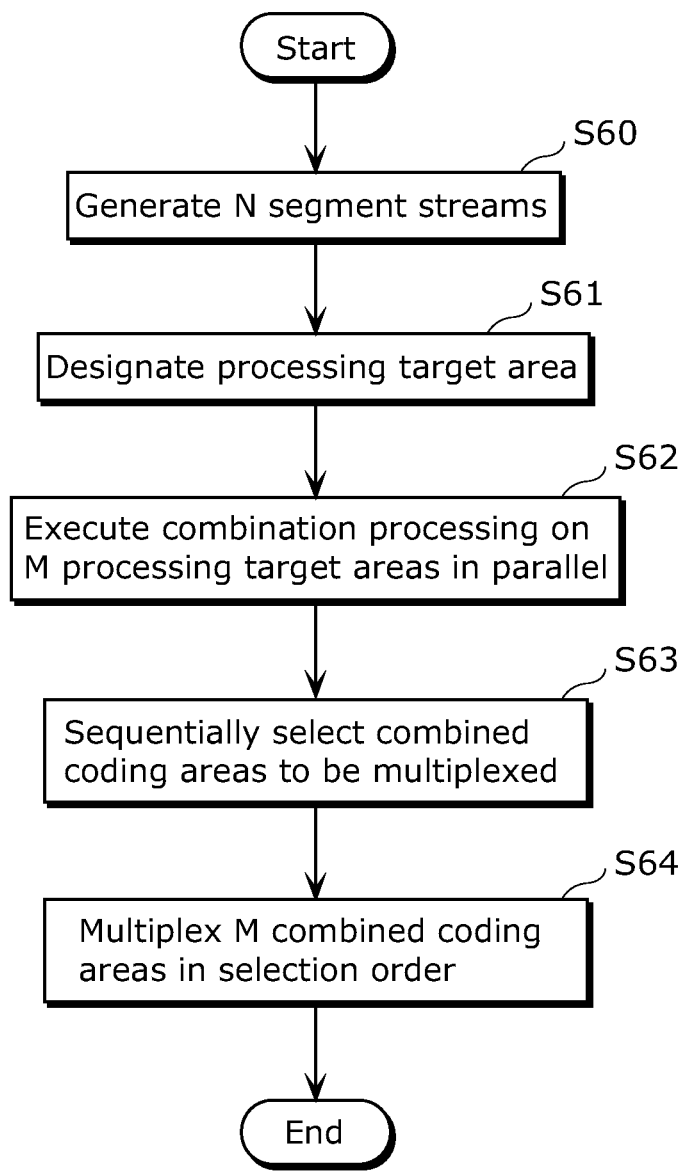
FIG. 43 is a flowchart showing an image coding method by the image coding apparatus according to the present invention.
Figure 44:
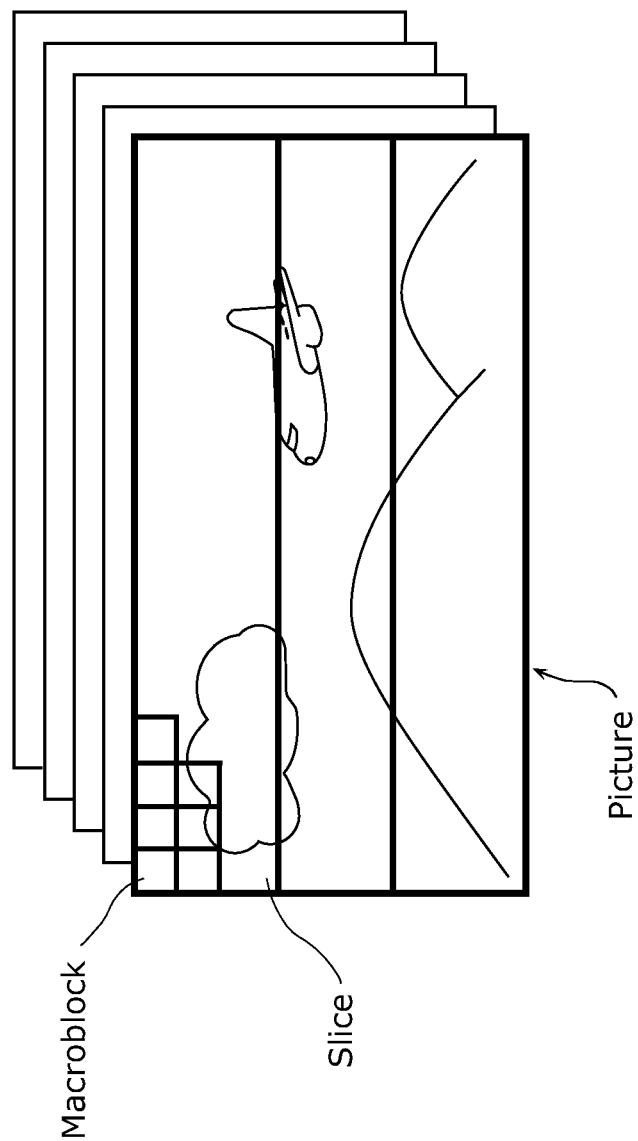
FIG. 44 is a diagram showing a structure of a picture to be coded.
Figure 45:
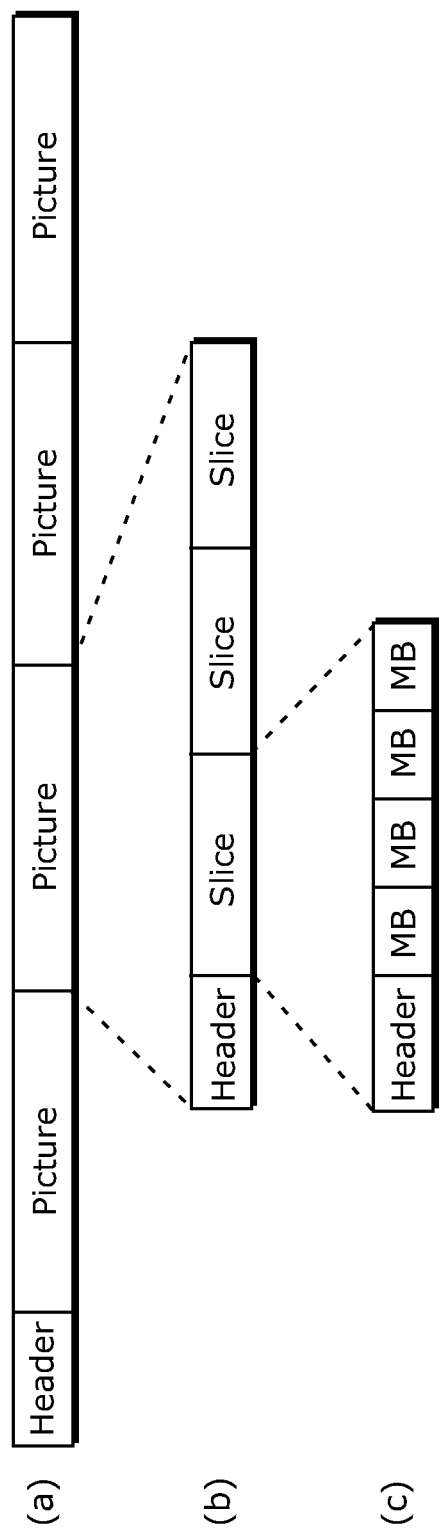
FIG. 45 is a diagram showing a structure of a bit stream.
Figure 46:
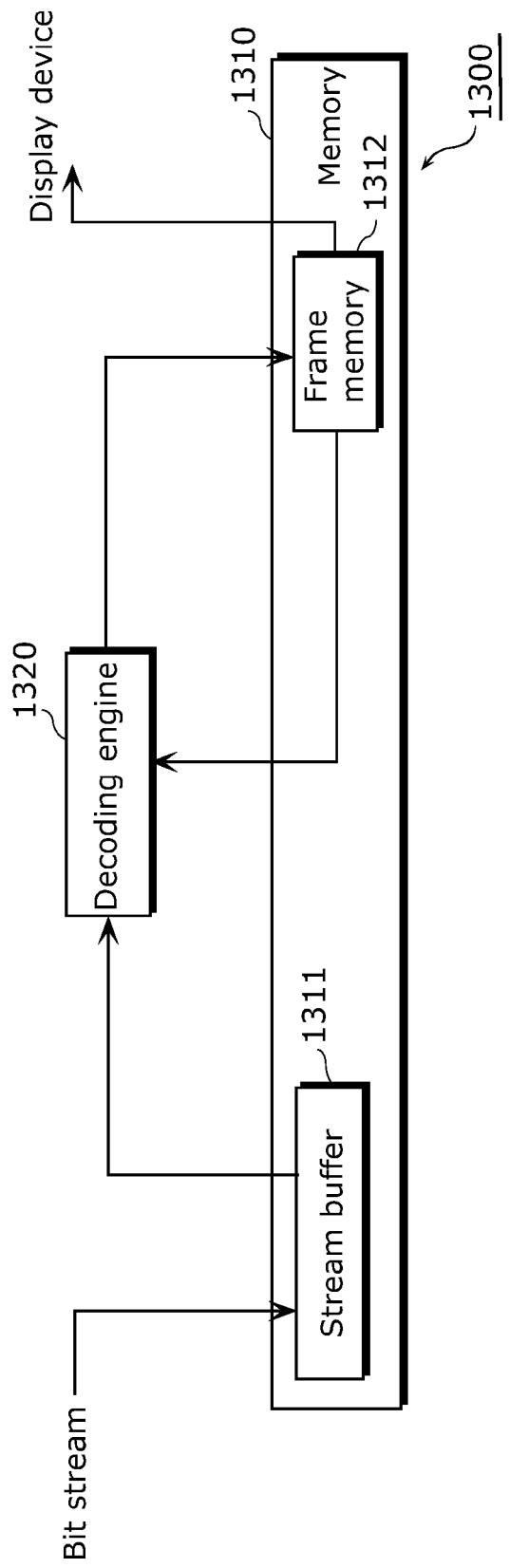
FIG. 46 is a diagram showing a structure of a conventional image decoding apparatus.
Figure 47:
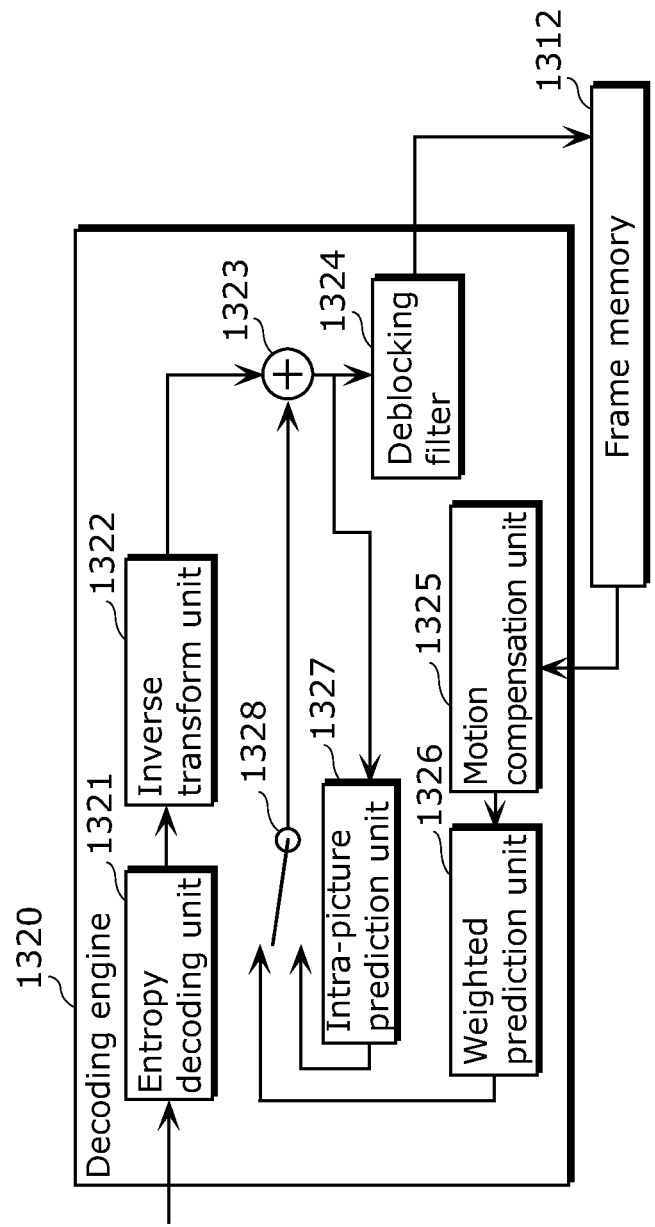
FIG. 47 is a diagram showing a structure of a conventional decoding engine.
Figure 48:
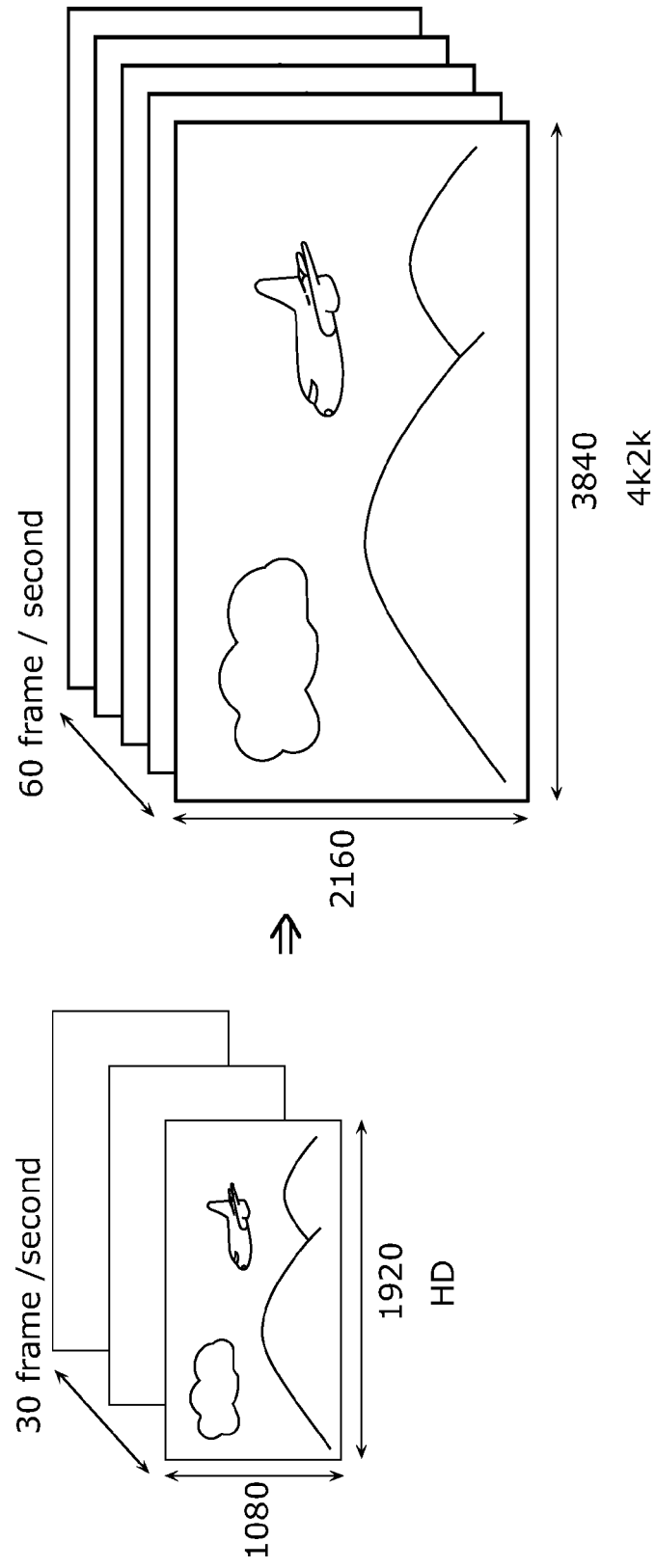
FIG. 48 is an illustration of HD and 4k2k.

FIG. 43 is a flowchart showing an image coding method by the image coding apparatus 20.

This image coding method is a method whereby the image coding apparatus 20 generates a bit stream by coding image data, and includes: a coding step S60 of generating N (N is an integer equal to or greater than 2) segment streams by coding, for each picture included in the image data, a plurality of structural units included in the picture in parallel, N being an integer equal to or greater than 2; a first combination control step S61 of designating a processing target area included in the bit stream; a stream combination step S62 of executing combination processing in parallel on M processing target areas designated in the first combination control step S61, the combination processing being a process of combining partial areas that are respectively included in the N segment streams and correspond to a processing target area to generate a combined coding area which is the processing target area; a second combination control step S63 of sequentially selecting, from M combined coding areas generated in the stream combination step S62, combined coding areas to be multiplexed, based on positions, in the bit stream, of the M processing target areas designated in the first combination control step S61; and a multiplexing step S64 of generating the bit stream by multiplexing the M combined coding areas in order in which the combined coding areas are selected in the second combination control step S63.

In the stream combination step S62, in the case where the partial areas are composed of a plurality of coded structural units when executing the combination processing, the combined coding area are generated by segmenting the partial areas into the plurality of coded structural units and recombining the plurality of coded structural units. Moreover, in the case where a slice included in the image data is segmented into a plurality of slice portions and coded and the plurality of coded slice portions are assigned to the N segment streams when performing the recombination, a slice portion group made up of the plurality of coded slice portions is reconstructed as a new slice in the combined coding area.

Though the combination processing is performed in parallel in the image coding apparatus 20 and the image coding method, the combination processing may instead be performed serially. In such a case, the image coding apparatus 20 includes only one stream combination unit 23.

In the image coding apparatus 20 and the image coding method described above, a picture is segmented into a plurality of structural units such as macroblock lines, and each of the plurality of macroblock lines is assigned to and coded by a corresponding one of the N coding units 21. This enables the N coding units 21 to equally share the load of coding processing, with it being possible to appropriately execute parallel coding processing. For example, even in the case where an H.264/AVC coded picture is composed of one slice, the picture is segmented into a plurality of macroblock lines, so that the load of coding one slice is not placed on one coding unit 21 but equally shared by the N coding units 21.

Moreover, the coding processing is allocated to the M stream combination units 23 on a processing target area basis by the processing target area designation by the first combination control unit 22, as a result of which the combination processing can be performed by the M stream combination units 23 in parallel.

When a picture is segmented into a plurality of macroblock lines and coded, there is a possibility that a slice extending over a plurality of macroblock lines is segmented into a plurality of slice portions and these slice portions are sequentially assigned to segment streams. That is, slice portions which are segments of the slice are distributed in each segment stream. Such distributed slice portions are not in the same order as in the image data. This being so, in the case where there is a dependency between the plurality of consecutive macroblock lines based on a predetermined code word, the distributed slice portions cannot maintain the dependency. In such a state, it is impossible to generate the bit stream conforming to the corresponding coding scheme. Accordingly, in the image coding apparatus 20 and the image coding method, the slice portion group, i.e. the group of the distributed slice portions, is reconstructed as a new slice in the combination processing. In so doing, the combined coding area including the slice portion group can be generated in conformance with the coding scheme.

Further, when the combination processing is allocated to the M stream combination units 23 on a processing target area basis and performed by the M stream combination units 23 in parallel, the order of the plurality of processing target areas included in the bit stream cannot be maintained in the M combined coding areas (partial streams) generated by the parallel combination processing. As a result, the M combined coding areas cannot be multiplexed in the correct order.

In view of this, in the image coding apparatus 20 and the image coding method, for each designated processing target area, combined coding areas to be multiplexed are sequentially selected from the M combined coding areas generated by the M stream combination units 23, based on the position of the processing target area, i.e. the position in coding order of the processing target area in the bit stream. The M combined coding areas are then multiplexed in the order in which the combined coding areas are selected. As a result, the M combined coding areas can be multiplexed in the correct order. Furthermore, in the image coding apparatus 20 and the image coding method, the designation of the processing target areas and the selection of the combined coding areas to be multiplexed are performed in a centralized manner by a component other than the M stream combination units 23 and the N coding units 21. No special processing or structure is required of each component such as the M stream combination units 23 and the N coding units 21, in order to multiplex the M combined coding areas in the correct order as mentioned above. Hence, parallel coding processing can be appropriately executed by a simple structure.

Therefore, the image coding apparatus 20 and the image coding method can produce the above-mentioned distinct advantageous effects of the present invention and achieve the above-mentioned objects of the present invention, without a need for the partial stream buffer 363 and the like in the above embodiment.

Though Embodiments 1 to 3 describe the case where one MB line is treated as one structural unit and a picture is segmented into a plurality of structural units, the structural unit is not limited to one MB line. The structural unit may be two MB lines, three MB lines, or a plurality of macroblocks vertically arranged in a row in the picture. As an example, the structural unit may be two MB lines in the case where the picture is coded in MBAFF, and one MB line in the case where the picture is not coded in MBAFF.

Though Embodiments 1 and 2 describe the case where the stream segmentation control unit allocates the processing to the M stream segmentation units on a slice basis, the processing may be allocated on a larger unit basis, such as on a picture basis or on a picture group basis where a picture group is made up of a plurality of pictures.

Likewise, though Embodiment 3 describes the case where the stream combination control unit allocates the processing to the M stream combination units on a slice basis, the processing may be allocated on a larger unit basis, such as on a picture basis or on a picture group basis where a picture group is made up of a plurality of pictures.

Though Embodiments 1 and 2 describe the case where the stream segmentation unit inserts the slice header copy in the segment stream and the decoding engine reads and decodes the segment stream in which the slice header copy is inserted, the stream segmentation unit may directly output the slice header copy to the decoding engine without inserting the slice header copy in the segment stream. For example, the stream segmentation unit may determine whether or not the slice header copy needs to be present immediately before the MB line in the segment stream to be read by the decoding engine and, when determining that the slice header copy needs to be present, output the slice header copy to the decoding engine immediately before the decoding engine reads the MB line. Here, the stream segmentation unit may output only a part of information included in the slice header copy to the decoding engine, instead of outputting the slice header copy itself.

Though Embodiment 3 describes the case where the stream combination unit generates and adds header information such as an SPS, a PPS, and a slice header, the header information may be generated and added by a processing unit other than the stream combination unit. In detail, when each of the N encoding engines generates a segment stream, the encoding engine may generate the segment stream to which the slice header is added. In such a case, there is a possibility of an overlap of slice headers for the same slice when the stream combination unit combines segment streams. When this occurs, the stream combination unit removes an unnecessary slice header. Alternatively, the SPS, the PPS, and the slice header may be generated and added by the multiplexing unit.

Though Embodiments 1 and 2 describe the case where the stream segmentation unit executes one of the QP variation modification and the QP variation insertion, the stream segmentation unit may execute both the QP variation modification and the QP variation insertion. In this case, the stream segmentation unit may determine, for example, whether or not a starting macroblock of an MB line includes a QP variation, perform replacement of the QP variation in the macroblock or the like (Steps S318 to S322 in FIG. 21) when the starting macroblock of the MB line includes the QP variation, and perform accumulated QP variation output or the like (Steps S352 to S356 in FIG. 28) when the starting macroblock of the MB line does not include the QP variation.

In the case where the stream segmentation unit executes both the QP variation modification and the QP variation insertion, for example it is preferable that, when MB skip run information is located at the beginning of an MB line, the skip run modification unit determines whether or not a QP variation is inserted at the beginning of the MB line. The skip run modification unit may then add preceding MB skip run information to the MB skip run information (Step S210 in FIG. 18) when the QP variation is not inserted at the beginning of the MB line, and output each of the preceding MB skip run information and the MB skip run information as MB skip run information when the QP variation is inserted at the beginning of the MB line.

Though Embodiments 1 to 3 describe the case where the first code word is MB skip run information, the first code word may not necessarily be MB skip run information. For instance, the first code word may be a code word indicating consecutive macroblocks of a different kind from a skipped macroblock.

Though Embodiments 1 to 3 describe the case where the second code word is a QP variation, the second code word may not necessarily be a QP variation. For instance, the second code word may be a code word indicating a variation in coding coefficient between macroblocks other than a QP variation.

The functional blocks in the block diagrams (FIGS. 1, 10, 12, 17, 23, 24, 26, 29, 35, 38A, and so on) may be realized by LSI (Large Scale Integration) which is typically an integrated circuit. The functional blocks may each be individually implemented as one chip, or may be partly or wholly implemented on one chip. As an example, the part (including the M stream segmentation units 130 and the first to N-th decoding engines 120) represented by the decoder 110 in FIG. 1 may be included in one chip.

Though LSI is mentioned here, the circuit may be called an IC (Integrated Circuit), system LSI, super LSI, ultra LSI, or the like, depending on the degree of integration.

The integrated circuit method is not limited to LSI, and may be realized by a dedicated circuit or a general-purpose processor. A FPGA (Field Programmable Gate Array) which can be programmed or a reconfigurable processor which is capable of reconfiguring connections and settings of circuit cells in LSI may also be used after LSI manufacturing.

When an integrated circuit technology that replaces LSI emerges from development of semiconductor technologies or other derivative technologies, such a technology may be used for integration of the functional blocks. For instance, biotechnology may be adapted in this way.

INDUSTRIAL APPLICABILITY

The image decoding apparatus and the image coding apparatus according to the present invention respectively produce advantageous effects of appropriately executing parallel decoding processing and parallel coding processing by simple structures, and are useful, for example, as a reproduction apparatus that decodes a 4k2k bit stream and a recording apparatus that codes a 4k2k moving picture.

REFERENCE SIGNS LIST 10, 100, 200 Image decoding apparatus
11 First segmentation control unit
12, 130, 230 First to M-th stream segmentation units (stream segmentation unit)
13 Second segmentation control unit
14 Decoding unit
20, 300, 300a Image coding apparatus
21 Coding unit
22 First combination control unit
23, 330, 330b First to M-th stream combination units (stream combination unit)
24 Second combination control unit
25, 350 Multiplexing unit
110, 210 Decoder
120, 220 First to N-th decoding engines (decoding engine)
130m, 330m Processing management unit
131 Start code detection unit
132a EPB removal unit
132b EPB insertion unit
133 Slice header insertion unit
133a NAL type determination unit
133b Header insertion counter
133c Header address update unit
133d Header buffer
134, 134a, 134b Slice data processing unit
135a, 135b Slice data layer decoding unit
136a, 136b Macroblock layer decoding unit
137a, 137b Skip run modification unit
138, 138a, 138b QP delta modification unit
139, 139a, 139b Segment boundary detection unit
140 Stream segmentation control unit
150 Memory
151 Stream buffer
152 First to M-th segment stream buffers (segment stream buffer)
153 Frame memory
160 Skip run extraction unit
161 Skip run segmentation unit
162 Skip run accumulation and holding unit
163 Addition unit
164 Skip run coding unit
238, 238a, 238b QP delta insertion unit
310 Encoder
320 First to N-th encoding engines (encoding engine)
331 Start code detection unit
332a EPB removal unit
332b EPB insertion unit
333 Header insertion unit
334a, 334b Slice data processing unit 335a, 335b Slice data layer analysis unit
336a, 336b Macroblock layer analysis unit
337a Skip run modification unit
338, 338a, 338b QP delta modification unit
339a, 339b Segment boundary detection unit
340 Stream combination control unit
360 Memory
361 Frame memory
362 Segment stream buffer
363 First to M-th partial stream buffers (partial stream buffer)

The invention claimed is:

1. An image decoding apparatus that decodes a bit stream generated by coding image data, said image decoding apparatus comprising:
a processor;
a non-transitory computer-readable medium having stored thereon executable instructions, which when executed by the processor, cause the image decoding apparatus to:
designate processing target areas included in the bit stream;
generate M×N segment streams by executing stream segmentation processing in parallel on M processing target areas of the designated processing target areas;
execute the stream segmentation processing on one of the M processing target areas each time M processing target areas are designated, the stream segmentation processing being a process of generating at least a portion of N segment streams from one of the M processing target areas, M being an integer equal to or greater than 2, and N being an integer equal to or greater than 2;
for each processing target area of the designated processing target areas, select a portion of each of at least one segment stream from the generated M×N segment streams, based on a position of the respective processing target area in the bit stream;
each time the portion of each of the at least one segment stream is selected, decode respective portions of the N segment streams in parallel, the portions of the N segment streams including the portion of each of the at least one segment stream;
execute the stream segmentation processing, by segmenting one of the processing target areas into a plurality of structural units and assigning each of the plurality of structural units to a portion of a corresponding one of the generated N segment streams; and
for a slice included in the one of the processing target areas, the slice being segmented into a plurality of slice portions and the plurality of slice portions being assigned to a plurality of segment streams as a result of segmenting the one of the processing target areas into the plurality of structural units, reconstruct, for each of the plurality of segment streams, a slice portion group made up of one or more slice portions assigned to the segment stream, as a new slice.

2. The image decoding apparatus according to claim 1, wherein the executable instructions, when executed by the processor, further cause the image decoding apparatus to analyze each piece of first header information included in the bit stream and generate the N segment streams based on a result of the analysis, irrespective of the designated processing target areas.

3. The image decoding apparatus according to claim 1, wherein the executable instructions, when executed by the processor, further cause the image decoding apparatus to generate N segment streams that include second header information included in the bit stream, and generate N segment streams that do not include the second header information.

4. The image decoding apparatus according to claim 1, wherein the executable instructions, when executed by the processor, further cause the image decoding apparatus to generate selection information indicating the selected portion of the segment stream, and output the generated selection information, and
decode the portions of the N segment streams indicated by the outputted selection information, in parallel.

5. The image decoding apparatus according to claim 4, wherein the executable instructions, when executed by the processor, further cause the image decoding apparatus to output the selection information including a data size of the selected portion of the segment stream, and
to specify the portions of the N segment streams based on the data size included in the outputted selection information, and decode the specified portions in parallel.

6. The image decoding apparatus according to claim 5, wherein the executable instructions, when executed by the processor, further cause the image decoding apparatus to output the selection information including, as a data size, a number of bits or a number of data structural units constituting each of the N segment streams.

7. The image decoding apparatus according to claim 1, wherein the executable instructions, when executed by the processor, further cause the image decoding apparatus to:
judge whether or not the stream segmentation processing executed on the designated M processing target area is completed; and
in the case of judging that the stream segmentation processing is completed, preferentially designate a new processing target area.

8. The image decoding apparatus according to claim 1, wherein in the case where a first slice portion is decoded and included in an assigned segment stream from among the N segment streams and a second slice portion is decoded and included in an another assigned segment stream from among the N segment streams, the first slice portion and the second slice portion being spatially adjacent to each other:
the executable instructions, when executed by the processor, further cause the image decoding apparatus to start decoding the first slice portion before decoding the second slice portion; and
to obtain adjacency information generated as a result of the decoding of the first slice portion, and decode the second slice portion using the adjacency information or decode the second slice portion without using the adjacency information.

9. The image decoding apparatus according to claim 1, wherein the executable instructions, when executed by the processor, further cause the image decoding apparatus to designate, as a processing target area of the processing target areas, a slice, a picture, or a picture group made up of a plurality of pictures in the bit stream.

10. An image decoding method for decoding a bit stream generated by coding image data, said image decoding method comprising:
designating processing target areas included in the bit stream;
generating M×N segment streams by executing stream segmentation processing in parallel on M processing target areas designated in said designating, the stream segmentation processing being a process of generating at least a portion of N segment streams from one of the M processing target areas each time M processing target areas are designated in said designating, M being an integer equal to or greater than 2, and N being an integer equal to or greater than 2;

selecting, for each processing target area of the processing target areas designated in said designating, a portion of each of at least one segment stream from the M×N segment streams generated in said generating, based on a position of the respective processing target area in the bit stream; and decoding, each time the portion of each of the at least one segment stream is selected in said selecting, respective portions of the N segment streams in parallel, the portions of the N segment streams including the portion of each of the at least one segment stream, wherein said generating includes:

executing the stream segmentation processing, by segmenting one of the processing target areas into a plurality of structural units and assigning each of the plurality of structural units to a portion of a corresponding one of the generated N segment streams; and for a slice included in the one of the processing target areas, the slice being segmented into a plurality of slice portions and the plurality of slice portions being assigned to a plurality of segment streams as a result of segmenting the one of the processing target areas into the plurality of structural units, reconstructing, for each of the plurality of segment streams, a slice portion group made up of one or more slice portions assigned to the segment stream, as a new slice.

11. An image coding apparatus that generates a bit stream by coding image data, said image coding apparatus comprising:

a processor;

a non-transitory computer-readable medium having stored thereon executable instructions, which when executed by the processor, cause the image coding apparatus to:

generate N segment streams by coding in parallel, for each picture included in the image data, a plurality of structural units included in the picture, N being an integer equal to or greater than 2;

designate processing target areas included in the bit stream;

execute combination processing in parallel on M processing target areas of the designated processing target areas, the combination processing being a process of combining partial areas that are respectively included in the N segment streams and correspond to a processing target area of the designated processing target areas to generate a combined coding area which is the processing target area, M being an integer equal to or greater than 2;

sequentially select, from generated M combined coding areas, combined coding areas to be multiplexed, based on positions of designated M processing target areas in the bit stream;

generate the bit stream by multiplexing the M combined coding areas in an order in which the combined coding areas are selected;

in the case where the partial areas include a plurality of coded structural units when executing the combination processing, generate the combined coding area by segmenting the partial areas into the plurality of coded structural units and recombining the plurality of coded structural units; and for a slice included in the image data, the slice being segmented into a plurality of slice portions and being coded and the plurality of coded slice portions assigned to the N segment streams when performing the recombination, reconstruct a slice portion group made up of the plurality of coded slice portions as a new slice in the combined coding area.

12. The image coding apparatus according to claim 11, wherein the executable instructions, when executed by the processor, further cause the image coding apparatus to, each time a combined coding area to be multiplexed is selected, generate selection information indicating the selected combined coding area, and output the generated selection information, and to, each time the selection information is obtained, multiplex the combined coding area indicated by the selection information into the bit stream.

13. The image coding apparatus according to claim 12, wherein the executable instructions, when executed by the processor, further cause the image coding apparatus to output the selection information including a data size of the selected combined coding area, and to multiplex the combined coding area of the data size included in the selection information, into the bit stream.

14. The image coding apparatus according to claim 11, wherein the executable instructions, when executed by the processor, further cause the image coding apparatus to:

judge whether or not the executed combination processing is completed; and in the case of judging that the combination processing is completed, preferentially designate a new processing target area.

15. The image coding apparatus according to claim 11, wherein in the case where a first structural unit is coded and assigned from among N structural units and a second structural unit is coded and assigned from among the N structural units, the first structural unit and the second structural unit being adjacent to each other in the picture:

the executable instructions, when executed by the processor, further cause the image coding apparatus to start coding the first structural unit before coding the second structural unit; and to obtain adjacency information generated by the coding of the first structural unit, and code the second structural unit using the adjacency information or code the second structural unit without using the adjacency information.

16. An image coding method for generating a bit stream by coding image data, said image coding method comprising:

generating N segment streams by coding in parallel, for each picture included in the image data, a plurality of structural units included in the picture, N being an integer equal to or greater than 2;

designating processing target areas included in the bit stream;

executing combination processing in parallel on M processing target areas designated in said designating, the combination processing being a process of combining partial areas that are respectively included in the N segment streams and correspond to a processing target area of the processing target areas designated in said designating to generate a combined coding area which is the processing target area, M being an integer equal to or greater than 2;

sequentially selecting, from M combined coding areas generated in said executing, combined coding areas to be multiplexed, based on positions of the M processing target areas in the bit stream, the M processing target areas being designated in said designating; and generating the bit stream by multiplexing the M combined coding areas in order in which the combined coding areas are selected in said sequentially selecting, wherein said executing includes:

in the case where the partial areas include a plurality of coded structural units when executing the combination processing, generating the combined coding area by segmenting the partial areas into the plurality of coded structural units and recombining the plurality of coded structural units; and for a slice included in the image data, the slice being segmented into a plurality of slice portions and being coded and the plurality of coded slice portions assigned to the N segment streams when performing the recombination, reconstructing a slice portion group made up of the plurality of coded slice portions as a new slice in the combined coding area.

* * * * *